(12) United States Patent
Rudow

(10) Patent No.: US 12,506,878 B1
(45) Date of Patent: Dec. 23, 2025

(54) STREAMING CODES FOR VARIABLE SIZE MESSAGES ACCOMMODATING PARTIAL BURST LOSSES

(71) Applicant: Michael H. Rudow, Cleveland, OH (US)

(72) Inventor: Michael H. Rudow, Cleveland, OH (US)

( * ) Notice: Subject to any disclaimer, the term of this patent is extended or adjusted under 35 U.S.C. 154(b) by 0 days.

(21) Appl. No.: 18/647,873

(22) Filed: Apr. 26, 2024

Related U.S. Application Data

(60) Provisional application No. 63/523,184, filed on Jun. 26, 2023.

(51) Int. Cl.
*H04N 19/149* (2014.01)
*H04N 19/164* (2014.01)

(52) U.S. Cl.
CPC ......... *H04N 19/149* (2014.11); *H04N 19/164* (2014.11)

(58) Field of Classification Search
CPC ........................... H04N 19/149; H04N 19/164
See application file for complete search history.

(56) References Cited

U.S. PATENT DOCUMENTS

| | | | |
|---|---|---|---|
| 5,699,365 A | 12/1997 | Klayman et al. | |
| 6,421,387 B1 | 7/2002 | Rhee | |
| 6,694,478 B1 | 2/2004 | Martinian et al. | |
| 7,257,664 B2 | 8/2007 | Zhang | |
| 8,352,832 B2 | 1/2013 | Khisti et al. | |
| 8,375,266 B2 | 2/2013 | Zhang | |
| 8,775,889 B2 | 7/2014 | Zhang | |
| 9,209,897 B2 | 12/2015 | Amitai et al. | |
| 9,641,803 B1 | 5/2017 | Badr et al. | |
| 9,843,413 B2 | 12/2017 | Badr et al. | |
| 10,833,710 B2 | 11/2020 | Caramma | |
| 10,979,175 B2 | 4/2021 | Low et al. | |
| 11,036,525 B2 | 6/2021 | Momchilov | |
| 11,303,690 B1 | 4/2022 | Bhattacharyya et al. | |
| 2013/0039410 A1 | 2/2013 | Tan et al. | |

(Continued)

FOREIGN PATENT DOCUMENTS

| | | | | |
|---|---|---|---|---|
| CA | 2978211 C | * | 8/2023 | ........... H04L 1/0041 |
| CN | 101427495 B | * | 12/2013 | ........... H03M 13/00 |
| WO | 2019213556 A1 | | 11/2019 | |

OTHER PUBLICATIONS

Wang, Y., et al., "Error Control and Concealment for Video Communication: A Review," Proceedings of the IEEE, vol. 86, No. 5, May 1998 (24 pages).

(Continued)

*Primary Examiner* — Tracy Y. Li
(74) *Attorney, Agent, or Firm* — Nutter McClennen & Fish LLP

(57) ABSTRACT

Video frames to be transmitted are split into two components U and V, which can be different sizes depending on criteria such as burst and packet loss estimates provided as feedback from a receiver based on actual or predicted burst and packet losses. Parity symbols are generate for a frame, i, that is a function of the symbols of $V[i-\tau:i]$ and $U[i-\tau]$ so that for any partial burst the symbols of first component of data frames are all recovered by t time slots after the start of the burst and the symbols of the second component of each data frame are recovered t time slots later.

20 Claims, 35 Drawing Sheets

(56) References Cited

U.S. PATENT DOCUMENTS

| | | | |
|---|---|---|---|
| 2013/0070844 A1 | 3/2013 | Malladi et al. | |
| 2013/0097470 A1 | 4/2013 | Hwang et al. | |
| 2013/0156420 A1 | 6/2013 | Amitai et al. | |
| 2014/0101521 A1* | 4/2014 | Myung | H04L 1/0057 |
| | | | 714/776 |
| 2017/0279558 A1 | 9/2017 | Badr et al. | |
| 2018/0034583 A1 | 2/2018 | Low et al. | |
| 2019/0007069 A1 | 1/2019 | Caramma | |
| 2019/0339997 A1 | 11/2019 | Momchilov | |
| 2020/0044772 A1 | 2/2020 | Low et al. | |
| 2020/0177311 A1* | 6/2020 | Ho | H04L 1/0002 |
| 2020/0322008 A1* | 10/2020 | Lomayev | H04B 7/0456 |
| 2022/0124543 A1 | 4/2022 | Orhan et al. | |
| 2023/0106959 A1 | 4/2023 | Ananthanarayanan et al. | |

OTHER PUBLICATIONS

Watson, M. et al, "Forward Error Correction (FEC) Framework," Internet Engineering Task Force (IETF), Oct. 2011 (42 pages).

Weiring, M., et al., "Reinforcement Learning, State of the Art," Adaptation, Learning, And Optimization, vol. 12, 2012 (653 pages).

White, G., et al, "A Simulation Study of CoDel, SFQ-CoDel and PIE in DOCSIS 3.0 Network," Active Queue Management Algorithms for DOCSIS 3.0, Cable Television Laboratories, Inc., Apr. 2013 (45 pages).

Wong, A., et al., "Deep multiagent reinforcement learning: challenges and directions," Artificial Intelligence Review (2023) 56:5023-5056 (34 pages).

Wu, D., et al., "Transporting Real-Time Video over the Internet: Challenges and Approaches," Proceedings of the IEEE, vol. 88, No. 12, Dec. 2000 (21 pages).

Yang, Y., et al., "An Overview of Multi-agent Reinforcement Learning from Game Theoretical Perspective," arXiv:2011. 00583v3 [cs.MA] Mar. 18, 2021 (129 pages).

Yaqoob A. et al., "A Survey on Adaptive 360 Video Streaming: Solutions, Challenges and Opportunities," IEEE Communications Surveys & Tutorials, vol. 22, No. 4, Fourth Quarter 2020 (38 pages).

Zadnik, J., et al., "Image and Video Coding Techniques for Ultra-low Latency," ACM Computing Surveys, vol. 54, No. 11s, Article 231. Publication date: Sep. 2022 (35 pages).

Zhang, K., et al., "Multi-Agent Reinforcement Learning: A Selective Overview of Theories and Algorithms," arXiv:1911.10635v2 [cs.LG] Apr. 28, 2021 (73 pages).

Li, Z., et al., "Correcting Erasure Bursts with Minimum Decoding Delay," https://www.comm.toronto.edu/~akhisti/burst_erasure.pdf, pp. 33-39, 2011 (7 pages).

Li, Z., et al., "Forward Error Protection For Low-Delay Packet Video," Proceedings of 2010 IEEE 18th International Packet Video Workshop, Hong Kong, Dec. 13-14, 2010 (8 pages).

Lin, C., "A RED-FEC Mechanism for Video TransmissionOver WLANs," IEEE Transactions on Broadcasting, vol. 54, No. 3, Sep. 2008 (8 pages).

Lykouris, T., et al., "Competitive Caching with Machine Learned Advice," 2021. J. ACM 68, 4, Article 24 (Jul. 2021), (pp. 24:1-24:25 (25 pages).

Ma, S., et al., "Image and V+B63:B75ideo Compression with Neural Networks: A Review," IEEE Transactions On Circuits And Systems For Video Technology, arXiv:1904.03567v2 [cs.CV] Apr. 10, 2019 (16 pages).

Martinian, E., et al., "Burst Erasure Correction Codes With Low Decoding Delay," IEEE Transactions On Information Theory, vol. 50, No. 10, Oct. 2004 pp. 2494-2502 (9 pages).

Maturana, F., et al., "Access-optimal Linear MDS Convertible Codes for All Parameters," available on arXiv, 2020 (6 pages).

Mazyavkina, N., et al., "Reinforcement learning for combinatorial optimization: A survey," Computers & Operations Research 134 (2021) 105400 (15 pages).

McCanne, S. et al., "Joint Source/Channel Coding for Multicast Packet Video," Proceedings., International Conference on Image Processing, Washington, DC, USA, 1995, pp. 25-28 vol. 1, doi: 10.1109/ICIP.1995.529030 (4 pages).

Mitzenmacher, M., "A Model for Learned Bloom Filters, and Optimizing by Sandwiching," 32nd Conference on Neural Information Processing Systems (NeurIPS 2018), Montréal, Canada (10 Pages).

Moerland, T., et al., "Model-based Reinforcement Learning: A Survey," Foundations and Trends® in Machine Learning, vol. 16, No. 1, pp. 1-118, 2023 (43 pages).

Nagy, M., et al., "Congestion Control using FEC for Conversational Multimedia Communication," MMSys '14 Mar. 19-21, 2014, Singapore, Singapore (12pages).

Narra, H., et al., "Collage Inference: Using Coded Redundancy for Lowering Latency Variation in Distributed Image Classification Systems," 2020 IEEE 40th International Conference on Distributed Computing Systems (ICDCS), Singapore, Singapore, 2020, pp. 453-463, doi: 10.1109/ICDCS47774.2020.00024, pp. 453-463 (11 pages).

Nichols, K., et al., "Controlled Delay Active Queue Management," Internet Engineering Task Force (IETF), Jan. 2018 (25 pages).

Nowroozi, E., et al., "A survey of machine learning techniques in adversarial image forensics," Computers & Security 100 (2021) 102092 (25 pages).

Orosz, P., et al., "A Case Study on Correlating Video QoS and QoE," 2014 IEEE Network Operations and Management Symposium (NOMS) (5 pages).

O'Shea, T. et al., "An Introduction to Deep Learning for the Physical Layer," IEEE Transactions On Cognitive Communications And Networking, vol. 3, No. 4, Dec. 2017.

Pan, R., et al., "Proportional Integral Controller Enhanced (PIE): A Lightweight Control Scheme to Address the Bufferbloat Problem," Internet Engineering Task Force (IETF), Feb. 2017 (30 pages).

Park, K., "AFEC: An Adaptive Forward Error-Correction Protocol and Its Analysis," Department of Computer Science Technical Reports, Report No. 97-038, 1997 (25 pages).

Perkins, C., et al., "A Survey of Packet Loss Recovery Techniques for Streaming Audio," IEEE Network Sep./Oct. 1998 pp. 40-48 (9 pages).

Ponlatha, S., et al., "Comparison of Video Compression Standards," International Journal of Computer and Electrical Engineering, vol. 5, No. 6, Dec. 2013 (7 pages).

Powell, W., "A unified framework for stochastic optimization," European Journal of Operational Research (2018) pp. 1-27 (27 pages).

Raghavendra, R., et al., "Characterizing High-bandwidth Real-time Video Traffic in Residential Broadband Networks," WiOpt'10: Modeling and Optimization in Mobile, Ad Hoc, and Wireless Networks, May 2010, Avignon, France. pp. 539-544 (6 pages).

Rao, N., et al., "Analysis of the Effect of QoS on Video Conferencing QoE," https://ieeexplore.ieee.org/abstract/document/8766591, 2019 (6 pages).

Rippel, O., et al., "Learned Video Compression," Computer Vision Foundation, arXiv:1811.06981, Nov. 16, 2018 (10 pages).

Rosenberg, J., et al., "An RTP Payload Format for Generic Forward Error Correction," Network Working Group, Columbia University, Dec. 1999 (26 pages).

Rudow, M. et al., "A locality-based approach for coded computation," arXiv:2002.02440v1 [cs.IT], Feb. 6, 2020 (18 pages).

Rudow, M. et al., "A locality-based lens for Coded computation," retrieved from the internet at: //2021 IEEE International Symposium on Information Theory (ISIT) © 2021 IEEE | DOI: 10.1109/ISIT45174.2021.9518056// (6 pages).

Rudow, M. et al., "Learning-Augmented Streaming Codes are Approximately Optimal for Variable-Size Messages," arXiv:2205. 08521v1 [cs.IT] Extended Version, May 17, 2022 (13 pages).

Rudow, M., "Discrete Logarithm and Minimum Circuit Size," Inf. Process. Lett. (2017) http://dx.doi.org/10.1016/j.ipl.2017.07.005 (10 pages).

Rudow, M., "Efficient loss recovery for videoconferencing via streaming codes and machine learning," Carnegie Mellon University, Thesis, retrieved from the internet at //https://doi.org/10.1184/R1/24992973.v1//, May 2023 (186 pages).

(56) References Cited

OTHER PUBLICATIONS

Rudow, M., et al., "Learning-augmented streaming codes for variable-size messages under partial burst losses," in 2023 IEEE International Symposium on Information Theory (ISIT), 2023, (20 pages).
Rudow, M., et al., "On expanding the toolkit of locality-based coded computation to the coordinates of inputs," 2023 IEEE International Symposium on Information Theory (ISIT) (10 pages).
Rudow, M., et al., "On expanding the toolkit of locality-based coded computation to the coordinates of inputs," 2023 IEEE International Symposium on Information Theory (ISIT) (6 pages).
Rudow, M., et al., "Online Versus Offline Rate in Streaming Codes for Variable-Size Messages," arXiv:2006.03045v2 [cs.IT] Feb. 27, 2023 (21 pages).
Rudow, M., et al., "Online Versus Offline Rate In Streaming Codes For Variable-Size Messages," 2020 IEEE International Symposium on Information Theory (ISIT), 2020 (6 pages).
Rudow, M., et al., "Compression-informed coded computing," In 2023 IEEE International Symposium on Information Theory (ISIT), pp. 2177-2182, 2023 (6 pages).
Rudow, M., et al., "Learning-augmented streaming codes are approximately optimal for variable-size messages," 2022 IEEE International Symposium on Information Theory (ISIT). IEEE, pp. 474-479, 2022 (6 pages).
Rudow, M., et al., "Learning-Augmented Streaming Codes For Variable-Size Messages Under Partial Burst Losses," In 2023 IEEE International Symposium on Information Theory (ISIT), pp. 1101-1106, 2023 (6 pages).
Rudow, M., et al., "Online versus offline rate in streaming codes for variable-size messages," IEEE Transactions on Information Theory, vol. 69, No. 6, pp. 3674-3690, 2023 (17 pages).
Rudow, M., et al., "Streaming codes for variable-size arrivals," 2018 56th Annual Allerton Conference on Communication, Control, and Computing, (Allerton). IEEE, 2018 (8 pages).
Rudow, M., et al., "Streaming Codes for Variable-Size Messages," IEEE Transactions on Information Theory, vol. 68, No. 9, pp. 5823-5849, Sep. 2022 (27 pages).
Rudow, M., et al., "Tambur: Efficient loss recovery for videoconferencing via streaming codes," In Proceedings of the 20th USENIX Symposium on Networked Systems Design and Implementation, Apr. 17-19, 2023 (20 pages).
Sharma, S., "Active Queue Management for Forward Error Correction," International Journal of Computing and Business Research (IJCBR) ISSN (Online) : 2229-6166, vol. 3, Issue 2, May 2012 (7 pages).
Sullivan, G., et al., "Video Compression-From Concepts to the H.264/AVC Standard," Proceedings of the IEEE, vol. 93, No. 1, Jan. 2005 (14 pages).
Sztrik, J., "Basic Queueing Theory," https://irh.inf.unideb.hu/~jsztrik/education/16/SOR_Main_Angol.pdf, 2016 (246 pages).
Tan, W., et al., "Video Multicast using Layered FEC and Scalable Compression," in IEEE Transactions on Circuits and Systems for Video Technology, vol. 11, No. 3, pp. 373-386, Mar. 2001, doi: 10.1109/76.911162 (30 pages).
Uehara, M. et al., "A Review of Off-Policy Evaluation in Reinforcement Learning," arXiv:2212.06355v1 [stat.ML] Dec. 13, 2022 (27 pages).
Usman, M., et al., "Survey of Error Concealment Techniques: Research Directions and Open Issues," 2015 Picture Coding Symposium (PCS), Cairns, QLD, Australia, 2015, pp. 233-238, doi: 10.1109/PCS.2015.7170081 (7 pages).
Wah, B., et al. "Survey of Error-Concealment Schemes for Real-Time Audio and Video Transmissions over the Internet," Proceedings International Symposium on Multimedia Software Engineering 2000 (8 pages).
Adams, R., "Active Queue Management: A Survey," IEEE Communications Surveys & Tutorials, vol. 15, No. 3, Third Quarter 2013 (52 pages).
Adan, I., et al., "Queueing Theory," retrieved from the internet at https://citeseerx.ist.psu.edu/document?repid=rep1&type=pdf&doi=097d866985fc04b986d1f28885de7a0c1e89fce9, Feb. 14, 2001 (180 pages).
Adler, N., et al., "Burst-Erasure Correcting Codes With Optimal Average Delay," IEEE Transactions On Information Theory, vol. 63, No. 5, May 2017, pp. 2848-2865 (18 pages).
Agrawal, A., et al., "A Rewriting System for Convex Optimization Problems," arXiv:1709.04494v2 [math. OC] Jan. 22, 2019, (18 pages).
Alemu, T., "The Interaction of Forward Error Correction and Active Queue Management," JDIR'04 : 6èmes Journées Doctorales Informatique et Réseau, Nov. 2004, Lannion, France. lirmm-00108649.
Almomani, O., et al, "Impact of Large Block FEC with Different Queue Sizes of Drop Tail and RED Queue Policy on Video Streaming Quality over Internet," 2010 Second International Conference on Network Applications, Protocols and Services (5 pages).
Almomani, O., et al, "Performance Study of Large Block FEC with Drop Tail for Video Streaming over the Internet," 2009 First International Conference on Networks & Communications (4 pages).
Alwahab, D., "A Simulation-Based Survey of Active Queue Management Algorithms," ICCBN 2018, Feb. 24-26, 2018, Singapore, Singapore, DOI: https://doi.org/10.1145/3193092.3193106 (7 pages).
Arulkumaran, K., et al., "A Brief Survey of Deep Reinforcement Learning," IEEE Signal Processing Magazine, Special Issue On Deep Learning For Image Understanding (Arxiv Extended Version), arXiv:1708.05866v2 [cs.LG] Sep. 28, 2017 (16 pages).
Author Unknown, "Series G: Transmission Systems and Media, Digital Systems and Networks, Quality of service and performance," ITU-T, Telecommunication Standardization Sector of ITU, Sep. 2001 (18 pages).
Badr, A., et al., "Embedded MDS Codes for Multicast Streaming," 2015 IEEE International Symposium on Information Theory (ISIT) (5 pages).
Baguda, Y., et al., "Adaptive FEC Error Control Scheme for Wireless video Transmission," 2010 The 12th International Conference on Advanced Communication Technology (ICACT) (5 pages).
Bandung, Y., "Qos Analysis for WebRTC Videoconference on Bandwidth-Limited Network," The 20th International Symposium on Wireless Personal Multimedia Communications (WPMC2017), 2017 IEEE pp. 547-553 (7 pages).
Boykov, Y., et al., "An Experimental Comparison of Min-Cut/Max-Flow Algorithms for Energy Minimization in Vision," IEEE Transactions On Pattern Analysis And Machine Intelligence, vol. 26, No. 9, Sep. 2004, pp. 1124-1137 (14 pages).
Brockners, F. "The Case for FEC fueled TCP-like Congestion Control," Kommunikation in Verteilten Systemen (KiVS) 11. ITG/GI-Fachtagung. Darmstadt, Mar. 2-5, 1999, retrieved from the internet https://citeseerx.ist.psu.edu/document?repid=rep1&type=pdf&doi=0ddd1c2dcc7166b61e5b9bd713cbf895a24355ee (14 pages).
Canese, L., et al., "Multi-Agent Reinforcement Learning: A Review of Challenges and Applications," Appl. Sci. 2021, 11, 4948. https://doi.org/ 10.3390/U.S. Appl. No. 11/114,948 (25 pages).
Carlucci, G., et al., "Analysis and Design of the Google Congestion Control for Web Real-time Communication(WebRTC)," Proceedings of the 7th International Conference on Multimedia Systems, retrieved from the internet at: https://www.researchgate.net/profile/Luca-De-Cicco/publication/303323771_Analysis_and_design_of_the_google_congestion_control_for_web_real-time_communication_WebRTC/links/601d21c892851c4ed54c6ed0/Analysis-and-design-of-the-google-congestion.
Chang, H., et al., "Can You See Me Now? A Measurement Study of Zoom, Webex, and Meet," IMC '21, Nov. 2-4, 2021, Virtual Event, USA, pp. 216-228 (13 pages).
Clarke, R., "Image and Video Compression: A Survey," Creative Commons License, vol. 10, pp. 20-32, 1999 (13 pages).
Cohen, A., et al., "Adaptive Causal Network Coding With Feedback," EEE Transactions On Communications, vol. 68, No. 7, Jul. 2020 (17 pages).

(56) References Cited

OTHER PUBLICATIONS

Dischinger, M., et al., "Characterizing Residential Broadband Networks," 07, Oct. 24-26, 2007, San Diego, California, USA, pp. 43-56, (14 pages).

Domanovitz, D., "An Explicit Rate-Optimal Streaming Code for Channels With Burst and Arbitrary Erasures," IEEE Transactions On Information Theory, vol. 68, No. 1, Jan. 2022 (19 pages).

Duanmu, et al., "A Quality-of-Experience Index for Streaming Video," IEEE Journal Of Selected Topics In Signal Processing, vol. 11, No. 1, Feb. 2017 (13 pages).

Dudzicz, D., et al., "An Explicit Construction of Optimal Streaming Codes for Channels With Burst and Arbitrary Erasures," IEEE Transactions On Communications, vol. 68, No. 1, Jan. 2020 pp. 12-25 (14 pages).

Ellis et al., Performance analysis of AL-FEC for RTP-based streaming video traffic to residential users, IEEE, pp. 1 to 6. (Year: 2012).

Falk, B., et al., "Properties of Constacyclic Codes Under the Schur Product," arXiv:1810.07630v2 [cs. IT] Oct. 18, 2018 (24 pages).

Falk, B., et al., "Properties of Constacyclic Codes Under the Schur Product," Designs, Codes and Cryptography (2020) 88:993-1021 (29 pages).

Floyd, S. et al., "Random Early Detection Gateways for Congestion Avoidance," IEEE/ACM Transactions on Networking. vol. I . No 1. Aug. 1993 (17 pages).

Forney, Jr., G., "Burst-Correcting Codes for the Classic Bursty Channel," IEEE Transactions On Communications Technology, Oct. 1971, pp. 772-781 (10 pages).

Friedman, T., et al., "RTP Control Protocol Extended Reports (RTCP XR)," Network Working Group, Nov. 2003 (55 pages).

Frossard, P., "Joint Source/FEC Rate Selection for Quality-Optimal MPEG-2 Video Delivery," IEEE Transactions On Image Processing, vol. 10, No. 12, Dec. 2001(11 pages).

Geist, M., et al., "Off-policy Learning With Eligibility Traces: A Survey," Journal of Machine Learning Research 15 (2014) 289-333 (45 pages).

Gettys, J., "Bufferbloat: Dark Buffers in the Internet," Published by the IEEE Computer Society, May/Jun. 2011 (2 pages).

Ghavamzadeh, M., et al., "Bayesian Reinforcement Learning: A Survey," Foundations and Trends® in Machine Learning, vol. 8, No. 5-6 (2015) 359-483, 2015, 28 pages.

Gilbert, E., "Capacity of a Burst-Noise Channel," The Bell System Technical Journal, Sep. 1960, pp. 1253-1265 (13 pages).

Ha, H., et al., "Layer-based RED-FEC (L-RED-FEC) method for wireless scalable video streaming," Electronics Letters Sep. 25, 2014 vol. 50 No. 20 pp. 1438-1440 (2 pages).

Huo, Y., et al., "A Tutorial and Review on Inter-Layer FEC Coded Layered Video Streaming," IEEE Communications Surveys & Tutorials 2015 (44 pages).

Ibrahim, I. et al., "Task Scheduling Algorithms in Cloud Computing: A Review," Turkish Journal of Computer and Mathematics Education, vol. 12 No. 4 (2021), pp. 1041-1053 (13 pages).

International Search Report and Written Opinion for International Application No. PCT/US2024/043054, mailed Dec. 31, 2024 (19 pages).

Jeon, Y., et al., "Blind Detection for MIMO Systems With Low-Resolution ADCs Using Supervised Learning," IEEE ICC 2017 Signal Processing for Communications Symposium (6 pages).

Jiang, P., et al., "Wireless Semantic Communications for Video Conferencing," IEEE Journal on Selected Areas in Communications, vol. 41, No. 1, Jan. 2023 (15 pages).

Kaelbling, L., et al., "Reinforcement Learning: A Survey," Journal of Articial Intelligence Research 4 (1996) 237-285 (49 pages).

Kazemi, M., et al., "A review of temporal video error concealment techniques and their suitability for HEVC and VVC," Multimedia Tools and Applications (2021) 80:12685-12730 (46 pages).

Kotz, D., et al., "Crawdad: A Community, Resource for Archiving, Wireless Data at Dartmouth," Conferences—HP Labs, www.computer.org/pervasive (3 pages).

Krishan, M., et al., "A Quadratic Field-Size Rate-Optimal Streaming Code for Channels with Burst and Random Erasures," 2019 IEEE (5 pages).

Kuhn, N., et al. "Forward Erasure Correction (FEC) Coding and Congestion Control in Transport," RFC: 9265, Internet Research Task Force (IRTF), Jul. 2022 (21 pages).

Le Gall, D., "MPEG: A Video Compression Standard for Multimedia Applications," Digital Image and Video Standards; Communications of the ACM, vol. 34, No. 4, Apr. 1991 (13 pages).

Levine, S., et al., "Offline Reinforcement Learning: Tutorial, Review, and Perspectives on Open Problems," arXiv:2005.01643v3 [cs.LG] Nov. 1, 2020 (43 pages).

Li, T., "Reparo: Loss-Resilient Generative Codec for Video Conferencing," arXiv:2305.14135v1 [cs.NI] May 23, 2023 (17 pages).

Li, Y., "Deep Reinforcement Learning: An Overview," arXiv:1701.07274v6 [cs.LG] Nov. 26, 2018 (85 pages).

\* cited by examiner $$P[i] = B_i^{i-\tau} * U[i-\tau] + \sum_{j=i-\tau}^{i} A_i^j * V[j]$$

where $A_i^{i-\tau}$ through $A_i^i$ and $B_i^{i-\tau}$ are carefully chosen matrices (e.g., to be full-rank)

FIG. 3

STREAMING CODES FOR VARIABLE SIZE MESSAGES ACCOMMODATING PARTIAL BURST LOSSES

CROSS-REFERENCE TO RELATED APPLICATION(S)

This patent application claims the benefit of U.S. Provisional Patent Application No. 63/523,184 entitled AN ERASURE-CODING BASED, LIVE COMMUNICATION METHOD THAT USES PACKET LOSS CHARACTERISTICS TO PARTITION FRAMES AND SEND PARITY SYMBOLS filed Jun. 26, 2023, which is hereby incorporated herein by reference in its entirety.

STATEMENT REGARDING FEDERALLY SPONSORED RESEARCH

This invention was made with government support under Grant No. CCF-1910813 awarded by the National Science Foundation (NSF). The government has certain rights in the invention.

STATEMENT REGARDING PRIOR DISCLOSURES BY THE INVENTOR

OR A JOINT INVENTOR UNDER 37 C.F.R. 1.77(b)(6) On Apr. 24, 2023, Carnegie Mellon University (CMU) issued an email to various CMU email groups announcing the inventor's Ph.D. oral thesis to be conducted on Apr. 28, 2023 on the subject of "Efficient loss recovery for videoconferencing via streaming codes and machine learning." This email included the following summary of the oral thesis: However, many real-world applications experience what we dub "partial burst" losses of only some packets per frame, unlike the existing model, which assumes all or no packets are lost for each frame. To address this gap, we introduce a new streaming-codes-based approach to videoconferencing called Tambur. When assessed over emulated networks, Tambur improves several key metrics of QoE compared to conventional methods (e.g., it reduces the frequency of freezes by 26%). We then extend the theoretical streaming model to accommodate partial bursts and design an online approximately rate-optimal streaming code. The code combines (a) a building block construction given any choice of how much parity to allocate per frame with (b) a learning-augmented algorithm to allocate parity per frame.

The inventor's Ph.D. thesis including aspects of "Learning-Augmented Streaming Codes For Variable-Size Messages Under Partial Burst Losses" (a copy of Chapters 6 and 7 of which is included below in Appendix A below) was presented orally in a non-recorded talk at Carnegie Mellon University (CMU) on Apr. 28, 2023, although the thesis document was embargoed and was not made public on the CMU website until around November 2023.

14 The inventor and his thesis advisor presented aspects of "Learning-Augmented Streaming Codes For Variable-Size Messages Under Partial Burst Losses" on Jun. 27, 2023 at the 2023 IEEE International Symposium on Information Theory (ISIT) in Taipei, Taiwan. The inventor believes that the related paper, M. Rudow and K. Rashmi, "Learning-Augmented Streaming Codes For Variable-Size Messages Under Partial Burst Losses," In 2023 *IEEE International Symposium on Information Theory (ISIT)*, pp. 1101-1106, 2023 (a copy of which is included in Appendix B below) was available to conference participants via password-protected access prior to the presentation although the earliest access date is unknown by applicant, and the paper was added to IEEE Xplore on Aug. 22, 2023.

An extended version of the IEEE paper with proofs (a copy of which is included in Appendix C below) was posted online around November 2023.

Pursuant to the guidance of 78 Fed. Reg. 11076 (Feb. 14, 2013), Applicant is identifying this disclosure in the specification in lieu of filing a declaration under 37 C.F.R. 1.130(a). Applicant believes that such disclosure is subject to the exceptions of 35 U.S.C. 102(b)(1)(A) or 35 U.S.C. 102(b)(2)(a) as having been made or having 29 originated from one or more members of the inventive entity of the application under examination.

FIELD OF THE INVENTION

The present invention generally relates to the transmission of digital information and methods, software and devices for detecting and preventing errors in the transmitted information. Specifically, the present invention is directed to detecting and recovering bursty, packet losses in live communication systems, for example, those employing the Internet.

DESCRIPTION OF THE RELATED ART

Data communication is still prone to data loss. For example, videoconferencing calls sometimes experience "partial burst losses," e.g., in which one or more channel frames experience the loss of some fraction of its packets. Despite many previous attempts at packet loss recovery, there is still a need for better mechanisms for packet loss recovery in such communications.

Two general approaches have been used to recover such lost packets, these are: (1) retransmission-based approaches, and (2) forward error correction (FEC) approaches. However, retransmission-based approaches often lead to a packet loss recovery delay time that is greater than the usual short, playback time requirement of live communications. Therefore, videoconferencing applications often focus on using FEC approaches and codes for recovering packet losses in real-time (e.g., for long-distance communication).

Various types of FEC codes have been used for these applications with only limited levels of success. For example, standard FEC codes are inefficient at recovering the frequently occurring, bursts of packet losses in real time.

A relatively new class of theoretical FEC code constructions, known as "streaming codes," have been specifically designed to decode such losses. However, there are several obstacles (e.g., streaming code constructions have often been designed for transmitting only one packet per frame; however, in videoconferencing multiple packets are frequently sent for individual video frames; their theoretically assumed burst loss patterns are often not those of the packet loss patterns that arise in real-world videoconferencing applications) that have so far limited the practical adoption of these streaming codes.

Examples in the patent literature of prior attempts to address the recovery of lost packets in digital communications can be found in the following numbered U.S. patents: U.S. Pat. No. 8,352,832—"Unequal delay codes for burst-erasure channels," U.S. Pat. No. 9,209,897—"Adaptive forward error correction in passive optical networks," U.S. Pat. No. 9,843,413—"Forward error correction for low-delay recovery from packet loss," U.S. Pat. No. 10,833,710—"Bandwidth efficient FEC scheme supporting uneven levels of protection," U.S. Pat. No. 10,979,175—"Forward error correction for streaming data," U.S. Pat. No. 11,036,525—

"Computer system providing hierarchical display remoting optimized with user and system hints and related methods," U.S. Pat. No. 11,489,620—"Loss recovery using streaming codes in forward error correction;" and in U.S. Patent Publication Nos. US20130039410A1—"Methods and systems for adapting error correcting codes," and US20230106959—"Loss recovery using streaming codes in forward error correction." Additional examples also can be found in Kuhn, N. et al., RFC 9265—Forward Erasure Correction (FEC) Coding and Congestion Control in Transport, Internet Research Task Force (IRTF), July 2022.

The present invention seeks to provide a method that yields an improvement in packet loss recover, and, likely by extension, the quality-of-experience (QoE) of real-time, digital communications.

SUMMARY OF VARIOUS EMBODIMENTS

In accordance with one embodiment of the invention, a system and method for streaming video frames from a sender to a receiver involves obtaining, by the sender and for each frame i of a plurality of video frames of said video stream, loss estimation parameters for the video frame i including a burst loss estimate, $b_i$, for the video frame i and a per-frame packet loss estimate $l_i$, for the video frame i; partitioning, by the sender and for each video frame i of a plurality of video frames of said video stream, a set of video data symbols D[i] into a first set of video data symbols U[i] and a second set of video data symbols V[i] by using said estimated $b_{i-\tau}$ through $b_i$ and $l_{i-\tau}$ through $l_{(i+bi-1)}$ to determine a minimum size for U[i] and then identifying how many symbols are partitioned to U[i] between this minimum value and all symbols of D[i] and allocating the rest to V[i], wherein $\tau$ is a function of a predetermined maximum tolerable latency of the video stream expressed as a whole number of frames; generating, by the sender and for each video frame i, a set of one or more streaming FEC code parity symbols P[i] based on the symbols: V[i–$\tau$] through V[i–1], U[i–$\tau$], and the symbols of V[i] but not U[i], wherein the number of parity symbols for the ith video frame is determined as a function of the size of U[i–$\tau$]; encoding, by the sender and for each video frame i, the symbols of D[i] and P[i] into a plurality, $c_i$, of channel frames such that each of U[i], V[i], and P[i] is spread evenly across the plurality of channel frames, wherein each of U[i] and V[i] is selectively zero-padded by as little as possible and the size of P[i] is selectively increased by as little as possible to ensure that the size of each of U[i], V[i], and P[i] is evenly divisible by $c_i$, and wherein $c_i$ is selected to be as small as possible under the conditions that (a) evenly spreading the symbols over the channel frames leads to a channel frame size that is no more than a predetermined maximum transmittable unit size and (b) $c_i$ times $l_i$ is an integer or rounds up to be an integer where the increase due to rounding is small relative to the product; transmitting the plurality of channel frames by the sender to the receiver over a lossy communication channel that can introduce burst losses including partial burst losses; and decoding, by the receiver, a burst across i to j consecutive frames where j is an integer between one and $b_i$ to solve a system of linear equations corresponding to the symbols of D[i–$\tau$] through D[i+$\tau$–1], wherein the symbols of D[i–$\tau$] through D[i–1] are combined with the received symbols V[i] through V[i+$\tau$–1] and received symbols of P[i] through P[i+$\tau$–1] to recover V[i] through V[i+$b_i$–1] and then for each r in i to j the symbols of V[r] through V[r+$\tau$] are combined with the received symbols of U[r] and P[r+$\tau$] to recover U[r].

In various alternative embodiments, the value of $\tau$ may be chosen based on the frame rate and one-way propagation delay from the sender to the receiver. The parity symbols P[i] may be the sum of two quantities P[i]:=$P_1$[i]+$P_2$[i], wherein the symbols of $P_1$[i] are linear combinations of the symbols of U[i–$\tau$], and wherein the symbols of $P_2$[i] are linear combinations of the symbols of V[i–$\tau$] . . . , V[i]. Setting the number of parity symbols sent for the ith video frame as a function of the size of U[i–$\tau$] may involve setting the number of parity symbols sent for the ith video frame to be the size of U[i–$\tau$] times $l_{i-\tau}$ and optionally increasing the resulting number of parity symbols to be evenly divisible by the number of channel frames sent for the ith video frame. The sender may receive loss estimation parameters the loss estimation parameters for the video frame i as feedback from the receive, and the receiver may use machine learning to determine the loss estimation parameters for the video frame i based at least on channel characteristics for at least one prior video frame. In some cases, such as in the absence of feedback from the receiver, the sender may set the loss estimation parameters for the video frame i to values used for a prior video frame. In some cases, the sender may determine the values for the loss estimation parameters based on any of a variety of information. The sender may perform video data compression to produce the plurality of video frames of said video stream, in which case the receiver may send a reset request to the sender to reset video compression upon determining that a recovered compressed video frame cannot be rendered due to dependence on an earlier unrecovered compressed video frame.

Additional embodiments also can include a sender that performs some or all of the sender functions, a method for performing some or all of the sender functions, a computer program product embodying computer program instructions for performing some or all of the sender functions, and an integrated circuit with circuitry for performing some or all of the sender functions.

Similarly, additional embodiments also can include a receiver that performs some or all of the receiver functions, a method for performing some or all of the receiver functions, a computer program product embodying computer program instructions for performing some or all of the receiver functions, and an integrated circuit with circuitry for performing some or all of the receiver functions.

In accordance with one embodiment of the invention, a method for encoding a video frame comprises splitting a video frame i into two components U and V, which can be different sizes depending on criteria such as burst and packet loss estimates provided as feedback from a receiver based on actual or predicted burst and packet losses; and generating parity symbols for the video frame i as a function of the symbols of V'[i–$\tau$:i] and U[i–$\tau$] so that for any partial burst the symbols of the first component are all recovered by t time slots after the start of the burst and the symbols of the second component are recovered t time slots later.

In various alternative embodiments the method may ensure recovery of the first component by $\tau$–1 time slots after the start of the burst. Generating parity symbols may involve choosing linear combinations of the symbols of V[i–$\tau$:i] according to a sliding window rateless code to create a vector of symbols $P_2$[i]; choosing linear combinations of the symbols of U[i–$\tau$] according to an MDS code to create a vector of symbols $P_1$[i]; and adding $P_1$[i] to $P_2$[i] to form the parity symbols to be sent, P[i]:=$P_1$[i]+$P_2$[i]. The number of parity symbols may be chosen to be high enough so that loss recovery occurs with high probability. Choosing the number of parity symbols may involve allocating extra parity symbols compared to how many are needed when the linear combinations of symbols of the first component are full rank.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 3 is a schematic diagram for creating parity symbols, in accordance with one embodiment.

Figure 1:
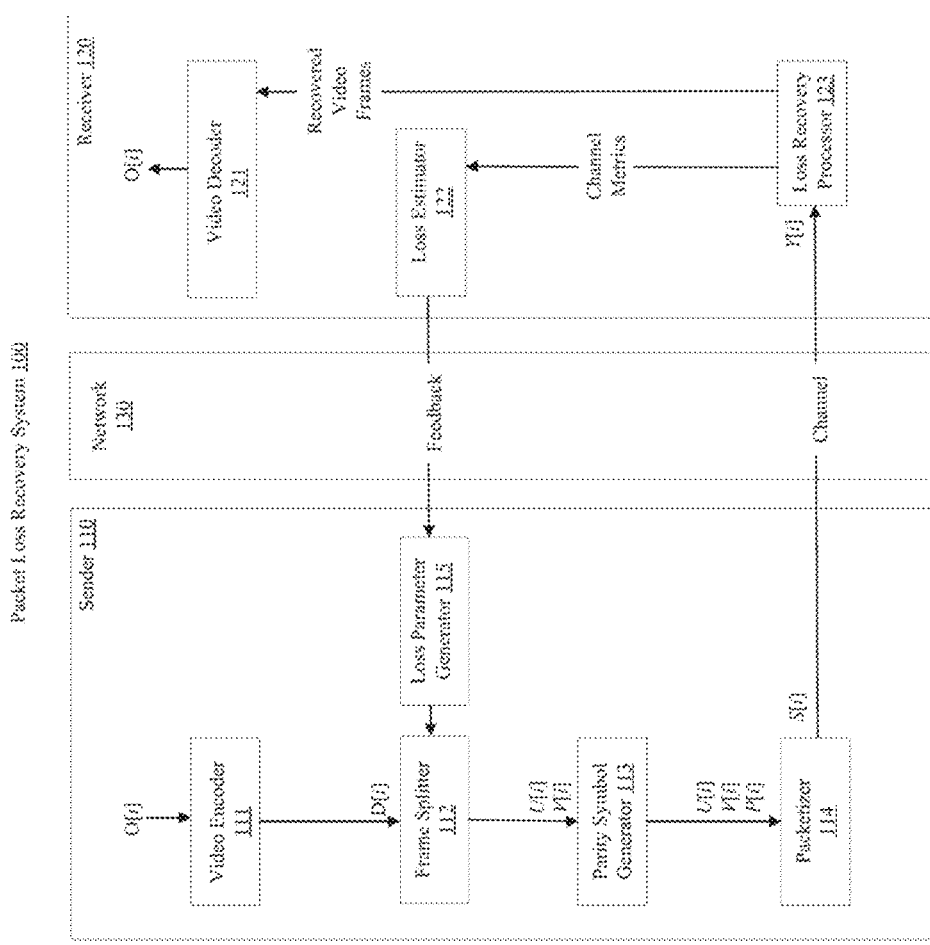
FIG. 1 is a schematic block diagram of a packet loss recovery system 100 in accordance with certain embodiments of the present invention.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Recognizing the need for an improvement in the mechanism for packet loss recovery, which impacts the quality-of-experience (QoE), of real-time, digital communications, certain embodiments of the present invention seek to provide methods and software (or hardware) that will provide such an improvement.

Various aspects, advantages, features and embodiments of the present invention are included in the following description of exemplary examples thereof, which description should be taken in conjunction with the accompanying drawings. All patents, patent applications, articles, other publications, and things referenced herein are hereby incorporated herein by this reference in their entirety for all purposes. These include the following previously published academic papers of the inventor:

Michael Rudow and K. V. Rashmi, "Online Versus Offline Rate In Streaming Codes For Variable-Size Messages," 2020 *IEEE International Symposium on Information Theory (ISIT)*, 2020;

Rudow, Michael, and K. V. Rashmi. "Online versus offline rate in streaming codes for variable-size messages." *IEEE Transactions on Information Theory* (2023);

Michael Rudow and K. V. Rashmi, "Streaming codes for variable-size messages," *IEEE Transactions on Information Theory*, pp. 1-1, 2022;

Rudow, Michael, and K. V. Rashmi. "Streaming codes for variable-size arrivals." 2018 *56th Annual Allerton Conference on Communication, Control, and Computing (Allerton)*. IEEE, 2018;

Rudow, Michael, and K. V. Rashmi. "Learning-augmented streaming codes are approximately optimal for variable-size messages." 2022 *IEEE International Symposium on Information Theory (ISIT)*. IEEE, 2022; and M. Rudow and K. Rashmi, "Learning-Augmented Streaming Codes For Variable-Size Messages Under Partial Burst Losses," In 2023 *IEEE International Symposium on Information Theory (ISIT)*, pp. 1101-1106, 2023.

This patent application, and all incorporated publications, documents, and things, are each considered to be internally consistent, e.g., conventions used in one (e.g., terminology, definitions, notations, representations, etc.) may be used differently in others. To the extent of any inconsistency or conflict in the conventions used in any of the incorporated publications, documents, or things and the present application, those of the present application shall prevail for purposes of this patent application.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Details of various embodiments are described in this detailed description including the attached appendices, which include Chapters 6 and 7 of the inventor's Ph.D. thesis incorporated herein physically in Appendix A below; M. Rudow and K. Rashmi, "Learning-Augmented Streaming Codes For Variable-Size Messages Under Partial Burst Losses," In 2023 *IEEE International Symposium on Information Theory* (*ISIT*), pp. 1101-1106, 2023, incorporated herein physically in Appendix B below; and an extended version of the IEEE paper with proofs incorporated herein physically in Appendix C below. It should be noted that the IEEE paper with proofs is considered to be the most up-to-date of these three references and therefore the content of this reference generally will supersede the content of the other two references and in some cases the content of this detailed description. Applicant expressly reserves the right to incorporate any information from the appendices into the body of the detailed description and drawings and to claim any aspects disclosed in any of the appendices.

Rapidly recovering and decoding lost data packets is a requirement for providing high quality-of-experience (QoE), for real-time, digital communications. Despite the limited success of streaming codes applied to real-time, digital communications, their framework is well-suited for videoconferencing applications (for example, where a sequence of a video frames are generated periodically, e.g., one every 33.3 ms for a 30 frame/sec video) for at least the following reasons: (a) it captures the streaming nature of incoming data via sequential encoding (where data symbols and parity symbols are sent for each video frame through the described erasure coding scheme, and with the parity symbols being a function of the data symbols from the current frame and previous frames that fall within a predefined window); (b) it incorporates the per-frame decoding latency that can be tolerated for real-time playback via sequential decoding; and (c) it optimizes for recovering bursty losses with minimal bandwidth overhead.

FIG. 1 is a schematic block diagram of a packet loss recovery system 100 in accordance with certain embodiments of the present invention. Among other things, the packet loss recovery system 100 includes a sender 110 and a receiver 120. Among other things, the sender 110 here includes a video encoder 111, a frame splitter 112, a parity symbol generator 113, a packetizer 114, and a loss parameter generator 115 (which logically may be part of the frame splitter 112 but is shown here separately for the sake of discussion) Among other things, the receiver 120 herein includes a video decoder 121, a loss estimator 122, and a loss recovery processor 123. The sender 110 and the receiver 120 communicate over a communication network 130 (sometimes referred to herein as a "communication channel" or just "channel" for communication from the sender 110 to the receiver 120) with the goal of conveying original video content O[i] (e.g., video content from a videoconference, live video stream, or other video source) from the sender 110 with recovery and output of the same original video content O[i] by the receiver 120. It should be noted that the term "video" as used herein can include other information such as audio information, secondary audio program information, closed captioning information, and other types of data and metadata.

In summary, the sender 110 and receiver 120 perform the following operations:

(1a) at the sender 110, the video encoder 111 provides a stream of video frames D[i], which, for example, may be a stream of video frames that are received by the video encoder 111 (which could be compressed video frames) and optionally compressed by the video encoder 111 (e.g., if received video frames O[i] are not compressed), (1b) at the sender 110, the loss parameter generator 115 provides loss estimation parameters (which are so named but may be set independently of losses in certain embodiments) for each of the video frames that in one embodiment are modeled as a burst loss estimate and a packet loss estimate for each video frame as discussed herein (where the loss parameter generator 115 may receive burst/packet loss estimates as feedback signals from the loss estimator 122 of the receiver 120 as discussed below, or may generate its own burst/packet loss estimates such as in the absence of feedback signals from the receiver or using machine learning), (2) at the sender 110, the frame splitter 112 generally produces two components, or a first and a second set of video data symbols, U[i] and V[i], for each video frame based on the loss estimation parameters and the sizes of the video frames, (3) again at the sender 110, based on the partitioning by the frame splitter 112, the parity symbol generator 113 generates a number of forward error correction parity symbols P[i] (i.e., linear combinations of data symbols from the a number of frames that are used to characterize and recover digital data if it is lost during its transmission), (4) again at the sender 110, the packetizer 114 encodes or allocates the data symbols U[i] and V[i] and parity symbols P[i] into channel frames S[i] (where each channel frame includes one or more channel packets as discussed further below) in a manner that ensures recovery of the channel packets (and hence also the video frames encoded in the channel frames/packets) within a predetermined tolerance and transmits the channel frames S[i] to the receiver 120 over a lossy communication channel, (5) at the receiver 120, the loss recovery processor 123 receives channel frames (referred to in the figure as Y[i], as the received channel frames may differ from the transmitted channel frames S[i] due to burst losses, partial burst losses, and other communication issues) and recovers video frames using the data symbols and parity symbols from received channel frames/packets (note that the loss recovery processor 123 generally can recover video frames provided network losses do not exceed the estimated burst size and fraction of lost packets) and further provides channel metrics (e.g., frame and packet loss patterns, latency, frame/packet sizes, transmit times, etc.) to the loss estimator 122, (6) again at the receiver 120, the video decoder 121 decodes the recovered video frames and outputs video data (which also can include audio and other data encoded along with the video data) to an output device, and (7) again at the receiver 120, the loss estimator 122 estimates (e.g., using machine learning or heuristic techniques) future burst losses and fractions of packet losses for at least one future video frame and transmits these burst/packet loss estimates to the sender 110 as feedback signals for use by the loss parameter generator 115, although, alternatively, the loss estimator 122 may set burst/packet loss estimates using other methods (e.g., machine learning) so as to adjust the communication scheme.

It is absolutely critical to note that many prior works of the inventor use similar notation (e.g., S[i], D[i], U[i], V[i], P[i], Y[i], etc.) to mean very different things. Thus, for example, while many of the prior works split a video frame D[i] (which was sometimes was referred to as S[i] in the provisional patent application and appended papers) into two components called U[i] and V[i], generate parity bits called P[i], and send a channel frame S[i] (which was sometimes referred to as X[i] in the provisional patent application and appended papers) that can be received as channel frame Y[i] (which was sometimes referred to as R[i] in the provisional patent application and appended papers), the values of U[i], V[i], P[i], S[i], and Y[i] are significantly different in those works than they are in the present invention, which will be clear from the present disclosure. In some cases, the usage of these notations may differ slightly between this detailed description and the discussions in each of the appendices. In some cases, different terminology may be used to represent the same things (e.g., in some of the works, a channel frame may have been referred to as a packet). Applicant expressly reserves the right to use terminology, notation and concepts from the detailed description and/or any of the appendices in any claimed invention (e.g., if a particular claim is directed to an embodiment described in a particular appendix, then terminology from that appendix may be used although it need not necessarily be used).

Generally speaking, the video encoder 111 may receive video frames O[i] periodically or substantially periodically (e.g., one every 33.3 ms for a 30 frame/sec video) and therefore video frames D[i] may be generated periodically or substantially periodically. In some embodiments, there may be a maximum size for incoming video frames O[i] and if a particular incoming video frame O[i] is larger than the maximum size, the system can split O[i] amongst multiple frames D[i], e.g., the system could create two video frames D[i] and D[i+1] if the size was greater than the maximum size but less than twice the maximum size, etc. This essentially would appear to the system as two or more video frames received back-to-back.

It should be noted that the loss estimation parameters produced by the loss parameter generator 115 and used to generate U[i], V[i], P[i], S[i] (e.g., burst/packet loss estimates) may be set conservatively in certain embodiments so that the losses are strictly better than those of actual burst/packet loss estimates. However, alternatively, these parameters can be used more generally as parameters to control the generation of U[i], V[i], P[i], S[i], e.g., used only as "knobs" to tune the coding construction (e.g., independently of any actual burst/packet loss estimates). Thus, for example, the loss estimation parameters generated by the loss parameter generator and used by the frame splitter 112 may have no correlation to actual burst/packet losses experienced at the receiver 120 but instead could be set in other ways, e.g., based on expected or worst-case burst/packet loss estimates, or using additional metadata (e.g., one-way delay, channel frame rate, channel bit rate, network congestion information, etc.).

In some embodiments, rather than splitting the data of a video frame into the two components U[i] and V[i], the two components may be created in other ways based on the data of the video frame such that, given access to a certain number of prior frames, the components U[i] and V[i] suffice to recover D[i]. For example, rather than U[i] and V[i] containing symbols of D[i], U[i] and V[i] could be full rank random linear combinations of the symbols of D[i]). That is to say, the construction is not required to be systematic.

It should be noted that channel frames/packets S[i] can be transmitted using any appropriate data communication protocol. For example, some embodiments transmit channel frames/packets using the User Datagram Protocol (UDP).

In certain embodiments, when losses do not exceed the estimates, the encoding scheme ensures that the first component is recovered strictly before its playback deadline and the other or second component is recovered by its playback deadline. Overall, estimating loss characteristics for each frame and using the estimates to create parity symbols enables the present invention to provide fine granularity for tuning the communication system's bandwidth overhead for each frame; in particular, the bandwidth overhead associated with a frame can vary from frame to frame. Doing so enables maximizing bandwidth savings while providing formal guarantees for recovering burst losses within a bounded latency. The symbols S[i], D[i], U[i], V[i], P[i], and Y[i] used in FIG. 1 are discussed in greater detail below.

It should be noted that the loss estimation parameters fed back from the receiver 120 to the sender 110 can be viewed as the receiver 120 conservatively estimating how lossy the network conditions will be based on prior losses or network conditions. For example, the feedback could report on actual prior losses (e.g., a frame or packet loss rate over some number of past channel frames or packets) or the feedback could provide a prediction of an upcoming frame or packet loss rate (e.g., if network conditions are deteriorating, then the feedback could predict a greater channel frame or packet loss rate than was actually detected in the past). In certain embodiments, the loss parameter generator 115 also could estimate loss parameters such as from prior feedback or other information (e.g., network performance information received from the receiver 120 or from other sources). The loss estimator 122 and/or the loss parameter generator 115 may utilize AI/ML or other predictive analytics to produce future loss estimation parameters based on any relevant data source such that, for example, the loss estimation parameters can be treated in some embodiments as a "knob" to adjust the coding scheme (e.g., using machine learning) rather than based on actual burst/packet loss estimates, as discussed above. Certain embodiments therefore perform learning-augmented encoding of video frames to improve QOE.

For our following discussion of data transmission for the representative real-time, digital communications application of videoconferencing (although also usable in other applications such as live streaming, remote desktop, cloud gaming, remote controlled vehicles, satellite/space communication, etc. including virtually any video or non-video communication that may be subject to burst or partial burst losses and needs to be decoded within strict constraints) and to explain the present invention's methodology (e.g., implementable in software and/or hardware) that is used to recover packet losses and our use of what is called a streaming model and its use of streaming codes, it proves useful to introduce some specific notation and mathematical ideas. Under our streaming model, during each time slot or video frame time interval, i, a video frame, D[i], of $k_i$ symbols arrives at the frame splitter 112, where different video frames may have different numbers of symbols due to data compression variability. It should be noted that data compression algorithms usually (but not always) introduce dependencies between compressed video frames, e.g., where the ability to decompress one compressed video frame depends on having correctly decompressed one or more prior compressed video frames.

Also under our streaming mode, a channel frame, S[i] of size $n_i$, which can include one or more channel packets containing data symbols and/or one or more channel packets containing parity symbols, is sent to the receiver 120 over a lossy communication channel that can introduce burst losses (e.g., a burst loss that affects one or more channel frames) including "partial burst losses" (where at most a fraction of packets of a channel frame are lost). It should be noted that, even though the variable "i" is used in both the representation of S[i] and the representation of X[i], there is not necessarily a one-to-one correlation between S[i] and X[i], e.g., a particular channel frame X[i] could include data symbols and/or parity symbols from multiple video frames.

Each video frame, for example the ith video frame, denoted as D[i], is partitioned, where each symbol in the partitioning can be thought of as a vector of $k_i$*d bits where d is the number of bits per symbol. More formally, a symbol is an element of a mathematical entity called a field (e.g., a finite field, or other fields like the real numbers). An illustrative example would be a finite field of non-negative integers mod a prime, where all operations are performed over finite fields such as using modular arithmetic or extension fields (the order is a prime power) where arithmetic is field arithmetic and is not necessarily "modular arithmetic." For simplicity, the discussion below is expressed in usual arithmetic without affecting meaning.

These symbols are distributed over one or more channel packets to be sent to the receiver 120. Different video frames can have different numbers of symbols $k_i$, since video frames are compressed prior to transmission, and the sizes of compressed video frames are variable.

Continuing with the introduction of the notation used herein, the components or sets of video data symbols into which D[i] is partitioned are denoted as a first set of video data symbols U[i] and a second set of video data symbols V[i]. The previously mentioned, parity symbols of frame "i" are denoted as P[i], and the loss estimate parameters reflecting estimated burst length and per-frame degree of loss are denoted as $b_i$ and $l_i$, respectively.

Each video frame should be decoded at the receiver 120 within a strict latency for it be most useful in playback (e.g., to avoid video "freeze"). However, it should be noted that even if there is a freeze, recovering a frame late still may be useful to enable playing later frames that are encoded using inter-frame dependencies (e.g., failing to recover frame 10 in time to play it is bad, but recovering frame 10 in time to use frame 10 to decode and play frame 11 still may be useful). This latency requirement is modeled by imposing the requirement that each video frame "i" is decoded by the time the packets for frame (i+τ) are received. The parameter τ may be chosen based on the frame rate and one-way propagation delay so that the latency of decoding each frame is tolerable.

For example, if the maximum tolerable latency is 150 ms, the one-way propagation delay is 50 ms, and a frame is encoded every 33.3 ms (i.e., the frame rate), τ could be set to 3 frames, i.e., (150 ms–50 ms)/33.3 ms/frame.

The methodology employed by the framework of streaming codes to recover a burst loss encompassing b consecutive frames D[i], . . . , D[i+b−1] (i.e., $b_i$ consecutive frames for frame i), is to sequentially recover each frame D[j] within a delay of exactly τ additional frames. In other words, for each j∈{i, . . . , i+b−1}, D[j] is recovered using the symbols of P[i+b], . . . , P[j+τ].

As noted in the above-cited academic publications, the present invention is directed to providing an improvement in the quality-of-experience (QoE) of real-time, digital communications involving variable-size (compressed) video frames and the sending of one or more channel packets per channel frame over a lossy communication channel that can introduce burst losses (e.g., a burst loss that affects one or more channel frames) including "partial burst losses" (where only a fraction of channel packets of a channel frame are lost).

It can be noted that the variability in variable-size frames is problematic to achieving the objective of the present invention since at each frame, the optimal number of symbols to transmit can depend on the sizes of future messages, which are inherently variable and unknown. This leads to the distinction that is often made in this technology between "offline" coding schemes, which have access to (a) the sizes of messages of future frames, and (b) parameters of partial bursts indicative of worst-case losses for each future frame, and "online" schemes, which do not have access to such information. This distinction will be seen below to impact how the present invention proceeds to estimate or predict burst loss characteristics.

The present invention applies the following methodology to design streaming codes for the above situation. A building block construction is used by the present invention to design a streaming code given any partition or split of each video frame into (a) one component intended to be recovered strictly before its playback deadline (i.e., within τ−1 time slots or frames), and (b) another component intended to be recovered by its playback deadline (i.e., τ frames later).

When an online setting situation exists where the sizes of future frames are unavailable, certain embodiments use estimated burst loss characteristics to determine a suitable range of values for the split and then employs a learning-augmented algorithm or model, or a heuristic, to determine the split.

In an offline setting, an optimization algorithm (using a linear program) may be used to estimate burst loss characteristics and determine how to split each frame into these two components. An exemplary offline optimization to find splits and parity allocation via a linear program is described below with reference to FIGS. 14A-14M.

Periodically estimating or predicting future burst loss or burst characteristics enables the present invention to tune a communication system's bandwidth overhead based on the invariably changing network conditions. This estimate or prediction includes two sets of parameters to reflect the estimated burst length and fraction of packets lost per frame, as is illustrated in FIG. 1. Specifically, for the ith frame, the maximum length of a burst starting with frame i is estimated as $b_i$, and the maximum fraction of packets lost for the ith frame is estimated as $l_i$. Bursts are modeled as being followed by guard spaces of length at least t frames with no losses; although loss recovery is not guaranteed if there are losses in the guard space, the present invention's code design enables recovering from certain losses in the guard spaces when burst losses are not worst case.

In some cases, this feedback from the receiver to the sender can be viewed as the receiver conservatively estimating how lossy the network conditions will be based on prior losses or network conditions, although, as discussed above, loss estimation parameters can be based on other information and can be produced in other ways such as using machine learning. For example, the feedback could report on actual prior losses (e.g., a frame or packet loss rate over some number of past frames or packets) or the feedback could provide a prediction of an upcoming frame or packet loss rate (e.g., if network conditions are deteriorating, then the feedback could predict a greater frame or packet loss rate than was actually detected in the past). When there is no feedback, the parameters preferably do not change, e.g., $b_i$ may be set to $b_{i-1}$ and $I_{(i+bi-1)}$ may be set to $I_{(i+bi-2)}$, although in certain embodiments, the transmitter also could estimate or predict future network conditions such as from prior feedback or other information (e.g., network performance information received from the receiver or from other sources) and could adjust transmitter parameters accordingly. When encoding the ith frame, the sender has access to $b_j$ for any j≤i and to $l_j$ for any j≤(i+$b_j$−1). The value for each $I_j$ is set exactly once.

In order to make these estimates of burst characteristics, one embodiment of the present invention assumes M to be the maximum possible number of packets sent per frame. For the ith frame, suppose $c_i$ packets are sent. Let $L_i$ be a length M vector where the jth position is +1 if the jth packet is received, −1 if the jth packet is lost, and 0 for all but the first $c_i$ positions. To then compute these characteristics or parameters, a machine learning model is applied to (a) the concatenation of a recent window of w of such loss vectors (i.e., ($L_{i-w+1}$, . . . , $L_i$)), or (b) $L_i$ if the model (used by the sender to set the parameters $b_i$ and $l_j$ for j=i, . . . , i+$b_i$−1 which have not yet been set) has a state that can capture information about prior values $L_j$ for j<i.

At times, there could be an underestimation of losses, which could lead to some packets not being recovered. In certain applications (e.g., where data compression is used such as in videoconferencing or video streaming), there may be interpacket dependencies (e.g., the ability to decompress one packet could depend on having successfully received and decompressed one or more other packets) such that failure to recover one packet could result in several subsequent packets being unusable even if received intact. Thus, in some embodiments, the receiver can send additional feedback to indicate that a reset is needed, in which case the transmitter could reset data compression starting with a packet that is not dependent on past packets (sometimes referred to herein as a "keyframe," which is essentially a self-sufficient frame). If a reset is sent for frame i, the values of $l_j$ for j≥i are treated as being reset (i.e., they may be set again).

Figure 2A:
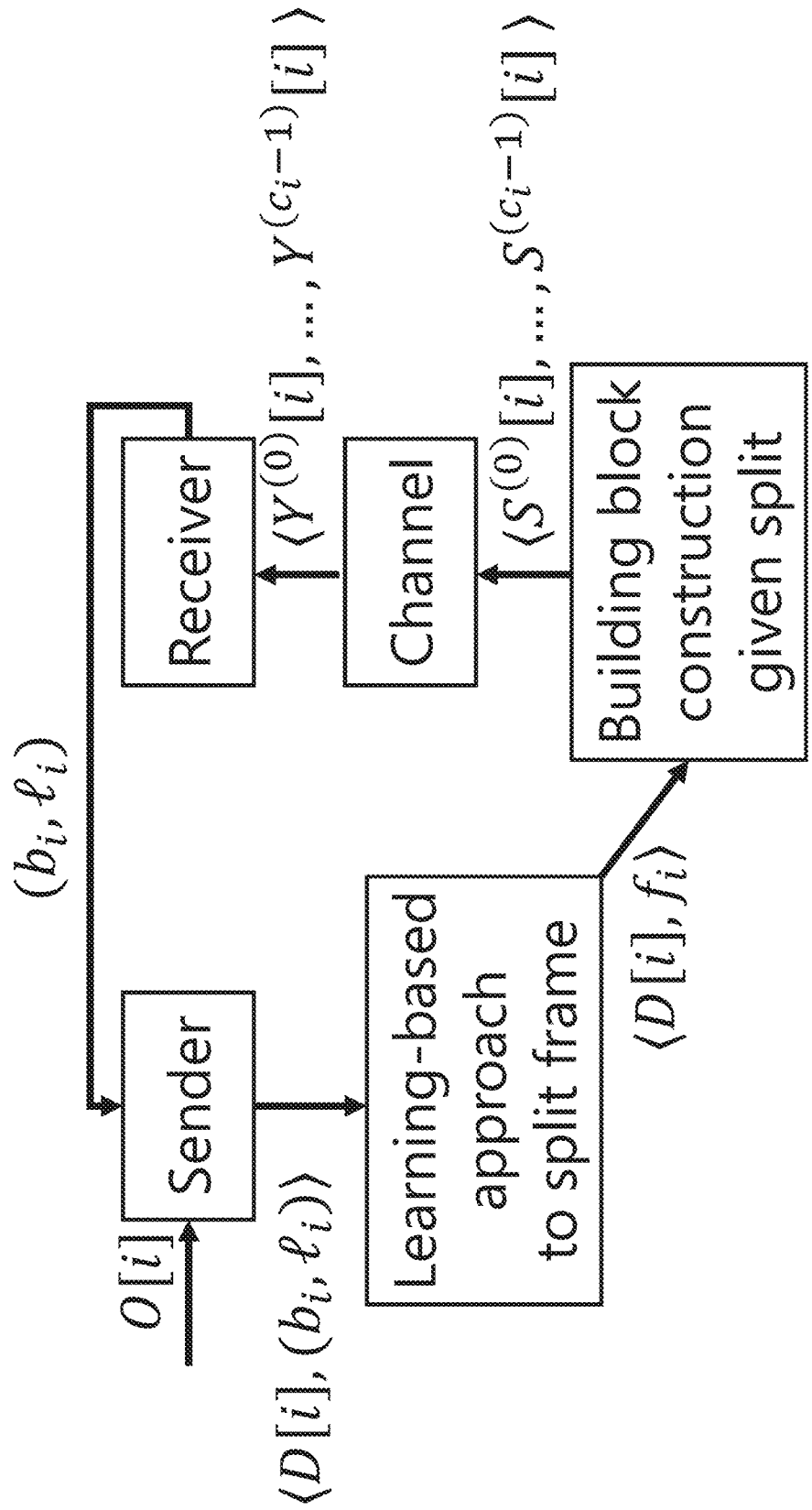
FIGS. 2A-2B are schematic diagrams illustrating the task of frame partitioning or splitting a stream of video frames, in accordance with one embodiment.
Figure 2B:
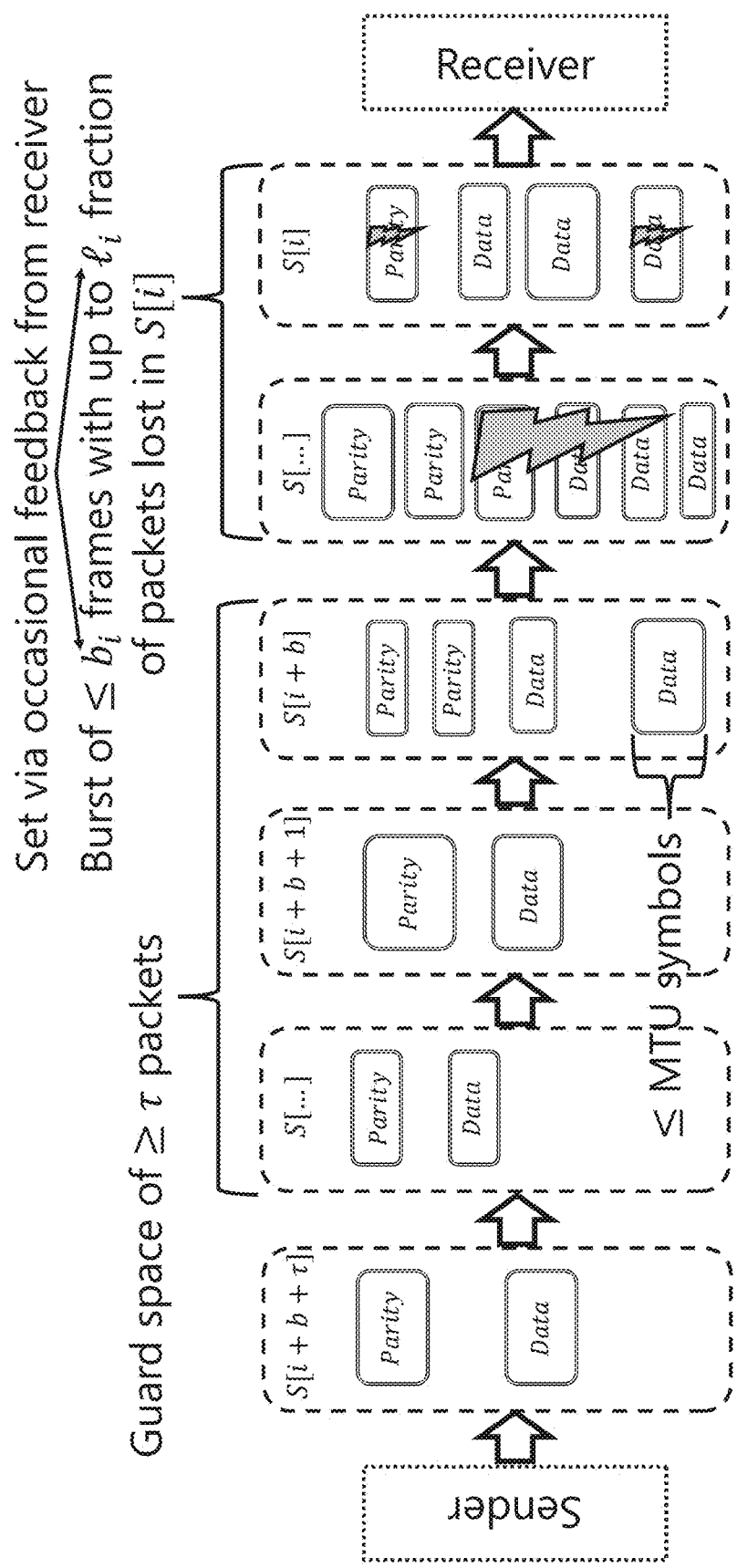

The task of frame partitioning or splitting is illustrated in FIGS. 2A-2B, in accordance with one embodiment. This involves the ith video frame of a video stream, D[i], being partitioned into two components, U[i] and V[i], based on $b_i$ and $I_i$ through a frame splitting approach (e.g., partitioning via a learning-based approach, a heuristic, etc.), followed by generation of parity symbols P[i] based on U[i] and V[i], followed by encoding and transmission of channel frames S[i] containing components of U[i], V[i], and P[i]. Generally speaking, the system sends one or more packets per channel frame with sizes that do not exceed a predetermined maximum transmittable unit size (MTU). As discussed herein, in some embodiments splitting of video frames and generation of parity symbols may be set via occasional feedback from the receiver. As discussed above, the receiver receives channel frames Y[i] up to and including all transmitted channel frames S[i], although in this model, the receiver can encounter burst or partial burst losses. The loss recover methodology described herein is designed such that, when there are partial burst losses, V[i] is intended to be recovered within (τ−1) additional frames and U[i] is intended to be recovered within τ additional frames, where τ is a parameter reflecting the maximum tolerable latency in frames.

Figure 12:
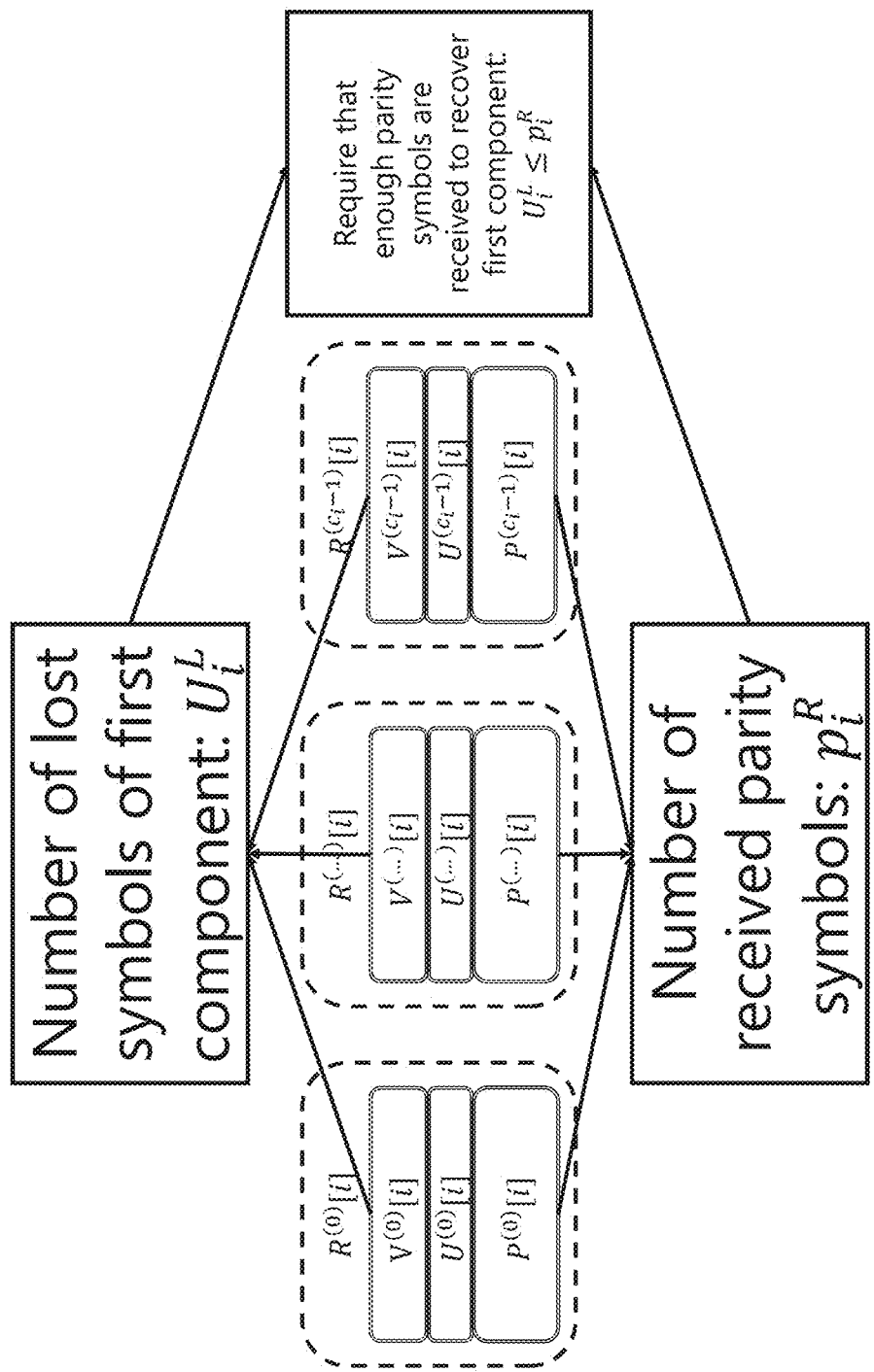
FIG. 12 is a schematic diagram representing a heuristic for splitting video frames in accordance with one embodiment.
Figure 13A:
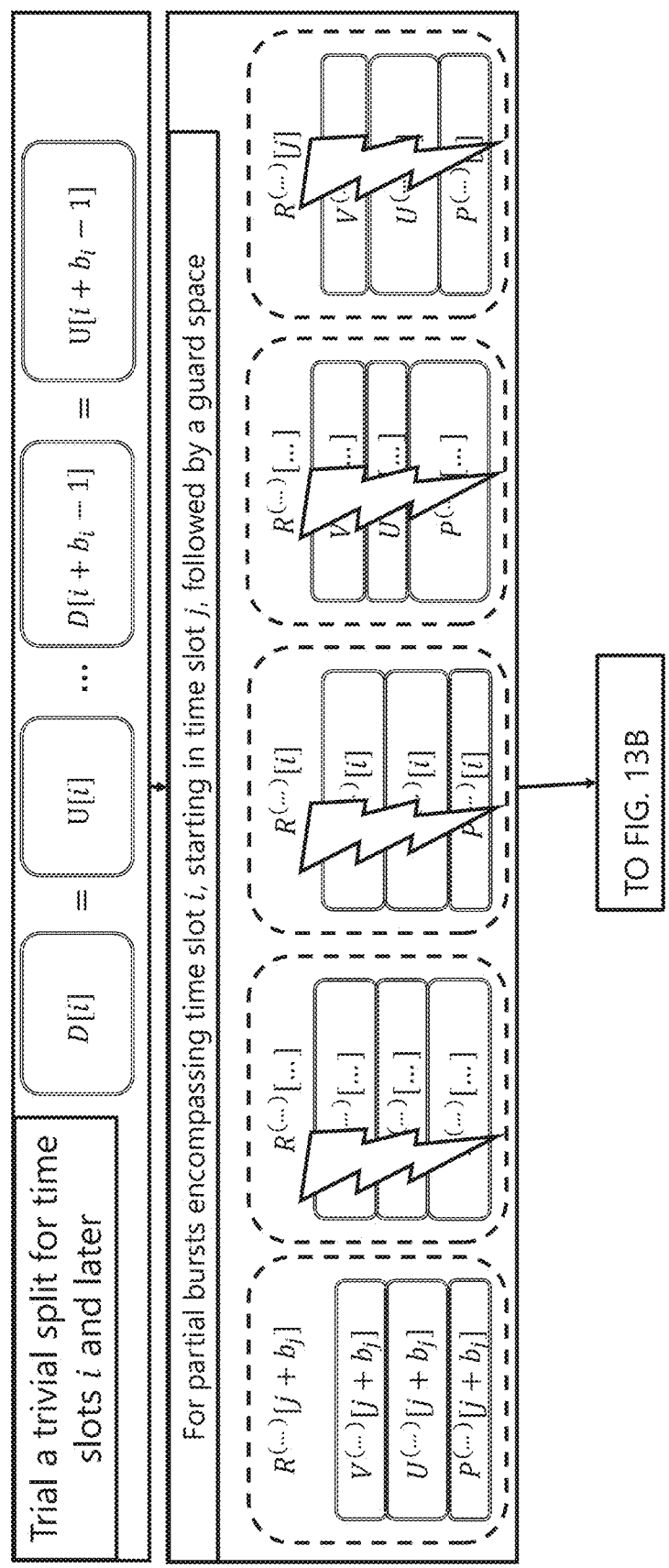
FIGS. 13A and 13B are collectively a schematic diagram representing a process for splitting video frames using the heuristic of FIG. 12.
Figure 13B:
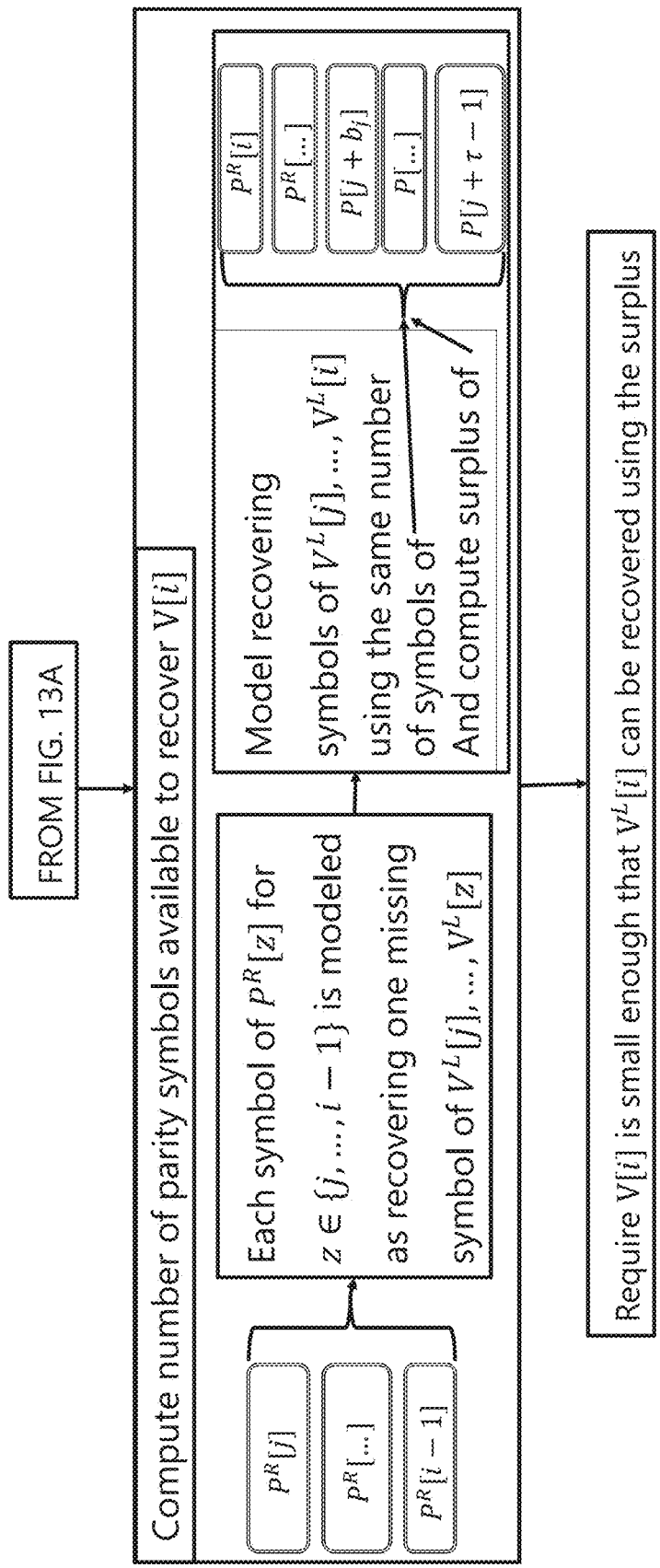

In one embodiment, the size of V[i] ranges from 0 to some maximum value, $v_i'$, set to be as large as possible subject to the following constraint. For any burst encompassing frame i starting with frame j of length $b_j$ where any $l_r$ fraction of packets are lost for frame r in the burst, V[j] through V[j+$b_j$−1] are recoverable by frame (j+τ−1). Then a procedure is used to select an integral value between 0 and $v_i'$ reflecting the number of symbols allocated to V[i]. This procedure is depicted schematically in FIG. 12 and FIGS. 13A and 13B which uses a heuristic that determines the size of the first component should be as large as possible subject to the following constraint. Suppose the first component is empty for the next τ time slots. For any partial burst that includes the current time slot, then all symbols of the first component that are lost in the partial burst are recovered by τ−1 time slots after the start of the partial burst with high probability.

Figure 4:
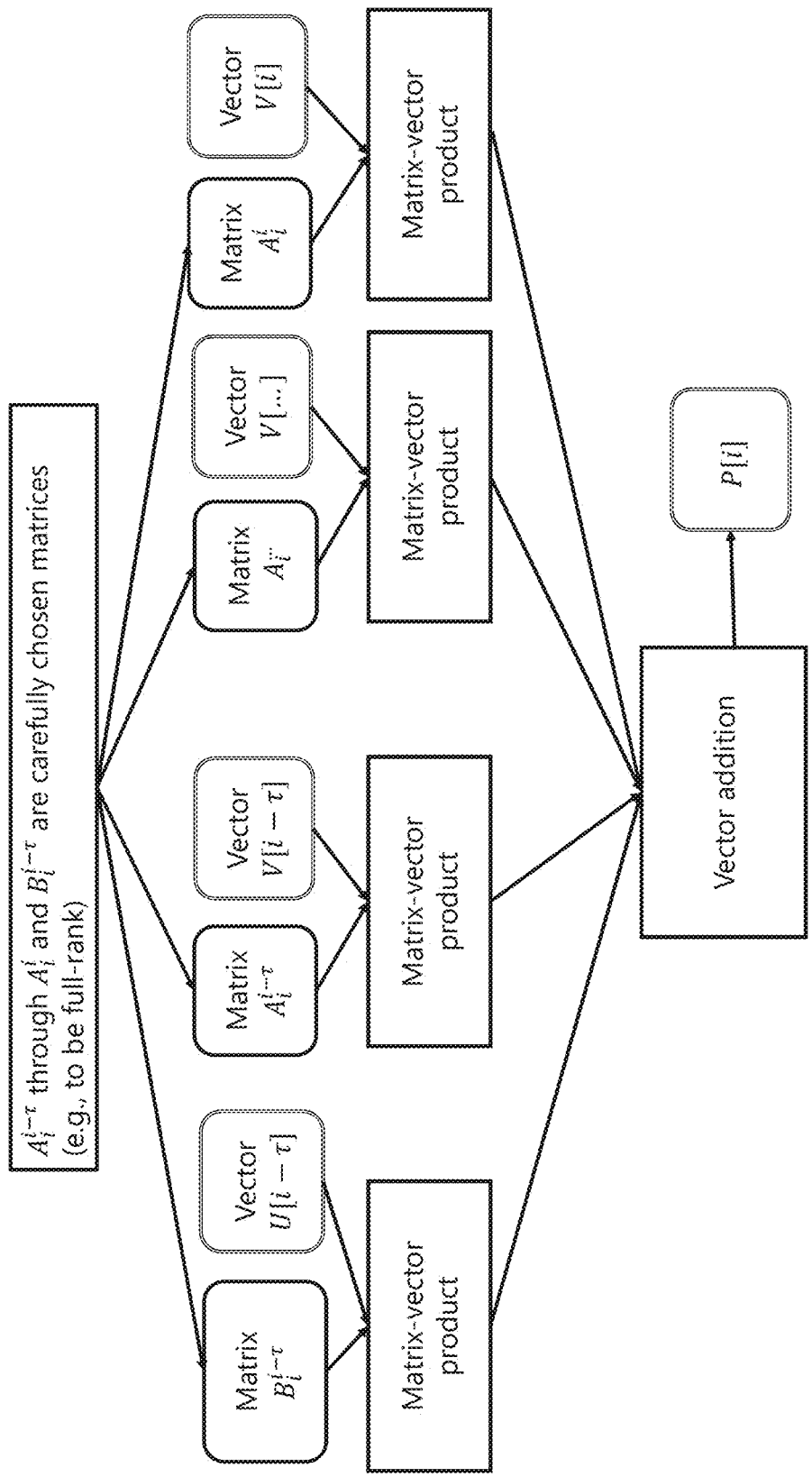
FIG. 4 is a schematic diagram showing a representation of the process of FIG. 3.

FIG. 3 is a schematic diagram for creating parity symbols, in accordance with one embodiment. In this example, the symbols of P[i] are linear combinations of the symbols of the current frame and previous t frames. Specifically, the symbols of P[i] are designed linear combinations of the symbols of the following quantities: V[i], . . . , V[i−τ], and U[i−τ] but not U[i]. Formally, P[i] is the sum of two quantities: P[i]:=$P_1$[i]+$P_2$[i]. The symbols of $P_1$[i] are linear combinations of the symbols of U[i−τ], e.g., $P_1$[i]=$B_i^{i-\tau}$*U[i−τ], where $B_i^{i-\tau}$ is a carefully chosen matrix (e.g., full-rank) as discussed further below. The symbols of $P_2$[i] are linear combinations of the symbols of V[i−τ], . . . , V[i], e.g., $P_2$[i]=Σ(j=i−τ to i) of $A_i^j$*V[i], where $A_i^{i-\tau}$ to $A_i^i$ are carefully chosen matrices (e.g., full-rank) as discussed further below. One way to construct the matrices for the process of FIG. 3 is for (a) $B_i^{i-\tau}$ to be the parity check matrix of a systematic MDS code (e.g., Reed-Solomon) and (b) $A_i^j$ for j∈{i−τ, . . . , i} be parity check matrices of a systematic m-MDS convolutional code. Alternatively, $A_i^j$ (and optionally also $B_i^{i-\tau}$) can be matrices with each entry drawn independently and uniformly at random over the elements of the field, in which case, loss recovery is shown with a high probability for a sufficiently large field size instead of being guaranteed with probability 1. All linear combinations are carefully chosen to be linearly independent linear equations. In one embodiment, the number of parity symbols to be sent with the data of frame (i+τ) is allocated to be a function of the size of U[i]. For example, in one embodiment, the number of parity symbols could be set to equal the size of U[i] times $l_i$ (or to the ceiling of this quantity), e.g., setting the number of parity symbols sent for the ith video frame as a function of the size of U[i−τ] such as the size of U[i−τ] times $l_{i-\tau}$ and optionally increasing the resulting number of parity symbols to be evenly divisible by the number of channel frames sent for the ith video frame. This heuristic splits video frames to minimize parity associated with each video frame, e.g., by making U[i] as small as possible. An alternate heuristic could allocate enough parity symbols to recover V[i] during time slot i. FIG. 4 is a schematic diagram showing a representation of the process of FIG. 3.

It should be noted that the processes of FIGS. 3 and 4 can be extended to a more general class of encoding/decoding matrices, e.g., to any structure for encoding parity symbols for the current data frame, i, that is a function of the symbols of V[i−τ:i] and U[i−τ] so that for any partial burst the symbols of first component of data frames are all recovered by t time slots after the start of the burst (e.g., one method to accomplish this is to ensure recovery by τ−1 time slots after the start of the burst) and the symbols of the second component of each data frame are recovered $\tau$ time slots later. For example, linear combinations of the symbols of $V[i-\tau:i]$ can be chosen according to a sliding window rateless code to create a vector of symbols $P_2[i]$. Then linear combinations of the symbols of $U[i-\tau]$ may be chosen according to an MDS code, leading to the vector of symbols $P_1[i]$. Adding $P_1[i]$ to $P_2[i]$ can then form the parity symbols to be sent, $P[i]:=P_1[i]+P_2[i]$. The number of parity symbols may be chosen to be high enough so that loss recovery occurs with high probability. This may involve allocating extra parity symbols compared to how many are needed when the linear combinations of symbols of the first component are full rank (e.g., how many symbols are used under the construction proposed in the provisional patent application). Using such a rateless code may improve the complexity of encoding/decoding but require sending extra parity symbols.

FIGS. 5A-5D schematically show exemplary packetization schemes for allocating data and parity symbols to channel frames, in accordance with various embodiments of the present invention.

Figure 5A:
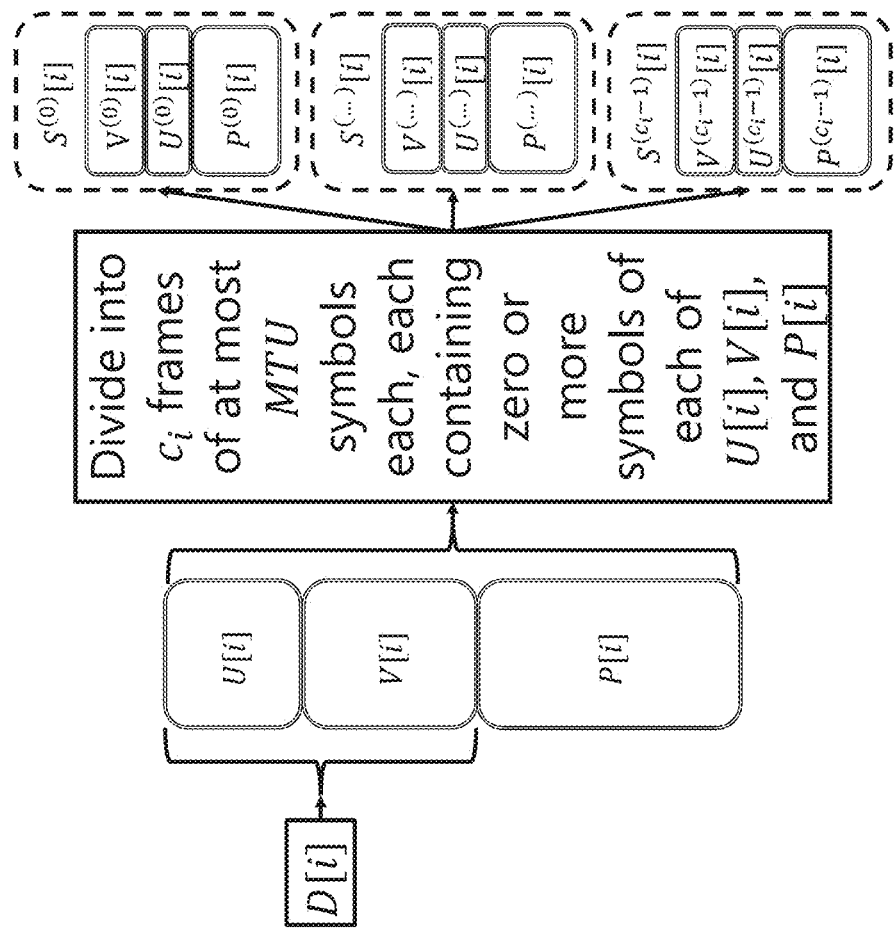
FIG. 5A is a schematic diagram showing the general packetization scheme for allocating data and parity symbols to channel frames, in accordance with various embodiments of the present invention.
Figure 5B:
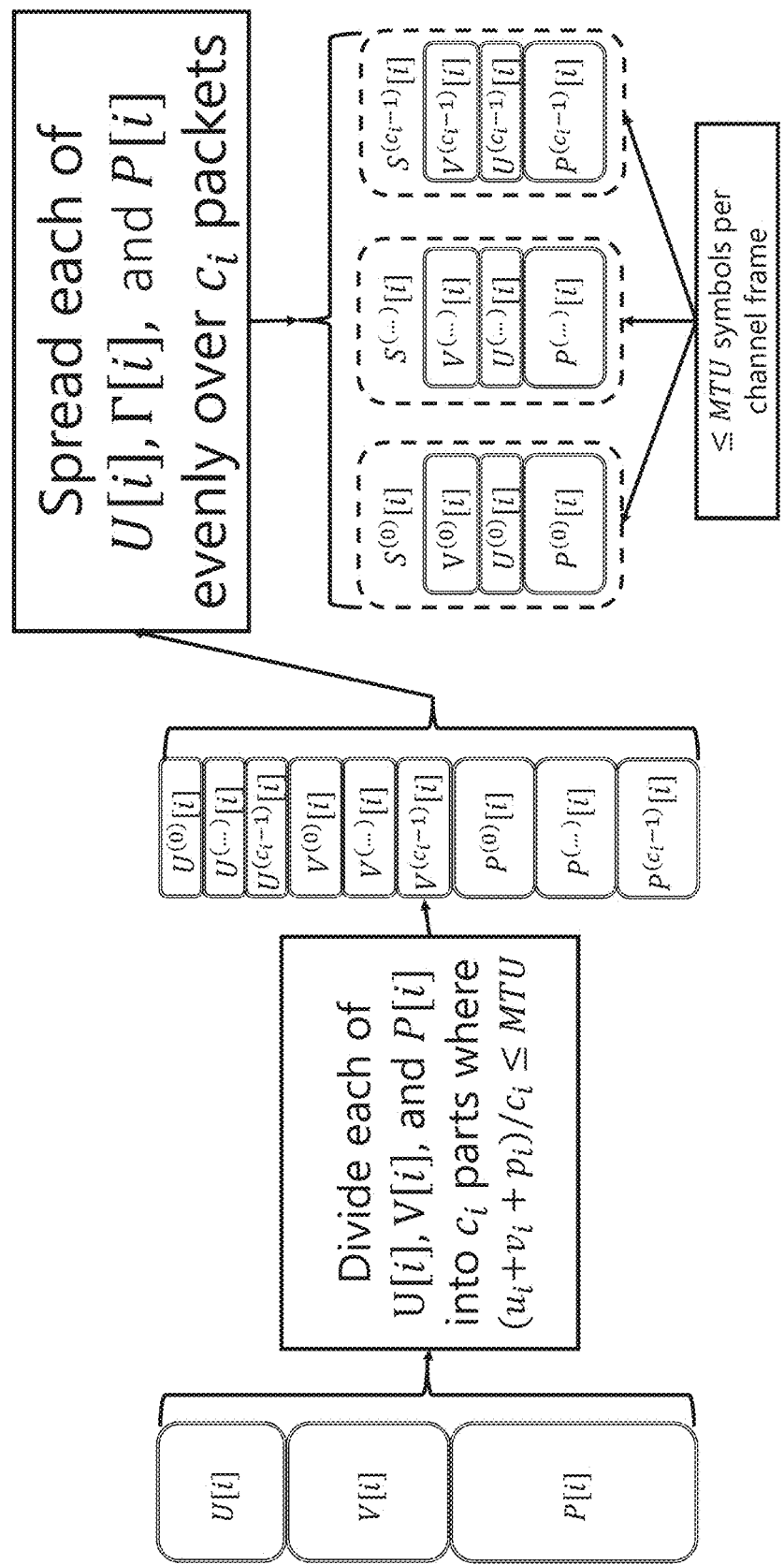
FIG. 5B is a schematic diagram showing a first way for packetizing the ith frame.

As depicted in FIG. 5A, packetization generally involves distributing the symbols of $U[i]$, $V[i]$, and $P[i]$ over some number, $c_i$, of packets such that (a) each packet has size at most MTU symbols, and (b) losses under a partial burst channel are recoverable such that each data frame is recovered within t time slots. It suffices to receive approximately $(1-l_i)$ fraction of each of $U[i]$, $V[i]$, and $P[i]$. Each packet may contain symbols from one, two, or three of: $U[i]$, $V[i]$, and $P[i]$. FIG. 5B is a schematic diagram showing a first way for packetizing the ith frame. Here, the number, $c_i$, of transmitted channel frames $S[i]$ is kept as small as possible so that, when the data and parity symbols of a video frame are spread evenly over these channel frames, the following conditions hold:

(a) the size of each channel frame does not exceed the maximum transmittable unit (MTU), e.g., which may be 1500 bytes in some embodiments), and (b) the number of channel frames times $l_i$ is an integer (or, it may be slightly less than an integer where the difference is deemed sufficiently small relative to the number of packets).

Then, in one embodiment, $U[i]$ and $V[i]$ are selectively zero-padded for the sake of generating $P[i]$ (although any added zeroes need not be transmitted, e.g., they may be inferred by the receiver) and the size of $P[i]$ is selectively increased, each by as little as possible to ensure the sizes of $U[i]$, $V[i]$, and $P[i]$ are evenly divisible by $c_i$. Each of $U[i]$, $V[i]$ and $P[i]$ are evenly distributed over the $c_i$ channel frames. It should be noted that, here, parity symbols are sent in packets $S[i]$ along with data symbols and the number of packets may be chosen based on loss-recovery characteristics.

Figure 5C:
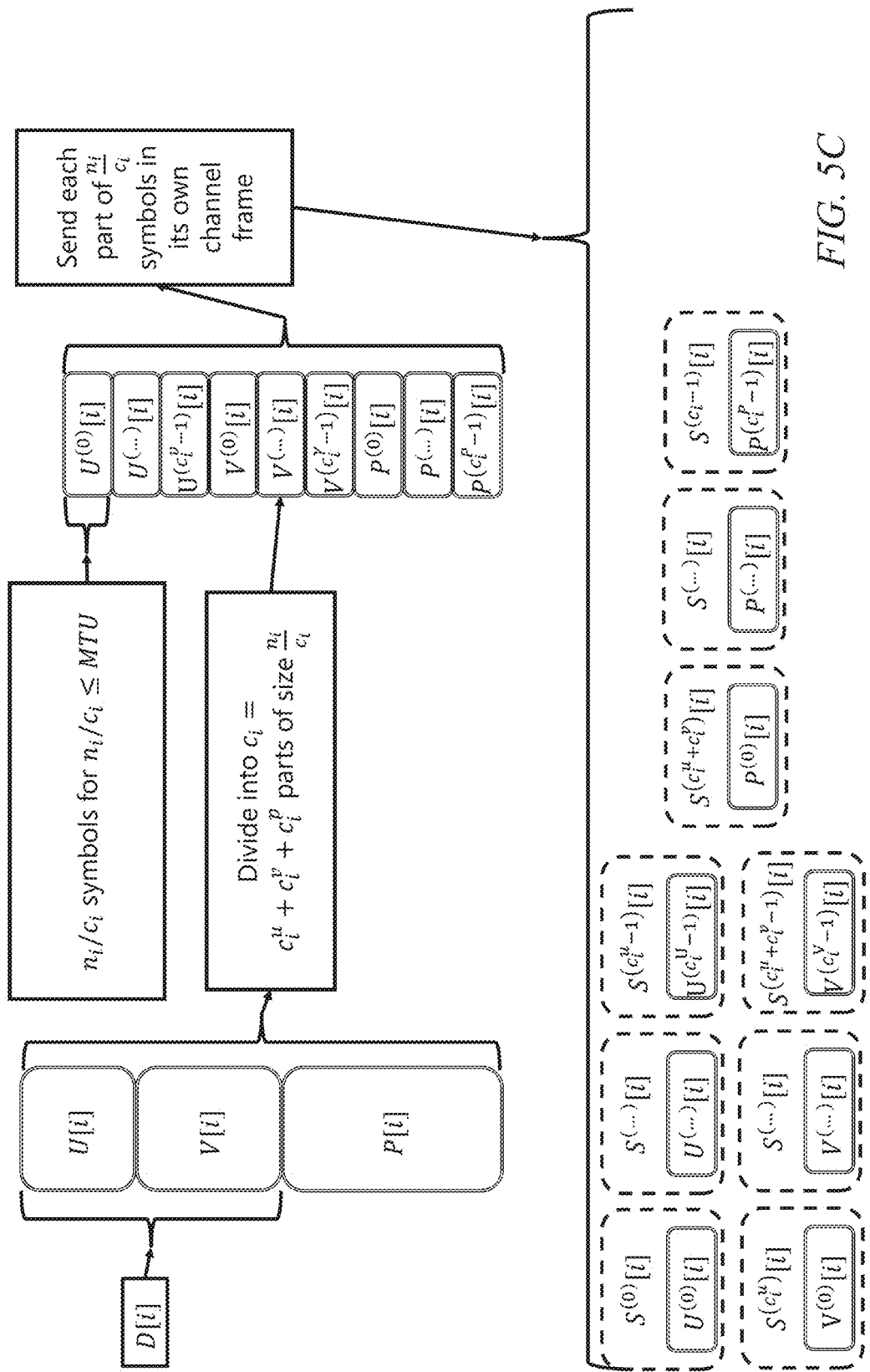
FIG. 5C is a schematic diagram showing a second way for packetizing the ith frame.

FIG. 5C is a schematic diagram showing a second way for packetizing the ith frame. Here, $V[i]$ is divided into $c_i^v$ packets of size $(n_i/c_i) \leq$ MTU, $U[i]$ is divided into $c_i^u$ packets of size $(n_i/c_i) \leq$ MTU, and $P[i]$ is divided into $c_i^p$ packets of size $(n_i/c_i) \leq$ MTU such that $c_i=(c_i^u+c_i^v+c_i^p)$ packets are sent. Splitting $U[i]$, $V[i]$, and $P[i]$ may involve zero-padding or pushing the boundary between $U[i]$ and $V[i]$.

Figure 5D:
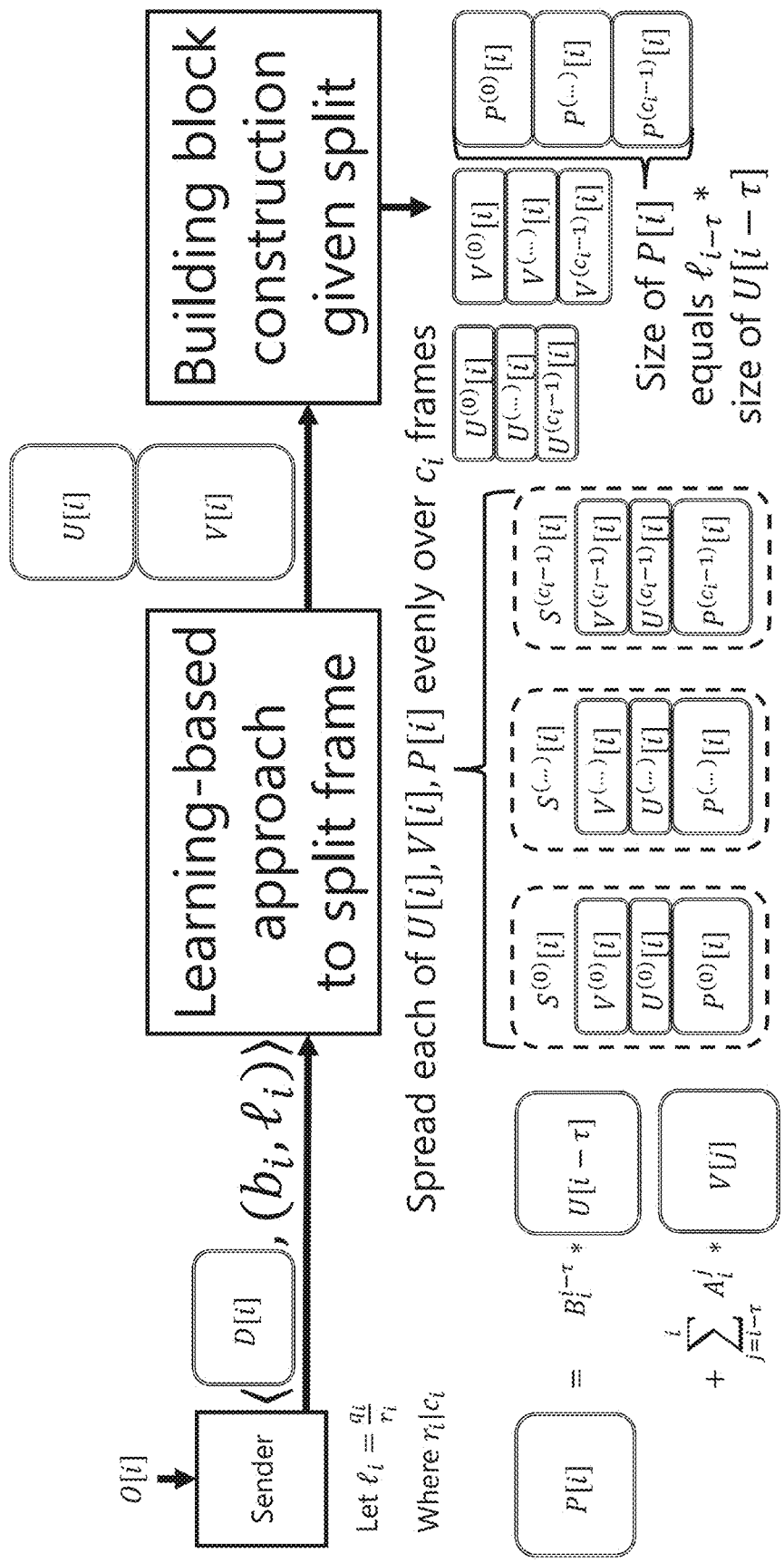
FIG. 5D is a schematic diagram showing a third way for packetizing the ith frame consistent with the frame partitioning or splitting scheme shown in FIG. 2A.

FIG. 5D is a schematic diagram showing a third way for packetizing the ith frame consistent with the frame partitioning or splitting scheme shown in FIG. 2A. Here, a learning-based approach is used to split frames. Specifically, $D[i]$ is passed to the learning-based module along with the parameters $b_i$ and $l_i$. The learning-based module determines how to split the frame into the two components, $U[i]$ and $V[i]$. Then, a building block construction is applied given the split. The number of parity symbols is based on the encoding of frame $(i-\tau)$. The symbols of the three components are evenly spread over $b_i$ channel frames. Finally, for random matrices $A_i^j$ and $B_i^j$, we define the parity symbols as line combinations of the V component of the current and previous $\tau$ frames and linear combinations of the symbols of U from $\tau$ frames before.

Figure 6:
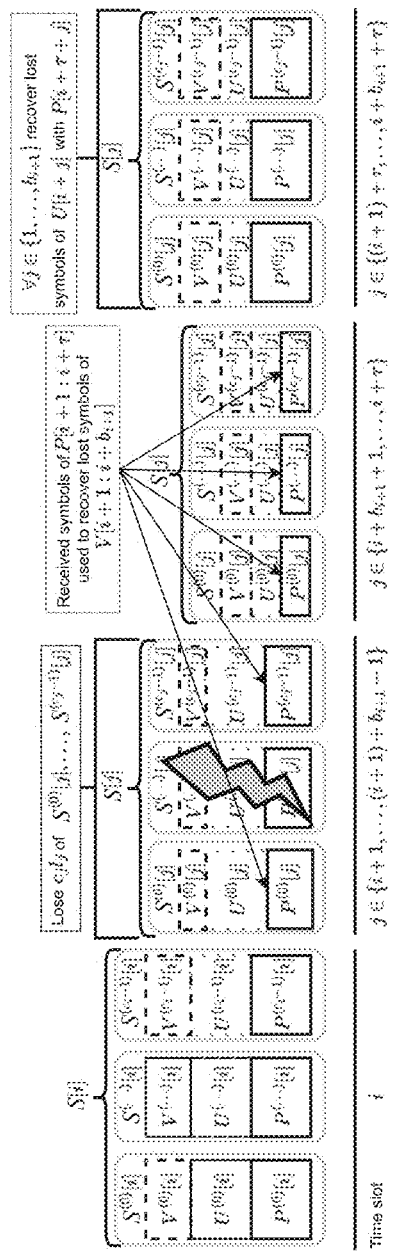
FIG. 6 is a schematic diagram for decoding the encoded frames to recover any burst losses, in accordance with one embodiment.

FIG. 6 is a schematic diagram for decoding the encoded frames to recover any burst losses, in accordance with one embodiment. When there are no losses, frames may be directly decoded (or, if the scheme is not systematic, decoding is applied using the received packets and possibly the symbols of prior frames, such as by applying Gaussian Elimination). When losses occur, the following decoding process is followed for a situation in which one encounters a burst of length $b_{i+1}$ starting in frame $(i+1)$ where for each frame j with loss in the burst, $l_j$ fraction of its transmitted packets are lost. Here, we assume all of the received channel frames before the burst have been decoded. First, the received symbols of $P[i+1]$ through $P[i+b_{i+1}]$ are combined with $P[i+1+b_i+1], \ldots, P[i+\tau]$ to decode the lost symbols of $V[i+1]$ through $V[i+b_{i+1}]$ (this process also uses the received symbols for frames 0 through i, as well as the received symbols of $V[i+1]$ through $V[i+b_{i+1}]$). Second, for $j=(i+1)$ through $(i+b_{i+1})$, the lost symbols of $U[j]$ are recovered using $P[j+\tau]$. In both steps, decoding follows from solving a system of linear equations, such as by using Gaussian elimination. Put another way, the receiver decodes a burst across i to j consecutive frames where j is an integer between one and $b_i$ to solve a system of linear equations corresponding to the symbols of $D[i-\tau]$ through $D[i+\tau-1]$, wherein the symbols of $D[i-\tau]$ through $D[i-1]$ are combined with the received symbols $V[i]$ through $V[i+\tau-1]$ and received symbols of $P[i]$ through $P[+\tau-1]$ to recover $V[i]$ through $V[i+b_i-1]$ and then for each r in i to j the symbols of $V[r]$ through $V[r+t]$ are combined with the received symbols of $U[r]$ and $P[r+\tau]$ to recover $U[r]$.

Figure 8A:
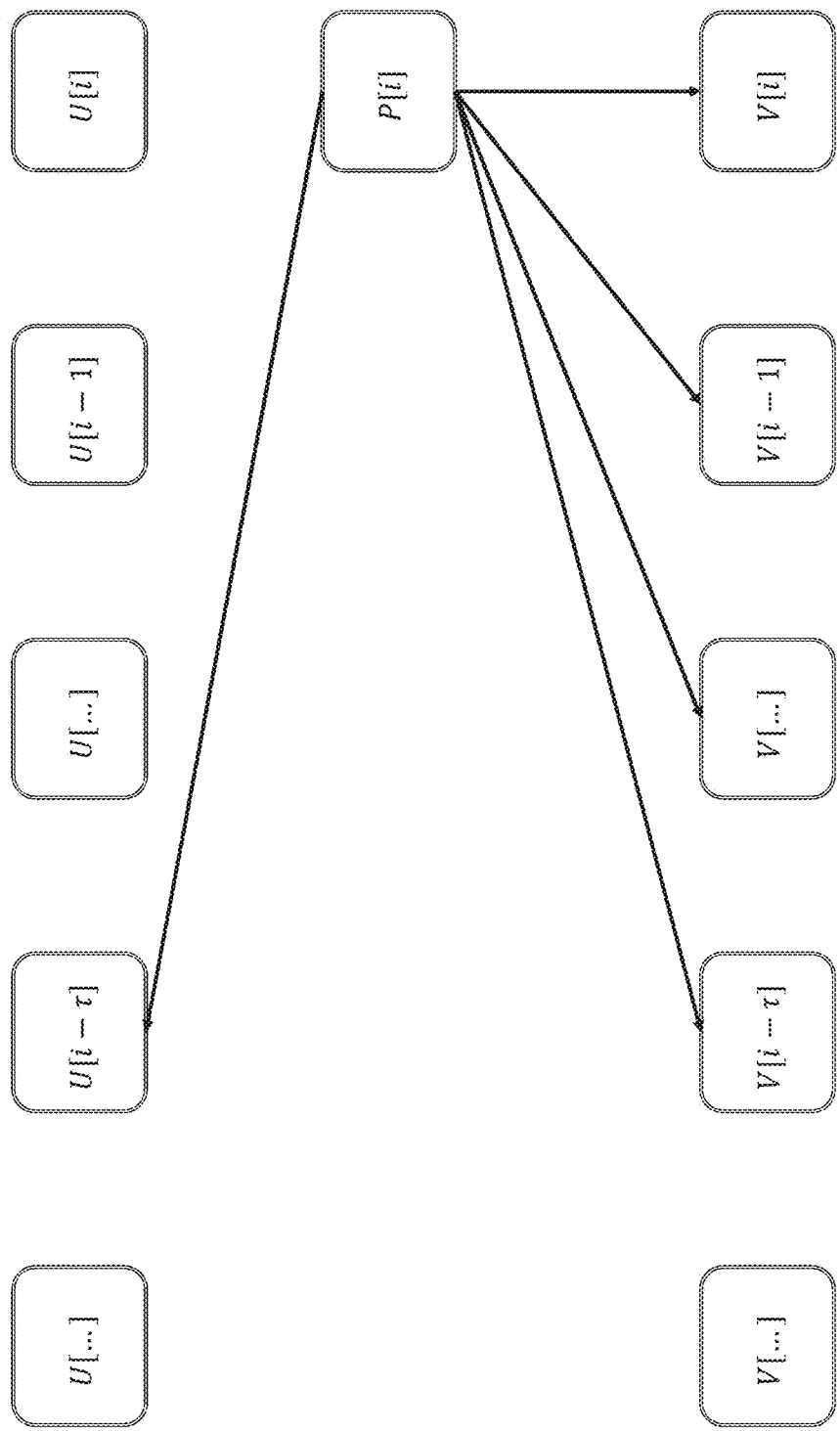
FIG. 8A is a factor graph schematically representing the generation of parity bits for a single video frame, in accordance with one embodiment.
Figure 8B:
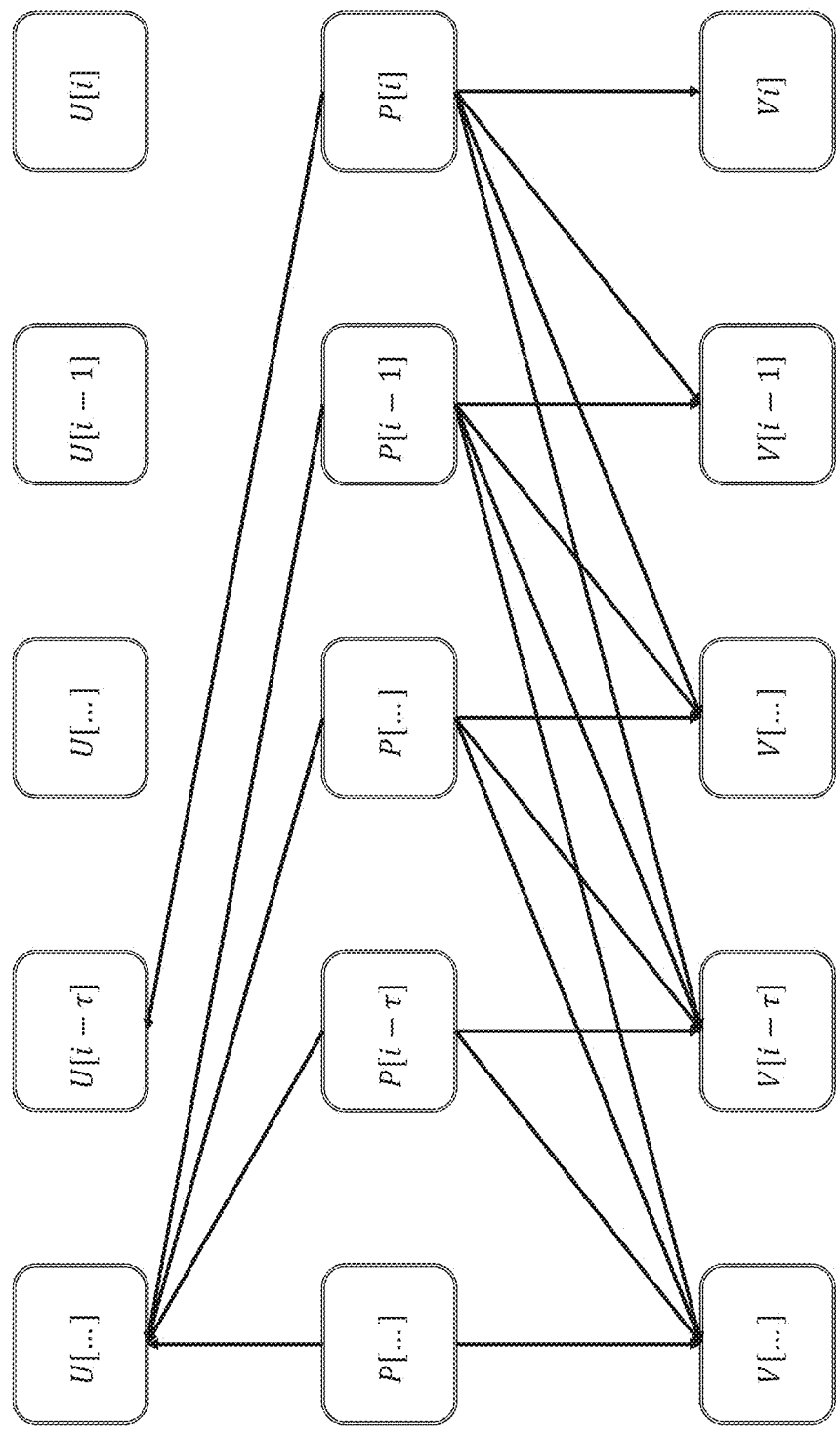
FIG. 8B is a factor graph schematically representing the generation of parity bits across multiple video frames in accordance with FIG. 8A.

FIG. 8A is a factor graph schematically representing the generation of parity bits for $P[i]$, in accordance with one embodiment as discussed above and FIG. 8B is a factor graph schematically representing the generation of parity bits across multiple video frames. For purposes of this specification, a factor graph is a graph that reflects which symbols are intended to be used to compute parity symbols. For example, a factor graph may reflect where parity symbols $P[i]$ are connected to components whose symbols are used to compute it and not to components whose symbols are independent of the symbols of $P[i]$. Here, the parity symbols for data frame i are functions of (a) the first component of the current and previous $\tau$ data frames (i.e., $V[i-\tau:i]$), and (b) the second component of the data frame from $\tau$ time slots before (i.e., $U[i-\tau]$). For example, each symbol of $P[i]$ may be a linear combinations of the symbols from (a) and (b).

As long as burst losses do not exceed the estimated parameter, the methodology of the present invention ensures that each video frame is recovered within $\tau$ frames (with high probability). Doing so therefore mitigates the adverse effect of packet loss on the quality-of-experience (QoE), as each frame is recovered within a tolerable latency. In the event that a decoding should fail, the receiver preferably queries the sender to generate a new keyframe (i.e., a self-sufficient frame), which prevents the decoding failure from affecting decoding later frames (i.e., to handle inter-frame dependencies.) Then, future frames are encoded similarly to if the keyframe were the first frame (i.e., parity symbols do not include linear combinations of frame symbols of frames from before the prompted keyframe).

Figure 10A:
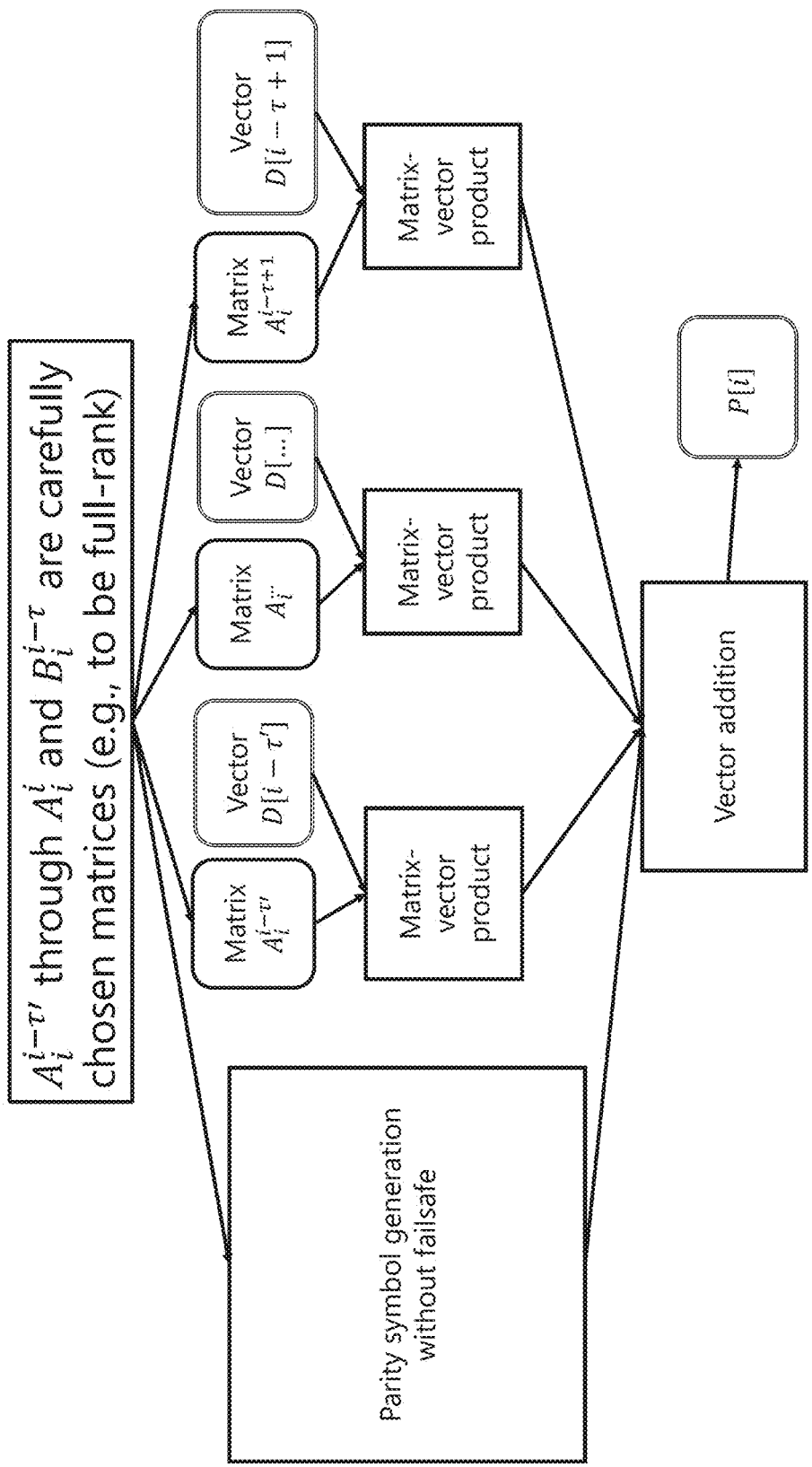
FIG. 10A is a schematic diagram representing parity symbol generation with failsafe, in accordance with one embodiment.
Figure 10B:
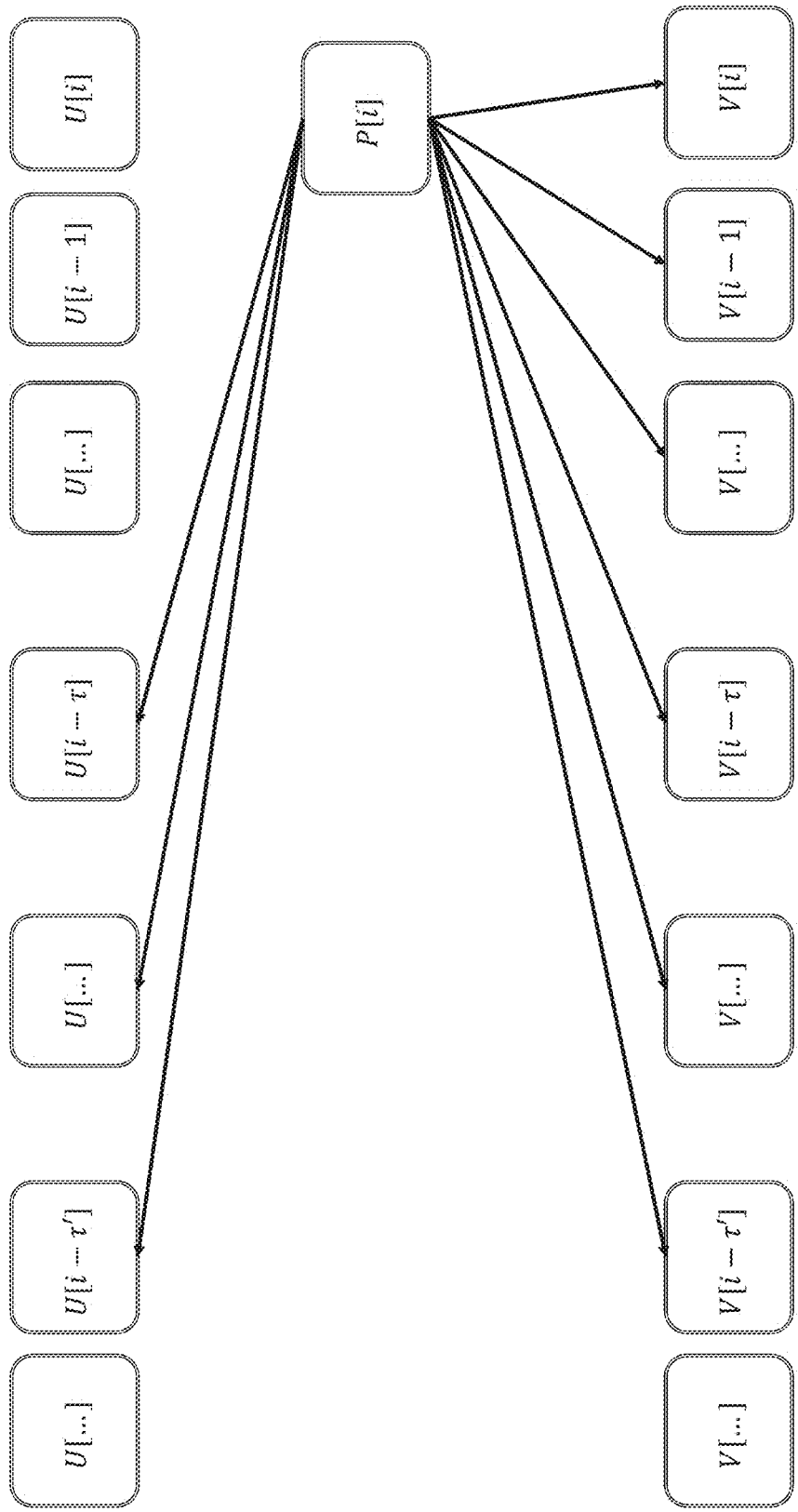
FIG. 10B is a factor graph schematically representing the generation of parity symbols with failsafe in accordance with FIG. 10A.

It should be noted that alternate embodiments can include a failsafe mechanism. FIG. 10A is a schematic diagram representing parity symbol generation with failsafe and FIG. 10B is a factor graph schematically representing the generation of parity symbols with failsafe in accordance with FIG. 10A, in accordance with one embodiment. The loss-recovery mechanism of certain embodiments described above provides guarantees as long as losses are no worse than the type of loss that is admissible under the channel parameters (i.e., $b_i$ and $l_i$ for each data frame i). Embodiments can include a failsafe mechanism by which information from one or more additional prior data frames are added to parity symbols of the current data frame. This enables loss recovery even in cases where losses are worse than the anticipated values (i.e., a burst of length $b_i$ starting in data frame i where $l_i$ fraction of the packets are lost for each data frame j in the burst). For example, if P[i] is the parity symbols as defined above, the parity symbols to be sent may be P[i]+P⁺[i] where P⁺[i] can be random linear combinations of the symbols of data frames (i−τ') through (i−τ−1) for some τ' larger than τ. Formally, $$P^+[i] = \sum_{j=i-\tau'}^{i-\tau-1} A_i^j D[j],$$

where each $A_i^j$ is a matrix with entries drawn uniformly at random from the field, although it should be noted that embodiments are not limited to linear combinations but instead could use other techniques to incorporate information about prior frames into the parity symbols (e.g., if each symbol is over an extension field, could include information about only part of a symbol). Even if the baseline coding scheme might not be able to recover certain lost packets, the coding scheme with failsafe mechanism may lead to loss recovery (albeit with a latency of more than t). Recovering data frames after their deadline can be useful due to inter-frame dependencies, as later uncompressed frames are playable once all prior data frames have been recovered. The failsafe of sending feedback from the receiver to the sender to generate a keyframe (i.e., an uncompressed frame that does not depend on prior uncompressed frames) can be applied on top of this failsafe by triggering the new keyframe when frame i has not been recovered by time slot (i−τ'+1). It should be noted that embodiments could dynamically switch between coding without failsafe and coding with failsafe, e.g., based on network conditions or other parameters.

Figure 11A:
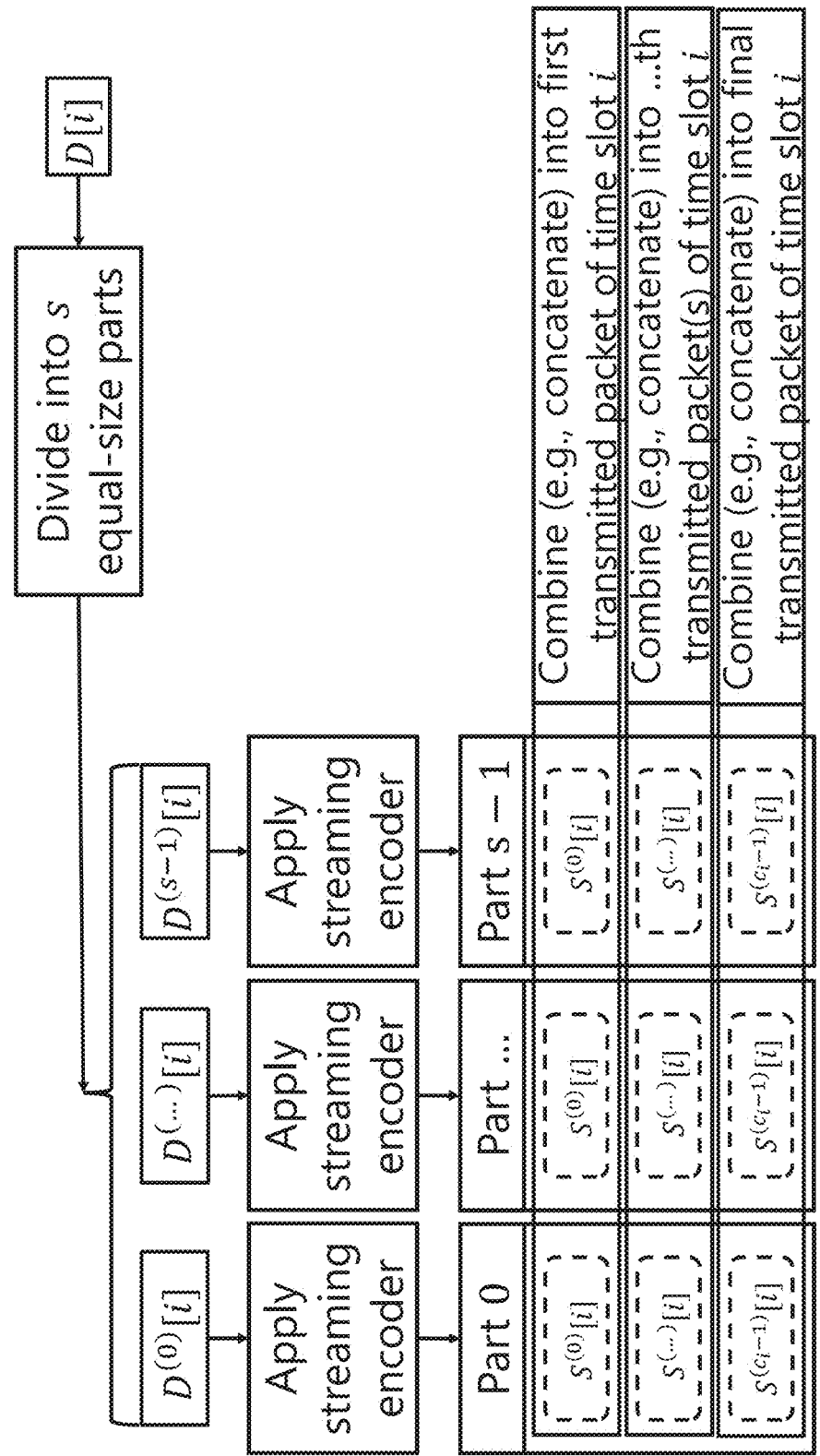
FIG. 11A is a schematic diagram showing a representation of encoding with stripes, in accordance with one embodiment.
Figure 11B:
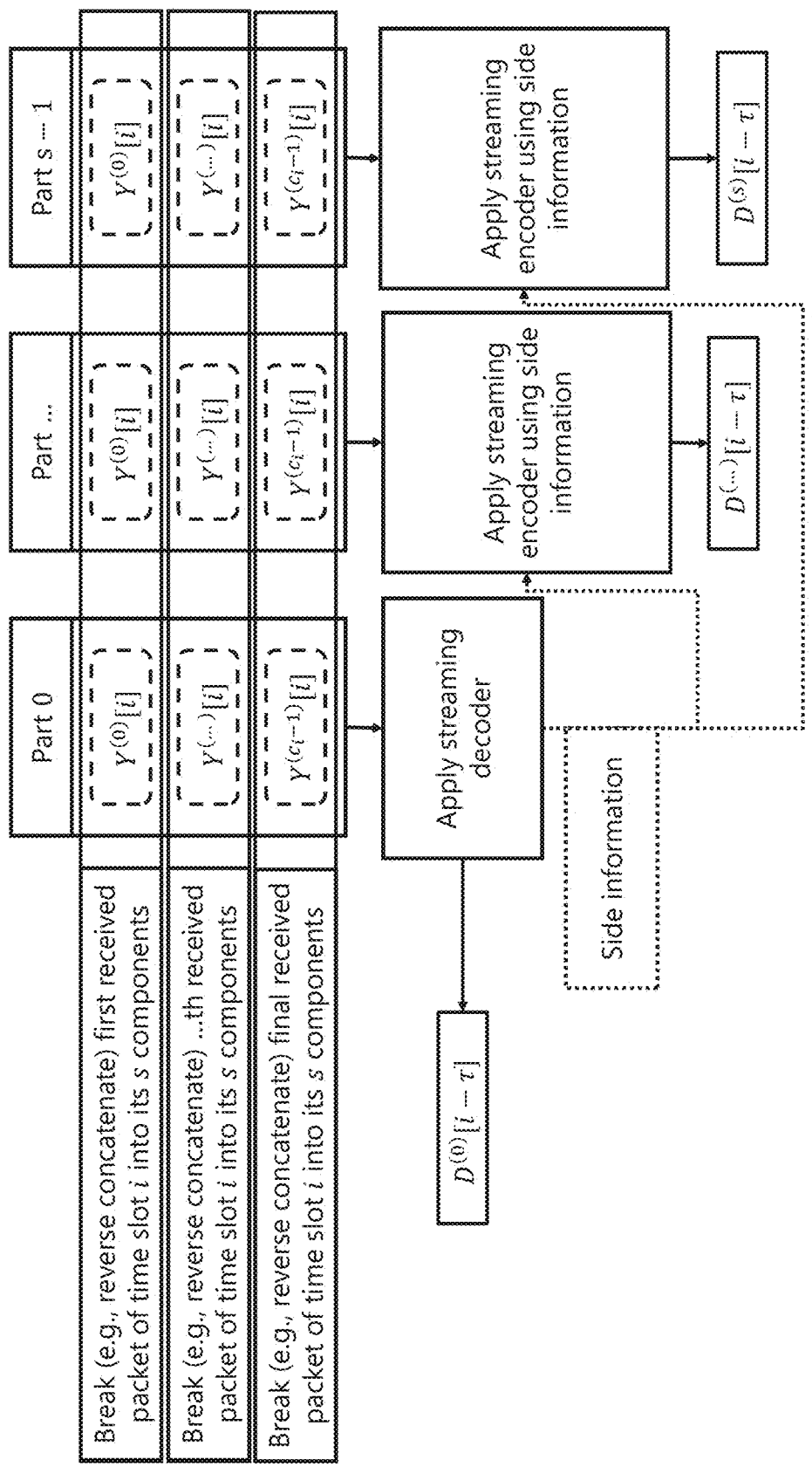
FIG. 11B is a schematic diagram showing a representation of decoding with stripes in accordance with FIG. 11A.

It should be noted that embodiments can be applied to batch encoding with striping. FIG. 11A is a schematic diagram showing a representation of encoding with stripes and FIG. 11B is a schematic diagram showing a representation of decoding with stripes in accordance with FIG. 11A, in accordance with one embodiment. The idea of batching symbols into stripes is well-known in the coding theory literature. Generally speaking, striping is a methodology for (a) how linear combinations of symbols are taken and (b) how they are spread over packets so that decoding is more efficient (e.g., reduced computation). In the context of the present invention, striping provides a mechanism by which each of U[i] and V[i] and P[i] are split into so-called "stripes" of s symbols each (here, the symbol s is chosen because the word "stripe" starts with an "s" and is different from S[i]). To generate the parity symbols of a stripe, the same function (e.g., taking a linear combination) is used to create the symbol of each position by applying the function to different inputs. For example, to create the jth parity symbol of a stripe, one may apply the function to the jth position of all relevant stripes of V[i−τ:i] and U[i−τ] (the inputs may also include the jth position stripes of D[i−τ':i−τ−1] if the failsafe is used as discussed above).

In certain embodiments, packetization for striping would be performed in a manner that distributes symbols such that all symbols of each stripe are always placed in the same packet. One way to do packetization is shown in FIG. 11A and may involve using a smaller "MTU" by dividing the true MTU by s. One advantage is that after solving a system of linear equations to recover any one position of a stripe, j, the solution to the system of linear equations can be reused to decode each remaining position of the stripe. This reduces the complexity of decoding, as depicted in FIG. 10B. In the step of dividing D[i] into s equal-size parts, one may add zero padding of up to (s−1) symbols to ensure the number of symbols is divisible by S. As with zero-padding discussed above, embodiments could optimize to not send these symbols and instead have the receiver infer them. With reference to FIG. 10B, the decoder essentially undoes the combination step from encoding with stripes to obtain the received packets, e.g., as if part 0 was the entire communication. This can involve applying the streaming decoder in order to solve for the data of the (i−τ)th data frame when restricted to part 0 and storing the useful information computed during decoding (referred to herein as "side information") for use when decoding parts 1 through (s−1). Specifically, since decoding follows from solving a system of linear equations by inverting a matrix, one possibility for using the side information is to set the side information to be this matrix such that that decoding parts 1 through (s−1) will be able to reuse this matrix inverse rather than computing it again. By using stripes of size s, the size of matrix that is inverted in part 0 is much smaller than if no stripes had been used (and the underlying streaming encoder/decoder were used directly). Then, each additional part can be decoded as if the part was the entire communication but using the side information in the decoding to reduce computational complexity. The computational complexity of decoding all data is intended to be much less than if stripes were not used (i.e., if the underlying streaming encoder/decoder were used directly). It should be noted that the same streaming encoder can be applied to all parts, although alternatively a different streaming encoder/decoder could be used for each stripe (e.g., different randomly generated encoding matrices) such that both encoding and decoding can be done in parallel (i.e., at the sender and receiver, respectively); in this case, the "side information" generally would not be needed or used.

As discussed above, an optimization algorithm (e.g., using a linear program) may be used to estimate burst loss characteristics and determine how to split each frame for offline optimization. FIGS. 14A-14M schematically show an offline optimization to find splits and party allocation via a linear program, in accordance with one embodiment.

Figure 14A:
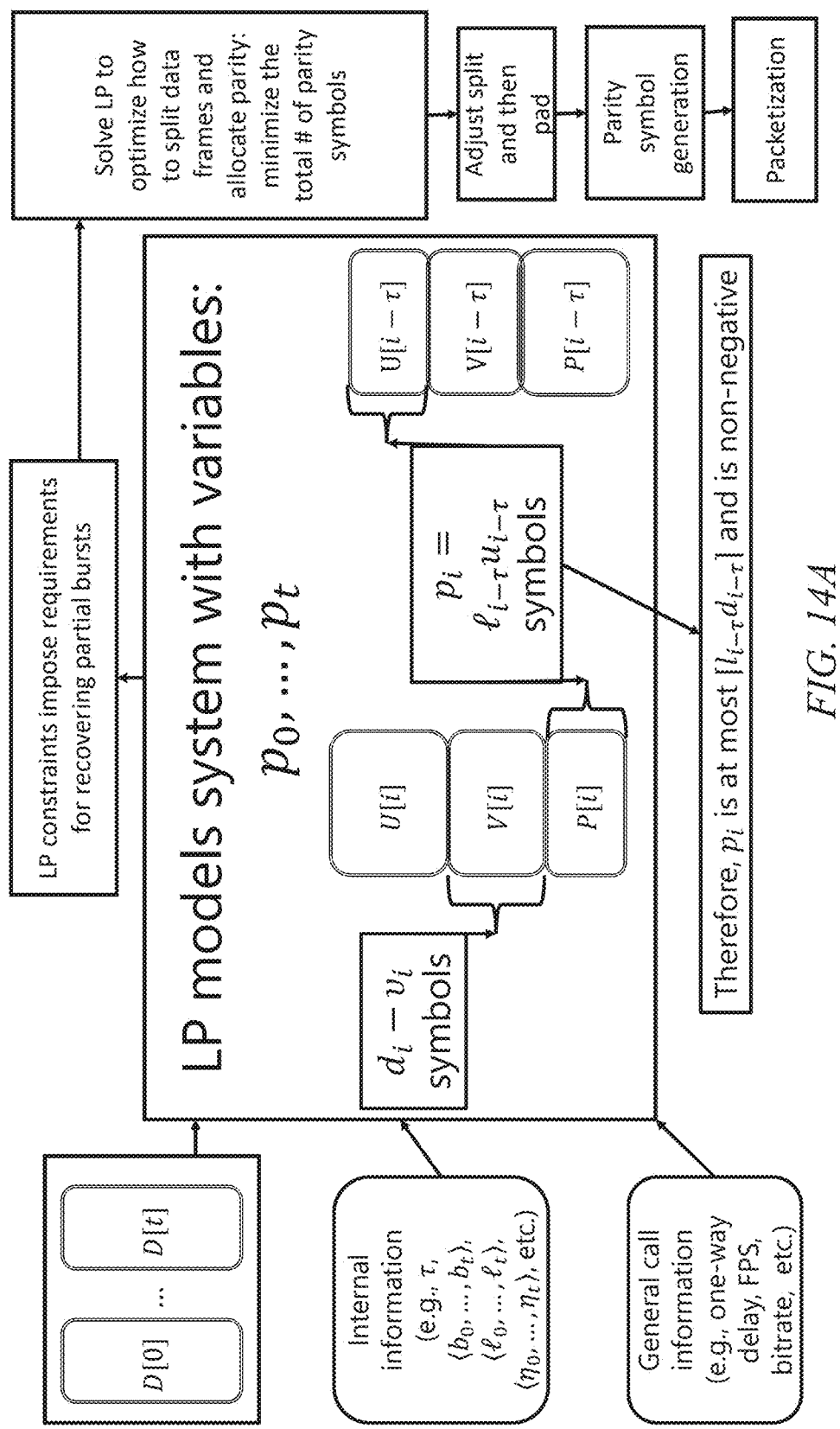
FIGS. 14A-14M schematically show an offline optimization to find splits and party allocation via a linear program, in accordance with one embodiment.

FIG. 14A shows a general linear program model to be solved for offline optimization, in accordance with one embodiment. In this example the total number of parity symbols is just the summation over all time slots, i, of $p_i$, where t is the length of the call in this example.

Figure 14B:
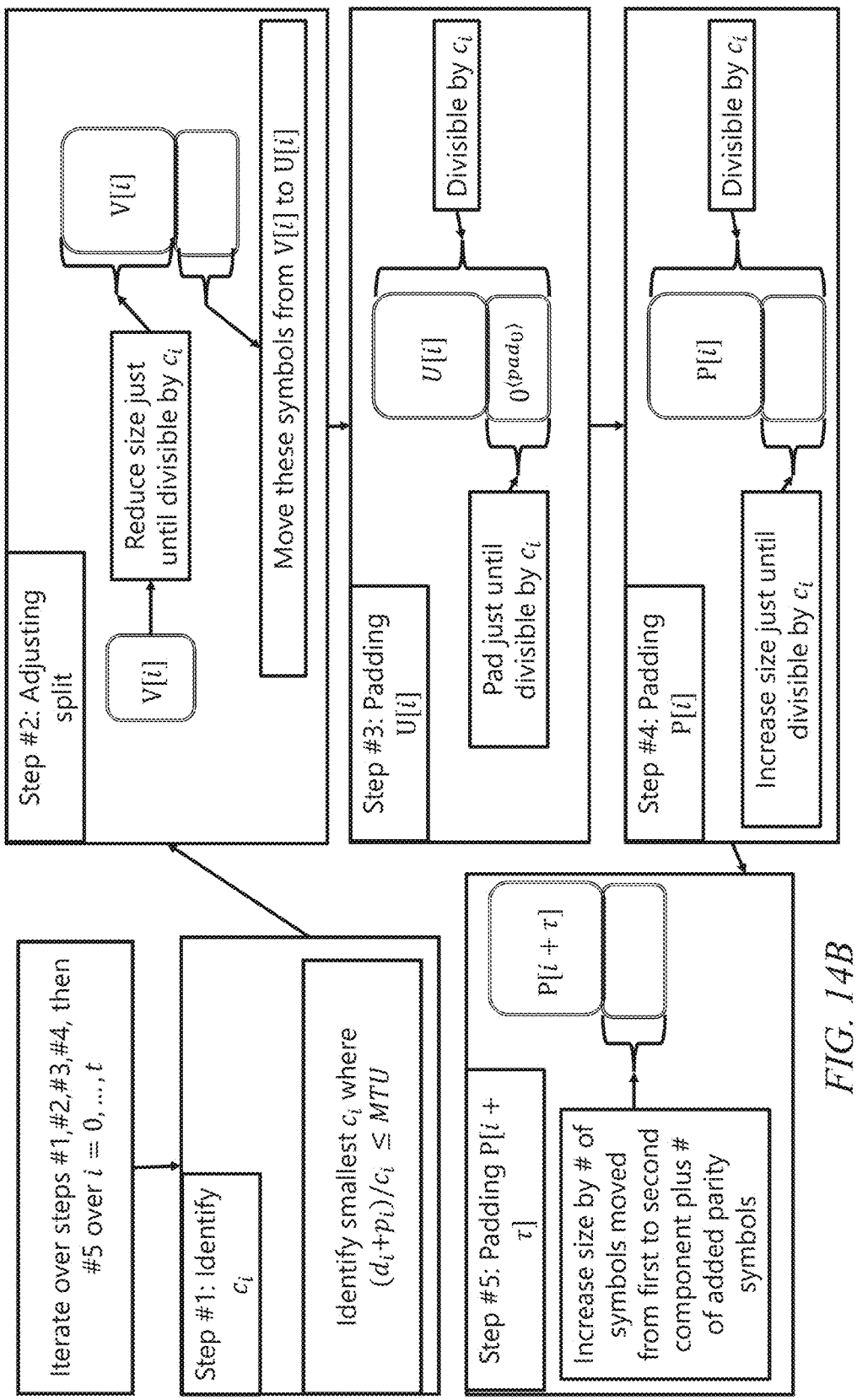

FIG. 14B shows the general steps for offline optimization using the linear program model of FIG. 14A, in accordance with one embodiment. This ensures (a) the packetization is well defined while (b) maintaining the intended recovery properties for partial bursts (i.e., for a partial burst starting in time slot i with high probability (a) V[i:i+$b_i$−1] are recovered by time slot (i+τ−1) and (b) each U[j] is recovered by time slot (j+τ) for j∈{i, ..., i+$b_i$−1}.

Figure 14C:
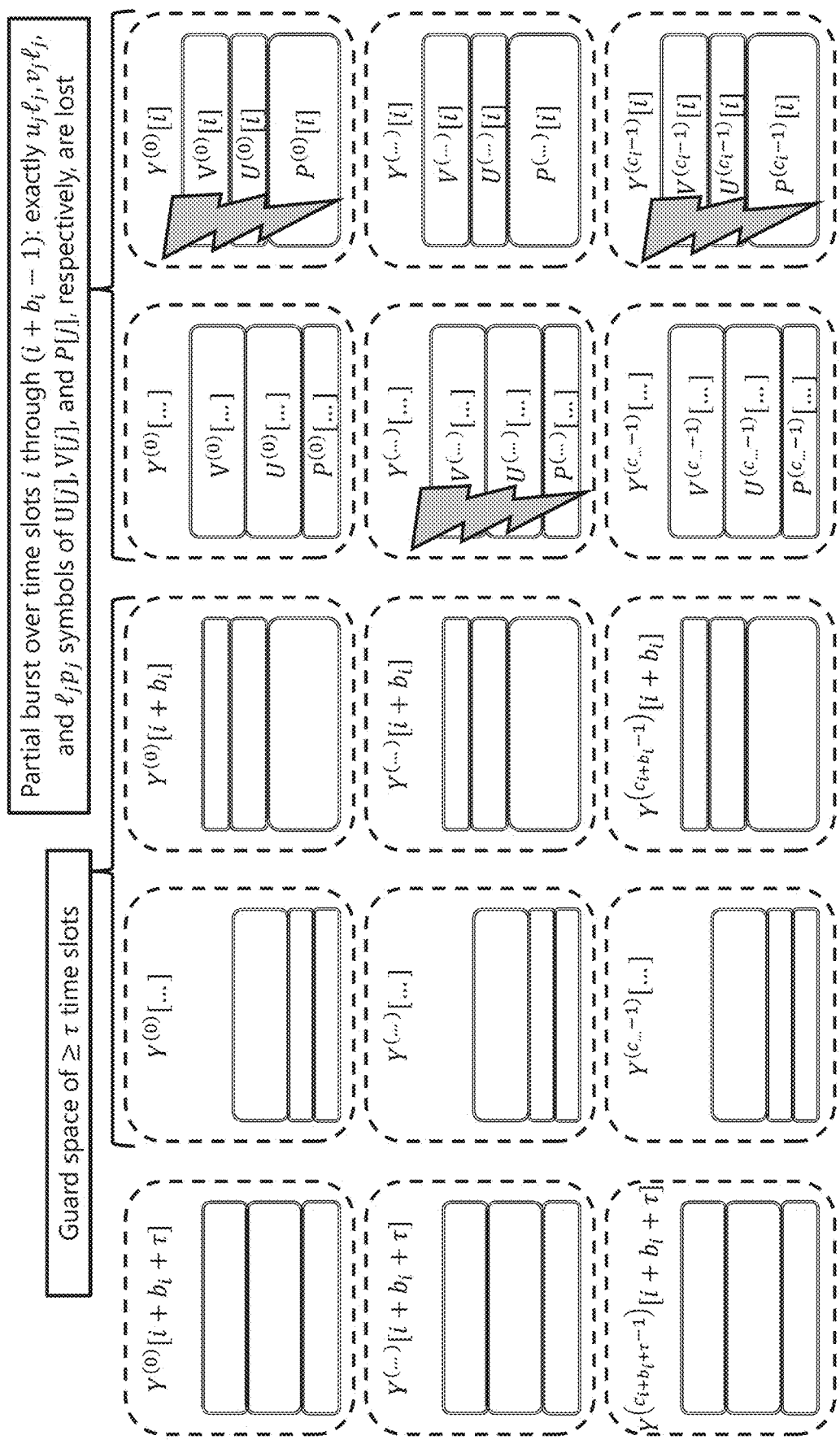

FIG. 14C models a partial burst starting in time slot i for constraints on loss recovery.

Figure 14D:
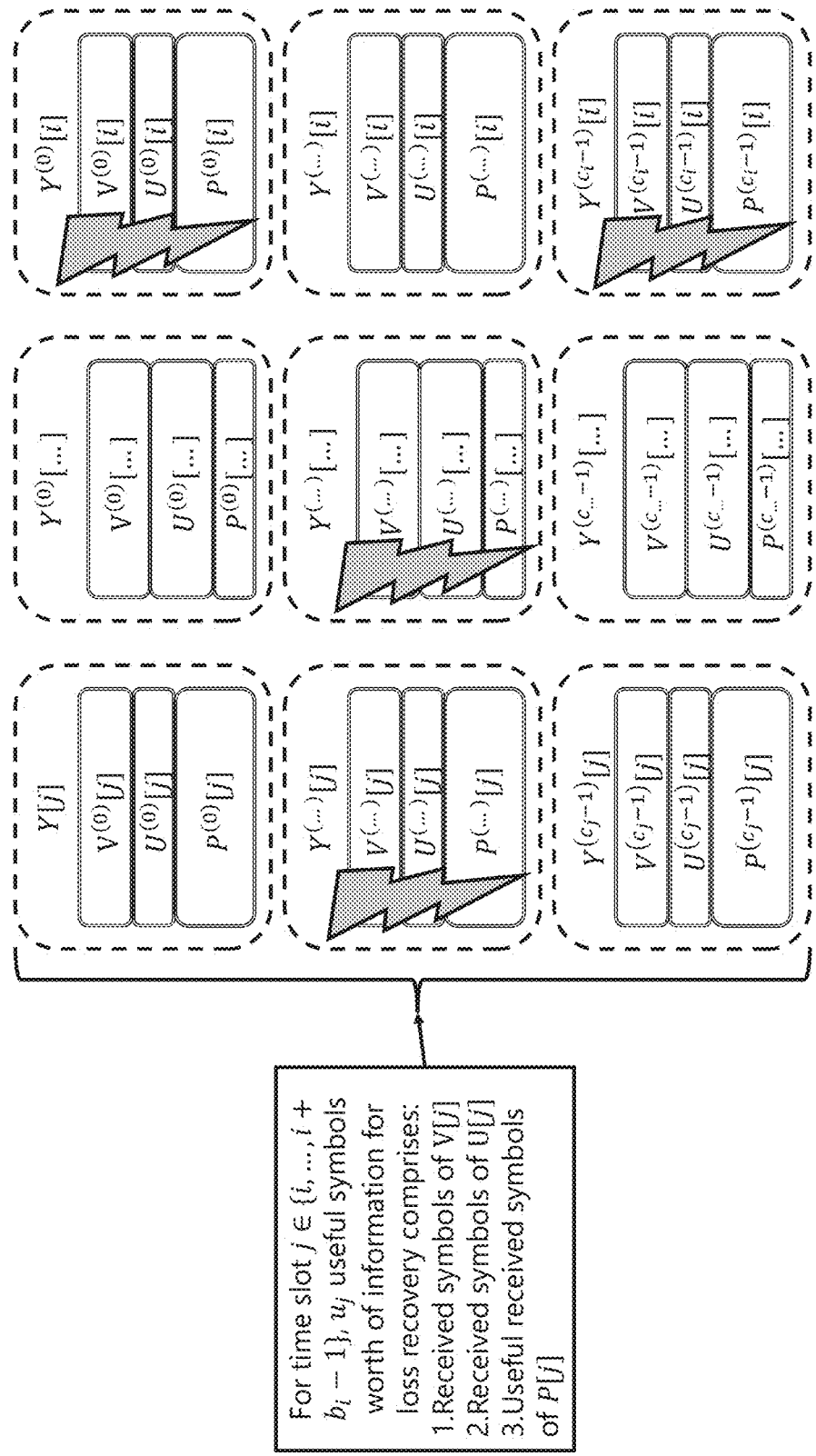

FIG. 14D shows useful symbols for loss recovery in time slot j∈{i, ..., i+$b_i$−1}, in accordance with one embodiment.

Figure 14E:
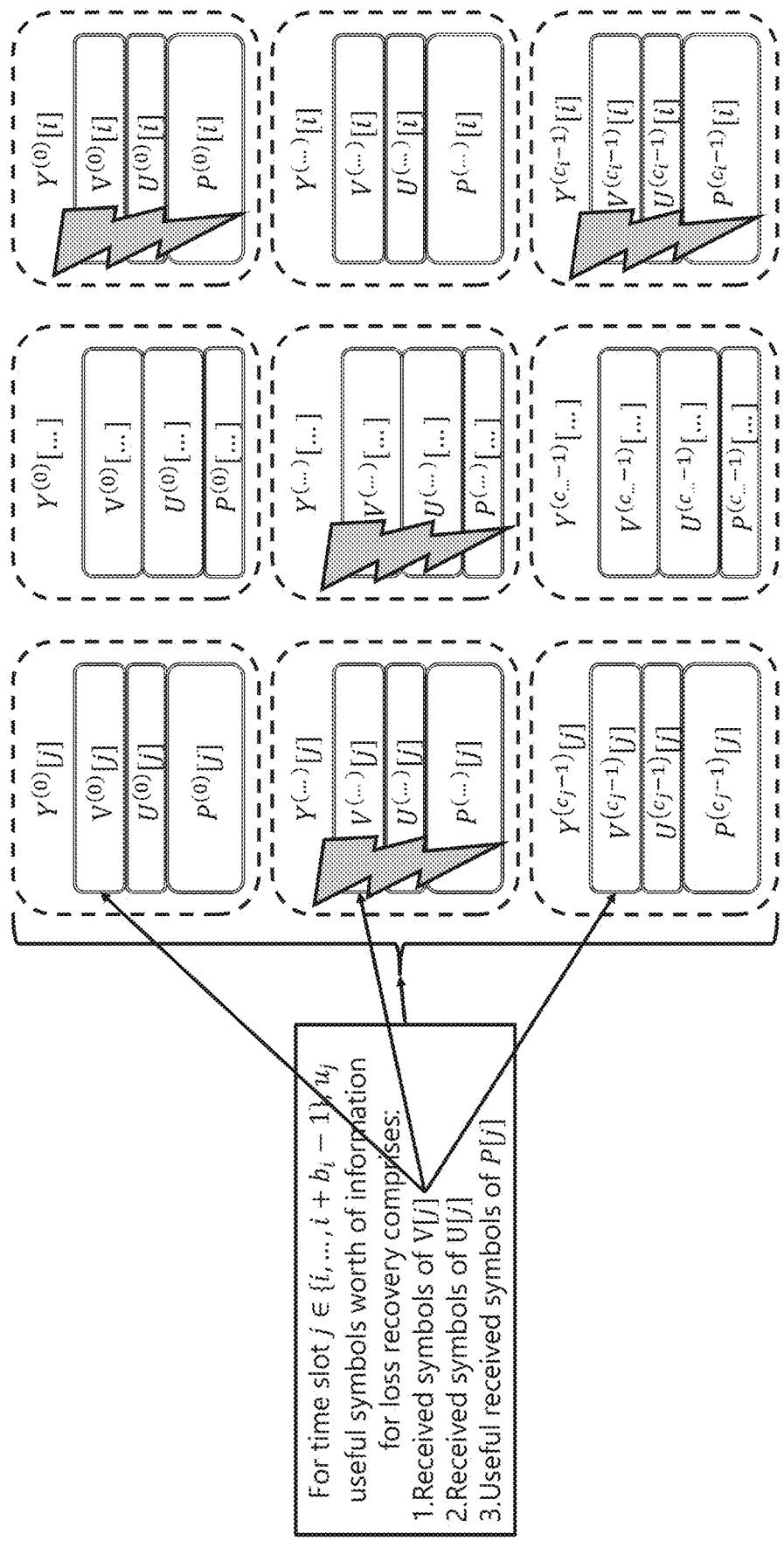

FIG. 14E highlights received symbols V[j].

Figure 14F:
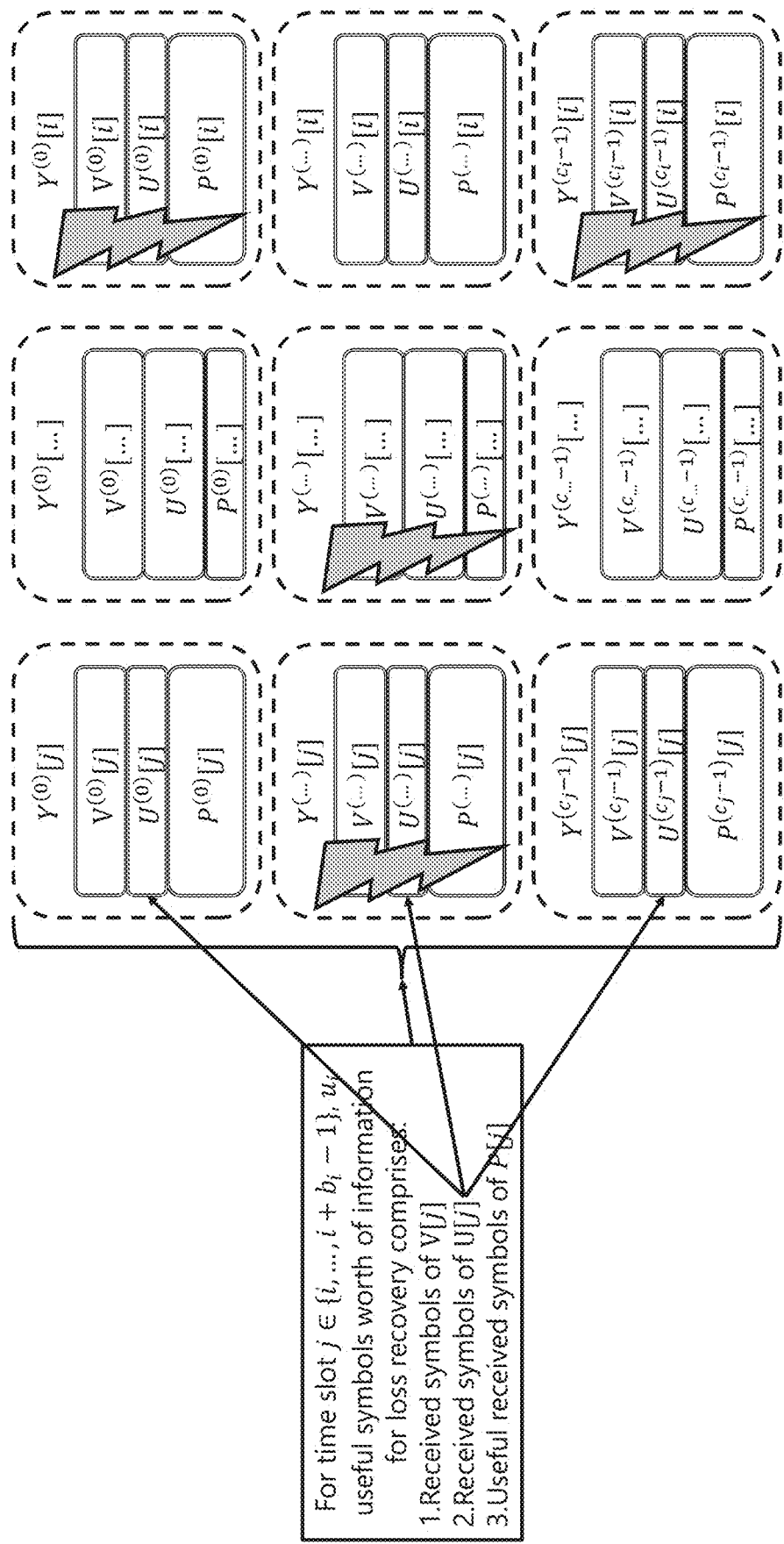

FIG. 14F highlights received symbols U[j].

Figure 14G:
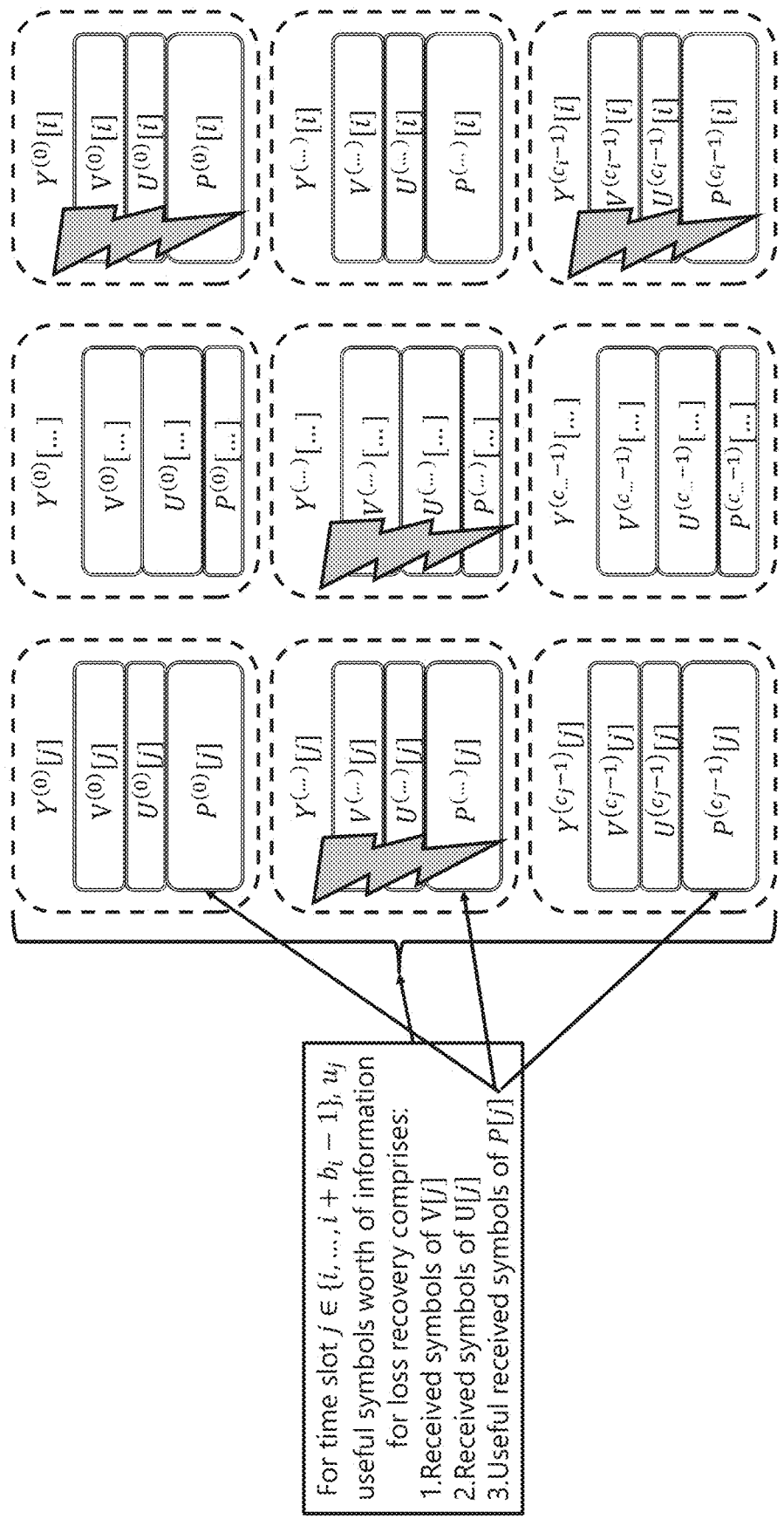

FIG. 14G highlights received symbols P[j].

Figure 14H:
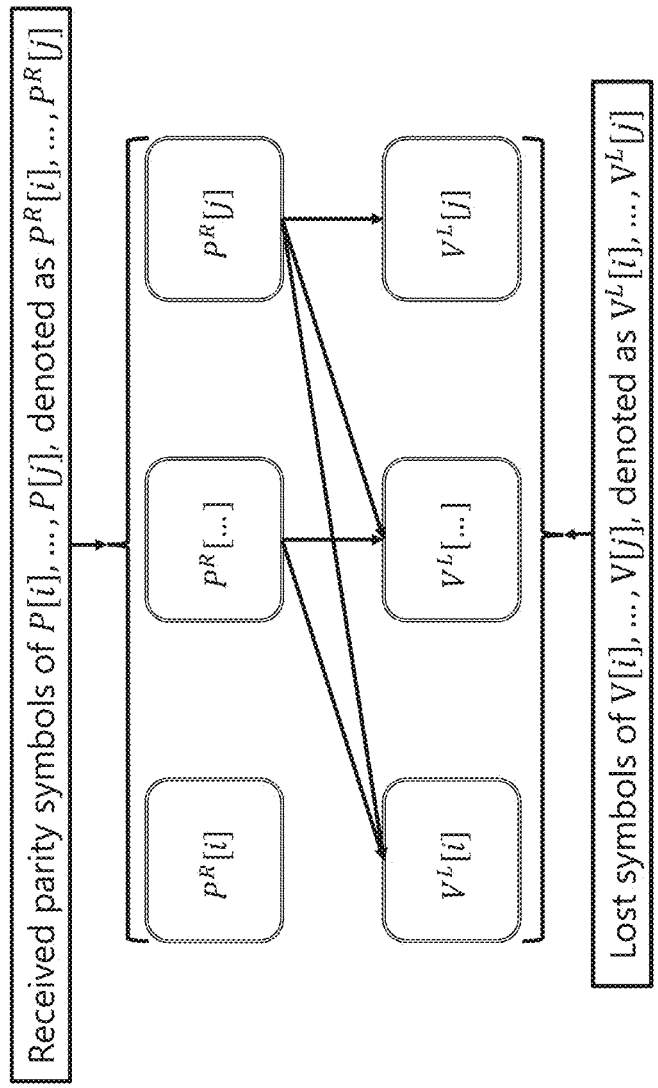

FIG. 14H shows useful parity symbols for loss recovery, in accordance with this example.

Figure 14I:
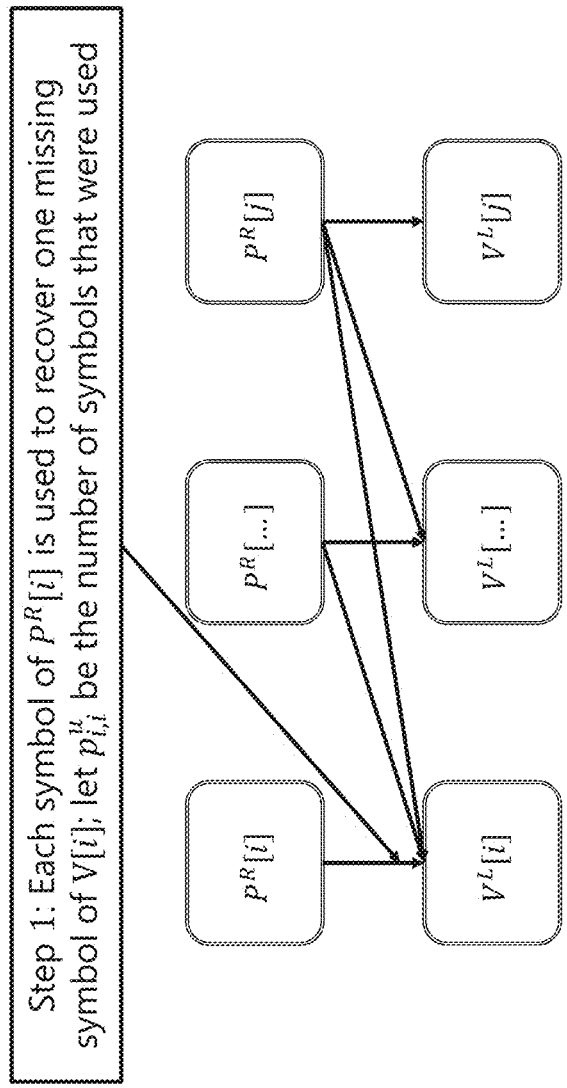

FIG. 14I shows a first step for loss recovery in accordance with this example.

Figure 14J:
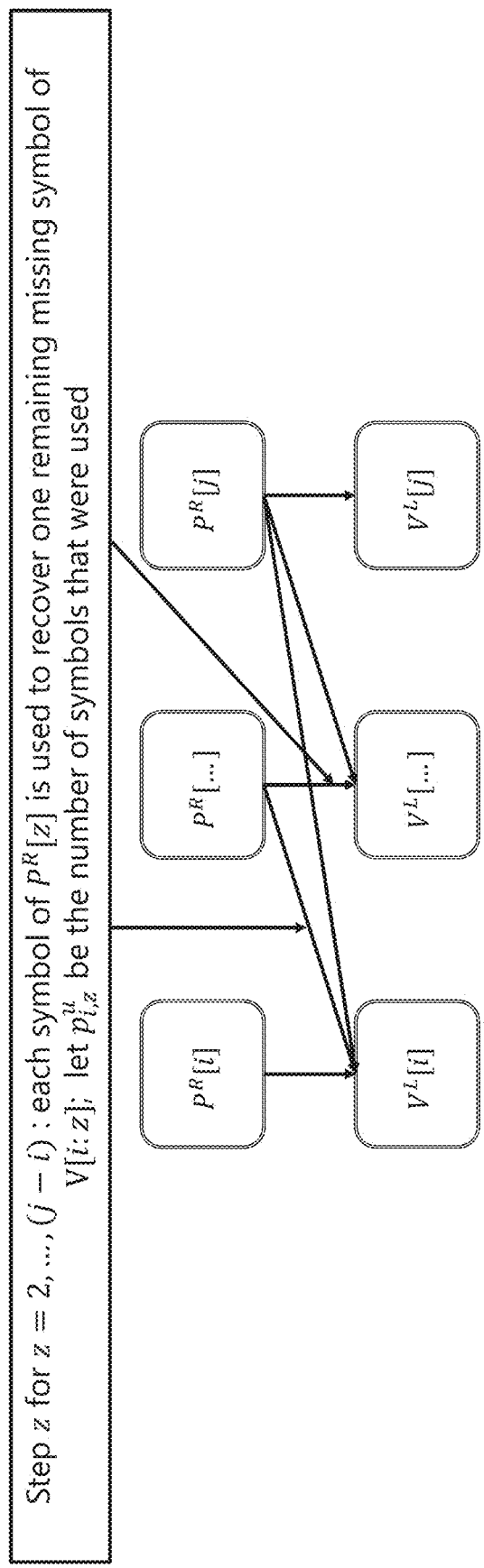

FIG. 14J shows intermediate steps for loss recovery in accordance with this example.

Figure 14K:
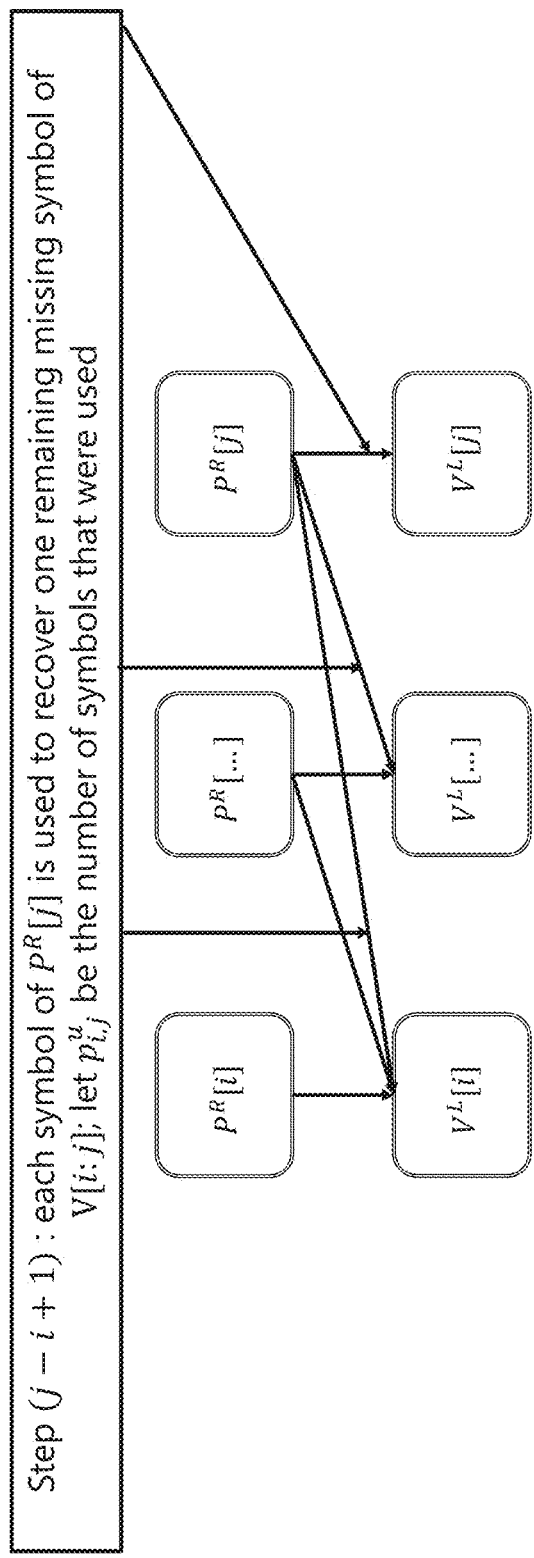

FIG. 14K shows the final step for loss recovery in accordance with this example.

Figure 14L:
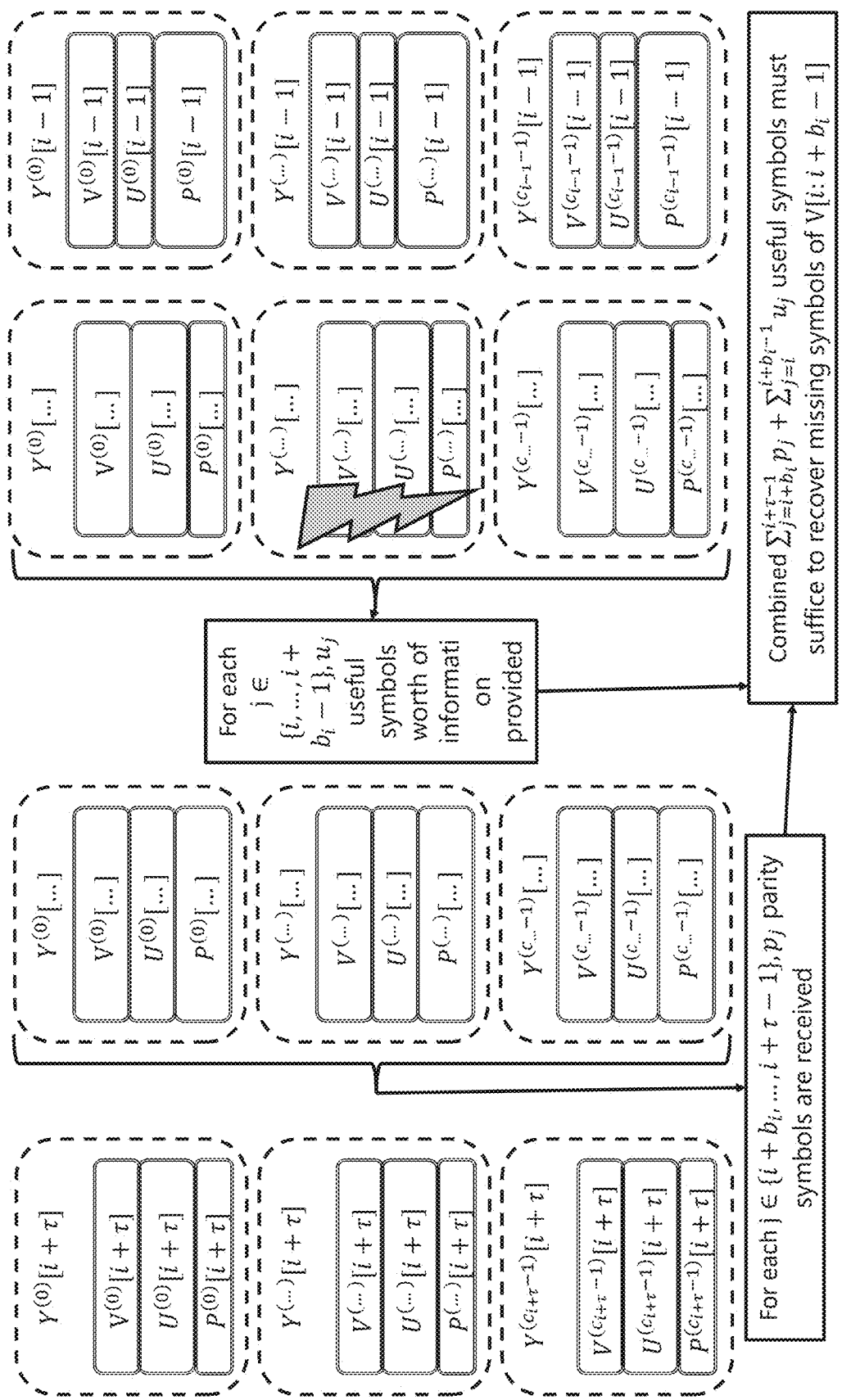

FIG. 14L shows how a sufficient number of useful symbols can be used to recover missing symbols of V[i:i+$b_i$−1] by time slot (i+τ−1). Here, optimization is accomplished by minimizing the sum of $p_i$ for i=0 to τ subject to (a) the above loss recovery constraint, (b) bounding the size of each $p_i$ to be at least 0 and for i>τ to be at most $d_{i-\tau}|_{i-\tau}$, and (c) (optionally) add the constraint that the first τ−1 time slots involve sending 0 parity symbols using a linear program. Then we pad to ensure divisibility by $c_i$ of sizes of U[i], V[i], and P[i] (see offline packetization) then match the sizes of U[i], V[i], and P[i] (i.e., handling splitting and allocating parity symbols) and apply the parity symbol generation/loss recovery. To deal with resets, for each time slot i where there is a reset among time slots i+1 ..., i+τ, we model $d_i$ as being of size 0 in the linear program and split so that U[i]=D[i] and $p_{i+\tau}$=0.

Figure 14M:
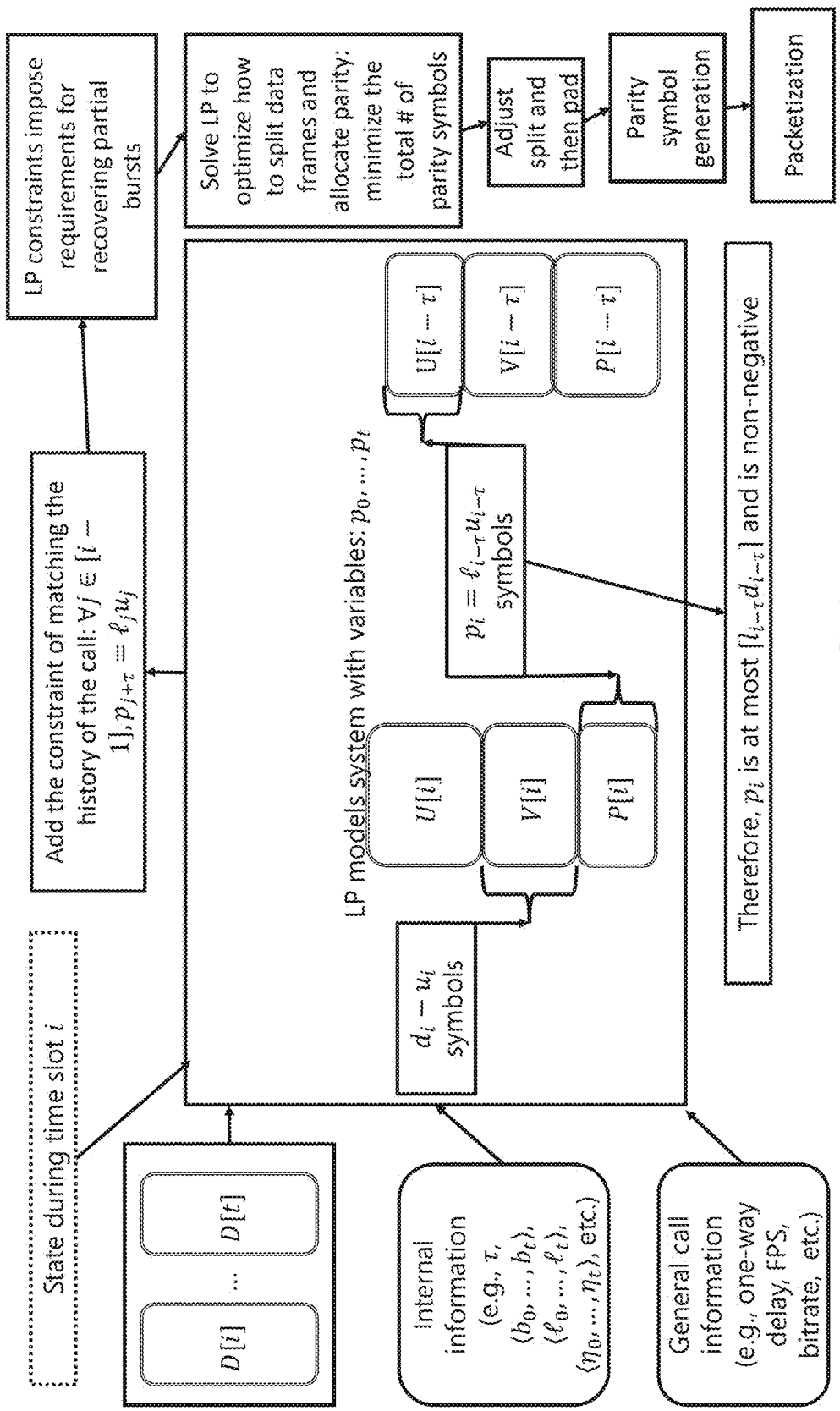

FIG. 14M shows that the optimization can be modified to apply during time slot i (i.e., after packets have been sent for previous time slots) by adding constraints to reflect the actions from earlier in the call (e.g., how much parity was allocated) and then using the offline linear program solver to determine the splits for the remainder of the call, where the total number of parity symbols is just the summation over all time slots, i, of $p_i$ (where the length of the call is represented by t).

Figure 15:
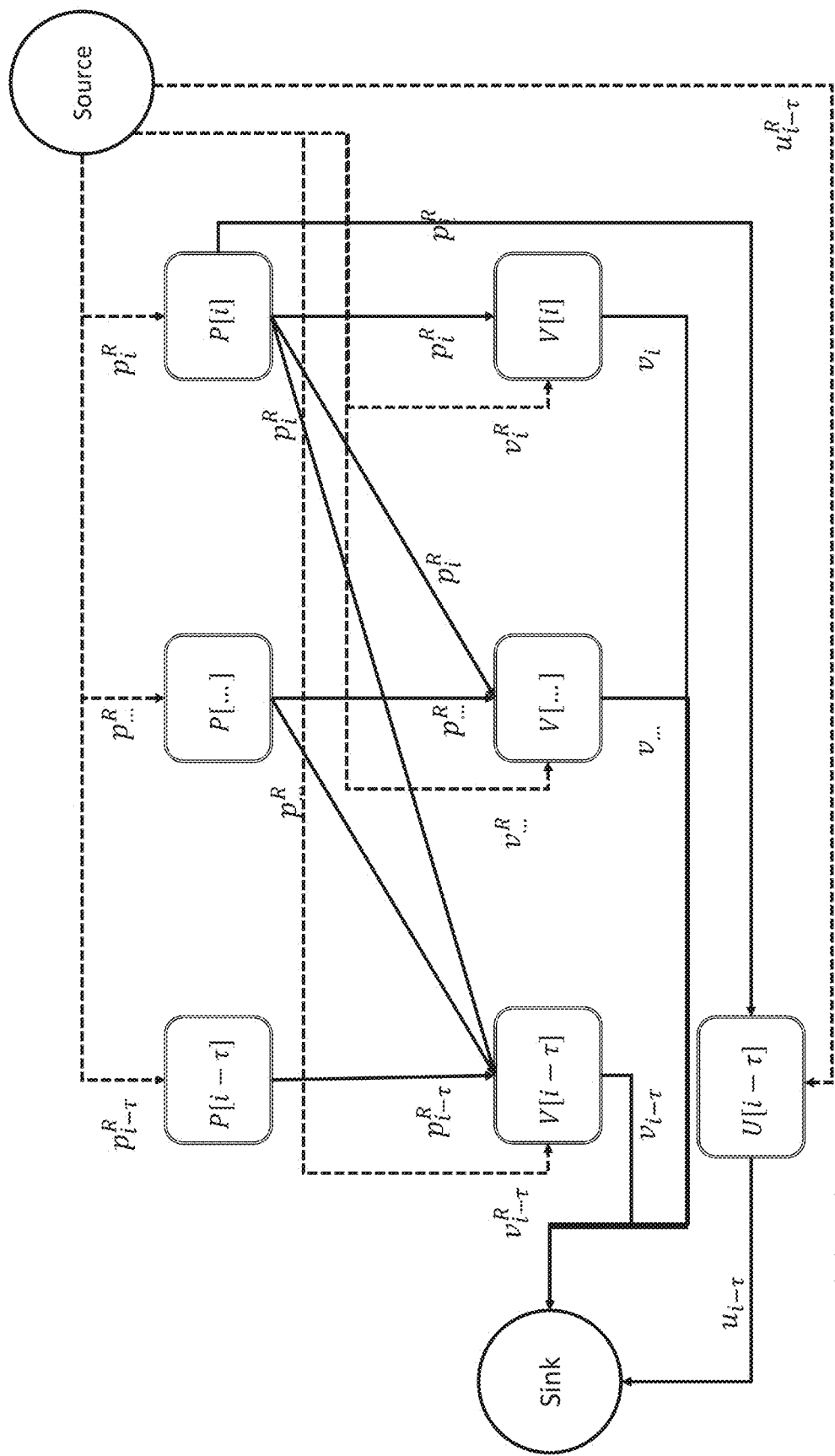
FIG. 15 is a schematic diagram for a method to determine whether the lost data of the ith data frame can be recovered assuming the prior t data frames have been recovered, in accordance with one embodiment.

FIG. 15 is a schematic diagram for a method to determine whether the lost data of the ith data frame can be recovered assuming the prior t data frames have been recovered, in accordance with one embodiment. The benefit is that this method is lightweight and quickly determines if the data frame cannot be decoded and therefore can be used to avoid the expensive decoding operation (e.g., using Gaussian Elimination to solve a system of linear equations) unless the data frame is able to be decoded. In this example, one can represent decoding using a flow graph. A maxflow can be computed (e.g., by using the Ford-Fulkerson algorithm) to determine whether decoding is possible. Essentially, the flow may reflect whether enough relevant parity symbols are received to decode each of U[i] and V[i], based on the code's structure, this also necessitates recovering V[i+1] through V[i+τ]. For example, there may be three vertices (labeled as U[i], V[i], and P[i]) for each data frame to reflect the three quantities U[i], V[i], and P[i], respectively. A source is connected to all vertices reflecting parity for data frames i through i+τ, all vertices reflecting the first component of data frames i through (i+τ), and the first component of data frame i. Edge capacities are shown in the graph, for edges between Source and vertices representing a first or second component of a data frame, the capacity is the number of received symbols of that component of that data frame. For edges between the Source and vertices representing the parity symbols a data frame, the edge capacity is the number of received parity symbols of that data frame. Vertices representing parity are connected to the vertices reflecting data that was used to create the parity (i.e., if there was an edge between corresponding components of the factor graph). All vertices representing the first or second component of a data frame are connected to the Sink; the capacity of the edge from one such vertex to the Sink is the size of the corresponding component. A maxflow is computed (e.g., by using the Ford-Fulkerson algorithm). Decoding of data frame i−τ is deemed possible if and only if the flow to Sink is at least the sum of (a) the sizes of the first component of data frames i−τ through i plus (b) the size of the second component of frame (i−τ).

In certain embodiments, metadata of various kinds may be transmitted from the sender to the receiver (e.g., metadata on how the sender is splitting frames, metadata on allocating parity symbols, a seed value for a pseudorandom number generator used for random linear combinations, metadata regarding usage of failsafe, etc.). It should be noted that such metadata could be conveyed in any appropriate manner, e.g., in message headers of messages carrying encoded data, embedded encoded or unencoded within the channel frames, in a separate stream (which may or may not also employ some form of erasure coding to recover from losses), etc. If sent in a separate stream, the separate stream could be encoded using techniques described herein to better ensure receipt of the information.

It should be noted that embodiments are not limited to any particular order of data symbols and parity symbols within channel frames.

Figure 7:
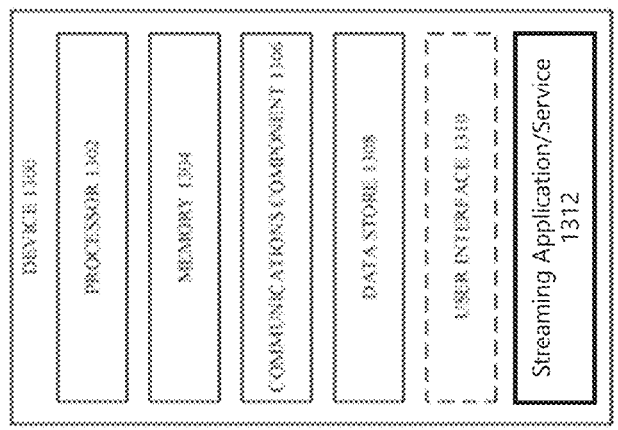
FIG. 7 is a schematic block diagram showing components of a sender device and/or receiver device in accordance with certain embodiments.

While the above disclosure has concentrated on the methods of the present invention in the context of the overall system, it should be noted that the present invention can also take the form of a sender device, method, computer program product, and integrated circuit that performs some or all of the sender functions discussed above (e.g., splitting video frames into two components based on loss estimation parameters, generating parity data, forming channel frames, and transmitting the channel frames to the receiver in accordance with the described methodologies), and the present invention also can take the form of a receiver device, method, computer program product, and integrated circuit that performs some or all of the receiver functions discussed above (e.g., recovering video frames from received channel frames and providing loss estimation feedback to the sender in accordance with the described methodologies). FIG. 7 is a schematic block diagram showing components of a sender device and/or receiver device 1300 in accordance with certain embodiments. In one aspect, device 1300 may include processor 1302 for carrying out processing functions associated with one or more of components and functions described herein. Processor 1302 can include a single or multiple set of processors or multi-core processors. Moreover, processor 1302 can be implemented as an integrated processing system and/or a distributed processing system.

Device 1300 may further include memory 1304, such as for storing local versions of operating systems (or components thereof) and/or applications being executed by processor 1302, such as a streaming application/service 1312, etc., related instructions, parameters, etc. Memory 1304 can include a type of memory usable by a computer, such as random access memory (RAM), read only memory (ROM), tapes, magnetic discs, optical discs, volatile memory, non-volatile memory, and any combination thereof.

Further, device 1300 may include a communications component 1306 that provides for establishing and maintaining communications with one or more other devices, parties, entities, etc. utilizing hardware, software, and services as described herein. Communications component 1306 may carry communications between components on device 1300, as well as between device 1300 and external devices, such as devices located across a communications network and/or devices serially or locally connected to device 1300. For example, communications component 1306 may include one or more buses, and may further include transmit chain components and receive chain components associated with a wireless or wired transmitter and receiver, respectively, operable for interfacing with external devices.

Additionally, device 1300 may include a data store 1308, which can be any suitable combination of hardware and/or software, that provides for mass storage of information, databases, and programs employed in connection with aspects described herein. For example, data store 1308 may be or may include a data repository for operating systems (or components thereof), applications, related parameters, etc. not currently being executed by processor 1302. In addition, data store 1308 may be a data repository for streaming application/service 1312 and/or one or more other components of the device 1300.

Device 1300 may optionally include a user interface component 1310 operable to receive inputs from a user of device 1300 and further operable to generate outputs for presentation to the user. User interface component 1310 may include one or more input devices, including but not limited to a keyboard, a number pad, a mouse, a touch-sensitive display, a navigation key, a function key, a camera, a microphone, a voice recognition component, a gesture recognition component, a depth sensor, a gaze tracking sensor, a switch/button, any other mechanism capable of receiving an input from a user, or any combination thereof. Further, user interface component 1310 may include one or more output devices, including but not limited to a display, a speaker, a wired or wireless audio interface, a haptic feedback mechanism, a printer, any other mechanism capable of presenting an output to a user, or any combination thereof. For example, user interface 1310 may allow for receiving video, audio, and other information for transmission as part of a videoconference or other application via streaming application/service 1312 and/or may render streaming content from streaming application/service 1312 for consumption by a user (e.g., on a display of the device 1300, an audio output of the device 1300, and/or the like).

Device 1300 may additionally include the streaming application/service 1312, which, for a sender device 110, may include or implement some or all of the video encoder 111, the frame splitter 112, the parity symbol generator 113, the packetizer 114, and/or the loss parameter generator 115, and for a receiver device 120, may include or implement some or all of the video decoder 121, the loss estimator 122, and/or the loss recovery processor 123.

Figure 9:
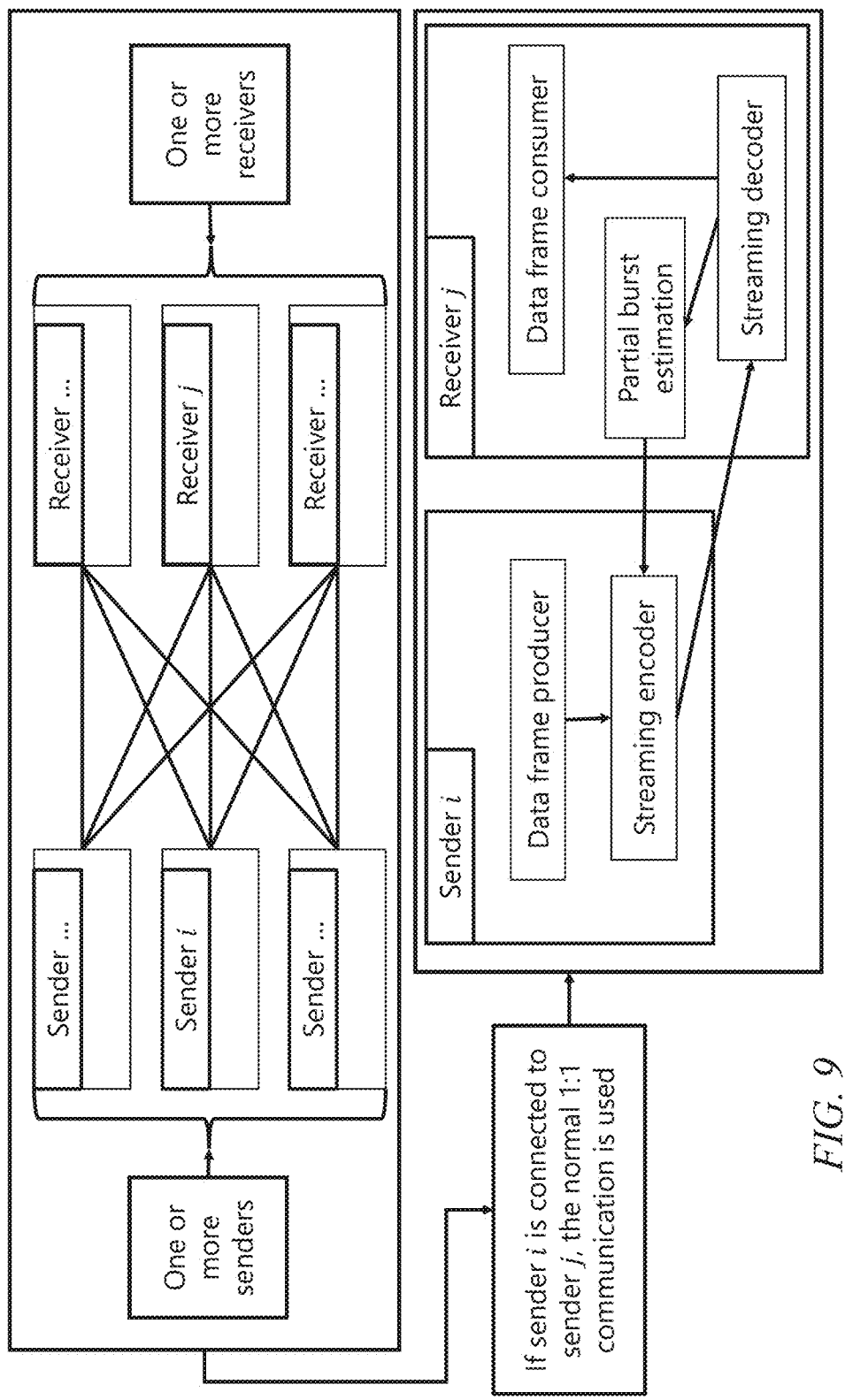
FIG. 9 is a schematic diagram representing communication from one or more senders to one or more receivers in accordance with various embodiments.

It should be noted that embodiments include "full duplex" embodiments, e.g., where a first video stream is being sent from a first party to a second party (in which case the first party is the sender and the second party is the receiver for the first video stream) and where a second video stream is being sent from the second party to the first party (in which case the second party is the sender and the first party is the receiver for the second video stream). Without limitation, this can be particularly useful for two-way videoconferencing. Embodiments likewise can extend to multiparty communication (e.g., videoconferencing with any number of people, such as by applying the methodology for each pair of people), for example, as depicted schematically in FIG. 9 in which a connection between a sender and a receiver indicates that they are communicating.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software.

As used herein, the term software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The above hardware description is provided to enable any person skilled in the art to practice the various aspects described herein.

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk).

The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., components of the sender 110 and/or receiver 120) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method May be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements May optionally be present other than the elements specifically identified by the "and/or" clause, whether related or unrelated to those elements specifically identified Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B), in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

To the extent of any inconsistency or conflict in the definition or use of terms between any of the incorporated publications, documents or things and the present application, those of the present application shall prevail.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Nor are these potential claims intended to limit various pursued claims.

Without limitation, potential subject matter that may be claimed (prefaced with the letter "P" so as to avoid confusion with the actual claims presented below) includes:

P1. A computer implemented method for sending a real-time, stream of video frames between a sender and a receiver, said method comprising:
  estimating, by said receiver, a characteristic of previously received packet losses in said stream that reflects for a frame the longest burst and the fraction of transmitted packets that are lost,
  partitioning, by said sender, said stream of video frames into a first set of video data symbols and a second set of video data symbols,
  generating, by the sender and for each frame, a set of one or more streaming FEC code parity symbols based on said video data symbols,
  encoding, by the sender and for each frame, packets carrying said video data and parity symbols,
  transmitting, by said sender, each frame of encoded packets to said receiver,
  decoding, by said receiver, said encoded packets, and
  wherein said partitioning of said stream of video frames into a first set of video data symbols and a second set of video data symbols includes using said estimated characteristic of said previously received packet losses.

P2. A sender device for sending a real-time, stream of video frames between a sender and a receiver, said device comprising:
  a memory; and
  at least one processor coupled to the memory, the memory including instructions executable by the at least one processor to cause the device to:
    estimate, by said receiver, a characteristic of previously received packet losses in said stream that reflects for a frame the longest burst and the fraction of transmitted packets that are lost,
    partition, by said sender, said stream of video frames into a first set of video data symbols and a second set of video data symbols,
    generate, by the sender and for each frame, a set of one or more streaming FEC code parity symbols based on said video data symbols,
    encode, by the sender and for each frame, packets carrying said video data and parity symbols,
    transmit, by said sender, each frame of encoded packets to said receiver,
    decode, by said receiver, said encoded packets, and
    wherein said partitioning of said stream of video frames into a first set of video data symbols and a second set of video data symbols includes using said estimated characteristic of said previously received packet losses.

Described embodiments are considered as illustrative only of the principles of the present invention. Further, since numerous modifications and changes will readily occur to those skilled in the art based on the teachings herein, it is not desired to limit the invention to the exact construction and operation shown and described herein. Accordingly, all suitable modifications and equivalents may be resorted to and should be assumed to fall within the scope of the invention as may be further defined in this and any subsequent regular patent application's claims to the invention.

APPENDIX A – THESIS CHAPTERS

Chapter 6

Learning-augmented streaming codes for variable-size frames under partial bursts Recall that the streaming codes designed in Chapters 2, 3, and 4 applied to burst losses of entire frames. However, Chapter 5 showed that network conditions that lose only some packets for each frame in a burst are also prevalent. The streaming model for variable-size frames presented in Chapter 2 is incompatible with such losses, motivating the need for updating the model. Thus, we generalize the streaming model for variable-size frames to accommodate such losses in Section 6.1. We aim to design high-rate streaming codes for the new model. To do so, we decompose the code design into two components. First, a building block construction for a streaming code given any choice of how to split a frame into a component recovered at its deadline and a component recovered strictly before its deadline. We introduce such an approximately rate-optimal building block construction in Section 6.2. Second, a policy to determine how to split the frames. We use a linear program to determine how to optimally split frame symbols in the offline setting in Section 6.3. Combining the linear program with the building block construction leads to an approximately rate-optimal offline code. But the goal is to design online codes. Thus, we present online streaming codes for three parameter regimes that are optimal up to a trivial factor in Section 6.4. However, Section 6.5 then establishes for all remaining parameter regimes that there is a nontrivial gap between the rate of optimal online codes and the offline-optimal-rate despite the lossless-delay being zero. This deviates from the model studied in Chapter 3 (i.e., without partial bursts), where we presented an online code matching the optimal rate of offline codes for the setting where the lossless-delay is zero. To construct an online code for the remaining parameter regimes, we replace the linear program with a learning-based approach to determine how to split frame symbols in Section 6.6. Doing so yield an approximately rate-optimal online code. Finally, Section 6.7 adds a constraint into the model to capture a requirement of real-world systems: a maximum size of a transmitted packet. Section 6.7 then illustrates how to adjust our constructions to satisfy this requirement with minimal changes in rate.

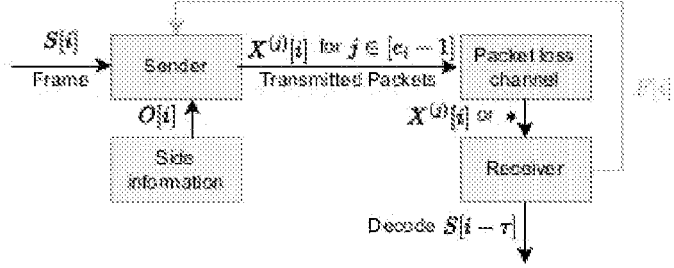

Figure 6.1: Overview of the proposed streaming model. Multiple packets are transmitted over the channel for each frame. The packet loss channel allows for partial bursts.

6.1 System model

We now extend the streaming model for variable-size frames from Chapter 2, as illustrated in Figure 6.1. There are a positive number, $t$, of time slots. During the $i$th time slot, the sender obtains a frame, $S[i]$, of $k_i$ independent random symbols of a finite field, $\mathbb{F}$, where $k_i$ is a non-negative integer between 0 and a maximum value, $m$. We refer to $k_0, \ldots, k_t$ as the "frame-size sequence." The sender sends $c_i$ transmitted packets, $X^{(0)}[i], \ldots, X^{(c_i-1)}[i]$, consisting of $n_i^{(0)}, \ldots, n_i^{(c_i-1)}$ symbols, respectively. This change to the model allowing multiple packets to be transmitted over the channel for each frame is a stepping stone toward adding partial bursts to the loss model. We denote the transmitted packets, number of symbols sent, and number of parity symbols as $$X[i] = (X^{(0)}[i], \ldots, X^{(c_i-1)}[i]),$$

$$n_i = \sum_{j=0}^{c_i-1} n_i^{(j)}$$

$$p_i = n_i - k_i,$$

respectively. The rate is defined as in Chapter 2 as the ratio of frame symbols to transmitted symbols:

$$R_t = \frac{\sum_{i=0}^{t} k_i}{\sum_{i=0}^{t} n_i}$$

The transmitted packets are sent over the following lossy channel.

Loss model: The loss model comprises bursty losses (affecting one or more consecutive time slots) followed by a guard space where there are no losses. We introduce a new type of burst loss, called a *partial burst*. In each time slot within a partial burst, only a fraction of the transmitted packets are lost. Formally, for a partial burst of length $b$ starting at time slot $i$, for each time slot $l$ within the partial burst, $l \in \{i, \ldots, i+b-1\}$, a $\ell_l \in (0, 1]$ fraction of the transmitted packets can be lost. That is, an arbitrary $\lceil \ell_l c_l \rceil$ transmitted packets of $X[l]$ are lost.

Further, the length and the fraction of packets lost of partial bursts are allowed to vary over time in order to enable using feedback (based on network changes) to tune the code. Formally, a partial burst starting in time slot $i$ encompasses $b_i$ consecutive time slots, where $b_i$ is a positive integer. The partial burst is followed by a guard space of at least $\tau$ time slots where all transmitted packets are received.

For any time slot $i$, we denote the $c_i$ received packets as $$Y[i] = (Y^{(0)}[i], \ldots, Y^{(c_i-1)}[i]),$$

where each received packet corresponds to either receiving the corresponding transmitted packet intact or it being lost. That is, for $j \in \{0, \ldots, c_i - 1\}$, $$Y^{(j)}[i] = \begin{cases} X^{(j)}[i] & \text{if } X^{(j)}[i] \text{ is received} \\ * & \text{if } X^{(j)}[i] \text{ is lost} \end{cases}$$

Feedback: During any time slot, $i$, the sender may obtain feedback from the receiver for updating the length of a burst starting in time slot $i$ and the fraction of transmitted packets lost during each time slot of the burst (i.e., $b_i$ and $(\ell_1, \ldots, \ell_{i+b_i-1})$). The feedback can be viewed as the receiver conservatively estimating how lossy the network conditions will be based on prior losses. For most time slots, no feedback is received. In this case, the parameters are retained as is. At times, there could be an underestimation of the losses, and that could lead to frames not being recovered. In videoconferencing, due to compression, video frames are typically dependent on each other. Hence not recovering a frame can lead to several subsequent packets not being useful even though they are received intact. Thus, the receiver can send additional feedback to signal that a *reset* is needed. This is modeled via a binary value $\zeta_i$. It is 0 by default and set to 1 to indicate that the $\tau$ frames before the reset need not be recovered if their transmitted packets are lost; this ensures that loss recovery does not rely on having already decoded these previous frames.

6.1.1 Encoding and Decoding

Defining encoding and decoding requires understanding what information is available during the $i$th time slot. In the "offline" setting, the sizes of future frames and future feedback from the receiver are assumed to be known in advance. In contrast, the setting where this information is unavailable is dubbed "online." We introduce side information, $O_i$, to capture the available information. Thus, in the offline setting, $O_i = (k_t, b_t, \ell_t, \zeta_t | t \in \{i+1, \ldots, t\})$. In the online setting, side information is the output of a predictive model (see Section 6.6 for details). During time slot $i$, the sender uses the prior frames and side information, $O_i$, to encode as $$X[i] = Enc(S[0], \ldots, S[i], O_i).$$

We consider two types of decoding: (a) decoding when there are no losses, and (b) decoding when there are losses. First, when there are no losses (or all losses have already been recovered), the *lossless-delay constraint* requires decoding each frame, $S[i]$, within the same time slot:

$$S[i] = Dec^{L,i}(S[0], \ldots, S[i-1], Y[i], k_i).$$

Second, when there are losses, the *worst-case-delay constraint* stipulates that each frame is recovered within $\tau$ time slots. Specifically, for any burst starting in time slot $j$ of length $b_j$ that encompasses time slot $i$, $$S[i] = Dec(S[0], \ldots, S[j-1], Y[j], \ldots, Y[i+\tau], \qquad (6.1)$$
$$k_0, \ldots, k_{i+\tau}).$$

We note that under variable-size frames, the sizes of the frames are needed for decoding (see Chapter 2, 3, and 4). This is handled by adding a small header containing the sizes of the previous $\tau$ frames. We also point out that our constructions do not require the full memory allowed under the model because they do not use any information about frames and transmitted packets more than $2\tau$ time slots in the past.

6.1.2 Notation and Conventions

Let $[n]$ denote $\{0, \ldots, n\}$. Any vector, $V$, is a column vector of length $v$. For any $I = \{j_1, \ldots, j_v\} \subseteq [n]$ where $j_1 < \ldots < j_v$, the values of $V$ in the positions of $I$ are denoted as $V_I = V_{j_1, j_v}$. For any time slots $i \leq j \in [t]$ and vectors $Z[i], \ldots, Z[j]$, let $Z[i:j] = Z[i], \ldots, Z[j]$, and $z_i, \ldots, z_j$ denote their sizes. Let $0^{(j)}$ be a vector of $j$ zeros.

Finally, we define a notation related to burst losses which will be used in the construction and multiple proofs. For any time slot, $i$, let $\mathbb{B}_i$ be the set of time slots, $j$, for which a burst starting in time slot $j$ includes time slot $i$ (i.e., $i \in \{j, \ldots, j+b_j-1\}$).

We will next define some conventions followed in the rest of the paper. The final $(\tau+1)$ frames are assumed to be of size 0, and $t$ is at least $(\tau+1)$; this can be satisfied by appending $(\tau+1)$ frames of size 0 without affecting the optimal rate.

The number of transmitted packets for each frame is always an integer between 0 and $2m$. Thus, for any time slot, $i$, $\ell_i$ can be restricted to be a rational number. We then define natural numbers $q_i$ and $h_i$ so that $\ell_i = q_i/h_i$ is in simplest form. We expect $(h_i - 1)$ to be negligible for practical settings; this can be guaranteed by considering higher values of $\ell_i$ with smaller values for $h_i$. To simplify our presentation of constructions and proofs, we require $h_i | k_i$ and $k_i \leq m - h_i$; this can be accomplished by zero-padding $S[i]$ and increasing $m$ by at most $(h_i - 1)$. The cost of zero-padding is at most $\sum_{i=0}^{t} 2(h_i - 1)$ (because replication could be used).

6.2 A Building Block Construction

This section develops an approximately rate-optimal construction for any parameters, $\tau$ and $t$, frame-size sequence, $K = (k_0, \ldots, k_t)$, and feedback, $\mathcal{L} = (\ell_0, \ldots, \ell_t)$, $B = (b_0, \ldots, b_t)$, and $Z = (\zeta_0, \ldots, \zeta_t)$. We present a building block to construct a code given any splits of the frames into (a) a component recovered within $(\tau - 1)$ time slots, and (b) a component recovered $\tau$ time slots later. Specifically, for any time slot $i \in [t - \tau]$, let $w_i$ be the number of symbols of $S[i]$ to be recovered during time slot $(i + \tau)$, and let $W = (w_0, \ldots, w_{t-\tau})$. At a high level, $(k_i - w_i)$ symbols of $S[i]$ are received or recovered using the parity symbols of $X[i:i+\tau-1]$. Then $w_i$ parity symbols are sent in $X[i+\tau]$ to recover the remaining lost symbols of $S[i]$. The construction is called "$(\tau, t, K, Z, \mathcal{L}, B, W)$-Split Code."

Encoding (high-level description). During the $i$th time slot, $S[i]$ is partitioned into $S[i] = (U[i], V[i])$. Parity symbols $P[i]$ are defined as $P[i] = (P^{(u)}[i] + P^{v}[i])$ where $P^{v}[i]$ comprises symbols that are full-rank linear combinations of the symbols of $V[i-\tau], \ldots, V[i]$ and $P^{(u)}[i]$ comprises full-rank linear combinations of the symbols of $U[j-\tau]$. The key property of the linear equations and choices of how to split is that for any $j \in [i]$ and burst of length $b_j$ starting in time slot $j$, the symbols of $V[j], \ldots, V[j+b_j-1]$ can be recovered by time slot $(j+\tau-1)$. Finally, the symbols of $U[i], V[i], P[i]$ are each evenly spread over $h_i$ transmitted packets. Figure 6.2 provides an overview of encoding.

Recovery (high-level description). Consider a burst of length $b_i$ starts in time slot $i$ where $Y[i:i+b_i-1]$ are received. First, for $j \in \{i, \ldots, i+\tau-1\}$, the received symbols of $P[j]$ are combined with $U[j-\tau]$ (which would have been already received) to determine $P^{v}[j]$. Then the received symbols of $P^{v}[i:i+\tau-1]$ are used to recover $V[i:i+b_i-1]$ by solving a system of linear equations. Second, for each $j \in \{i+\tau, \ldots, i+\tau+b_i-1\}$, $P^{v}[j]$ is computed using $V[j-\tau:j]$, yielding $P^{(u)}[j] = (P[j] - P^{v}[j])$. Combining $P^{(u)}[j]$ with the received symbols of $U[j-\tau]$ suffices to recover $U[j-\tau]$. Figure 6.3 provides an overview of loss recovery.

Code construction (detailed description) time slot $i$. The five-step encoding process comprises: (a) initialization, (b) splitting $S[i]$ into $V[i]$ and $U[i]$, (c) defining $P[i]$ given $V[j], U[j]$ for $j < i$, (d) allocating symbols to transmitted packets, and (e) handling resets from $\zeta_i = 1$.

*Initialization:* For any $i \in [\tau-1]$, $U[i] = S[i]$, $u_i = 0$, $p_{i+\tau} = k_i \ell_i$, and $p_i = 0$.

*Splitting $S[i]$:* For $i \in \{\tau, \ldots, t-\tau\}$, $S[i]$ splits into $S[i] = (U[i], V[i])$ where $u_i = 0$ if $\ell_i = 0$ and otherwise $u_i = w_i/\ell_i$. For each $j \in \mathbb{B}, l \in \{j, \ldots, j+b_j-1\}$, we define the number of received parity symbols for recovering $V[j:j+b_j-1]$ as $d^{(i,j,l)}$ next. Since for any $l > i$ $k_l$ is not available, we pretend that all future frames are recovered using parity symbols sent after time slot $(i+\tau)$ by setting $u_l = k_l = 0$ (for Equations 6.2 and 6.3 below), leading to $$d^{(i,j,l)} = \min\left((1-\ell_l)n_l, k_l - u_l\ell_l + \sum_{r=j}^{l-1}(k_r - u_r\ell_r - d^{(i,j,r)})\right). \quad (6.2)$$

To ensure $V[j:j+b_j-1]$ are recovered by time slot $(j+\tau-1)$, we require $$\sum_{l=j+b_j}^{j+\tau-1} p_l + \sum_{l=j}^{j+b_j-1} d^{(i,j,l)} \geq \sum_{l=j}^{j+b_j-1}(k_l - u_l\ell_l). \quad (6.3)$$

Next, $u_i$ is increased until Equation 6.3 is satisfied and $h_i | u_i$. Then $S[i]$ is split into:

$$U[i] = S_{0:u_i-1}[i] \quad (6.4)$$
$$V[i] = S_{u_i:k_i-1}[i]. \quad (6.5)$$

The number of parity symbols of $X[i+\tau]$ is defined using as $$p_{i+\tau} = \ell_i u_i + p_i d_{i+\tau}. \quad (6.6)$$

where $pad_{i+\tau}$ is the smallest integer to ensure $h_{i+\tau}|p_{i+\tau}$. The symbols of $P[i+\tau]$ themselves are not defined until time slot $(i+\tau)$.

*Defining $P[i]$:* To start, we define matrices that we use to define parity symbols. Let $H_0, \ldots, H_\tau$ be the parity check matrices of a systematic $[m(\tau+1), m\tau]$ m-MDS convolutional code [39, 43] (as from [11]). Let $A$ be a $m \times m$ parity check matrix of a $[2m, m]$ systematic MDS code (e.g., Reed-Solomon). For any $i \in [\tau - 1], p_i = 0$ by initialization. For $i \geq \tau$, $P[i]$ is full-rank linear combinations of the symbols of $V[i - \tau : i]$ and $U[i - \tau]$:

$$U^*[i - \tau] = (U[i - \tau], 0^{(m - s_{i-\tau})})$$
$$V^*[j] = (V[j], 0^{(m - s_j)})$$
$$P^{(s)}[i] = (AU^*[i - \tau])_{0:p_i - 1}$$
$$P'[i] = \sum_{j=0}^{\tau} H_j V^*[i - \tau + j]$$
$$P[i] = (P^{(s)}[i] + P'[i]). \tag{6.7}$$

*Allocating symbols to transmitted packets.* Let $c_i = h_i$. The symbols of each of $V[i], U[i]$, and $P[i]$ are evenly allocated over $c_i$ transmitted packets. Formally, for each $j \in [c_i - 1]$, let the $j$th $v_i/c_i$, $u_i/c_i$, and $p_i/c_i$ symbols of $V[i], U[i]$, and $P[i]$, be denoted as $V^{(j)}[i], U^{(j)}[i]$, and $P^{(j)}[i]$, respectively. Then let $$X^{(j)}[i] = (V^{(j)}[i], U^{(j)}[i], P^{(j)}[i]).$$

*Resets.* When $\zeta_i = 1$ the sender treats $S[i]$ as the first frame of a length $(l - i + 1)$ call and completes initialization.

Next, Theorem 8 shows that the lossless-delay and worst-case-delay constraints are met by the building block construction.

Theorem 8. *For any $\tau, t, K, Z, \mathcal{L}, B, W$, the Split Code satisfies the lossless-delay and worst-case-delay constraints over the channel.*

*Proof.* At a high level, for any time slot $i$ and burst over $X[i : i + b_i - 1]$, we show that $V[i : i + b_i - 1]$ are recovered by time slot $(i + \tau - 1)$ using the received frame symbols and received symbols of $P'[i : i + \tau - 1]$. We then show for $l \in \{i, \ldots, i + b_i - 1\}$ that $U[l]$ is recovered during time slot $(l + \tau)$ using the received symbols of $U[l]$ and $P^{(s)}[l + \tau]$.

Appendix 6.8.2 has a detailed proof. □

Recall that the field size requirement of the code design is based on two components. First, it is at least $2m$ to construct $A$. Second, it needs to be large enough for the m-MDS code, and this field size may be large. Next, we present a randomized construction with a small field size. When a burst loss occurs during time slot $i$, the probability that $S[i : i + b_i]$ will not be recovered will be at most $\epsilon$ for a small $\epsilon > 0$. The construction involves choosing each entry of $H_0, \ldots, H_{\tau-1}$ independently and uniformly at random from a field of size $|\mathbb{F}| \geq (\tau m/\epsilon)$ (i.e., polynomial in the input parameters and $1/\epsilon$). We call this construction $(\tau, t, K, Z, \mathcal{L}, B)$-RandomCode($\epsilon$) and show it satisfies the lossless-delay and worst-case-delay constraints next.

120

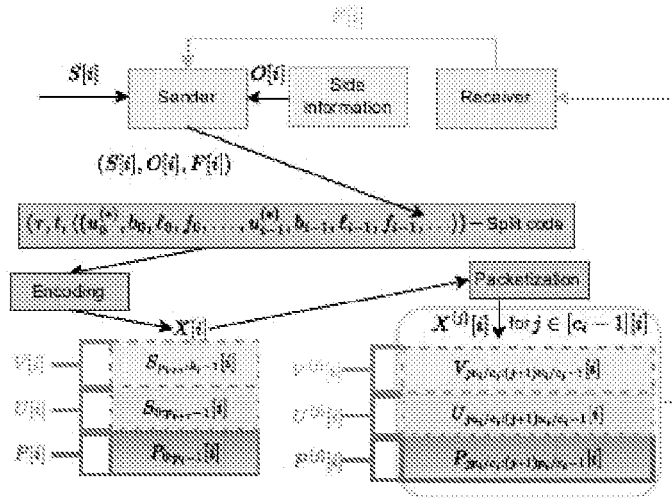

Figure 6.2: Overview of encoding.

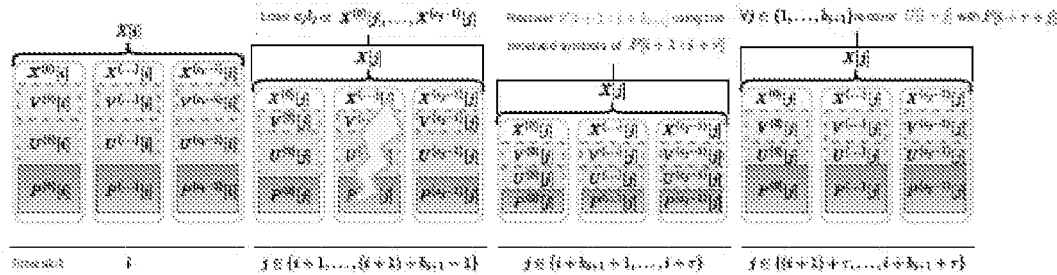

Figure 6.3: Illustration of loss recovery under the $(\tau, t, K, Z, \mathcal{L}, B, W)$-Split Code for a burst over $X[i+1 : i+b_{q,1}-1]$.

Lemma 21. *Consider any $\tau, t, K, Z, \mathcal{L}, B, W$. The $(\tau, t, K, Z, \mathcal{L}, B)$-RandomCode($\epsilon$) (a) satisfies the lossless-delay constraint for all frames, and (b) for any burst starting in time slot $i \in [l]$ satisfies the worst-case-delay constraint for $S[i : i+b_k-1]$ with probability at least $(1-\epsilon)$.*

*Proof sketch.* At a high level, the proof follows from showing that the set of symbols from the system of linear equations used to recover $V[i : i+b_j-1]$ under $(\tau, t, K, Z, \mathcal{L}, B, W)$-Split Code by time slot $(i+\tau-1)$ constraints remain full rank, thus sufficing to recover $S[i : i+b_k-1]$ under $(\tau, t, K, Z, \mathcal{L}, B)$-RandomCode($\epsilon$). Then recovery of $U[i : i+b_k-1]$ follows identically to Theorem 8. A complete proof is presented in Appendix 6.8.3.

□

Next, we use a simple example to highlight how $(\tau, t, K, Z, \mathcal{L}, B)$-RandomCode($\epsilon$) is likely to require a reasonable field size and provide sufficient loss-recovery capabilities for practical videoconferencing applications. For a 2000 kbps video 30 fps, a reasonable setting of $m$ may be $2^{16}$. Suppose there is a a 50 ms one-way delay, then the end-to-end latency is $(33.3\tau + 50)$ ms. One may set $\tau = 3$ so that this latency is $\approx 150$ ms to satisfy industry recommendations [84]. Therefore, if we choose $\epsilon = 2^{14}$, we obtain a field size of $2^{32}$, which requires only 4 bytes. The recovery error probability is then less than $0.01\%$ due to using random matrices. We argue that $0.01\%$ is likely to be negligible compared to the small error of unpredictable changes to the network conditions due to real-world events.

6.3 Offline codes

In this section, we design an offline approximately rate-optimal construction in three steps. First, we present Algorithm 4. The algorithm identifies suitable choices for $w_0, \ldots, w_j$ using a linear program (LP) whose objective function is to minimize the number of parity symbols sent, which maximizes the rate. Second, Algorithm 4 is combined with $(\tau, t, K, Z, \mathcal{L}, B, W)$-Split Code.

At a high level, the variables of the LP used in Algorithm 4 represent $w_0, \ldots, w_{t-\tau}$, which equal the number of parity symbols sent during time slots $\tau, \ldots, t$, respectively. Then $(k_i + w_{i-\tau})$ symbols are modeled as being sent during time slot $i$ (satisfying the lossless-delay constraint). The frames that need not be recovered due to resets are modeled as having size zero. The LP's constraints impose the worst-case-delay constraint as follows. Constraint 1 ensures that no parity symbols are sent until time slot $\tau$. Constraint 2 ensures that a non-negative number of parity symbols are sent. For any burst starting during time slot $i$, Constraint 3 bounds how much useful information is received during the burst. Constraint 4 ensures recovery of enough symbols of $S[i:i+b_i-1]$ by time slot $(i+\tau-1)$ that the remaining symbols are recoverable at their respective decoding deadlines. Finally, Constraint 5 reflects that $w_i$ never exceeds the number of lost symbols of $S[i]$.

We will show that Algorithm 4 yields an upper bound on the optimal rate subject to a certain condition on feedback introduced below. Then Theorem 9 shows that this upper bound is nearly tight.

Condition on feedback: A reset must occur whenever increasing the fraction of transmitted packets that could be lost. Formally, for any time slot $i \in [t-\tau] \setminus \{0\}$ where $\ell_i > \ell_{i-1}$, $\zeta_i$ must be set to 1.

Lemma 22. *For any $\tau, t, K, Z, \mathcal{L}, B$, if Algorithm 4 outputs $\langle w_i | i \in [t] \rangle$, the offline optimal rate under the condition on feedback is at most*

$$\left(\sum_{i=0}^{t} k_i\right) \Big/ \left(-2(t-\tau)(\tau-1) + \sum_{i=0}^{t-\tau} k_i + w_i\right). \tag{6.9}$$

*Proof.* The proof is shown in Appendix 6.8.4. □

Remark 10. *Algorithm 4 runs in $O(poly(t\tau))$ time since the LP has $O(t\tau)$ constraints and variables.*

Combining Algorithm 4 with the building block construction (Section 6.2) yields an approximately rate-optimal code.

Algorithm 4 Computes $\langle w_i | i \in [t] \rangle$ of an approximately rate optimal code.

Input: $(\tau, t, K, \mathcal{L}, B)$
For $i \in [t - \tau]$:
  If $\sum_{j=i+1}^{i+\tau} \ell_j > 0$:
    Set $k_i = 0$.
Minimize $\sum_{i=0}^{t-\tau} p_{i+\tau}^{(IP)}$ subject to:
  1. $\forall j \in [\tau - 1], p_j^{(IP)} = 0$.
  2. $\forall j \in [t - \tau], p_{j+\tau}^{(IP)} \geq 0$.
  3. $\forall i \in [t - \tau], l \in \{i, \ldots, i + k_i - 1\}$, $$0 \leq d_{i,l} \leq \min((p_l^{(IP)} + k_l)(1 - \ell_l),$$

$$k_i - p_{i+\tau}^{(IP)} + \sum_{r=i}^{l-1}(k_r - p_{r+\tau}^{(IP)} - d_{i,r})$$

4. $\forall i \in [t - \tau]$, $$\sum_{l=i+k_i}^{i+\tau-1} p_l^{(IP)} + \sum_{l=i}^{i+k_i-1} d_{i,l} \geq \sum_{l=i}^{i+k_i-1}(k_l - p_{l+\tau}^{(IP)}) \quad (6.8)$$

5. $\forall j \in [t - \tau], k_j \ell_j \geq p_{j+\tau}^{(IP)}$.
Output: $\langle p_j^{(IP)} | i \in [t] \rangle$

Theorem 9. *For any $\tau, t, K, Z, \mathcal{L}$, suppose Algorithm 4 outputs $\langle w_i | i \in [t] \rangle$. For any $i \in [t - \tau]$ where $\sum_{j=i+1}^{i+\tau} \zeta_j \geq 1$, let $w_i = k_i \ell_i$. Then the rate of the corresponding Split Code is less than the optimal rate under the condition on feedback by at most*

$$\Big(\sum_{i=0}^{t-\tau}(2\tau + q_i + h_{i+\tau} - 4)\Big) \Big/ \Big(\sum_{i=0}^{t} k_i\Big). \tag{6.10}$$

*Proof.* The proof is shown in Appendix 6.8.5.  □

As an example of applying Theorem 9, consider a videoconferencing call at 2000 kbps and 30 fps. Suppose the field size is $2^{32}$, for $i \in [t], \ell_i \in \{j/8 \mid j \in [8]\}$, and $\tau \leq 5$. Then the rate of the Split Code is within 0.01 of optimal.

Finally, we bound the cost of removing the condition on feedback. For each time slot $i$ that the condition is violated (i.e., $\ell_i > \ell_{i-1}$ without a rest), the denominator of Equation 6.9 decreases and numerator of Equation 6.10 increases by up to $((\ell_i - \ell_{i-1}) \sum_{j=i-\tau+1}^{i} k_j \ell_j)$.

6.4 Online rate-optimal codes

This section presents online rate-optimal constructions for three parameter regimes when there are no resets (i.e., $\zeta_i = 0$ for all $i \in [t]$): (a) Regime $b_1$ where $\tau > 1$ and $b_i = 1$ for all $i \in [t]$, (b) Regime $b_\tau$ where $b_i = \tau$ for all $i \in [t]$, and (c) Regime $b_{\tau+1}$ where $b_i > \tau$ and $\ell_i < 1$ for all $i \in [t]$. Later, Section 6.5 shows in all other parameter regimes that online rate-optimal codes cannot match the optimal rate of offline ones, even without resets.

6.4.1 Online optimal codes for Regime $b_1$

We introduce a systematic construction called "Regime $b_1$-Code." During the $i$th time slot, $X[i] = (S[i], P[i])$. One symbol is sent per transmitted packet (i.e., $c_i = n_i$). All that remains is to define $P[i]$. At a high level, $P[i]$ is chosen to be full-rank linear combinations of all of the symbols of $S[i - \tau : i]$. Its size, $p_i$, is as small as possible to ensure $S[i - \tau]$ is recovered by time slot $i$.

Next, we define some notation and then use it to define $P[i]$. Let $[I_m | A^T]^T$ be the generator matrix of a $[m(\tau + 2), m]$ systematic MDS code, where $T$ denotes transpose. Let $A$ comprise $m \times m$ block submatrices, $A_0, \ldots, A_\tau$. For $i < \tau$, $p_i = 0$, and no parity symbols are sent. For $i \in [t - \tau] \setminus [\tau - 1]$, during time slot $i$, we define $$p_i = \max\Big(0, n_{i-\tau} - \lceil n_{i-\tau} \ell_{i-\tau} \rceil - k_{i-\tau} - \sum_{l=i-\tau+1}^{i-1} p_l\Big) \tag{6.11}$$

$$V[j] = (S[j], 0^{n-k_j}) \tag{6.12}$$

$$P[i] = \Big(\sum_{j=i-\tau}^{i} A_{j-(i-\tau)} V[j]\Big)_{0:p_i-1}. \tag{6.13}$$

Decoding involves solving a full-rank system of linear equations.

Next, we establish that the proposed construction satisfies the lossless-delay and worst-case-delay constraints.

Lemma 23. *For any $\tau, t, K, \mathcal{L}$ under Regime $b_1$, the Regime $b_1$-Code lossless-delay and worst-case-delay constraints over the channel.*

*Proof.* The lossless-delay constraint is met by sending $S[i]$ in $X[i]$.

The final $\tau$ frames are known to be of size 0. Consider any burst loss in $X[i]$ for some $i \in [t - \tau]$. For each $l \in \{\max(\tau, i), \ldots, i + \tau\}$ and $j \in \{l - \tau, \ldots, l\} \setminus \{i\}$, $S[j]$ is received and used to compute $V[j]$.[1] This yields $$P^*[l] = \sum_{j \in \{l-\tau, \ldots, l\} \setminus \{i\}} A_{j-(l-\tau)} V[j].$$

Recall that $$A_{i-(l-\tau)} V[i] = P[l] - P^*[l].$$

Overall, for $l \in \{i + 1, \ldots, i + \tau\}$, the first $p_l$ symbols of $A_{i-(l-\tau)} V[i]$ are available. In addition, some $(n_i - \lceil n_i \ell_i \rceil)$ symbols of $[I, A_i^T]^T V[i]$ are received. Therefore, $$(n_i - \lceil n_i \ell_i \rceil) + \sum_{l=i+1}^{i+\tau} p_l$$

symbols of $[I, A_i^T]^T V[i]$ are received and $(m - k_i)$ symbols of $V[i]$ are known in advance to be zero-padding.

By Equation 6.11 that $$(p_i - \lceil p_i \ell_i \rceil) + k_i(1 - \ell_i) + \sum_{l=i+1}^{i+\tau} p_l \geq k_i.$$

By the MDS property, $V[i]$ can be recovered, yielding $S[i]$. □

Finally, we show that the proposed construction is trivially close to having an optimal rate.

Lemma 24. *Consider any $\tau, t, K, \mathcal{L}$ under Regime $b_1$, and let $N^{(OPT)}$ be the number of symbols sent under a rate-optimal offline code. Then the Regime $b_1$-Code's rate is at least*

$$\left(\sum_{i=0}^{t} k_i\right) / (N^{(OPT)} + 3\tau(t - \tau) + 1).$$

*Proof sketch.* At a high level, we compare the number of symbols sent under Regime $b_1$-Code to the number modeled as being sent under Algorithm 4. We demonstrate how to modify the values of $p_i^{(IP)}$ for $i \in [t]$ to match $p_i$ for $i \in [t]$ while increasing $\sum_{i=0}^{t} p_i^{(IP)}$ by at most $(t - \tau + 1)$. A complete proof is included in Appendix 6.8.6.

□

---

[1] For $j \in [\tau - 1]$, we consider $V[-j] = 0^{(m)}$.

6.4.2 Online optimal codes for Regime $b_\tau$

We introduce a systematic construction called "Regime $b_\tau$-Code." During the $i$th time slot, $(S[i], P[i])$. One symbol is sent per transmitted packet, leading to $c_i = n_i$. It suffices to define $P[i]$. At a high level, $P[i]$ is chosen to be full-rank linear combinations of the symbols of $S[i-\tau]$ and $S[i]$. Its size, $p_i$, is as small as possible to ensure $S[i-\tau]$ is recovered by time slot $i$.

Next, we define some notation and then use it to define $P[i]$. Let $[I_m | A^T]^T$ be the generator matrix of a $[3m, m]$ systematic MDS code. Let $A_0$ and $A_1$ be disjoint $m \times m$ block submatrices of $A$. For $i < \tau, p_i = 0$, and no parity symbols are sent. For $i \in [t-\tau] \setminus [\tau-1]$, during time slot $i$, we define $$p'_i = \max(0, n_{i-\tau} - \ell_{i-\tau} n_{i-\tau} - k_{i-\tau}) \quad (6.14)$$

$$p_i = p'_i + \mathbb{1}[p'_i \mod h_i](h_i - (p'_i \mod h_i)) \quad (6.15)$$

$$V[i] = (S[i], 0, \ldots, 0)$$

$$P[i] = (A_0 V[i-\tau] + A_1 V[i])_{0:p_i-1}. \quad (6.16)$$

Decoding follows from solving a full-rank system of linear equations. Clearly, $w_i = p_i$.

Next, we establish that the proposed construction satisfies the lossless-delay and worst-case-delay constraints.

Lemma 25. *For any $\tau, t, K, \mathcal{L}$ under Regime $b_\tau$, the Regime $b_\tau$-Code lossless-delay and worst-case-delay constraints over the channel.*

*Proof.* The lossless-delay constraint is met by sending $S[i]$ in $X[i]$.

The final $\tau$ frames are known to be of size 0. Consider any burst loss in $X[i]$ for some $i \in [t-\tau]$. Then $S[i+\tau]$ is received and used to compute $V[i+\tau]$ and $A_1 V[i+\tau]$. Thus, $$(A_0 V[i])_{0:p_{i+\tau}} = P[i+\tau] - (A_1 V[i+\tau])_{0:p_{i+\tau}}.$$

Additionally, $S[i-\tau]$ is known and used to compute $V[i-\tau]$ and $V[i-\tau] A_0$. Suppose $p'_i$ parity symbols of $P[i]$ are received; for some $J \subseteq [p_i - 1]$ of size $p'_i$, for all $j \in J$, $P_j[i]$ is received and used to compute $$(A_1 V[i])_j = P_j[i] - (A_0 V[i-\tau])_j.$$

Finally, $k'_i = (n_i - \lceil n_i \ell_i \rceil - p'_i)$ frame symbols of $S[i]$ are received. Recall by Equations 6.14 and 6.15 that $$(p_i - \lceil p_i \ell_i \rceil) + k_i(1 - \ell_i) + p_{i+\tau} \geq k_i.$$

By the MDS property, $V[i]$ can be recovered, yielding $S[i]$. □

Finally, we show that the proposed construction is trivially close to having an optimal rate.

Lemma 26. *Consider any $\tau, t, K, \mathcal{L}$ under Regime $b_\tau$, $N^{(OPT)}$ be the number of symbols sent under a rate-optimal offline code. Then the Regime $b_\tau$-Code's rate is at least*

$$\left(\sum_{i=0}^{t} k_i\right) / \left(N^{(OPT)} + 2(t-\tau)(\tau-1) + \sum_{i=0}^{t-\tau} 2(q_i + h_{i+\tau} - 2)\right).$$

*Proof sketch.* Let $C$ be the code created by $(\tau, t, K, Z, \mathcal{L}, \mathcal{B}, (w_0, \ldots, w_{t-\tau}))$-Split Code. By Theorem 9, it sends at most $2(t-\tau)(\tau-1) + \sum_{i=0}^{t-\tau}(q_i + h_{i+\tau} - 2)$ extra symbols compared to an offline rate-optimal code. We iteratively adjust $C$ so that each $p_i^{(C)} = p_i$ while increasing the number of symbols sent for each time slot $i$ by at most $h_i$. This bounds the difference in the rates of $C$ and the Regime $b_\tau$-Code. A complete proof is included in Appendix 6.8.7. □

6.4.3 Online optimal codes for Regime $b_{\tau+1}$

We introduce a systematic construction called "Regime $b_{\tau+1}$-Code." During the $i$th time slot, $X[i] = (S[i], P[i])$. Next, we will define $P[i]$. No parity symbols are sent for the first $\tau$ time slots (i.e., $p_i = 0$ for $i < \tau$). For each $i \in [t] \setminus [\tau-1]$, we define the number of parity symbols as $$p_i' = k_{i-\tau} \ell_{i-\tau}/(1-\ell_i) \qquad (6.17)$$

$$p_i = \lceil p_i' \rceil + \mathbb{1}[\lceil p_i' \rceil \mod h_i](h_i - \lceil p_i' \rceil \mod h_i). \qquad (6.18)$$

A $[p_i + k_{i-\tau}, k_{i-\tau}]$ systematic MDS code is constructed for $S[i-\tau]$, leading to $p_i$ parity symbols. These parity symbols are evenly spread over $h_i$ transmitted packets of $X[i]$. The frame symbols of $S[i]$ are also evenly spread over these transmitted packets. Next, we show the proposed construction satisfies the lossless-delay and worst-case-delay constraints.

Lemma 27. *For any $\tau, t, K, \mathcal{L}$ under Regime $b_{\tau+1}$, the Regime $b_{\tau+1}$-Code lossless-delay and worst-case-delay constraints over the channel.*

*Proof.* The lossless-delay constraint is satisfied by sending $S[i]$ in $X[i]$.

Consider any $i \in [t]$. If $X[i]$ is lost in part of a burst, at least $(1-\ell_i)k_i$ frame symbols are recovered in $S[i]$ and at least $(1-\ell_{i+\tau})p_{i+\tau}$ parity symbols are received $\tau$ time slots later. As such, at least $k_i$ symbols are received of an the $[p_{i+\tau} + k_i, k_i]$ MDS encoding of $S[i]$. By the MDS property, these symbols to recover $S[i]$. □

Next, we show that the proposed construction sends at most $(h_i - 1)$ extra symbols per time slot compared to a rate-optimal code (i.e., it is trivially close to being rate-optimal).

Lemma 28. *Consider any $\tau, t, K, \mathcal{L}$ under Regime $b_{\tau+1}$, and let $N^{(opt)}$ be the number of symbols sent under a rate-optimal offline code. Then the Regime $b_{\tau+1}$-Code's rate is at least*

$$\left(\sum_{i=0}^{t} k_i\right) \Big/ \left(N^{(opt)} + \sum_{i=0}^{t-\tau} h_i\right).$$

*Proof.* Recall that under Regime $b_{\tau+1}$, for any $i \in [t-\tau+1]$, $h_i > \tau$. Any code construction satisfying the lossless-delay and worst-case-delay constraints must recover from each $S[i]$ within $\tau$ time slots. So if a burst starts in time slot $0$, $S[0]$ is recovered by time slot $\tau$. Therefore, the code can recover from a burst of length $(\tau + 2)$ starting in time slot $0$. If the code must recover from a burst of length $l \geq (\tau + 1)$ starting in time slot $0$, then $S[0:l-\tau-1]$ must be recovered by time slot $(l-1)$. Therefore, it is as if nothing was lost until time slot $(l-\tau)$. Therefore, the code must be able to recover from a burst of length $(l+1)$ starting in time slot $0$. Thus, inductively, the code must be able to recover from a burst of length $t$ starting in time slot $0$.

This establishes that any code, $C$, that sends $n_{C,i}$ symbols during time slot $i$ must be able to recover when $\ell_i$ fraction of transmitted packets are dropped adversarially for any $i \in [t]$. The total number of symbols lost is at least $\sum_{i=0}^{t} \ell_i n_{C,i}$. At least $\sum_{i=0}^{t} k_i$ symbols must be received. Therefore, $\sum_{i=0}^{t}(1-\ell_i) n_{C,i} \geq \sum_{i=0}^{t} k_i$.

Combining Equations 6.17, 6.18, and $p_i = 0$ for $i < \tau$, and $k_i = 0$ for $i > (t-\tau)$ establishes $$\sum_{i=0}^{t}(1-\ell_i)n_i = \sum_{i=0}^{t}(1-\ell_i)(k_i + p_i)$$

$$\leq \sum_{i=0}^{\tau-1} k_i + \sum_{i=\tau}^{t} h_i + (1-\ell_i)(k_i + p_i)$$

$$= \sum_{i=0}^{\tau-1} k_i$$

$$+ \sum_{i=\tau}^{t}(h_i + (1-\ell_i)(k_i + k_{i-\tau}\ell_{i-\tau}/(1-\ell_i)))$$

$$\leq \sum_{i=0}^{t-\tau}(h_i + k_i) + \sum_{i=t-\tau+1}^{t} k_i$$

$$= \sum_{i=0}^{t-\tau}(h_i + k_i).$$

This concludes the result.

$\square$

The proof of Lemma 28 also establishes that Regime $b_{\tau+1}$ is not bursty. Specifically, there are not bursts of losses across only a few consecutive time slots followed by guard spaces. Instead, arbitrary losses occur during every single time slot.

6.5 Gap between online and offline codes

Recall from Theorem 4 that in the setting where an entire channel packet (i.e., all transmitted packets) is lost or received, an online code exists that matches the optimal rate of offline codes. However, this is no longer true when only some transmitted packets are lost. The key distinction is that the optimal choice for how much information the received symbols of a transmitted packets should contain about the corresponding frame depends on the sizes of *future* frames. Consequently, even when there are no resets, there is a gap between the optimal online rate and offline rate for all but the three parameter regimes discussed in Section 6.4: Regime $b_1$, Regime $b_\tau$, and Regime $b_{\tau+1}$. We formalize this result next in Theorem 10

Theorem 10. *For any $\tau$ and $B$ outside of Regime $b_1$, Regime $b_\tau$, and Regime $b_{\tau+1}$, the online-optimal-rate is strictly less than offline-optimal-rate.*

*Proof sketch.* We introduce two possible frame-size sequences. We show that there exists a non-negligible $\epsilon > 0$ so that in order to be within $\epsilon$ of the optimal offline rate on one sequence, an online code's rate must be lower than the optimal offline rate by at least $\epsilon$ on the second. A full proof is included in Appendix 6.8.8. □

6.6 Online approximately rate-optimal codes

We now present an online approximately rate-optimal construction. During the $i$th time slot, an ML model provides side information, $O_i = w_i$, to determine how to split the $i$th frame in the building block construction (Section 6.2). If $\ell_i = 0$ then $X[i]$ is received, so $O_i$ must be 0. Otherwise, to ensure $O_i$ can be used by the building block construction, we require it to be (a) sufficiently large (i.e., setting $w_i = O_i/\ell_i$ satisfies Equation 6.3), and (b) padded to be divisible by $q_i$. The construction is dubbed the "$(\tau, t, K, Z, \mathcal{L}, B, W^{(O)})$-Split ML Code."

Our result requires a few terms. Let the outputs of the ML model over time slots $0, \ldots, (t-\tau)$ be $W^{(O)} = O_0, \ldots, O_{t-\tau}$. For $i = 0, \ldots, (t-\tau)$, let $W_i^{(O,*)}$ be the set of optimal values for $p_{j,i'}^{(IP)}$ in Algorithm 4 with additional constraints that the variables for variables corresponding to earlier time slots are set according to $W^{(O)}$ (i.e., for $j \in [i-1]$ $p_{j,i'}^{(IP)} = W_j^{(O)}$). For $i \in [t-\tau]$, the regret of the outputs of the ML model compared to the optimal values is $$\mathcal{R}_i = \min_{w^{(O,*)} \in W_i^{(O,*)}} |O_i - w^{(O,*)}|, \mathcal{R}_{[t]} = (\mathcal{R}_0, \ldots, \mathcal{R}_t) \quad (6.19)$$

For an arbitrary frame-size sequence, $K = (k_0, \ldots, k_t)$, and feedback, $\mathcal{L} = (\ell_0, \ldots, \ell_t)$, $B = (b_0, \ldots, b_t)$, and $Z = (\zeta_0, \ldots, \zeta_t)$, (all chosen offline without access to $W^{(O)}$), let $R^{(opt)}$ be the offline optimal rate under the condition on feedback from Section 6.3 and $R^{(on)}$ be a random variable (over the predictions of the ML model) reflecting the rate of the Split ML Code.

Theorem 11. *Consider any $\tau, t, K, Z, \mathcal{L}, B, W^{(O)}$ and $\epsilon, \delta, \epsilon_i \in (0, 1)$. Suppose for $i \in [t]$ that $E[\mathcal{R}_i] \leq \epsilon k_i$ and $t > \log(1/\delta)/(2\epsilon_i^2)$. Then with probability at least $(1-\delta)$,*

$$R^{(opt)} - R^{(on)} \leq \epsilon + \left(\sum_{i=0}^{t} \epsilon_i + 2\tau + b_t + q_t - 4\right) / \left(\sum_{i=0}^{t} k_i\right). \quad (6.20)$$

*Proof.* The proof is shown in Appendix 6.8.9. □

Consider the example of a videoconferencing call discussed after Theorem 9. If the call is sufficiently long, with probability $(1-\delta)$, $R^{(on)}$ is within $(0.01 + \epsilon + 0.00048 \cdot \epsilon_i)$ of optimal.

Finally, we note that removing the condition on feedback leads to increasing Equation 6.20 for each $i \in \{\tau, \ldots, t\}$ were $\ell_i > \ell_{i-1}$ by at most $$\left((\ell_i - \ell_{i-1}) \sum_{j=i-\tau+1}^{t} k_j \ell_j\right) / \left(\sum_{j=0}^{t} k_j\right).$$

6.7 Maximum transmittable unit

To match the conventions used by real-world multimedia streaming applications, we can add a maximum transmittable unit (MTU) to the model. Specifically, we introduce a new parameter, "$M$," wherein each transmitted packet is of size at most $M$.

One can modify $(\tau, t, K, Z, \mathcal{L}, B, W)$-Split Code to handle this extra requirement while sending negligibly few extra symbols per time slot as follows: Consider the $i$th time slot, wherein $X^{(j)}[i]$ is sent for $j \in [c_i - 1]$ for $c_i = b_i$. Suppose any transmitted packet contains more than $M$ symbols. Let $c'_i$ be the smallest multiple of $b_i$ so that $\lceil n_i/c'_i \rceil \leq M$. The symbols of $X[i]$ are spread over $(c'_i - 1)$ transmitted packets so that each transmitted packet contains the same ratio of symbols of $U[i], V[i], P[i]$ as were originally sent. This may require decreasing $V[i]$ to equal the nearest multiple of $c'_i$, increasing $U[i]$ by the same amount, and then padding $U[i]$ until it is a multiple of $c'_i$. Similarly, $P[i]$ will be padded until it is a multiple of $c'_i$.

Next, we provide a simple example of the number of extra symbols needed to satisfy the requirement of the $M$. A typical value of $M$ may be 1500 bytes. Suppose $|\mathbb{F}| \geq 8$. Consider videoconferencing at a standard 30 frames per second where the maximum possible size of a video frame is $2^{14}$ bytes. Then $c'_i$ is never more than 11. Thus, the amount of extra padding is at most $2c'_i \leq 22$ bytes per frame. The overhead per frame is at most 22 bytes in this example; for a 2000 kbps videoconferencing call, this leads to an overhead of less than 0.27%.

6.8 Appendix

6.8.1 Additional notation

We define the set of possibilities for the received packets of $X[i]$ as $\mathcal{Y}_i$. For a burst starting in time slot $j$ of length $b_j$ and any $i \in \{j, \ldots, j + b_j - 1\}$, we define the set of possible received packets of $X[j : i]$ as $\mathcal{Y}_{j,i} = \mathcal{Y}_j \times \ldots \times \mathcal{Y}_i$.

To simplify the presentation of proofs, we also require that a burst starting in time slot $i$ does not end sooner than a burst starting before time slot $i$. Formally, we require $(i + b_i) \geq (j + b_j)$ for all $j \in \mathbb{B}_i$. This requirement holds without loss of generality by the satisfaction of the worst-case-delay for any $j \in \mathbb{B}_i$ and any burst loss leading to $Y[j : j + b_j - 1] \in \mathcal{Y}_{j, j+b_j-1}$. Specifically, $S[j : i - 1]$ are recovered by time slot $(j + \tau - 1)$ and suffice to obtain $X[j : i - 1]$. The worst-case-delay is still satisfied even though now the burst spans time slots $i$ through $(j + b_j - 1)$.

Next, we formalize decoding in terms of the normalized Shannon Entropy (i.e., the Shannon Entropy divided by the entropy of a random field element, $log(|\mathbb{F}|)$):

$$\mathcal{H}(S[i] | S[0], \ldots, S[i - 1], k_i, Y[i]) = 0 \quad (6.21)$$

$$\mathcal{H}(S[i] | S[0], \ldots, S[j - 1], Y[j], \ldots, Y[j + \tau], k_j, \ldots, k_{j+\tau}) = 0. \quad (6.22)$$

Equations 6.21 and 6.22 follow directly from the lossless-delay and worst-case-delay constraints, respectively. The sizes of the frames are assumed to be known for loss recovery (from the header), so they will be omitted from the entropy function henceforth. Let $\mathcal{I}(\cdot)$ be the normalized Mutual Information (MI): $\mathcal{I}(W; Z) = \mathcal{H}(W) - \mathcal{H}(W|Z)$.

Finally, formally define the term to capture how frames are split into a component recovered before its deadline and a component recovered at its deadline. For any $i \in [t - \tau]$, let $u_i =$ $$\max_{Y[i] \in \mathcal{Y}_i} \left( \mathcal{H}(S[i] | S[0:i-1], X[i+1], \ldots, X[i+\tau-1], \right. \tag{6.23}$$
$$\left. Y[i], k_0, \ldots, k_{i+\tau-1}) \right)$$

6.8.2 Proof of Theorem 8

We start with an auxiliary Lemma.

Lemma 29. *For any $i \in [t - \tau]$, all $j \in \mathbb{B}$, where $\sum_{r=j}^{j+\tau-1} \zeta_r = 0$, and any $l \in \{j, \ldots, i\}$, $d^{(i,j,l)} \geq (1 - \ell_l) u_l$.*

*Proof.* First, $(1 - \ell_l) u_l \geq (1 - \ell_l) k_l \geq (1 - \ell_l) u_l$.

For $l = j$, combining Equation 6.2 with $k_l \geq u_l$ yields $$d^{(i,j,l)} \geq (k_l - u_l \ell_l) \geq (u_l - u_l \ell_l) = u_l(1 - \ell_l) \geq 0. \tag{6.24}$$

For $l \in \{j + 1, \ldots, i\}$, the case necessitates that $j < i$. First, by the inductive hypothesis on $(l - 1)$, $$d^{(i,j,l-1)} \leq k_{l-1} - u_{l-1} \ell_{l-1} + \sum_{r=j}^{l-2} k_r - u_r \ell_r - d^{(i,j,r)} \tag{6.25}$$

$$\sum_{r=j}^{l-1} d^{(i,j,r)} \leq \sum_{r=j}^{l-1} k_r - u_r \ell_r \tag{6.26}$$

where Equation 6.26 follows from rearranging terms. Thus, $d^{(i,j,l)} \geq (1 - \ell_l) u_l$ by Equation 6.2 and the logic for $l = j$. □

For any $i \in [t]$, the lossless-delay is met as $S[i]$ is in $X[i]$.

Next, to show satisfaction of the worst-case-delay, we consider any burst starting in $i \leq [t - \tau]$. We need not consider $i > (t - \tau)$, as the final $\tau$ frames are known to be 0. If $\sum_{j=i+b_i}^{i+\tau-1} \zeta_j > 0$ then $S[i : i + b_i - 1]$ need not be recovered, and the proof is concluded. Otherwise, $\sum_{j=i+b_i}^{i+\tau-1} \zeta_j = 0$. We show in two steps that each $S[i : i + b_i - 1]$ is recovered within $\tau$ timeslots. First, the received symbols of $Y[i : i + b_i - 1]$ and $P[i + b_i : i + \tau - 1]$ are used to recover $V[i : i + b_i - 1]$. Second, for $j \in \{i, \ldots, i + b_i - 1\}$ where $\sum_{j=i+b_i}^{i+\tau-1} \zeta_j = 0$, $U[j]$ is recovered in time slot $(i + \tau)$ with $P[i + \tau]$.

First, for $j \in \{i, \ldots, i + \tau - 1\}$, $U[j - \tau]$ is used to compute $P^{(s)}[j]$ to determine $P'[j] = (P[j] - P^{(s)}[j])$ (by Equation 6.7). Recall from Equation 6.3 (and $u_i = (k_i - u_i)$)

$$\sum_{l=i+b_i}^{i+\tau-1} p'[l] + \sum_{l=i}^{i+b_i-1} d^{(j,i,l)} \geq \sum_{l=i}^{i+b_i-1} k_l - u_i \ell_i \qquad (6.27)$$

$$\sum_{l=i+b_i}^{i+\tau-1} p'[l] + \sum_{l=i}^{i+b_i-1} d^{(j,i,l)} - (1 - \ell_i)u_i \geq \sum_{l=i}^{i+b_i-1} v_l \qquad (6.28)$$

where for $l \in \{i, \ldots, i + b_i - 1\}$ the $(1 - \ell_i)u_i$ symbols of $U[l]$ that are received are subtracted out (valid by Lemma 29).

Without loss of generality, we pretend that each $P[j]$ is padded with extra parity symbols to be $P^{(pad)}[j]$ of size $m$ but these extra $(m - p[j])$ symbols are all lost. Then each $(V^{\wedge}[j], P^{(pad)}[j])$ comprises $2m$ symbols. The number of received parity symbols exceeds the number of missing frame symbols. Thus, combining Equation 6.28 with Lemma 1 L1 of [11] shows $V[j]$ is recovered by time slot $(i + \tau - 1)$ (e.g., by solving a system of linear equations). For $r = (i + 1), \ldots, (i + b_i - 1)$, by Lemma 29 and Equation 6.2, $$\sum_{l=j}^{r-1} d^{(j, i+b_i-1, l)} \leq \sum_{l=i}^{r-1} k_l - u_i \ell_i \qquad (6.29)$$

$$\sum_{l=i}^{r-1} d^{(j, i+b_i-1, l)} - u_i(1 - \ell_i) \leq \sum_{l=i}^{r-1} v_l \qquad (6.30)$$

Combining Equations 6.28 and 6.30 shows $$\sum_{l=i+b_i}^{i+\tau-1} p'[l] + \sum_{l=r}^{i+b_i-1} (d^{(j,i,l)} - u_i(1 - \ell_i)) \geq \sum_{l=r}^{i+b_i-1} u_l \ell_l \qquad (6.31)$$

Combining Equation 6.31 with Lemma 1 L1 of [11], $V[r]$ can be recovered by time slot $(i+\tau-1)$ (e.g., by solving a system of linear equations). After finishing iteration $r = (i + b_i - 1)$, $V[i : i + b_i - 1]$ have been recovered.

For $l = i, \ldots, (i + b_i - 1)$ where $\sum_{l'=i+b_i}^{i+\tau-1} \ell_{l'} = 0$, we now show that $U[l]$ is recovered by time slot $(i + \tau)$. During time slot $(l + \tau)$, $V[l : l + \tau]$ are available and are used to compute $P^{(s)}[l + \tau]$, yielding $P^{(s)}[l + \tau] = (P[l + \tau] - P'[l + \tau])$. Then $P^{(s)}[l + \tau]$ comprises $p[l + \tau] \geq U[l]\ell_l$ linearly independent linear equations of the symbols of $U[l]$. Combining $P^{(s)}[l + \tau]$, the $(1 - \ell_l)u[l]$ received symbols of $U[l]$, and the $(m - u[l])$ zeroes of $U^{\wedge}[l]$ (padding) provides at least $m$ symbols of the $[2m, m]$ maximum distance separable linear code. Thus, $U[l]$ is obtained by solving a system of linear equations. Both $V[l]$ and $U[l]$ are recovered by time slot $(l + \tau)$ for any $l \in \{i, \ldots, i + b_i - 1\}$, so the worst-case-delay constraint is satisfied.

6.8.3 Proof of Lemma 21

For $i \in \{t - \tau + 1, \ldots, t\}$, $k_i = 0$. Hence, $S[i]$ is known. Otherwise, consider $i \in [t - \tau]$. The lossless-delay constraint is satisfied by $S[i]$ being sent uncoded in $X[i]$. If $\sum_{l=i+1}^{i+\tau-1} \ell_l > 0$ then $S[i:i+b_i-1]$ need not be recovered, and the proof is concluded. Otherwise, $\sum_{i=i+1}^{i+\tau-1} \zeta_i = 0$. We will show for any burst starting in time slot $i$ of length $b_i$ and any $j \in \{i,\ldots,i+b_i-1\}$ such that $\sum_{i=i+1}^{j+\tau-1} \zeta_i = 0$ that the probability of correctly recovering $S[i:j]$ within the worst-case-delay using $S[0:i-1], Y^{(C)}[i:j+\tau]$ is at least $(1-\epsilon)$. Recall that if $\sum_{i=i+1}^{j+\tau-1} \zeta_i > 0$, $S[j]$ need not be recovered. It suffices to show that $V[i:i+b_i-1]$ are correctly recovered by time slot $(i+\tau-1)$; afterwards, $U[j]$ for $j \in \{i,\ldots,i+b_i-1\}$ is recovered identically to the proof of Theorem 8 (respectively, not recovered if $\sum_{i=i+1}^{j+\tau-1} \zeta_i > 0$).

If $(\tau, t, K, Z, \mathcal{L}, B, W)$-Split Code were used, the only difference is the linear equations used to generate the parity symbols. Recall from the proof of Theorem 8 the missing symbols of $V[i:i+b_i-1]$ are obtained by solving a system of linear equations combining (a) received symbols of $S[0:i-1]$, (b) received symbols of $V[i:i+b_i-1]$, and (c) a set of $L = \sum_{j=i}^{i+b_i-1} \ell_j v_j$ parity symbols. The first two quantities are available to $(\tau, t, K, Z, \mathcal{L}, B)$-RandomCode$(\epsilon)$. We will show that set of $l$ corresponding parity symbols for $(\tau, t, K, Z, \mathcal{L}, B)$-RandomCode$(\epsilon)$ can be used to recover the $l$ missing symbols of $V[i:i+b_i-1]$. Without loss of generality, when $(\tau, t, K, Z, \mathcal{L}, B, W)$-Split Code is instead used, $L = \{r_1,\ldots,r_l\}$ where $r_j$ is used as a pivot column in Gaussian Elimination to recover the $j$th missing symbol of $V[i:i+b_i-1]$. Suppose under $(\tau, t, K, Z, \mathcal{L}, B)$-RandomCode$(\epsilon)$ Gaussian Elimination is used and sequentially $r_1,\ldots,r_l$ is chosen as a pivot column to recover the next missing symbol. We bound the probability of failing to recover at least one symbol. To fail, the pivot column would need to be $0$ in the position corresponding to the missing symbol. For each symbol, the probability of failure (i.e., that it cannot be used) is the same as the probability that it is $0$ which occurs with probability at most $1/|\mathbb{F}|$. Applying a union bound shows that the probability of failing for at least one symbol is at most $l/|\mathbb{F}|$. Noting that $l \leq b_i m \leq \tau m$ and $|\mathbb{F}| \geq (\tau m / \epsilon)$ leads to a probability of failing of at most $\epsilon$.

6.8.4 Proof of Lemma 22

Throughout Section 6.8.4, we assume for all $i \in [t]$ that $b_i \leq \tau$. We begin by proving the result when there are no resets (i.e., $\sum_{i=0}^{t} \zeta_i = 0$). Let code construction, $C$, be any offline construction that satisfies the lossless-delay and worst-case-delay constraints. Under $C$, $X^{(C)}[i]$ is sent during time slot $i \in [t]$ of size $n_{C,i}$ comprising $(c_{C,i}+1)$ transmitted packets. Then $Y^{(C)}[i]$ is the vector of received channel packets, and the total number of received symbols is $n_{C,i,Y^{(C)}}$. Appendix 6.8.4 shows some preliminary results for the proof. Appendix 6.8.4 incorporates relaxations to $C$ and verifies their correctness. Appendix 6.8.4 proves additional properties due to the relaxations. Finally, Appendix 6.8.4 ties the results together to finish the proof

Proof preliminaries

We begin with defining a few terms for time slot $i \in [t - \tau]$. Will use the following terms:

$$w_i^{(C)} = \max_{Y^{(C)}[i] \in \mathcal{Y}_i} \left( \mathcal{H}(S[i] | S[0:i-1], Y^{(C)}[i], X^{(C)}[i+1:i+\tau-1]) \right) \quad (6.32)$$

$$p_i^{(C)} = n_i - k_i. \quad (6.33)$$

Lemma 30. *For any $i \in [t - \tau]$ such that $\mathbb{B}_i \neq \emptyset, \ell_i > 0$ the number of symbols sent during the $(i + \tau)$th time slot is at least*

$$n_{C,i+\tau} \geq \left\lceil w_i^{(C)} + k_{i+\tau} \right\rceil.$$

*Proof.* At a high level, by Equation 6.32, at least $w^{(C)}[i]$ symbols' worth of information are needed to recover $S[i]$ that are unavailable prior to time slot $(i + \tau)$. They must be recovered during time slot $(i + \tau)$ due to the worst-case-delay, leading to at least $\lceil w^{(C)}[i] \rceil$ symbols being sent in $X^{(C)}[i + \tau]$. The lossless-delay constraint for $S[i + \tau]$ necessitates an additional $k_{i+\tau}$ symbols be sent in $X^{(C)}[i + \tau]$.

By Equation 6.32, there is a $Y^{(C)}[i] \in \mathcal{Y}_i$ so that $$\left(\mathcal{H}(S[i] \mid S[0:i-1], Y^{(C)}[i], X^{(C)}[i+1:i+\tau-1])\right) = w_i^{(C)}. \tag{6.34}$$

Recall that $S[0:i-1], Y^{(C)}[i:i+\tau-1]$ are available by time slot $(i + \tau - 1)$. By Equation 6.22 and the chain rule, $$\mathcal{H}(S[i] \mid S[0:i-1], Y^{(C)}[i], X^{(C)}[i+1:i+\tau]) = 0. \tag{6.35}$$

Thus for some $j \in \mathbb{B}_i$ and $Y^{(C)}[j:j+b_j-1] \in \mathcal{Y}_{j,j+b_j-1}$, $$n_{C,i+\tau} \geq \mathcal{H}(X^{(C)}[i+\tau]) \geq \tag{6.36}$$

$$\mathcal{H}(X^{(C)}[i+\tau] \mid S[0:i-1], Y^{(C)}[i:j+b_j-1], X^{(C)}[j+b_j:i+\tau-1]) = \tag{6.37}$$

$$\mathcal{H}(X^{(C)}[i+\tau] \mid S[0:i-1], Y^{(C)}[i:j+b_j-1], X^{(C)}[j+b_j:i+\tau-1]) + \tag{6.38}$$

$$\mathcal{H}(S[i] \mid S[0:i-1], Y^{(C)}[i:j+b_j-1], X^{(C)}[j+b_j:i+\tau]) =$$

$$\mathcal{H}(S[i], X^{(C)}[i+\tau] \mid S[0:i-1], Y^{(C)}[i:j+b_j-1], X^{(C)}[j+b_j:i+\tau-1]) \geq \tag{6.39}$$

$$\mathcal{H}(S[i] \mid S[0:i-1], Y^{(C)}[i:j+b_j-1], X^{(C)}[j+b_j:i+\tau-1]) + \tag{6.40}$$

$$\mathcal{H}(X^{(C)}[i+\tau] \mid S[0:i], Y^{(C)}[i:j+b_j-1], X^{(C)}[j+b_j:i+\tau-1]) \geq$$

$$\mathcal{H}(S[i] \mid S[0:i-1], Y^{(C)}[i], X^{(C)}[i+1:i+\tau-1]) + \tag{6.41}$$

$$\mathcal{H}(X^{(C)}[i+\tau] \mid S[0:i], X^{(C)}[j+1:i+\tau-1]) \geq$$

$$w_i^{(C)} + \mathcal{H}(X^{(C)}[i+\tau] \mid S[0:i], X^{(C)}[i:i+\tau-1]) \geq \tag{6.42}$$

$$w_i^{(C)} + \mathcal{H}(X^{(C)}[i+\tau] \mid S[0:i+\tau-1]) \geq \tag{6.43}$$

$$w_i^{(C)} + k_{i+\tau} \tag{6.44}$$

Equation 6.37 comes from conditioning reducing entropy; in Equation 6.38, the extra added term is 0 due to Equation 6.35; Equation 6.39 comes from applying the chain rule to Equation 6.38; Equation 6.40 comes from applying the chain rule to Equation 6.39; Equation 6.41 comes from conditioning reducing entropy; Equation 6.42 comes from conditioning reducing entropy Equation 6.34; Equation 6.43 comes from $X^{(C)}[i:i+\tau-1]$ being a function of $S[0:i+\tau-1]$ and conditioning reducing entropy; Equation 6.44 comes from Equation 6.21. Finally, combining Equations 6.36 and 6.44 establishes the result. □

Next, we bound the amount of information the parity symbols of each transmitted packet provide about earlier frames.

Lemma 31. *For any $i \in [t], j \in [i-1]$, the amount of information $X^{(C)}[i]$ can provide about dropped symbols of earlier frames is bounded by*

$$\mathcal{I}(X^{(C)}[i]; S[j:\min(j+b_j,i)-1] \| S[0:j-1])$$
$$\leq (n_{C,i} - k_i)$$

*Proof.*

$$\mathcal{I}(X^{(C)}[i]; S[j:\min(j+b_j,i)-1] \| S[0:j-1]) = \quad (6.45)$$

$$\mathcal{H}(X^{(C)}[i] \| S[0:j-1]) -$$
$$\mathcal{H}(X^{(C)}[i] \| \min(j+b_j,i)-1) \leq \quad (6.46)$$

$$\mathcal{H}(X^{(C)}[i] \| S[0:j-1]) - \mathcal{H}(X^{(C)}[i] \| S[0:i-1]) \leq \quad (6.47)$$

$$(n_{C,i} - k_i) \quad (6.48)$$

where Equation 6.46 comes from the definition of Mutual Information; Equation 6.47 comes from conditioning reducing information; Equation 6.48 comes from $X^{(C)}[i]$ having at most $n_{C,i}$ symbols and Equation 6.21. □

Lemma 31 will later be used to show for a burst starting in time slot $j$ how much redundancy transmitted packets received after the burst can provide to help in loss recovery.

We show for any $i \in [t-\tau]$ there is a burst starting in time slot $j \in \mathbb{B}_i$ such that all symbols of $S[j:i-1]$ and all but $w_i^{(C)}$ symbols of $S[i]$ must be recovered by time slot $(i+\tau-1)$.

Lemma 32. *Consider any $i \in [t-\tau]$ and any $j \in \mathbb{B}_i$. Then*

$$\min_{Y^{(C)}[j:j+b_j-1] \in \mathcal{Y}_{j,j+b_j-1}} (\mathcal{I}(S[j:i]; Y^{(C)}[j:j+\tau-1] \|$$

$$S[0:j-1])) \leq \sum_{l=j}^{i} k_l - w_i^{(C)}.$$

*Proof.*

$$\mathcal{H}(S[j:i] \| S[0:j-1], Y^{(C)}[j:j+\tau-1]) = \quad (6.49)$$

$$\sum_{l=j}^{i} \mathcal{H}(S[l] \| S[0:l-1], Y^{(C)}[j:j+\tau-1]) \geq \quad (6.50)$$

$$\sum_{l=j}^{i} \mathcal{H}(S[l] \| S[0:l-1], Y^{(C)}[l:l+\tau-1]) \geq \quad (6.51)$$

$$\sum_{l=j}^{i} \mathcal{H}(S[l] \| S[0:l-1], Y^{(C)}[l], X^{(C)}[l+1:l+\tau-1]) \geq \quad (6.52)$$

$$\sum_{l=j}^{i} w_l^{(C)}. \quad (6.53)$$

where Equation 6.50 follows from the chain rule; Equation 6.51 comes from conditioning reducing entropy; Equation 6.52 comes from conditioning reducing entropy; Equation 6.53 follows from Equation 6.32.

We note that $$\mathcal{I}(S[j:i]; Y^{(C)}[j:j+\tau-1] | S[0:j-1]) = \qquad (6.54)$$
$$\mathcal{H}(S[j:i]|S[0:j-1]) - \qquad (6.55)$$
$$\mathcal{H}(S[j:i]|S[0:j-1], Y^{(C)}[j:j+\tau-1])$$
$$\geq \sum_{l=j}^{i} k_l - w_j^{(C)} \qquad (6.56)$$

where Equation 6.55 follows from the definition of Mutual Information; Equation 6.56 follows from the sizes of $S[j:i]$/independence of frames and Equation 6.53. □

We rewrite the worst-case-delay constraint in terms of mutual information as follows.

Lemma 33. *Consider any $i \in [t - \tau]$ and any $j \in \mathbb{B}_i$. Then*

$$\min_{Y^{(C)}[j:j+k_j-1] = y_{j,j+k_j-1}} \left(\mathcal{I}(S[j:i]; Y^{(C)}[j:i+\tau]| S[0:j-1])\right) = \sum_{l=j}^{i} k_l.$$

*Proof.*

$$\mathcal{I}(S[j:i]; Y^{(C)}[j:i+\tau]|S[0:j-1]) = \qquad (6.57)$$
$$\mathcal{H}(S[j:i]|S[0:j-1]) - \qquad (6.58)$$
$$\mathcal{H}(S[j:i]|S[0:j-1], Y^{(C)}[j:i+\tau]) =$$
$$\sum_{l=j}^{i} k_l - \sum_{l=j}^{i} \mathcal{H}(S[l]|S[0:j-1], Y^{(C)}[j:i+\tau]) = \qquad (6.59)$$
$$\sum_{l=j}^{i} k_l. \qquad (6.60)$$

Where Equation 6.58 follows from the definition of mutual information; Equation 6.59 follows from independence of frames and the fact that the Equation 6.22 shows for any $l \in \{j, \ldots, i\}$, $\mathcal{H}(S[l]|S[0:j-1], Y^{(C)}[j:i+\tau]) = 0$, leading to Equation 6.60. □

Relaxations

We will use the following relaxations which may increase (but never decrease) the mutual information between received symbols under $C$ and missing information. Consider any $i \in [t - \tau]$ and any $j \in \mathbb{B}_i$.

Relaxation 1.

$$\min_{Y^{(C)}[j+b_j-1]\in \mathcal{Y}_{j,j+b_j-1}} (\mathcal{I}(S[j:i]; Y^{(C)}[i] |$$

$$S[0:j-1], Y^{(C)}[j:i-1])) =$$

$$\min \left( n_{C,i,Y^{(C)}}, k_i - w_i^{(C)} + \sum_{r=j}^{i-1} k_r - w_r^{(C)} - \right.$$

$$\mathcal{I}(S[j:r]; Y^{(C)}[r] | S[0:j-1], Y^{(C)}[j:r-1])).$$

Relaxation 2. For any $l \in \{j+b_j, \ldots, j+\tau-1\}$, $$\min_{Y^{(C)}[j+b_j-1]\in \mathcal{Y}_{j,j+b_j-1}} (\mathcal{I}(S[j:i]; X^{(C)}[l] |$$

$$S[0:j-1], Y^{(C)}[j:l-1])) =$$

$$\min \left( n_{C,l} - k_l, \sum_{r=j}^{i} k_r - w_r^{(C)} - \sum_{r=j}^{l-1} \right.$$

$$\mathcal{I}(S[j:\min(r,i)]; Y^{(C)}[r] | S[0:j-1], Y^{(C)}[j:r-1])).$$

Lemma 34. *Relaxations 1 and 2 do not cause C to send extra symbols or violate any constraints.*

*Proof.* Relaxation 1. By the sizes of transmitted packets and conditioning reducing entropy, we know $\mathcal{I}(S[j:i]; Y^{(C)}[i] | S[0:j-1], Y^{(C)}[j:i-1]) \leq \mathcal{H}(Y^{(C)}[i]) \leq n_{C,i,Y^{(C)}}$ (i.e., at most the size of $Y^{(C)}[i]$). We note $$\sum_{i=j}^{i} \mathcal{I}(S[j:i]; Y^{(C)}[i] | S[0:l-1], Y^{(C)}[j:l-1]) = \quad (6.61)$$

$$\sum_{i=j}^{i} \mathcal{I}(S[j:l]; Y^{(C)}[l] | S[0:l-1], Y^{(C)}[j:l-1]) = \quad (6.62)$$

$$\mathcal{I}(S[j:i]; Y^{(C)}[j:i] | S[0:j-1]) \leq \quad (6.63)$$

$$\mathcal{I}(S[j:i]; Y^{(C)}[j:j+\tau-1] | S[0:j-1]) \leq \quad (6.64)$$

$$\left( \sum_{l=j}^{i} k_l - w_l^{(C)} \right) \quad (6.65)$$

where Equation 6.62 comes from the independence of $S[l+1:i]$ from $S[0:l], Y^{(C)}[j:l]$; Equation 6.63 holds because applying the chain rule for mutual information to it yields Equation 6.61; Equation 6.64 comes from $(j+\tau-1) \geq i$, the chain rule for mutual information, and non-negativity of mutual information; Equation 6.65 comes from Lemma 32. Combining Equation 6.61 with Equation 6.65 establishes that the relaxation only maintains or increases the mutual information.

Relaxation 2. By Lemma 31, $\mathcal{I}(S[j:i];X^{(C)}[i]|S[0:j-1],Y^{(C)}[j:l-1])$ is at most $(n_{C,i} - k_i) = p_i^{(C)}$. Also, $$\sum_{r=j}^{i}(\mathcal{I}(S[j:i];Y^{(C)}[r]|S[0:j-1],Y^{(C)}[j:r-1])) = \tag{6.66}$$

$$\sum_{r=j}^{i}(\mathcal{I}(S[j:i];Y^{(C)}[r]|S[0:j-1],Y^{(C)}[j:r-1])+ \tag{6.67}$$

$$\sum_{r=i+1}^{i}(\mathcal{I}(S[j:i];Y^{(C)}[r]|S[0:j-1],Y^{(C)}[j:r-1])) =$$

$$\mathcal{I}(S[j:i];Y^{(C)}[j:l]|S[0:j-1]) \leq \tag{6.68}$$

$$\mathcal{I}(S[j:i];Y^{(C)}[j:j+\tau-1]|S[0:j-1]) \leq \tag{6.69}$$

$$\left(\sum_{r=j}^{i}k_r - w_j^{(C)}\right) \tag{6.70}$$

where Equation 6.67 comes from the independence of $S[j+1:i]$ from $S[0:l],Y^{(C)}[j:l]$; Equation 6.68 comes from the chain rule for mutual information; Equation 6.69 comes from the chain rule of mutual information, the fact that $l \leq (j+\tau-1)$, and the non-negativity of mutual information. Equation 6.70 comes from Lemma 32. □

The relaxations lead to a mutual information that depends on the sizes of frames and transmitted packets, not the symbols that are sent under $C$ themselves.

Relaxation 3. For any $i \in [t], (c_{C,i}+1) = n_{C,i}$.

Lemma 35. *Relaxation 3 does not cause $C$ to send extra symbols or violate any constraints.*

*Proof.* If there are no losses, this change is irrelevant. Otherwise, all considered bounds (under the relaxation) when $X^{(C)}[i]$ experiences loss apply to any choice for packetization. The only way that packetization effects the bounds is if it changes the total number of received symbols, with the greedy choice being to receive as many symbols as possible for each transmitted packet.

Relaxation 3 has no change for $i > (t - \tau)$. We apply the change for $i = 0, \ldots, (t - \tau)$; this does not alter the total number of symbols sent (or even the total number sent during any time slot).

Next, we show that this change does not effect decoding. When $\ell_i n_{C,i}$ is an integer, then the minimum possible number of symbols lost over $X^{(C)}[i]$ is $\ell_i n_{C,i}$ and that is what is lost in the worst case.

Otherwise, exactly $\lceil \ell_i n_{C,i} \rceil$ symbols are lost in the worst case. For any $(c_{C,i}+1)$ transmitted packets sent in $X^{(C)}[i]$, the largest $l = \lceil \ell_i (c_{C,i}+1) \rceil$ could be lost, which contain in total at least $\lceil n_{C,i} l/(c_{C,i}+1) \rceil \geq \lceil \ell_i n_{C,i} \rceil$ symbols by the pigeonhole principle and transmitted packets containing an integral number of symbols. Thus, one symbol per transmitted packet leads to as many symbols being received as possible, which maximizes their utility. □

Relaxation 4. $\forall l \in [t], \mathcal{I}(S[l]; X^{(C)}[l] | S[0:l-1]) = k_l$ whenever $n_{C,l} \geq k_l$.

Relaxation 5. $\forall l \in \{\tau, \ldots, t\}$, $$\mathcal{I}(S[l-\tau]; X^{(C)}[l] | S[0:l-\tau-1], Y^{(C)}[l-\tau:l-1]) =$$
$$\min(p_l^{(C)}, \mathcal{H}(S[l-\tau] | S[0:l-\tau-1], Y^{(C)}[l-\tau:l-1]))$$

This only increases the mutual information by Lemma 31.

Useful identities of relaxed code

Corollary 7. *Adjusting $C$ so that $p_j^{(C)} = 0$ for $j < \tau$ and for any $i \in [t-\tau]$,*

$$p_{i+\tau}^{(C)} = w_i^{(C)} \tag{6.71}$$

*leads to at most $2(t-\tau)(\tau-1)$ extra symbols being sent.*

*Proof.* By Equation 6.21, for all $i \in [t], n_{C,i} \geq k_i$. For $i \in [t]$, we will adjust $n_{C,i}$ but maintain $n_{C,i} \geq k_i$. This ensures that the lossless-delay constraint is met under relaxation 4.

When a burst of length $b_0$ starts in $X^{(C)}[0]$, it is recovered by time slot $(\tau + b_0 - 1)$ then $S[0:\tau+b_0-1]$ are available by the same time slot $(\tau + b_0 - 1)$ by Lemma 33 and relaxation 4. In addition, $n_{C,l} \geq k_l$ for $l \in [b_0 - 1]$ by Equation 6.21, so a worst case burst drops at least $k_l \ell_l$ symbols of $X^{(C)}[l]$. We apply relaxations 1-5.

For $l \in [\tau-1]$ we move all but $k_l$ symbols of $X^{(C)}[l]$ to $X^{(C)}[\tau]$. If $X^{(C)}[\tau]$ is received, this move only improves loss recovery. If $X^{(C)}[\tau]$ is involved in a loss starting during time slot $\tau$, $S[0:\tau-1]$ are available, so the move does not harm loss recovery. If a burst starts in time slot $j \in \mathbb{B}$, then the move only improves loss recovery; if an extra symbol is lost in $X^{(C)}[\tau]$ due to rounding, this can only occur if (a) at least one extra symbol would have been lost in $X^{(C)}[j:\tau-1]$ anyway or (b) $\ell_\tau < \ell_j$, in which case moving more symbols of $X^{(C)}[\tau]$ reduces the number lost. Given relaxation 1, the change only improves loss recovery. If a burst starts in $X^{(C)}[0]$, the changes have only improved loss recovery because strictly more symbols are received; for $j \in [b_0]$, any $\ell_j k_j$ symbols that are lost could have been lost before and now additional symbols are received. This also updates $w_0^{(C)} = \ell_0 k_0$ but does not change $w_j^{(C)}$ for any $j > 0$.

For $z = 0, \ldots, b_0 - 1$, we move all but $(k_{z+\tau} + \ell_z k_z)$ symbols of $X^{(C)}[\tau + z]$ to $X^{(C)}[\tau + z + 1]$. If a burst starts during or before time slot $z$ then this does not change which symbols are received.[2] So loss recovery is unchanged for $S[0:z-1], S[z+1:z+b_z-1]$. By Relaxation 5, the worst-case-delay is satisfied for $S[z]$. If a burst starts during time slot $(z+1)$ then $S[z]$ is recovered before the burst. If $b_z = \tau$ then the change causes strictly more symbols to be received and otherwise the exact same symbols are received. Either way, loss recovery will

---

[2] Except for another burst that may perhaps start in time slot $(z + \tau + 1)$, but for that symbols sent before the burst are useless for loss recovery proceed unchanged for $S[z+1:z+b_0]$. If a burst starts strictly after time slot $(z+1)$ during time slot $l$, then by relaxations 1 and 2 all received symbols of $X^{(C)}[l:l+\tau-1]$, including the received symbols of $X^{(C)}[z+\tau:z+\tau+1]$, are maximally useful for loss recovery. The only way fewer symbols are available compared to before the change is if the burst starts by time slot $(z+\tau)$ and is of length at least 2 time slots and extra losses occur due to rounding for how many transmitted packets are lost in partial bursts. So we send two extra symbols in $X^{(C)}[r]$ for $r \in \{z+\tau+2,\ldots,z+2\tau\}$ so that each provides one symbol's worth of information about $S[r-\tau]$ under relaxation 5.

The changes may have increased $w_{b_0}^{(C)}$ but not its loss recovery (relaxation 5). They also have not increased $w_j^{(C)}$ for $j > b_0$.

We prove by induction that we can alter $C$ to obey Equation 6.71 at the cost of $2(\tau - 1)$ symbols per time slot; there is no cost for the final $(\tau+1)$ time slots where the frames are each of size 0.

Suppose for the inductive hypothesis that $$\forall j \in [i_*], p_{j+\tau}^{(C)} = w_j^{(C)} \tag{6.72}$$

and loss recovery for $S[0:i_*]$ within $\tau$ time slots is guaranteed. The inductive hypothesis has been shown to hold for $i_* = (b_0 - 1)$.

Now we apply induction for $i = (i_* + 1)$. We know by Lemma 30 that $p_{i+\tau}^{(C)} \geq w_i^{(C)}$ before we altered $C$. During earlier time slot $i' < i$, having moved symbols to $X^{(C)}[i'+\tau]$ could only decrease $w_i^{(C)}$. Only moving symbols from $X^{(C)}[i+\tau-1]$ to $X^{(C)}[i+\tau]$ may have increased $w_i^{(C)}$, but doing so would maintain the inequality $p_{i+\tau}^{(C)} \geq w_i^{(C)}$. Recall that by the IH $S[0:i-1]$ are still recovered by time slot $(i+\tau-1)$. We set $$w_i^{(C)} = \max_{Y^{(C)}[i+b_i-1] \in \mathcal{Y}_{i+b_i-1}} \left( H(S[i] \mid S[0:i-1], Y^{(C)}[i:i+b_i-1], X^{(C)}[i+b_i:i+\tau-1]) \right) \tag{6.73}$$

under the relaxations, which can only increase $w_i^{(C)}$, ensuring $S[0:i-1]$ are still recovered by time slot $(i+\tau-1)$. This involves letting $C$ potentially remove information about $S[i]$ from $X^{(C)}[i+1:i+\tau-1]$. We will show that loss recovery is still accomplished despite the change under the considered relaxations.

For any burst starting in time slot $j \in \mathbb{B}_i$ where $j < i$ the change only increases loss recovery capabilities of $S[j:i-1]$ by time slot $(i+\tau-1)$ under our relaxations, so they are still recovered by then. To show loss recovery for $S[i:j+b_j-1]$, it suffices to show loss recovery for the worst-case burst starting in time slot $i$, as $(j+b_j) \leq (i+b_i)$. Under such a burst, all received symbols of $Y^{(C)}[i:i+\tau-1]$ are maximally useful under relaxations 1 and 2. Recall that by "worst-case" we just mean "drops as many symbols as possible" due to relaxation 1. Before resetting $w_i^{(C)}$, $S[i]$ was recovered by time slot $(i+\tau)$ and $w_i^{(C)}$ symbols must have been recovered at time slot $(i+\tau)$, so $p_{i+\tau}^{(C)} \geq w_i^{(C)}$. After the change, all but $w_i^{(C)}$ symbols of $S[i]$ are recovered before time slot $(i+\tau)$. Then $S[i]$ is still recoverable by time slot $(i+\tau)$ by relaxation 5. Now we can condition on $S[0:i]$ being recovered. We want to show worst-case loss recovery for $S[i+1:i+b_i-1]$.

Before the change, for $l \in \{i, \ldots, i + b_i - 1\}$ $$\mathcal{I}(S[i:l]; Y^{(C)}[i:i+b_i-1], X^{(C)}[i+b_i:l+\tau] \| S[0:i-1]) = \sum_{r=i}^{l} k_r$$

due to loss recovery under the IH. Recall $$\mathcal{I}(S[i:l]; Y^{(C)}[i:i+b_i-1], X^{(C)}[i+b_i:l+\tau] \| S[0:i-1]) = \quad (6.74)$$
$$\mathcal{I}(S[i]; Y^{(C)}[i:i+b_i-1], X^{(C)}[i+b_i:i+\tau] \| S[0:i-1]) + \quad (6.75)$$
$$\mathcal{I}(S[i+1:l]; Y^{(C)}[i+1:i+b_i-1], X^{(C)}[i+b_i:l+\tau] \| S[0:i]) \quad (6.76)$$

where we have already shown Equation 6.75 remains $k_i$ after the change.

Based on Equation 6.73 and Lemma 31 and under the relaxations, $$\mathcal{I}(S[i+1:l]; Y^{(C)}[i+1:i+b_i-1], X^{(C)}[i+b_i:i+\tau-1] \| S[0:i])$$

is not decreased (i.e., removing information about $S[i]$ from $Y^{(C)}[i+1:i+\tau-1]$ does not reduce the above expression). Both before and after the change, $X^{(C)}[i+\tau]$ provided $w_i^{(C)}$ symbols worth of information about $S[i]$. The change does not effect $$\mathcal{I}(S[i+1:l]; X^{(C)}[i+\tau:l+\tau:i+b_i-1] \| S[0:i])$$

So there is still enough information to ensure $Y^{(C)}[i+1:i+b_i-1]$ are recoverable. So loss recovery for $S[i+1:i+b_i-1]$ by their deadlines is still satisfied for this burst; For any burst starting in time slot $j > i$, loss recovery for $S[j:j+b_j-1]$ is similarly not affected.

Let $\delta_i = (p_{i+\tau}^{(C)} - w_i^{(C)})$ We now move $\delta$ symbols from $X^{(C)}[i+\tau]$ to $X^{(C)}[i+\tau+1]$, which increases $p_{i+\tau+1}^{(C)}$ by $\delta$ and decreases $p_{i+\tau}^{(C)}$ by $\delta$.[3]

Loss recovery for $S[0:i-1]$ is the same because the changes occur after the deadline of $(i-1+\tau)$. Before the change by Equation 6.73 for any $j \in \mathbb{B}$, and $Y^{(C)}[j:j+b_j-1] \in \mathcal{Y}_{j,j+b_j-1}$, $\mathcal{H}(S[i] \| Y^{(C)}[j:i+\tau-1], S[0:j-1]) \leq w_i^{(C)}$. After the change, the $p_{i+\tau}^{(C)} = w_i^{(C)}$ symbols of $X^{(C)}[i+\tau]$ are still available to be used to recover $S[i]$. So $S[i]$ is recovered by time slot $(i+\tau)$ (relaxation 5).

For $j = (i+1)$, the total amount of information available to recover $S[j]$ by time slot $(j+\tau)$ from received symbols has perhaps increased but not decreased from our alterations to $C$. It is possible that $w_j^{(C)}$ has increased as a result; however, the at most $\delta$ symbols of $X^{(C)}[i+\tau]$ that would have been used to recover $S[j]$ are now available in $X^{(C)}[j+\tau]$ to recover $S[j]$. So $S[j]$ is still recovered within $\tau$ time slots, and $p_{j+\tau}^{(C)} \geq w_j^{(C)}$.

For a burst starting in $j \in \mathbb{B}_i \cup \{i+1\}$, or any other burst that ends during or before $(i+\tau)$, the total number of symbols received over $X^{(C)}[i+\tau:i+\tau+1]$ is not reduced, so loss recovery of $S[i+1:j+b_j-1]$ is not negatively impacted. Either $X^{(C)}[i+\tau:i+\tau+1]$ are received (no change) or the information about lost packets is not lowered by the relaxations. For a burst

---

[3] We do not move the extra symbols we sent due to rounding issues (if we needed to move these to move $\delta$ symbols, then these symbols were never needed and are simply not sent).

starting during or after $(i + \tau + 1)$, the symbols of $X[i + \tau]$ would not be used anyway because $S[0 : i + \tau]$ are available. For bursts that include $X[i + \tau : i + \tau + 1]$—therefore, starting no sooner than $X[i + 2]$ and also ensuring relaxation 1 applies—up to 2 extra symbols may be lost due to a rounding issue of $\lceil \ell_l n_{C,l} \rceil$ symbols being lost in $X[l]$ for $l \in \{i + 2, i + \tau + 1\}$. This can be mitigated by sending two extra symbols in $X[r + \tau]$ for $r \in \{i + 2, \ldots, i + \tau\}$ that is used to recover $S[r]$ (relaxation 5) and increasing $w_r^{(C)}$ by two (up to a max of $k_r$), in other words, all information about up to two symbols of $S[r]$ are removed from the transmission, $C$ pretends $k_r$ was two symbols smaller, and the extra two symbols are sent via replication.

Iterating over $i_* = k_0, \ldots, (t - \tau - 1)$, we add at most $2(\tau - 1)$ symbols for each value of $i_*$.

Finally, we note how the proof changes without the condition on feedback. For each $i \in [t - \tau]$ where $\ell_{i+\tau} < \ell_{i+\tau+1}$, the number of extra symbols sent associated with step $i$ will increase by up to $(\ell_{i+\tau+1} - \ell_{i+\tau})$ times the number of parity symbols moved from $X^{(C)}[i + \tau]$ to $X^{(C)}[i + \tau + 1]$. Consider a relaxed code, $C$, that was originally rate optimal. If more than $\sum_{j=i+1}^{i+\tau} k_j \ell_j$ parity symbols are moved, instead they can be deleted, and for $j \in \{i + 1, \ldots, i + \tau\}$, $w_j^{(C)}$ could be set to $\ell_j k_j$ and an extra $w_j^{(C)}$ parity symbols be sent in $X^{(C)}[j + \tau]$. Thus, the number of symbols moved during time slot $i$ is at most $\sum_{j=i+1}^{i+\tau} k_j \ell_j$, so the increase during iteration $i$ is at most $$(\ell_{i+\tau+1} - \ell_{i+\tau}) \sum_{j=i+1}^{i+\tau} k_j \ell_j$$

□

Corollary 8. *For any $i \in [t - \tau]$, any $j \in \mathbb{B}_i$, and any construction $C$ adjusted under Corollary 7*

$$\min_{Y^{(C)}[j:j+k_j-1] \in \mathcal{Y}_{j,j+k_j-1}} \left( \mathcal{I}(S[j:i]; Y^{(C)}[j:j+\tau-1] \mid S[0:j-1]) \right) = \sum_{l=j}^{i} k_l - w_j^{(C)}.$$

*Proof.* Follows from Lemma 32, Lemma 33, Corollary 7, and Equation 6.32. □

Finishing the proof with no resets

Let $C$ be an offline rate-optimal construction under the relaxations of Appendix 6.8.4. Recall that without loss of generality, for all $i \in [t - \tau]$ then $w_i^{(C)} = p_{i,i}^{(C)}$ by Corollary 7. This causes $C$ to send an extra at most $2(t - \tau)(\tau - 1)$ symbols compared to a rate-optimal code.

We will show that $C$ satisfies the constraints where $p_{i,j}^{(IP)} = w_i^{(C)}$ for all $i \in [t - \tau]$. So the objective function is at most the number of symbols sent by $C$; this in turn is at most $$2(t - \tau)(\tau + 1)$$

more than a rate-optimal code. Essentially, we show that Constraint 4 is analogous to the worst-case-delay constraint for a burst starting in time slot $i \in [t - \tau]$ where (a) for $j \in \{i, \ldots, i + k_i - 1\}$, $w_i^{(C)}$ symbols of $S[j]$ are recovered during time slot $(j + \tau)$, (b) $d_{i,j}$ reflects the number of useful symbols of $Y^{(C)}[j]$ for recovering the remaining symbols of $S[i:j]$ not recovered in (a), and (c) for all $l \in \{i+b_i, \ldots, i+\tau-1\}$, at most $p_l^{(IP)}$ symbols of $X^{(C)}[l]$ are useful for recovering the remaining symbols of $S[i:i+b_i-1]$ not recovered in (a). Ultimately, because prove $C$ satisfies the constraints, the value of the objective function of the algorithm is smaller than the number of symbols sent by $C$ which is at most $$2(t-\tau)(\tau+1)$$

more than the that of a rate-optimal offline code.

We begin by noting that Constraint 1 holds by the proof of Corollary 7. By definition, $w_i^{(C)} \leq \ell_i k_i$, so Constraint 5 is satisfied. Also, Constraint 2 holds by Equation 6.33 and Equation 6.21.

By Corollary 8, for any burst starting in $i \in [t-\tau]$ and $j \in \{i, \ldots, i+b_i-1\}$ $$\min_{Y^{(C)}[i:i+b_i-1] \in \mathcal{Y}_{i:i+b_i-1}} \left(\mathcal{I}(S[i:j]; \right.$$
$$\left. Y^{(C)}[i:i+\tau-1] | S[0:i-1])\right) = \sum_{l=i}^{j} k_l - w_l^{(C)}. \quad (6.77)$$

Consequently, $$\mathcal{I}(S[i:i+b_i-1]; Y^{(C)}[i:i+\tau-1] | S[0:i-1]) = \quad (6.78)$$
$$\mathcal{I}(S[i:i+b_i-1]; Y^{(C)}[i:i+b_i-1] | S[0:i-1]) +$$
$$\mathcal{I}(S[i:i+b_i-1]; Y^{(C)}[i+b_i:i+\tau-1] | \quad (6.79)$$
$$S[0:i-1], Y^{(C)}[i:i+b_i-1]) \leq$$
$$\sum_{l=i}^{i+b_i-1} \min\left((1-\ell_l)(p_l^{(IP)}+k_l), k_l - w_l^{(C)} + \sum_{r=i}^{l-1} k_r - w_r^{(C)} -\right.$$
$$\mathcal{I}(S[i:r]; Y^{(C)}[r] | S[0:i-1], Y^{(C)}[i:r-1]) +$$
$$\sum_{l=i+b_i}^{i+\tau} \min\left(p_l^{(C)}, \sum_{r=i}^{j} k_r - w_r^{(C)} - \sum_{r=i}^{l-1} \right. \quad (6.80)$$
$$\mathcal{I}(S[i:j]; Y^{(C)}[r] | S[0:i-1], Y^{(C)}[i:r-1])) \leq$$
$$\sum_{l=i}^{i+b_i-1} \min\left((1-\ell_l)(p_l^{(IP)}+k_l), k_l - w_l^{(C)} + \sum_{r=i}^{l-1} k_r - w_r^{(C)} -\right.$$
$$\mathcal{I}(S[i:r]; Y^{(C)}[r] | S[0:i-1], Y^{(C)}[i:r-1]) + \quad (6.81)$$
$$+ \sum_{l=i+b_i}^{i+\tau} p_l^{(C)}$$

where Equation 6.79 follows from the chain rule for MI; Equations 6.80 follows from relaxations 1 and 2 as well as Lemma 31 and Corollary 7; Equation 6.81 follows from the definition of the minimum function.

Therefore, by Equation 6.77, for any $i \in [t-\tau], j \in \{i, \ldots, i+k_i-1\}$ Constraints 3 and 4 are satisfied.

By the minimization of Algorithm 4, the values for $p_i^{(IP)}$ lead to $$\sum_{i=0}^{t-\tau} w_{i+\tau}^{(O)} \geq \sum_{i=0}^{t} p_{i+\tau}^{(IP)}$$

where the number of symbols sent by a rate-optimal code is by Corollary 7 is at most $$-2(t-\tau)(\tau-1) + \sum_{i=0}^{t-\tau} w_{i+\tau}^{(O)} \geq -2(t-\tau)(\tau-1) + \sum_{i=0}^{t} p_{i+\tau}^{(IP)}.$$

Extending to resets

At a high level, we prove the result by induction on the number of resets. The base case of no resets has already been shown. If the first reset occurs in time slot $r$, we show that the objective function is only $2(r)(\tau-1)$ more than the number of symbols sent under a rate optimal code by time slot $r$. We then apply the inductive hypothesis to prove closeness to optimality for the rest of the transmission.

We prove by induction on $\zeta = \sum_{j=0}^{t} \zeta_j$. The base case of $\zeta = 0$ has already been proven.

For the inductive step, we prove the result for $\zeta$ assuming that it is been proven for all $j \in \{0, \ldots, \zeta-1\}$. Let $r$ be the smallest value so that $\zeta_r = 1$. If $r < \tau$ then only the lossless-delay constraint is imposed for $S[0 : r-1]$ so $\sum_{i=0}^{r-1} k_i$ symbols are sent and no parity need to be sent. Otherwise, $S[r-\tau : r-1]$ need not be recovered under lossy conditions. By considering $k_{r-\tau}, \ldots, k_{r-1}$ to all be 0, the output of the algorithm through time slot $(r-1)$ can be viewed as how many parity symbols to send per time slot for a code that sends at most $2r(\tau-1)$ more symbols than a rate-optimal code for the transmission of $S[0 : r-1]$ after appending $(\tau+1)$ time slots with size 0 frames. Then an extra $\sum_{i=r-\tau}^{r-1} k_i$ symbols must also be sent under $C$ for the lossless-delay constraint (as with the offline code).

Either way, for time slot $r$ and above, we can view Algorithm 4 as being applied a second time on the remainder of the transmission given $p_l^{(IP)} = 0$ for $l \in \{r, \ldots, r+\tau-1\}$ and the worst-case-delay is not imposed for $S[r - \min(r, \tau) : r-1]$. Then $\sum_{j=r}^{t} \zeta_j = (\zeta-1)$, so the correctness of Algorithm 4 holds by the inductive hypothesis. We note at most $(2r(\tau-1) + 2(t-r-\tau)(\tau-1)) = 2(t-\tau)(\tau-1)$ extra symbols are sent overall compared to a rate-optimal offline code.

6.8.5 Proof of Theorem 9

At a high level, the constraints of the algorithm ensure that Equation 6.3 is satisfied. For $i \in [t-\tau]$, the sizes of $u_i$ and $p_{i+\tau}$ are then slightly increased to ensure they are divisible by $q_i$ and $h_{i+\tau}$ respectively, leading to the slightly lower rate than the upper bound from Lemma 22.

Equation 6.3 need only be satisfied with the correct values of $u_i$ and $k_i$ in it and Equation 6.2 (due to the structure of the proof of Theorem 8). By the minimization and Constraints 3, 4 and Equations 6.2 (and $u_i = k_i$ if $\sum_{j=i+1}^{i+\tau} \zeta_j > 0$), Equation 6.3 is always satisfied. Thus, the construction's requirements are met.

For $j \in [t-\tau]$, if $\sum_{j'=j+1}^{t-\tau} \zeta_{j'} > 0$ then $p_{j+\tau} = 0$ (by the "resets" case of the construction); also, $u_i = k_i$, so failing to decode $S[i]$ will not hinder using parity symbols for recovering earlier frames. Recall for any $u_j^{(LP)}$ that increasing $u_j^{(LP)} = p_{j+\tau}^{(LP)}$ to a quantity no more than $\ell_j k_j$ retains satisfaction of all constraints of the LP. So increasing $u_i$ from $p_{i+\tau}^{(LP)}$ for $i \in [t-\tau]$ (to ensure $q_i|u_i$) and likewise increasing $p_{i+\tau}$ (i.e., $p_{i+\tau}^{(LP)}$) is still a valid solution to the LP. Increasing $p_{i+\tau}$ (similarly $p_{i+\tau}^{(LP)}$) to be divisible by $h_{i+\tau}$ for $i \in [t-\tau]$ likewise retains the satisfaction of all constraints (with Constraint 5 removed). After these changes to the values of $p_j^{(LP)}$, $(\tau, t, K, Z, \mathcal{L}, B, W)$-Split Code is fully specified and sends $\sum_{i=0}^{t-\tau} h_i + p_{t+\tau}^{(LP)}$. The total increase in $\sum_{i=0}^{t-\tau} p_{i+\tau}^{(LP)}$ due to the change is at most $\sum_{i=0}^{t-\tau} \mathbb{1}[p_{i+\tau}^{(LP)} \neq 0](q_i + h_{i+\tau} - 2)$.

We know the rate is $$\left(\sum_{i=0}^{t} k_i\right) / \left(2(t-\tau)(\tau-1) + \sum_{i=0}^{t-\tau} k_i + w_t + q_t + h_{t+\tau} - 2\right).$$

It also sends at most $$e = 2(t-\tau)(\tau-1) + \sum_{i=0}^{t-\tau} k_i + w_t + q_t + h_{t+\tau} - 2$$

more symbols than a rate-optimal code.

Let us label the number of symbols sent as $N$, so the rate is $(\sum_{i=0}^{t} k_i)/N$. Then the optimal rate is at most $(\sum_{i=0}^{t} k_i)/(N-e)$ where $(N-e) \geq \sum_{i=0}^{t} k_i$.

The difference to the optimal rate is at most $$\left(\sum_{i=0}^{t} k_i\right)/(N-e) - \left(\sum_{i=0}^{t} k_i\right)/N \leq$$

$$\left(e \sum_{i=0}^{t} k_i\right)/(N(N-e)) \leq$$

$$e / \left(\sum_{i=0}^{t} k_i\right).$$

6.8.6 Proof of Lemma 24

Suppose Algorithm $4(\tau, t, K, \mathcal{L})$ outputs $\langle p_i^{(LP)} | i \in [t-\tau] \rangle$. Recall from Lemma 22 that the offline optimal rate is at most $$\sum_{i=0}^{t-\tau} k_i / \left(-2(t-\tau)(\tau-1) + \sum_{i=0}^{t-\tau} k_i + p_t^{(LP)}\right)$$

We will adjust the values of the $p_i^{(LP)}$ to be $p_i^{(LP,1)} = p_i$ while maintaining satisfaction of all constraints and show $$\sum_{i=0}^{t-\tau} p_i - p_i^{(LP)} \leq (t - \tau + 1).$$

We start by setting $p_i^{(IP,1)} = p_i^{(IP)}$ for $i \in [t]$.

We prove the result by induction on $i$. We start with the base case. For $i \in [\tau - 1]$, $p_i = p_i^{(IP,1)} = p_i^{(IP)} = 0$ by Constraint 1. Due to Constraint 4, $p_\tau^{(IP)} = p_\tau^{(IP,1)} = p_\tau = \ell_0 k_0$.

For the inductive hypothesis, we assume that for some $i_* \geq \tau$ for all $i \in [i_*]$ that $p_i^{(IP,1)} = p_i$, all constraints are satisfied (when applying $p^{(IP,1)}$ instead of $p^{(IP)}$), and $$\sum_{i=0}^{i_*} p_i - p_i^{(IP)} \leq (i_* + 1).$$

For the inductive step, we consider $l = (i_* + 1)$.

Case $p_l \leq p_l^{(IP,1)}$. Then let $\delta = p_l^{(IP,1)} - p_l$. We set $p_l^{(IP,1)} = p_l$ and increase $p_{l+1}^{(IP,1)}$ by $\delta$. By Lemma 23, the constraints are clearly still satisfied for a burst starting in time slot $(l - \tau)$. For a burst starting in time slot $(l - \tau + 1), \ldots, l - 1$, the same number of parity symbols are received, so all constraints remain satisfied. For a loss in time slot $l$, the constraints are satisfied because more parity symbols are available. For a burst starting after time slot $l$, the change cannot hurt the satisfaction of the constraints, as parity symbols sent in time slot $l$ would not be useful. In this case, $\sum_{j=0}^{l+1} p_j^{(IP,1)}$ did not change.

Case $p_l > p_l^{(IP,1)}$. By Equation 6.11, $p_r^{(IP,1)} = p_r$ for $r \in \{l - \tau, \ldots, l - 1\}$, and satisfaction of Constraint 4 (for $p_l^{(IP,1)}$), it must be that $|p_l - p_l^{(IP,1)}| < 1$. The discrepancy comes from taking a ceiling in Equation 6.11. Therefore, it suffices to increase $p_l^{(IP,1)}$ by $(p_l - p_l^{(IP,1)}) \leq 1$. After the change, all constraints are satisfied, $p_l^{(IP,1)} = p_l$, and $$\sum_{i=0}^{l} p_i - p_i^{(IP)} \leq (l + 1).$$

6.8.7 Proof of Lemma 26

Let us define $U[i]$, and $V[i]$, for $C$ according to Section 6.2. We define the number of parity symbols as $p_i^{(C)}$ and the parity symbols as $P^{(C)}[i]$ where $w_i^{(C)} = p_{i+\tau}^{(C)}$ under $C$.

Recall that $h_0 = \tau$. By definition of the Regime $h_r$-Code and $C$, for $i \in [\tau - 1]$, $p_i = p_i^{(C)} = 0$. For $i \in \{\tau, \ldots, 2\tau - 1\}$, $p_i = p_i^{(C)} = \ell_{i-\tau} k_{i-\tau}$.

Let us assume that $p_i = p_i^{(C)}$ for all $i \in [i_* - 1]$ for some $i_* \geq 2\tau$. Now we consider $i_*$.

Under $C$, by Equation 6.2 (burst ending in $i_*$) and Equation 6.3, $\ell_{i_*}(k_{i_*} - w_{i_*}^{(C)}) \leq \ell_{i_*} p_{i_*}^{(C)}$. Therefore, for any burst starting in time slot $j \in \mathbb{B}_{i_*}$, for any $l \in \{j, \ldots, j + \tau - 1\}$ we know $P^{(C)}[j]$ is used to recover all missing symbols of $V[j]$.

Suppose $p_{i_*} < p_{i_*}^{(C)}$. Let $\delta = (p_{i_*}^{(C)} - p_{i_*})$. We reset $w_{i_*}^{(C)}$ to equal $p_{i_*}/\ell_{i_*-\tau}$. We reduce $p_{i_*}^{(C)}$ by $\delta$ to equal $p_{i_*}$. By Equation 6.14, $(\ell_{i_*-\tau} k_{i_*-\tau} - p_{i_*}) \leq \ell_{i_*-\tau} p_{i_*}^{(C)}$. Therefore, enough parity symbols of $X^{(C)}[i_* - \tau]$ are received to recover $V[i_* - \tau]$. We must increase $w_{i_*}^{(C)}$ to be divisible by $q_{i_*-\tau}$ (so that $U[i_* - \tau]$ has $w_{i_*}^{(C)}/\ell_{i_*-\tau}$ symbols). This causes $p_{i_*}^{(C)}$ to be increased by up to $(q_{i_*-\tau} - 1)$ symbols. We then pad $p_{i_*}^{(C)}$ with up to $(h_{i_*} - 1)$ symbols to be divisible by $h_{i_*}$. The total number of extra symbols sent is at most $(q_{i_*-\tau} + h_{i_*} - 2)$.

After the changes, $V[i_x - \tau]$ is still recoverable with the received symbols of $P^{(C)}[i_x - \tau]$. Therefore, loss recovery for $S[0 : i_x - \tau - 1]$ is unchanged. Adjusting the size of $U[i_x - \tau]$ does not effect loss recovery for $V[i_x - \tau + 1 : i_x - 1]$ because of $V[i_x - \tau]$ still being recovered, $U[i_x - \tau]$ being independent of the symbols of $P^{(C)}[i_x - \tau + 1 : i_x - 1]$, and $V[j]$ being recovered in $P^{(C)}[j]$ for $j \in \{i_x - \tau + 1, \ldots, i_x - 1\}$. Then $U[i_x - \tau]$ is recoverable using $P^{(C)}[i_x]$. In addition, $P^{(C)}[i_x]$ is independent of the symbols of $U[i_x - \tau + 1 : i_x]$, so loss recovery for these quantities is unaffected. The change ensures that the size of $V[i_x]$ is at most $p_{i_x}^{(C)}$, so $V[i_x]$ is recoverable using the received symbols of $Y^{(C)}[i_x]$ for any burst where $X^{(C)}[i_x]$ experiences loss. For any burst where $X^{(C)}[i_x]$ experiences loss for $j \in \{i_x + 1, \ldots, i_x + \tau - 1\}$, $V[j]$ can still be recovered with the received symbols of $Y^{(C)}[j]$. Then $U[i_x]$ is recovered with $P[i_x + \tau]$, and $U[j]$ is recovered with $P[j + \tau]$ for $j \in \{i_x + 1, \ldots, i_x + \tau - 1\}$. Therefore, after the change, the lossless-delay and worst-case-delay constraints are still met. At most $(q_{i_x} + h_{i_x + \tau} - 1)$ extra symbols were sent.

Suppose $p_{i_x} = p_{i_x}^{(C)}$. No change is needed, and we move on to $(i_x + 1)$.

Suppose $p_{i_x} > p_{i_x}^{(C)}$. This case cannot occur. Recall that the changes from earlier time slots only increased $p_{i_x}^{(C)}$. Recall $n_{i_x - \tau} = n_{C, i_x - \tau}$. All but $w_{i_x - \tau}^{(C)} = u_{i_x - \tau} \ell_{i_x - \tau}$ symbols of $S[i_x - \tau]$ are recovered during time slot $(i_x - \tau)$. In order to have $p_{i_x}^{(C)} < p_{i_x}$, this means that $w_{i_x - \tau}^{(C)} < p_{i_x}'$ by Equation 6.15. But by Equation 6.14, only $n_{i_x - \tau}(1 - \ell_{i_x - \tau}) < k_{i_x - \tau} - w_{i_x}^{(C)}$ symbols were received during time slot $(i_x - \tau)$, which is a contradiction.

Applying the change over all time slots leads to an extra $\sum_{i=0}^{t-1}(q_i + h_{i+\tau} - 2)$ extra symbols being sent. The resulting scheme, $C$, sends the same number of symbols as the Regime $b_x$-Code after the change. This concludes the result.

6.8.8 Proof of Theorem 10

Let $b_i$ be fixed as $b$ for all $i \in [t]$. Let $\ell_i \in \ell$ be fixed as $\ell = q/h \in (0,1)$ for $i \in [t - \tau]$. Recall that $\tau > b \geq 2$. Let $\zeta_i = 0$ for all $i \in [t]$. Let $d$ be an arbitrary positive integer where $h^2(2h - q)|d$. We consider two frame-size sequences:

1. $k_0^{(1)} = k_1^{(1)} = d, k_2^{(1)} = 2d(1 - \ell), k_{\tau+1}^{(1)} = d(1 - \ell), k_{2\tau+1}^{(1)} = d(1 - \ell)$, and for all $j \in \{2, \ldots, \tau - 1, \tau + 2, \ldots, 2\tau, 2\tau + 2, \ldots, t\}$ $k_j^{(1)} = 0$.

2. $k_0^{(2)} = k_1^{(2)} = d, k_2^{(2)} = 2d(1 - \ell), k_{\tau+1}^{(2)} = d(1 - \ell), k_{\tau+b}^{(2)} = d(1 - \ell)$, and for all $j \in \{2, \ldots, \tau - 1, \tau + 2, \ldots, \tau + b - 1, \tau + b + 1, \ldots, t\}$ $k_j^{(2)} = 0$.

For large $d$, the proof extends to frame-size sequences where the frames' sizes approximately equal the ones above. It also applies to longer frame-size sequences that contain the above frame-size sequences (or approximations of them).

Let code construction, $C$, be any offline rate-optimal construction that satisfies the lossless-delay and worst-case-delay constraints and $w_i^{(C)} = p_{i+\tau}^{(C)}$ for all $i$.[3] Suppose $C$ sends $X^{(C)}[i]$ during time slot $i \in [t]$, where $X^{(C)}[i]$ comprises $n_{C,i}$ symbols and $(\alpha_{C,i} + 1)$ transmitted packets.

---

[3]The construction may be slightly below rate optimal to put in the form $w_i^{(C)} = p_{i+\tau}^{(C)}$. By Theorem 9, it sends at most $2(t - \tau)(\tau - 1) + \sum_{i=0}^{t-1}(q_i + h_{i+\tau} - 2))$ more symbols than a rate optimal code. This will have a negligible effect on the rate for sufficiently large $d$.

Let us define $w_i^{(C)}$ and $p_i^{(C)}$ as in Equations 6.32 and 6.33.

We begin by proving several results towards proving the converses. We will include a few relaxations that can only increase the rate when proving the converse.

For either frame-size sequence $$w_0^{(C)} = w_1^{(C)} = \ell d = p_\tau^{(C)} = p_{\tau+1}^{(C)} \tag{6.82}$$

$$\forall i \in [\tau] \cup \{2 + \tau, \ldots, 2\tau - 1\}, p_i^{(C)} = 0 \tag{6.83}$$

In addition, $w_\tau^{(C)} \leq d(1 - \ell)\ell$ without loss of generality because we use relaxation $$\mathcal{I}(S[\tau]; Y^{(C)}[\tau] | S[0:1]) = n_{C,\tau}(1 - \ell)$$

(i.e., all parity symbols of $X[\tau]$ that are received are useful). Also, $S[0:1]$ are received if $X[\tau]$ is involved in the burst. So we take the relaxation that $$\mathcal{I}(S[\tau:\tau+1]; Y^{(C)}[\tau:\tau+1] | S[0:1]) = (n_{C,\tau} + n_{C,\tau+1})(1 - \ell).$$

As such, $$w_\tau^{(C)} + w_{\tau+1}^{(C)} = 3d(1 - \ell)\ell - d(1 - \ell)\ell = d(1 - \ell)\ell \tag{6.84}$$

(i.e., of the $3d(1-\ell)\ell$ lost frame symbols of $S[\tau:\tau+1]$, $2d(1-\ell)\ell$ are recovered using the received parity symbols of $X^{(C)}[\tau:\tau+1]$). By Corollary 7 for any $i \in \{\tau+2,\ldots,2\tau-1\}$ either $n_{C,i} = 0$ or if it is the second frame-size sequence $n_{C,\tau+b} = k_{\tau+b} > 0$. For the second frame-size sequence $$n_{C,\tau+b} \geq$$
$$\mathcal{I}(S[\tau:\tau+1], S[\tau+b]; X^{(C)}[\tau+b] | S[0:\tau-1]) =$$
$$\mathcal{I}(S[\tau:\tau+1]; X^{(C)}[\tau+b] | S[0:\tau-1]) +$$
$$\mathcal{I}(S[\tau+b]; X^{(C)}[\tau+b] | S[0:\tau+1]) =$$
$$\mathcal{I}(S[\tau:\tau+1]; X^{(C)}[\tau+b] | S[0:\tau-1]) +$$
$$k_{\tau+b}$$

Therefore, $$\mathcal{I}(S[\tau:\tau+1]; X^{(C)}[\tau+b] | S[0:\tau-1]) = 0.$$

Also, $$n_{C,2\tau} = w_\tau^{(C)} \geq$$
$$\mathcal{I}(S[\tau:\tau+1]; X^{(C)}[2\tau] | S[0:\tau-1], Y^{(C)}[\tau:2\tau-1]) =$$
$$\mathcal{I}(S[\tau]; X^{(C)}[2\tau] | S[0:\tau-1], Y^{(C)}[\tau:2\tau-1]) +$$
$$\mathcal{I}(S[\tau+1]; X^{(C)}[2\tau] | S[0:\tau], Y^{(C)}[\tau:2\tau-1]) =$$
$$w_\tau^{(C)} + \mathcal{I}(S[\tau+1]; X^{(C)}[2\tau] | S[0:\tau], Y^{(C)}[\tau:2\tau-1])$$

Therefore, $\mathcal{I}(S[\tau+1]; X^{(C)}[2\tau]|S[0:\tau], Y^{(C)}[\tau:2\tau-1]) = 0$. For $j \in \{0,1\}$ no information about $S[\tau+j]$ is available after $X^{(C)}[\tau+1]$ until $X^{(C)}[2\tau+j]$. Therefore, without loss of generality $$(w_\tau^{(C)} + w_{\tau+1}^{(C)}) = d(1-\ell)\ell. \tag{6.85}$$

By the Equations 6.82 and 6.83 $n_{C,0} = n_{C,1} = d$ and $p_\tau^{(C)} = p_{\tau+1}^{(C)} = d\ell$. By Equation 6.21 and Lemma 33, for a burst starting in $X[0]$, $\mathcal{H}(S[0:1], S[\tau:\tau+1]|Y^{(C)}[0:1], X[\tau:\tau+1]) = 0$ so for $i \in \{\tau, \tau+1\}$, at least $(k_i + d\ell)$ symbols are sent in $X[i]$. Thus, $$d(2 + 3(1-\ell) + 2\ell) \tag{6.86}$$

symbols are sent by time slot $(\tau+1)$. And the total number of frame symbols is $$K' = 2d(1 + 2(1-\ell)). \tag{6.87}$$

Offline scheme for frame-size sequence 1. Select $$w_0 = d\ell$$
$$w_1 = d\ell$$
$$w_\tau = 0$$
$$w_{\tau+1} = d(1-\ell)\ell$$
$$w_{2\tau+1} = d(1-\ell)\ell - d(1-\ell)^2\ell = d(1-\ell)\ell^2.$$

The total number of parity symbols sent is $$2d\ell + d(1-\ell)\ell + d(1-\ell)\ell^2.$$

We apply $(\tau, t, K, Z, \mathcal{L}, B, W)$-Split Code. The lossless-delay constraint is clearly satisfied. Next, we show the worst-case-delay constraint is met. For any burst starting in $i \in \{0,1\}$, $(i+b-1) \leq b < \tau$, so $X[\tau]$ and $X[\tau+1]$ are received. Thus, $S[0:1]$ are recovered. Since $X[2:\tau-1]$ are empty, we need not consider another burst until one that starts in $X[\tau]$. For a burst in $X[\tau]$, $2d(1-\ell)\ell$ symbols of $S[\tau]$ are lost, $d\ell(1-\ell)$ parity symbols are received in each of $X[\tau]$ and $X[\tau+1]$, and $w[\tau+1] = k_{\tau+1}$, so $X[\tau]$ is recovered by time slot $(\tau+1)$. For a burst starting in $X[\tau]$ or $X[\tau+1]$, the $d(1-\ell)\ell$ parity symbols of $X[2\tau+1]$ recover $S[\tau+1]$. So $S[\tau:\tau+1]$ are recovered in time. Finally, for any $i \in \mathbb{B}_{2\tau+1}$, $d(1-\ell)^2\ell$ missing symbols of $S[2\tau+1]$ are recovered using the $d(1-\ell)^2\ell$ received parity symbols of $X[2\tau+1]$. The remainder are recovered using $X[3\tau+1]$. In total,

Converse for frame-size sequence 1. Recall that $(p_\tau^{(C)} + p_{\tau+1}^{(C)}) = 2d\ell$ and $(p_{2\tau}^{(C)} + p_{2\tau+1}^{(C)}) \geq d(1-\ell)\ell$. By Corollary 7, $n_{C,2\tau} = w_\tau^{(C)}$ and $n_{C,2\tau+1} = w_{\tau+1}^{(C)} + d(1-\ell)$. At least $(d(1-\ell)\ell - w_{\tau+1}^{(C)}(1-\ell))$ parity symbols are sent in $X[3\tau+1]$. Therefore, the total number of symbols sent is at least $$K' + 2d\ell + d(1-\ell) + d(1-\ell)\ell - w_{\tau+1}^{(C)}(1-\ell) =$$
$$K' + 2d\ell + d(1-\ell) + d(1-\ell)\ell^2 + w_\tau^{(C)}(1-\ell).$$

149

Converse for frame-size sequence 2. By Corollary 7, $n_{C,2\tau} = w_\tau^{(C)}$ and $n_{C,2\tau+1} = w_{\tau+1}^{(C)}$. By definition of $w_{\tau+1}^{(C)}$ there is a burst starting in time slot $(\tau+1)$ so that $$\mathcal{H}(S[\tau+1] | S[0:\tau], Y^{(C)}[\tau+1:\tau+b],$$
$$X^{(C)}[\tau+b+1:2\tau]) = w_{\tau+1}^{(C)} = \qquad (6.88)$$
$$\mathcal{H}(S[\tau+1] | S[0:\tau], Y^{(C)}[\tau+1], Y^{(C)}[\tau+b], X^{(C)}[2\tau])$$

since for $j \in \{i+\tau+2, \ldots, i+\tau+b-1, i+\tau+b+1, \ldots, i+2\tau-1\}$, $n_{C,j} = 0$. Combining Equation 6.88, Lemma 33, and the definition of Mutual Information shows $$w_{\tau+1}^{(C)} = n_{C,2\tau+1} \geq$$
$$\mathcal{I}(S[\tau+1]; X^{(C)}[2\tau+1] |$$
$$S[0:\tau], Y^{(C)}[\tau+1:\tau+b], X^{(C)}[\tau+b+1:2\tau]) = \qquad (6.89)$$
$$\mathcal{I}(S[\tau+1]; X^{(C)}[2\tau+1] |$$
$$S[0:\tau], Y^{(C)}[\tau+1], Y^{(C)}[\tau+b], X^{(C)}[2\tau]).$$

Also, by the fact that $n_{C,j} = 0$ $j \in \{i+\tau+2, \ldots, i+\tau+b-1, i+\tau+b+1, \ldots, i+2\tau-1\}$, $$w_{\tau+1}^{(C)} = n_{C,2\tau+1} \geq$$
$$\mathcal{I}(S[\tau+1], S[\tau+b]; X^{(C)}[2\tau+1] |$$
$$S[0:\tau], Y^{(C)}[\tau+1:\tau+b], X^{(C)}[\tau+b+1:2\tau]) =$$
$$\mathcal{I}(S[\tau+1], S[\tau+b]; X^{(C)}[2\tau+1] |$$
$$S[0:\tau], Y^{(C)}[\tau+1], Y^{(C)}[\tau+b], X^{(C)}[2\tau]) = \qquad (6.90)$$
$$\mathcal{I}(S[\tau+1]; X^{(C)}[2\tau+1] |$$
$$S[0:\tau], Y^{(C)}[\tau+1], Y^{(C)}[\tau+b], X^{(C)}[2\tau]) +$$
$$\mathcal{I}(S[\tau+b]; X^{(C)}[2\tau+1] |$$
$$S[0:\tau+1], Y^{(C)}[\tau+b], X^{(C)}[2\tau])$$

using the fact that $Y^{(C)}[\tau+1]$ is a function of $S[0:\tau+1]$. Combining Equations 6.89 and 6.90 shows $0 =$ $$\mathcal{I}(S[\tau+b]; X^{(C)}[2\tau+1] | S[0:\tau+1], Y^{(C)}[\tau+b], X^{(C)}[2\tau]). \qquad (6.91)$$

Finally, we combine Equation 6.91 with the chain rule for mutual information to show $$\mathcal{I}(S[\tau+b]; X^{(C)}[2\tau:2\tau+1] | S[0:\tau+1], Y^{(C)}[\tau+b]) =$$
$$\mathcal{I}(S[\tau+b]; X^{(C)}[2\tau] | S[0:\tau+1], Y^{(C)}[\tau+b]) \leq \qquad (6.92)$$
$$n_{C,2\tau} = w_\tau^{(C)}.$$

We have already established that $$M = (k_0 + k_1)(1 + \ell) + k_\tau + k_{\tau+1} + w_\tau^{(C)} + w_{\tau+1}^{(C)} + k_{\tau+b} \qquad (6.93)$$

symbols are sent by time slot $(2\tau+1)$ to ensure the lossless-delay constraint is met and $S[0:\tau+1]$ are recovered within the worst-case-delay. In addition, in case of a burst starting in time slot $(\tau+b)$, we bound the amount of information about $S[\tau+b]$ that is available; the remainder must also be sent, and can be sent in $X[2\tau+b]$.

If $\tau+b+b-1 < 2\tau$ (i.e., $2b-1 < \tau$) then $X^{(C)}[2\tau]$ is received if $X[\tau+b]$ is lost; so at least $E = (k_{\tau+b}\ell - w_\tau^{(C)})$ extra symbols must be sent. So an extra $d(1-\ell)\ell - w_\tau^{(C)}$ symbols are sent compared to the optimal value; the optimal value is 0 and is obtained when $w_\tau^{(C)} = d(1-\ell)\ell$.

Suppose $\tau+b+b-1 > 2\tau$ (i.e., $2b-1 > \tau$) then we note $$\mathcal{I}(S[\tau+b]; Y^{(C)}[2\tau:2\tau+1]|S[0:\tau+1], Y^{(C)}[\tau+b]) \leq$$
$$\mathcal{H}(Y^{(C)}[2\tau:2\tau+1]|S[0:\tau+1], Y^{(C)}[\tau+b]) \leq \quad (6.94)$$
$$\mathcal{H}(Y^{(C)}[2\tau:2\tau+1]) \leq$$
$$(n_{C,2\tau}+n_{C,2\tau+1})\ell = (w_\tau^{(C)}+w_{\tau+1}^{(C)})\ell = d(1-\ell)\ell^2$$

by Equation 6.84. $X^{(C)}[2\tau:2\tau+1]$ is in loss if $X[\tau+b]$ is lost. Therefore, by Equation 6.94 and Equation 6.92, $E = (k_{\tau+b}\ell - \min(w_\tau^{(C)}, d(1-\ell)\ell^2))$ symbols must be sent.

If $\tau+b+b-1 = 2\tau$ (i.e., $2b-1 = \tau$) then $X^{(C)}[2\tau]$ is lost if $X[\tau+b]$ is lost but $X[2\tau+1]$ is not. We note $$\mathcal{I}(S[\tau+b]; Y^{(C)}[2\tau], X^{(C)}[2\tau+1]$$
$$|S[0:\tau+1], Y^{(C)}[\tau+b]) \leq$$
$$\mathcal{H}(Y^{(C)}[2\tau], X^{(C)}[2\tau+1]|S[0:\tau+1], Y^{(C)}[\tau+b]) \leq \quad (6.95)$$
$$\mathcal{H}(Y^{(C)}[2\tau], X^{(C)}[2\tau+1]) \leq$$
$$n_{C,2\tau}\ell + n_{C,2\tau+1} = w_\tau^{(C)}\ell + w_{\tau+1}^{(C)}.$$

Combining Equations 6.95 and 6.92 shows at least $E = (k_{\tau+b}\ell - \min(w_\tau^{(C)}, w_\tau^{(C)}\ell + w_{\tau+1}^{(C)}))$ symbols must be sent.

To assess this term, we observe that $$\min\left(w_\tau^{(C)}, w_\tau^{(C)}\ell + w_{\tau+1}^{(C)}\right) =$$
$$\min\left(w_\tau^{(C)}, d(1-\ell)\ell - w_\tau^{(C)}(1-\ell)\right)$$

by Equation 6.84. If the first term is larger, the min is increased by decreasing $w_\tau^{(C)}$. If the first term is smaller, the min is increased by increasing $w_\tau^{(C)}$. The slope of the change is linear except where the two quantities equal. So the maximum occurs at the endpoints or where the quantities meet; recall that the maximum value minimizes $E$. If $w_\tau^{(C)} = d(1-\ell)\ell$, the quantity is $d(1-\ell)\ell^2$. If $w_\tau^{(C)} = 0$ then the quantity is 0. To meet in the middle:

$$w_\tau^{(C)} = d(1-\ell)\ell - w_\tau^{(C)}(1-\ell)$$
$$w_\tau^{(C)} = d(1-\ell)\ell/(2-\ell)$$

We note that $\ell/(1/(2-\ell)) = \ell(2-\ell)$; this quantity is less than 1/2 for $\ell = 1/3$ and it is greater than 1/2 for $\ell = 2/3$. Therefore, the value of $w_\tau^{(C)}$ that maximizes the desired quantity depends on $\ell$. Let $w_{\tau+b}^{(C)} \in \{d(1-\ell)\ell, d(1-\ell)\ell/(2-\ell)\}$ be chosen to minimize $E$. So total sent is $(k_{\tau+b}\ell - e'$ for $e' \in \{d(1-\ell)\ell/(2-\ell), d(1-\ell)\ell^2\}$.

Offline scheme for frame-size sequence 2. We set $$w_0^{(C)} = d\ell$$
$$w_1^{(C)} = d\ell$$
$$w_{\tau+1}^{(C)} = \begin{cases} d(1-\ell)\ell - w_{\tau+b}^{(C)} & \text{if } 2b - 1 = \tau \\ 0 & \text{otherwise} \end{cases}$$
$$w_\tau^{(C)} = d\ell(1-\ell) - w_{\tau+1}$$
$$w_{\tau+b}^{(C)} = \begin{cases} k_{\tau+b}\ell - d\ell(1-\ell) & \text{if } 2b - 1 < \tau \\ k_{\tau+b}\ell - e'\ell & \text{if } 2b - 1 = \tau \\ k_{\tau+b}\ell - d\ell(1-\ell)^2 & \text{if } 2b - 1 > \tau \end{cases}$$

We apply $(\tau, \ell, K, Z, \mathcal{L}, B, W)$-Split Code. The lossless-delay constraint is clearly satisfied. Next, we show satisfaction of the worst-case-delay. For any burst starting in $i \in \{0, 1\}$, $(i + b - 1) \leq b < \tau$, so $X[\tau]$ and $X[\tau + 1]$ are received. Thus, $S[0:1]$ are recovered. Since $X[2:\tau-1]$ are empty, we need not consider another burst until one that starts in $X[\tau]$. For a burst in $X[\tau]$, $2d(1-\ell)\ell$ symbols of $S[\tau]$ are lost, $d\ell(1-\ell)$ parity symbols are received in each of $X[\tau]$ and $X[\tau+1]$, and $v[\tau] + v[\tau+1] = 2d(1-\ell)$, so $V[\tau]$ and $V[\tau+1]$ are recovered by time slot $(\tau+1)$. Then $U[\tau+j]$ is recovered with $P[2\tau+j]$ for $j \in \{0, 1\}$. For a burst starting in $X[\tau+1]$, the received parity symbols of $X[\tau+1]$ recover $V[\tau+1]$. The symbols of $X[2\tau+1]$ provide no information on $S[\tau+b]$ given $X[2\tau]$ so they are used to recover $X[\tau+1]$. Then it immediately. So it suffices to consider a burst dropping $X[\tau+b]$. Sufficiently many symbols are available to recover all but $w_{\tau+b}^{(C)}$ by time slot $(2\tau+1)$. The remainder are recovered with $X[2\tau+b]$. The total number of symbols sent is the term from Equation 6.93 plus $E$ where $E$ is minimized.

Finally, we show in a case analysis over the three possible cases that the choice for $w_{\tau+b}^{(C)}$ during time slot $(\tau+1)$ must be suboptimal for one of the two frame-size sequences. This causes a nontrivial gap between the optimal offline and online rates, concluding the proof.

Case $2b - 1 < \tau$

Suppose $w_{\tau+b}^{(C)} \leq d(1-\ell)\ell^2/2$ is chosen during time slot $(\tau+1)$ and frame-size sequence 2 happens. Then the rate is at most $$(K')/(K' + 2d\ell + d\ell(1-\ell) + d(1-\ell)\ell/2)$$

versus an optimal value of at least $$(K')/(K' + 2d\ell + d\ell(1-\ell))$$

152

Otherwise, suppose $w_\tau^{(C)} \geq d(1-\ell)\ell^2/2$ is chosen during time slot $(\tau+1)$ and frame-size sequence 1 happens. Then the rate is at most $$(K')/(K' + 2d\ell + d\ell(1-\ell) + d(1-\ell)\ell^2 + d(1-\ell)^2\ell^2)/2)$$

whereas the optimal rate is at least $$(K')/(K' + 2d\ell + d\ell(1-\ell) + d(1-\ell)\ell^2)$$

.

Case $2b - 1 = \tau$

Suppose $w_\tau^{(C)} \leq w_{\tau,max}^{(C)}/2$ is chosen during time slot $(\tau+1)$. Then the rate is at most $$(K')/(K' + 2d\ell + d\ell(1-\ell) - \ell'/2)$$

versus an optimal value of at least $$(K')/(K' + 2d\ell + d\ell(1-\ell) - \ell')$$

Otherwise, suppose $w_\tau^{(C)} \geq w_{\tau,max}^{(C)}/2$ is chosen during time slot $(\tau+1)$ and frame-size sequence 1 happens. Then $w_{\tau+1}^{(C)} \leq d(1-\ell)\ell - w_{\tau,max}^{(C)}/2$ Then the rate is at most $$(K')/(K' + 2d\ell + d\ell(1-\ell)) + d(1-\ell)\ell^2 + w_{\tau,max}^{(C)}/2(1-\ell))$$

whereas the optimal rate is at least $$(K')/(K' + 2d\ell + d\ell(1-\ell) + d(1-\ell)\ell^2))$$

.

Case $2b - 1 > \tau$

Suppose $w_\tau^{(C)} \leq d(1-\ell)\ell^2/2$ is chosen during time slot $(\tau+1)$. Then the rate is at most $$(K')/(K' + 2d\ell + d\ell(1-\ell) - d(1-\ell)\ell^2/2)$$

versus an optimal value of at least $$\frac{(K')/}{(K' + 2d\ell + d\ell(1-\ell) - d(1-\ell)\ell^2)}$$

Otherwise, suppose $w_\tau^{(C)} \geq d(1-\ell)\ell^2/2$ is chosen during time slot $(\tau + 1)$ and frame-size sequence 1 happens. Then $w_{\tau+1}^{(C)} \leq d(1-\ell)\ell - d(1-\ell)\ell^2/2$ Then the rate is at most $$\frac{(K')/}{(K' + 2d\ell + d\ell(1-\ell) + d(1-\ell)\ell^2 + d(1-\ell)^2\ell^2/2)}$$

whereas the optimal rate is at least $$\frac{(K')/}{(K' + 2d\ell + d\ell(1-\ell) + d(1-\ell)\ell^2)}$$

6.8.9 Proof of Theorem 11

At a high level, the proof is divided into three steps. First, we bound how many extra symbols are modeled as being sent under Algorithm 4 in terms of $\mathcal{R}_0, \ldots, \mathcal{R}_{t-\tau}$ by adding constraints for $p_0^{(IP)}, \ldots, p_t^{(IP)}$ to equal $O_0, \ldots, O_{t-\tau}$, respectively (Appendix 6.8.9). We then bound the probability that $\sum_{i=0}^{t-\tau} \mathcal{R}_i$ exceeds its mean by a significant amount (Appendix 6.8.9). Finally, we establish the rate in terms of these quantities (Appendix 6.8.9).

Extra symbols sent under Algorithm 4

First, we show that the increase in $\sum_{j=0}^{t} p_j^{(IP)}$ due to adding the constraint $p_{i+\tau}^{(IP)} = O_i$ for $i \in [t-\tau]$ is at most $\mathcal{R}_i$.

Let $w_i^{(Opt)} \in W_i^{(Opt)}$ be the value that minimizes $|w_i^{(Opt)} - O_i|$.

Suppose $O_i \geq w_i^{(Opt)}$. Then using the values of $p_j^{(IP)}$ for all $j > (i+\tau)$ still satisfy all constraints if $p_{i+\tau}^{(IP)}$ is set to equal $O_i$ and $p_{i+\tau+\delta}^{(IP)}$.

Otherwise, suppose $O_i < w_i^{(Opt)}$. Let $\delta = \delta' = w_i^{(Opt)} - O_i$. Let us set $w_i^{(Opt)} = O_i$. While $\delta > 0$ let $j = \min_{j \in [i+\tau, t-1] | p_j^{(IP)} < \ell_j k_j, \sum_{i=1}^{j-1} \zeta_i = 0}(\ell)$. At least one such $j$ exists, since otherwise $p_{i+\tau}^{(IP)}$ could be reduced, violating the minimizing the objective function. Increase $p_{j+\tau}^{(IP)}$ by $\min(\ell_j k_j - w_j^{(Opt)}, \delta)$ and decrement $\delta$ by the changed amount. The changes ensure that all constraints are satisfied. The total number of extra symbols sent is at most $\delta'$.

Bounding the regret

First, suppose we start with $(\tau, t, K, Z, \mathcal{L}, B)$-Split ML Code and then incrementally for $j = 0, \ldots, (t-\tau)$ switch to $(\tau, t, K, Z, \mathcal{L}, B, W^{(Opt)})$-Split ML Code. With each switch, the total number of extra symbols sent is at most $\mathcal{R}_j \leq \ell_j k_j \leq \ell_j m$ (Appendix 6.8.9). In total, the number of extra symbols sent compared to $(\tau, t, K, Z, \mathcal{L}, B)$-Split ML Code is $\sum_{j=0}^{t-\tau} \mathcal{R}_j$. The proof follows from the Hoeffding Bound [45]. Formally, $$\mathbb{P}\left[1/(t+1)\sum_{i=0}^{t}(\mathcal{R}_i - \mathbb{E}[\mathcal{R}_i]) \geq \epsilon_t\right] \leq e^{-2(t+1)\epsilon_t^2/m}$$

To ensure this probability is at most $\delta$, we require $$\delta \geq e^{-2(t+1)\epsilon_t^2/m}$$
$$e^{2(t+1)\epsilon_t^2/m} \geq 1/\delta$$
$$2(t+1)\epsilon_t^2/m \geq log(1/\delta)$$
$$t > log(1/\delta)/(2\epsilon_t^2).$$

Online approximately optimality

Let $$\mathcal{R}_{[t]}^{(+)} = \sum_{i=0}^{t} \mathcal{R}_i$$

Let the total number of symbols modeled as being sent under Algorithm 4 be $N_{\tau,t,K,Z,\mathcal{L},B} = \sum_{i=0}^{t-\tau} k_i + p_{[t]}^{(+)}$. Then let $$N' = N_{\tau,t,K,Z,\mathcal{L},B} - 2(t-\tau)(\tau-1) - \sum_{i=0}^{t}(h_i + q_i - 2)$$

$$\gamma = 2(t-\tau)(\tau-1) + \left(\sum_{i=0}^{t} h_i + q_i - 2\right) + \mathcal{R}_{[t]}^{(+)}.$$

Restricting to using the building block construction causes sending at most an extra up to $(h_i + q_i - 2)$ symbols per time slot $i$ compared to an optimal scheme for the choice of $O_0, \ldots, O_t$. By Lemma 22, defining $W_i^{(O_{[t]})}$ for $i \in [t]$ as we do costs an additional at most $2(t-\tau)(\tau-1)$. So $N'$ is at most the number of symbols sent by an offline rate-optimal scheme. By Appendix 6.8.9, the number of extra symbols sent during time slot $i$ due to sub optimal choice of $O_i$ is $\mathcal{R}_i$. So the total number of extra symbols sent over an optimal coding scheme is at most $\gamma$.

Let $K^{(+)} = \sum_{i=0}^{t} k_i$. Then, $$R^{(opt)} - R^{(ons)} \leq \tag{6.96}$$

$$K^{(+)}/N' - K^{(+)}/(N'+\gamma) \leq \qquad K^{(+)}\gamma/(N'(N'+\gamma)) \leq \gamma/N' \tag{6.97}$$

Recall from Appendix 6.8.9 that with probability at least $(1-\delta)$, $$\mathcal{R}_{[t]}^{(+)} \leq \sum_{i=0}^{t}(\epsilon k_i + \epsilon_t)$$

Therefore, by the definition of $K^{(+)}$ and the fact that $K^{(+)} \leq N'$, $$R^{(opt)} - R^{(alg)} \leq \left(2(t-\tau)(\tau-1) + \sum_{l=0}^{t}(h_i + q_i - 2 + ck_i + c_1)\right)/N'$$

$$\leq \left(2(t-\tau)(\tau-1) + \sum_{l=0}^{t}(h_i + q_i - 2 + ck_i + c_1)\right)/K^{(+)}$$

$$= c + c_1(t+1)/K^{(+)} + \sum_{l=0}^{t}(2\tau + h_i + q_i - 4)/K^{(+)}$$

Chapter 7

Conclusion and future directions

Real-time video communication applications, like videoconferencing and online gaming, are becoming the mainstay of communication over the Internet. Prior work on streaming codes is insufficient to provide bandwidth-efficient loss recovery for these applications because existing works assume the sizes of frames are fixed in advance. In contrast, real-time video communication involves transmitting a sequence of frames of varying sizes unknown in advance. Streaming codes that can support varying frame sizes well can help such applications improve the quality of service.

This thesis introduces a new model of streaming codes for variable-size frames and identifies the key challenges for designing high-rate streaming codes. In particular, streaming codes operate in an "online" setting where the amount of data to be transmitted varies over time and is not known in advance. Mitigating the adverse effects of variability requires spreading the data that arrives at a time slot over multiple future packets and determining in real-time how much redundancy to allocate for each frame. The optimal strategy depends on the arrival pattern. Algebraic coding techniques alone are, therefore, insufficient for designing rate-optimal codes.

We address these challenges in several steps. First, we introduce a simplified model where each frame is sent in one packet that is lost or received and analyze fundamental limits on the rate for (a) arbitrary frame-size sequences and (b) any given frame-size sequence. Second, we consider the regime where each frame must be sent immediately (i.e., $\tau_L = 0$). We propose a new framework for designing online rate-optimal constructions using a greedy paradigm for sending parity symbols. Third, we introduce a new methodology for constructing online streaming codes to tackle spreading frame symbols in real-time (specifically, for $\tau_L = 1$) under the same model. The approach combines machine learning with algebraic coding theory tools by (a) isolating the component that can benefit from machine learning, (b) solving the offline version of the problem by integrating optimization with algebraic coding theory techniques, and (c) converting the offline scheme into an online one using a learning-based approach. Fourth, we establish that these theoretical results can translate into practical settings. To do so, we analyze a large corpus of traces from Microsoft Teams to determine the suitability of streaming codes. We then design Tambur, a new communication scheme for bandwidth-efficient loss recovery for videoconferencing comprising two components: (a) A new streaming code that bridges the gap between theoretical streaming codes and videoconferencing applications, which takes as input any given bandwidth overhead; (b) a learning-based predictive model to set the bandwidth overhead. We assessed Tambur offline over a dataset of traces from Teams and online over a simulated network. We showed improvements in QoE metrics, including 26% fewer freezes and 28% fewer non-rendered frames. The benefits establish streaming codes as a viable solution to recovering lost packets for videoconferencing applications. The results thus also show the promise of streaming codes for other live-streaming applications like cloud gaming. We released our framework as open-source codebase. The framework enables easy evaluation of the QoE benefits of new communication schemes by providing a simple interface to incorporate (a) new FEC schemes and (b) new learning-based predictive models. Fifth, using the learnings from our analysis of real-world loss traces, we introduce a generalized streaming model with partial bursts. We then design offline and online approximately rate-optimal streaming codes by using a linear program and learning-augmented algorithm, respectively, to determine how to split frames into two components. One component is recovered using the parity symbols sent for prior frames, and additional parity symbols are sent to recover the other component. A building block construction is then presented to design an approximately rate-optimal code given how frame symbols are split.

Overall, this thesis expanded the toolkit for real-time communication to include new interdisciplinary techniques combining algebraic coding theory with algorithms, optimization, and machine learning. We end by presenting a few potential avenues of future direction for this toolkit.

7.1 Competitive analysis

One of this thesis' contributions was to show that online streaming codes cannot match the offline-optimal-rate in several settings. Specifically, Chapter 3 (respectively, Chapter 6) showed that the best way to spread (respectively, split) frame symbols depends on the sizes of future frames for all but a few parameter regimes. The result was shown via a case analysis using the following argument. Two possible frame-size sequences were introduced that were identical for the first several time slots. An offline coding scheme was presented for the frame-size sequences. We showed that matching the rate of the offline scheme on the first frame-size sequence required spreading (respectively, splitting) at least some number of frame symbols during the time slots where the two frame-size sequences were indistinguishable. Then we showed that this choice of spreading (respectively, splitting) penalized the rate on the second frame-size sequence. This accomplished the objective of establishing a gap between the online-optimal-rate and the offline-optimal-rate. But several questions remain, including:

1. How large is the gap in the worst case?
2. What is the worst-case gap for a given policy for spreading (respectively, splitting) symbols?
3. What policy spreading (respectively, splitting) symbols leads to the smallest gap?

To answer these open questions, one could leverage the existing literature [4, 34] on online algorithms' performance, which is typically called "competitive analysis." To facilitate future research, we translate the nomenclature of this thesis into the terminology used under competitive analysis for the model considered in Chapter 3 for $\tau_L = 1$ and any valid parameters $b$ and $\tau$.

An online streaming algorithm, A, receives a request sequence, $\sigma = \sigma(1), \sigma(2), \ldots, \sigma(t)$ of non-negative integers reflecting the sizes of frames. For request, $i \in [m]$, the online algorithm does not have access to $\sigma(i')$ for $i' > i$. Algorithm A determines how many symbols of each frame to spread. Let the values A computes on request sequence $\sigma$ be $A_\sigma(\sigma_1), \ldots, A_\sigma(\sigma_t) \in [m]$. Suppose the $(\tau, b, t, (A_\sigma(\sigma_i), \ldots, A_\sigma(\sigma_t) \mid i \in [t]))$–Spreading Variable-sized Generalized MS Code (from Chapter 4.2) sends channel packets of sizes $n_0, \ldots, n_t$. The cost of $A$ on request sequence $\sigma$ is given by $\text{cost}_A(\sigma) = \sum_{i=0}^{t} n_i$. The cost represents the total number of symbols sent by a rate-optimal construction given A's choices of how to spread frame symbols. The competitive ratio of $A$ is given by $$\inf\{c \mid \text{cost}_A(\sigma) \leq c \cdot \text{cost}_B(\sigma), \forall \sigma \in [m]^t, \forall B\}.$$

For any given request sequence, $\sigma$ it may be useful to know the optimal cost. The optimal cost can be exactly computed using Algorithm 3 and approximately computed using Algorithm 3.B.

7.2 Stochastic optimization

One of the core problems tackled by this thesis is communicating in the face of uncertainty in the sizes of future frames. Chapter 3 used a greedy paradigm to circumvent this challenge for certain parameter regimes and showed that no such workaround exists for all remaining settings. Instead, Chapter 4 introduced a learning-based approach to design online approximately rate-optimal streaming codes. Under this approach, a predictive decision is employed for the one component that fundamentally depends on future frames' sizes: how to spread frame symbols. We developed an explicit approach for making these predictive decisions with sufficient accuracy; this approach can be viewed as stochastic optimization.

Future work might further study how to use stochastic optimization to best make the decision for spreading frame symbols. To make this direction more concrete, we discuss how this thesis' terminology relates to an established framework for stochastic optimization [72].

Let the state, $\mathbb{S}_i$, comprise (a) the sizes of frames 0 through $i$, (b) how the symbols of the prior $\tau$ frames were spread, (c) the number of parity symbols sent during the prior $\tau$ time slots, and (d) the number of parity symbols allocated to be sent during time slot $i$ through $(i + \tau - 1)$. The exogenous information, $W_i \in [m]$ is the size of the $i$th frame. The decision variable is $a_i \in [k_i]$ and reflects how to spread the symbols of $S[i]$. The decision is made with a policy $A^\pi(\mathbb{S}_i) = a_i$ where $\pi$ contains the information about the function and parameters of the policy. The definition of the transition function, $S^M(\mathbb{S}_i, a_i, W_{i+1})$, follows immediately from the definition of the state. The objective function is $$\min_\pi \left[ \mathbb{E}_{W_1, \ldots, W_t} \left\{ \sum_{i=0}^{t} C(\mathbb{S}_{i+1}, A^\pi(\mathbb{S}_{i+1}), W_{i+1}) \right\} \right],$$

where $$\mathbb{S}_{i+1} = S^M(\mathbb{S}_i, a_i, W_{i+1}),$$
$$C(\mathbb{S}_i, a_i, W_{i+1}) = n_i.$$

and $n_i$ is the size of the $i$th channel packet. The objective function reflects the expected number of symbols sent used assuming an optimal policy is applied; hence, minimizing the objective function maximizes the communication rate.

Finally, we list a few open problems where stochastic optimization may be suitable. The number of samples to the distribution of the sizes of future frames that are needed to design a policy for spreading frame symbols that is within $\epsilon$ of accurate in expectation is currently unknown. In fact, whether this number of samples can be reduced from polynomial (Chapter 4) to linear or sublinear is as yet unknown. Recall in Chapter 4 that the choice of how to *spread* $S[i]$'s symbols over $X[i]$ and $X[i+1]$ is determined during time slot $i$. In contrast, how to *split* $S[i]$'s symbols depends on the parity symbols sent during time slots $i$ through $(i + \tau - 1)$. For example, if no parity symbols are sent during time slots $i$ through $(i + \tau - 1)$, then all of $S[i]$'s symbols are recovered at their deadline. However, if sufficiently many parity symbols are sent during any of time slots $i$ through $(i + \tau - 1)$, all of $S[i]$'s symbols can be recovered within $(\tau - 1)$ time slots. Thus, the split for frame $i$ is not determined until *after* time slot $i$. For this reason, we did not use stochastic optimization in Chapter 6 to determine how to split frame symbols. How to combine stochastic optimization and coding theory to determine the best way to split frames remains an open problem.

7.3 Data-driven coding theory in new domains

Recall that our goal was to improve the QoE for real-time streaming applications like videoconferencing that involve sending variable-size data. Thus, we introduced a new streaming model that is closely related to prior models studied in a series of related works [11, 27, 30, 35, 49, 52, 62, 63]. Unlike these prior models, our model incorporated (a) variable-size frames, and (b) partial bursts. Addressing these two unique aspects was our main challenge.

To do so, we developed an interdisciplinary toolkit to design and analyze codes using stochastic optimization, online algorithms, coding theory, and machine learning. These methods could be applied beyond the specific domain of live communication considered in this thesis. For example, one could expand our model to consider unequal error protection for frames using a similar methodology to that of [44]. Two loss modes would be considered: (a) short partial bursts where a small fraction of packets are lost per frame, and (b) long partial bursts where a large fraction of packets are lost per frame. All frames would need to be recovered after a short partial burst, but only keyframes would need to be recovered after a long one. Unequal error protection may be useful in applications like videoconferencing where one type of frame (specifically, a keyframe) is extra important to the QoE.

Future work could also expand this thesis' streaming model to include aspects of the various other streaming models discussed in Chapter 2.1.2 (e.g., multi-hop networks [28, 37, 53]) then apply our toolkit to design and analyze new erasure codes. More generally, the methods developed in this thesis could be used in any scenario where coding theory is applied online over variable-size data.

7.4 Improvements to Tambur

One of the contributions of Chapter 5 was to release Tambur, an open-source library integrated with Ringmaster that handles real-time packet-loss recovery for videoconferencing applications. There are several possible future directions here. For concreteness, we will list three.

First, recall that Tambur comprises two components: (a) a new streaming code, and (b) an ML model to take predictive decisions on the bandwidth overhead. The second component was a simple ML model trained offline on a dataset of traces from Microsoft Teams 1:1 video calls. For simplicity, the ML model uses binary classification to set the bandwidth overhead. Instead, a multi-class classification model would allow for greater flexibility to tune the bandwidth overhead. Second, Tambur could be combined with bandwidth estimation. Using a variable bitrate for video encoding to leverage Tambur's bandwidth savings may enable communicating the video at a higher resolution. Third, one could use the library's interface to implement the learning-augmented streaming code introduced in Chapter 6. Doing requires (a) replacing the feedback with estimates of the two channel parameters, and (b) a new predictive model to determine how to split frames.

APPENDIX B

1

2

Learning-augmented streaming codes for variable-size messages under partial burst losses Michael Rudow and K.V. Rashmi

*Abstract*—Recovering bursts of lost packets in real-time is crucial to multimedia live-streaming applications' quality-of-experience (QoE). Streaming codes optimally handle the unique aspects of loss recovery for live streaming, including (a) variable-size messages, (b) a real-time playback deadline, and (c) burst losses across multiple frames. However, existing models for streaming codes in this setting only apply to bursts that drop *all* data sent for each message. Yet in many real-world applications only some packets are lost for each message in what we call a "partial burst." We introduce a new streaming model to accommodate partial bursts. We then design a building block to construct a streaming code given any choice of how much parity to allocate for each message. Next, we present a streaming code in an offline setting (i.e., where the sizes of future messages are known) by combining (a) the building block with (b) a linear program to set the number of parity symbols per message. We then design a streaming code in an online setting (i.e., without knowledge of the future) by combining (a) the building block with (b) a learning-augmented algorithm to set the number of parity symbols per message. The constructions are approximately rate-optimal under a natural condition on the nature of feedback.

I. INTRODUCTION

Live streaming is crucial to numerous popular applications ranging from videoconferencing to cloud gaming. The QoE of such applications depends on several factors, including bandwidth, latency, and packet loss recovery. Retransmission can recover lost packets using minimal redundancy in three steps: (a) transmission, (b) feedback, and (c) retransmission. But the latency of three one-way delays is prohibitively high for long-distance communication. Instead, erasure codes can be used for loss recovery.

The main drawback of traditional erasure codes like block codes or random linear convolutional codes is that they are inefficient at recovering burst losses in real-time. This is problematic for the many live-streaming applications that experience bursty losses. The weakness arises from the fact that conventional approaches recover all lost packets simultaneously. If a burst loss encompasses multiple messages, the first message of the burst is unavailable until after recovering the lost packets of the final message. This property can cause the latency to exceed the playback deadline of the first message. In contrast, "streaming codes" are designed to recover each message in the burst sequentially. Hence, earlier messages are available to be played sooner. This reduces the latency for recovering earlier messages in a burst. As such, streaming codes are better suited for real-time communication.

Streaming codes were first introduced by Martinian and Sundberg in [1]. Under their streaming model, during each time slot, $i$, a *message packet*, $S[i]$, of $k$ symbols arrives

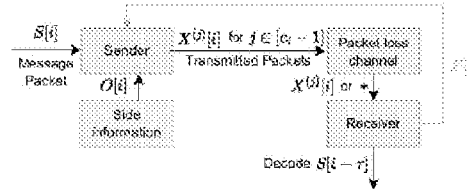

Fig. 1: Overview of the proposed streaming model. Multiple packets are transmitted over the channel for each message packet. The packet loss channel allows for partial bursts.

at a sender. A *channel packet*, $X[i]$, of $n$ symbols is sent over a burst-only packet loss model. Losses occur as bursts of $b$ consecutive channel packets followed by guard spaces of at least $\tau$ consecutive receptions. Each message packet must be recovered within $\tau$ time slots to satisfy the playback requirement. Martinian and Sundberg introduced rate-optimal streaming codes for several parameters, then Martinian and Trott presented rate-optimal codes for the remaining parameters in [2]. Many other works have studied streaming codes for various models of communication that fix the sizes of message packets and channel packets in advance [2]–[12], [12]–[21].

Motivated by the varying sizes of message packets in many live-streaming applications, such as videoconferencing, a new streaming model was introduced in [22]. Our paper focuses on this setting of variable-size message packets. Under this model, $S[i]$ and $X[i]$ are of sizes $k_i$ and $n_i$, respectively, for non-negative integers $k_i$ and $n_i$. Under this model, the optimal rate is adversely affected by the variability in the sizes of message packets. Spreading message symbols over multiple channel packets can mitigate the negative impact of the variability. However, spreading message symbols increases the latency to recover message packets when there are no losses—this is termed the "lossless-delay." As such, spreading across several channel packets may not be acceptable for many live-streaming applications. Rate-optimal and approximately rate-optimal streaming codes have been introduced when the lossless-delay is zero and one in [23] and [24], respectively.

The streaming model for variable message-sizes involves sending one channel packet per frame which is either received or lost. The prior works [3], [10], [11] on streaming codes that send multiple packets per message packet apply to settings where the sizes of message packets are fixed and bursts where *all* consecutive packets are lost. Unlike the existing literature on theoretical streaming codes, real-world applications frequently experience what we dub "partial bursts"

losses of only some packets per frame. This was shown in a recent work [25] by assessing a large corpus of packet loss traces from Microsoft Teams 1:1 video calls and showing the prevalence of bursts where only some packets are lost per frame. The authors also proposed a heuristic-based design of new streaming codes suitable for such losses, and used these constructions to showcase the viability and potential benefits of streaming codes for improving the QoE for real-world live-streaming applications. The promising observations in [25] motivate a formal study of streaming codes for partial bursts.

In this paper, we generalize the streaming model for variable message-sizes to accommodate sending one or more "transmitted packets" per time slot, where only a fraction of the transmitted packets may be lost in a burst (termed *partial bursts*). The receiver sends occasional feedback to the sender to inform the choice of parameters associated with partial bursts. The model is shown in Figure 1—the component "side information" will be introduced later in Section II. In the literature on streaming codes, arbitrary losses are often considered along with burst losses. While one could proceed to account for partial bursts by introducing arbitrary losses into the loss model, doing so would allow arbitrary losses over *across multiple time slots*. Allowing such arbitrary losses would reduce streaming codes' potential to exploit the bursty structure of losses clustered within a few consecutive frames observed in [25]. Instead, this burst structure can be leveraged under our new model with partial bursts.

We apply a two-step methodology to design streaming codes for the new model. First, a building block construction to design a streaming code given any split of each message packet into (a) one component guaranteed to be recovered strictly before its playback deadline (i.e., within $(\tau-1)$ time slots), and (b) another component guaranteed to be recovered by its playback deadline (i.e., $\tau$ time slots later). Second, a policy for how to split each message packet into these two components. Our work uses a linear program to determine how to split message packets in the offline setting where the sizes of future message packets are available. Combining the linear program for splitting frames with the building block construction yields an approximately rate-optimal code under a natural condition on the nature of feedback (termed the "reset condition"). Finally, we employ a learning-augmented algorithm to determine the split to build a construction for the online setting where the sizes of future message packets are unavailable which is approximately rate-optimal under the reset condition. All proofs are available in [26].

II. System Model

We now extend the streaming model with variable-size message packets from [22], as illustrated in Figure 1. There are a positive number, $t$, of time slots. During the $i$th time slot, the sender obtains a message packet, $S[i]$, of $k_i$ independent random symbols of a finite field, $\mathbb{F}$, where $k_i \in \{0, \ldots, m\}$ for some maximum value, $m$. We call $k_0, \ldots, k_t$ the "message packet size sequence." The sender sends $c_i$ *transmitted packets*, $X[i] = \langle X^{(0)}[i], \ldots, X^{(c_i-1)}[i] \rangle$, consisting of $n_i^{(0)}, \ldots, n_i^{(c_i-1)}$ symbols, respectively. This change to the model allowing multiple packets to be transmitted over the channel for each message packet is a stepping stone toward adding partial bursts to the loss model. We denote the transmitted packets, number of symbols sent, and number of parity symbols as $$X[i] = \langle X^{(0)}[i], \ldots, X^{(c_i-1)}[i] \rangle,$$
$$n_i = \sum_{j=0}^{c_i-1} n_i^{(j)},$$
$$p_i = n_i - k_i,$$

respectively. The rate is defined as in [22] as the ratio of message symbols to transmitted symbols:

$$R_t = \frac{\sum_{i=0}^{t} k_i}{\sum_{i=0}^{t} n_i}.$$

Loss model: The transmitted packets are sent over a channel with bursty losses (affecting one or more consecutive time slots) followed by guard spaces where there are no losses. We introduce a new type of burst loss, called a *partial burst*. In each time slot within a partial burst, only a fraction of the transmitted packets are lost. Formally, for a partial burst of length $b$ starting at time slot $i$, for each time slot $l$ within the partial burst, $l \in \{i, \ldots, i+b-1\}$, a $\ell \in (0,1]$ fraction of the transmitted packets can be lost. That is, an arbitrary $\lceil \ell c_l \rceil$ transmitted packets of $X[l]$ are lost.

Further, the length and the fraction of packets lost in partial bursts are allowed to vary over time in order to enable using feedback (based on network changes) to tune the code. Formally, a partial burst starting in time slot $i$ encompasses $b_i$ consecutive time slots, where $b_i$ is a positive integer. During each time slot of the partial burst, $j \in \{i, \ldots, i+b_i-1\}, \ell_j$ fraction of the transmitted packets are lost. Other than perhaps the few time slots after receiving feedback, $\ell_j = \ell_i$. The partial burst is followed by a guard space of at least $\tau$ time slots where all transmitted packets are received.

For any time slot $i$, we denote the $c_i$ received packets as $$Y[i] = \langle Y^{(0)}[i], \ldots, Y^{(c_i-1)}[i] \rangle,$$

where each received packet corresponds to either receiving the corresponding transmitted packet intact or it being lost. That is, for $j \in \{0, \ldots, c_i-1\}$, $$Y^{(j)}[i] = \begin{cases} X^{(j)}[i] & \text{if } X^{(j)}[i] \text{ is received} \\ * & \text{if } X^{(j)}[i] \text{ is lost} \end{cases}$$

Feedback: The sender occasionally receives feedback from the receiver for updating the burst length and the fraction of transmitted packets lost. During any time slot $i$ where feedback is received, $b_i$ and all undefined $\ell_j$ for $j \in \{i, \ldots, i+b_i-1\}$ are updated accordingly. If there is no feedback, the parameters do not change (i.e., $b_i$ and $\ell_{i+b_i-1}$ are set based on the last received feedback). The feedback can be viewed as the receiver conservatively estimating how lossy the network conditions will be based on prior losses. At times, there could be an underestimation of the losses, and that could lead to message packets not being recovered. In videoconferencing, due to compression, video frames are typically dependent on each other. Hence not recovering a message packet can lead to several subsequent packets not being useful even though they are received intact. Thus, the receiver can send additional feedback to signal that a *reset* is needed during any time slot. This is modeled via a binary value $c_i$. It is 0 by default and set to 1 to indicate that the $\tau$ message packets before the reset need not be recovered if their transmitted packets are lost; this ensures that loss recovery does not rely on having already decoded these previous message packets. Whenever a reset is triggered, the values of $b_i$ and $\ell_b, \ldots, \ell_{i+b_i-1}$ are also updated.

A. Encoding and Decoding

Defining encoding and decoding requires understanding what information is available during the $i$th time slot. In the "offline" setting, the sizes of future message packets and future feedback from the receiver are assumed to be known in advance. In contrast, the setting where this information is unavailable is dubbed "online." We introduce side information, $O_i$, to capture the available information. Thus, in the offline setting, $O_i$ comprises the sizes of future message packets and future feedback. In the online setting, side information is the output of a predictive model (see Section V for details). During time slot $i$, the sender uses the prior message packets and side information, $O_i$, to encode as $$X[i] = Enc(S[0], \ldots, S[i], O_i).$$

We consider two types of decoding: (a) decoding when there are no losses, and (b) decoding when there are losses. First, when there are no losses (or all losses have already been recovered), the *lossless-delay constraint* requires decoding each message packet, $S[i]$, within the same time slot:

$$S[i] = Dec^{(L)}(S[0], \ldots, S[i-1], Y[i], k_i).$$

Second, when there are losses, the *worst-case-delay constraint* stipulates that each message packet is recovered within $\tau$ time slots. Specifically, for any burst starting in time slot $j$ of length $b_j$ that encompasses time slot $i$, $$S[i] = Dec(S[0], \ldots, S[j-1], Y[j], \ldots, Y[i+\tau], \\ k_0, \ldots, k_{i+\tau}). \quad (1)$$

We note that under variable-size message packets, the sizes of the message packets are needed for decoding [22]–[24]. This is handled by adding a small header containing the sizes of the previous $\tau$ message packets. Also, our constructions do not require the full memory allowed under the model because they do not use any information about message packets and transmitted packets more than $2\tau$ time slots in the past.

B. Notation and Conventions

Let $[n]$ denote $\{0, \ldots, n\}$. Any vector, $V$, is a column vector of length $v$. For any $I = \{j_1, \ldots, j_t\} \subseteq [n]$ where $j_1 < \ldots < j_t$, the values of $V$ in the positions of $I$ are denoted as $V_I = V_{j_1, \ldots, j_t}$. For any time slots $i \leq j \in [t]$ and vectors $Z[i], \ldots, Z[j]$, let $Z[i:j] = Z[i], \ldots, Z[j]$, and $z_i, \ldots, z_j$ denote their sizes. Let $0^{(j)}$ be a vector of $j$ zeros.

Next, we define extra notation for bursts. For any time slot, $i$, let $\mathbb{B}_i$ be the set of time slots, $j$, for which a burst starting in time slot $j$ includes time slot $i$ (i.e., $i \in \{j, \ldots, j+b_j-1\}$).

We now introduce some conventions followed in the rest of the paper. The final $(\tau+1)$ message packets are assumed to be of size 0, and $t$ is at least $(\tau+1)$; this can be satisfied by appending $(\tau+1)$ message packets of size 0 without affecting the optimal rate. Because an integral number of transmitted packets are always sent, for each time slot, $i$, $\ell_i$ can be restricted to be a rational number $q_i/h_i$ in simplest form. To simplify our presentation of constructions and proofs, we require $h_i | k_i$ and $k_i \leq m - h_i$; this can be accomplished by zero-padding $S[i]$ and increasing $m$ by at most $(h_i-1)$.

III. A Building Block Construction

This section develops an approximately rate-optimal construction for any parameters, $\tau$ and $t$, message packet size sequence, $K = (k_0, \ldots, k_t)$, and feedback, $\mathcal{L} = (\ell_0, \ldots, \ell_t), B = (b_0, \ldots, b_t)$, and $Z = (c_0, \ldots, c_t)$. We present a building block to construct a code given any splits of the message packets into (a) a component recovered within $(\tau-1)$ time slots, and (b) a component recovered $\tau$ time slots later. Specifically, for any time slot $i \in [t-\tau]$, let $w_i$ be the number of symbols of $S[i]$ to be recovered during time slot $(i+\tau)$, and let $W = (w_0, \ldots, w_{t-\tau})$. At a high level, $(k_i - w_i)$ symbols of $S[i]$ are received or recovered using the parity symbols of $X[i:i+\tau-1]$. Then $w_i$ parity symbols are sent in $X[i+\tau]$ to recover the remaining lost symbols of $S[i]$. The construction is called "$(\tau, t, K, Z, \mathcal{L}, B, W)$-Split Code."

Encoding (high-level description). During time slot $i$, $S[i]$ is partitioned into $S[i] = (U[i], V[i])$. Parity symbols $P[i]$ are defined as $P[i] = (P^{(v)}[i] + P^{(u)}[i])$ where $P^{(v)}[i]$ comprises symbols that are full-rank linear combinations of the symbols of $V[i-\tau], \ldots, V[i]$ and $P^{(u)}[i]$ comprises full-rank linear combinations of the symbols of $U[i-\tau]$. The key property of the linear equations and choices of how to split is that for any $j \in [t]$ and burst of length $b_j$ starting in time slot $j$, the symbols of $V[j], \ldots, V[j+b_j-1]$ can be recovered by time slot $(j+\tau-1)$. Finally, the symbols of $U[i], V[i], P[i]$ are each evenly spread over $h_i$ transmitted packets. Figure 2 provides an overview of encoding.

Recovery (high-level description). Consider a burst starting in time slot $i$ of length $b_i$ where $Y[i:i+b_i-1]$ are received. First, for $j \in \mathbb{B}_i$, the received symbols of $P[j]$ are combined with $U[j-\tau]$ (which would have been already received) to determine $P^v[j]$. Then the received symbols of $P^v[i:i+\tau-1]$ are used to recover $V[i:i+b_i-1]$ by solving a system of linear equations. Second, for each $j \in \{i+\tau, \ldots, i+\tau+b_i-1\}$, 2023 IEEE International Symposium on Information Theory (ISIT)

$P'[j]$ is computed using $V[j - \tau : j]$, yielding $P^{(\star)}[j] = (P[j] - P'[j])$. Combining $P^{(\star)}[j]$ with the received symbols of $U[j - \tau]$ suffices to recover $U[j - \tau]$.

Code construction (detailed description) time slot $i$. The five-step encoding process comprises: (a) initialization, (b) splitting $S[i]$ into $V[i]$ and $U[i]$, (c) defining $P[i]$ given $V[j], U[j]$ for $j < i$, (d) allocating symbols to transmitted packets, and (e) handling resets from $c_i = 1$.

*Initialization:* For any $i \in [\tau - 1]$, $U[i] = S[i]$, $v_i = 0$, $p_{i+\tau} = k_i \ell_i$, and $p_i = 0$.

*Splitting $S[i]$:* For $i \in \{\tau, \ldots, t - \tau\}$, $S[i]$ splits into $S[i] = (U[i], V[i])$ where $u_i = 0$ if $\ell_i = 0$ and otherwise $u_i = u_i/\ell_i$. For each $j \in \mathbb{B}_i, l \in \{j, \ldots, j + b_j - 1\}$, we define the number of received parity symbols for recovering $V[j : j + b_j - 1]$ as $d^{(i,j,l)}$ next. Since for any $l > i$ $k_l$ is not available, we pretend that all future message packets are recovered using parity symbols sent after time slot $(i + \tau)$ by setting $u_l = k_l = 0$ (for Equations 2 and 3 below), leading to $$d^{(i,j,l)} = \min\left((1 - \ell_l)u_l, k_l - u_l\ell + \sum_{r=j}^{l-1}(k_r - u_r\ell_r - d^{(i,j,r)})\right). \quad (2)$$

To ensure $V[j : j + b_j - 1]$ are recovered by time slot $(j + \tau - 1)$, we require $$\sum_{l=j+b_j}^{j+\tau-1} p_l + \sum_{l=j}^{j+b_j-1} d^{(i,j,l)} \geq \sum_{l=j}^{j+b_j-1}(k_l - u_l\ell_l). \quad (3)$$

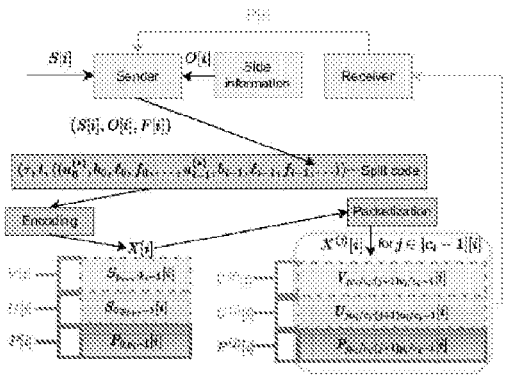

Fig. 2: Overview of encoding.

$$P[j] = (P^{(\star)}[j] + P'[j]). \quad (5)$$

*Allocating symbols to transmitted packets.* Let $c_i = k_i$. The symbols of each of $V[i], U[i]$, and $P[i]$ are evenly allocated over $c_i$ transmitted packets. Formally, for each $j \in [c_i - 1]$, the $j$th $v_i/c_i$, $u_i/c_i$, and $p_i/c_i$ symbols of $V[i], U[i]$, and $P[i]$, are called $V^{(j)}[i], U^{(j)}[i]$, and $P^{(j)}[i]$,respectively. Then let $$X^{(j)}[i] = (V^{(j)}[i], U^{(j)}[i], P^{(j)}[i]).$$

*Resets.* When $c_i = 1$ the sender treats $S[i]$ as the first message packet of a length $(t - i + 1)$ call and completes initialization.

at their respective deadlines. Finally, Constraint 5 reflects that $w_i$ never exceeds the number of lost symbols of $S[i]$.

Algorithm 1 Computes $(w_i | i \in [t])$ of an approximately rate optimal code.

Input: $(\tau, t, K, Z)$
For $i \in [t - \tau]$:
  If a reset occurs between time slot $(i + 1)$ and $(i + \tau)$:
    Treat $k_i$ as 0 in the below LP.
Minimize $\sum_{j=0}^{t-\tau} p_{j+\tau}^{(LP)}$ subject to:
1) $\forall j \in [\tau - 1], p_j^{(LP)} = 0$.
2) $\forall j \in [t - \tau], p_{j+\tau}^{(LP)} \geq 0$.
3) $\forall i \in [t - \tau], l \in \{i, \ldots, i + k_i - 1\}$,
$$0 \leq d_{i,l} \leq \min((p_l^{(LP)} + k_l)(1 - \ell_i),$$
$$k_l - p_{l+\tau}^{(LP)} + \sum_{r=i}^{l-1}(k_r - p_{r+\tau}^{(LP)} - d_{i,r})$$
4) $\forall i \in [t - \tau]$,
$$\sum_{l=i+k_i}^{i+\tau-1} p_l^{(LP)} + \sum_{l=i}^{i+k_i-1} d_{i,l} \geq \sum_{l=i}^{i+k_i-1}(k_l - p_{l+\tau}^{(LP)}) \quad (6)$$
5) $\forall j \in [t - \tau], k_j \ell_j \geq p_{j+\tau}^{(LP)}$.

For $i \in [t - \tau]$:
  If a reset occurs between time slot $(i + 1)$ and $(i + \tau)$:
    Set $p_{i+\tau}^{(LP)} = \ell_i k_i$.

Output: $\left(p_i^{(LP)} | i \in [t]\right)$

Theorem 2 below shows that combining Algorithm 1 with the building block construction (Section III) yields an approximately rate-optimal code subject to the following condition on the reset bit in feedback.

Reset condition on feedback : A reset must occur whenever an increasing fraction of transmitted packets could be lost. Formally, for any $i \in [t - \tau] \setminus \{0\}$ where feedback increases $\ell_i$, $\zeta_i$ must be set to 1.

Theorem 2: For any $\tau, t, K, Z, \mathcal{L}, B$, if Algorithm 1 outputs $(w_i | i \in [t])$, then the rate of the corresponding Split Code is less than the optimal rate under the reset condition on feedback by at most
$$\left(\sum_{i=0}^{t-\tau}(2\tau + q_i + h_{i+\tau} - 4)\right) / \left(\sum_{i=0}^{t} k_i\right). \quad (7)$$

As an example of applying Theorem 2, consider a videoconferencing call at 2000 kbps and 30 fps. Suppose the field size is $2^{32}$, for $i \in [t] \ell_i \in \{j/8 | j \in [8]\}$, and $\tau \leq 5$. Then the rate of the Split Code is within 0.01 of optimal.

V. ONLINE APPROXIMATELY RATE-OPTIMAL CODES

We now present an online approximately rate-optimal construction, dubbed the $(\tau, t, K, Z, \mathcal{L}, B, W^{(O)})$-Split ML Code." During the $i$th time slot, an ML model provides side information, $O_i = w_i$, to determine how to split the $i$th frame in the building block construction (Section III). If $\ell_i = 0$ then $X[i]$ is received, so $O_i$ must be 0. Otherwise, to ensure $O_i$ can be used by the building block construction, we require it to be (a) sufficiently large (i.e., setting $w_i = O_i / \ell_i$ satisfies Equation 3), and (b) padded to be divisible by $q_i$.

Our result requires a few terms. Let the outputs of the ML model over time slots $0, \ldots, (t - \tau)$ be $W^{(O)} = O_0, \ldots, O_{t-\tau}$. For $i \in 0, \ldots, (t - \tau)$, let $W_i^{(Opt)}$ be the set of optimal values for $p_{i+\tau}^{(LP)}$ in Algorithm 1 with additional constraints that the variables corresponding to earlier time slots are set according to $W^{(O)}$ (i.e., for $j \in [i - 1]$ $p_{j+\tau}^{(LP)} = W_j^{(O)}$). For $i \in [t - \tau]$, the regret of the outputs of the ML model compared to the optimal values is
$$\mathcal{R}_i = \min_{w^{(Opt)} \in W_i^{(Opt)}} |O_i - w^{(Opt)}|, \mathcal{R}_{[i]} = (\mathcal{R}_0, \ldots, \mathcal{R}_i) \quad (8)$$

For an arbitrary message packet size sequence and feedback chosen offline without access to $W^{(O)}$, let $R^{(opt)}$ be the offline optimal rate under the reset condition on feedback from Section IV and $R^{(on)}$ be a random variable (over the predictions of the ML model) reflecting the rate of the Split ML Code.

Theorem 3: Consider any $\tau, t, K, Z, \mathcal{L}, B, W^{(O)}$ and $\epsilon, \delta, \epsilon_f \in (0, 1)$. Suppose for $i \in [t]$ that $E[\mathcal{R}_i] \leq \epsilon k_i$ and $t > \log(1/\delta)/(2\epsilon_f^2)$. Then with probability at least $(1 - \delta)$,
$$R^{(opt)} - R^{(on)} \leq \epsilon + \left(\sum_{i=0}^{t} \epsilon_f + 2\tau + h_i + q_i - 4\right) / \left(\sum_{i=0}^{t} k_i\right). \quad (9)$$

Consider the example of a videoconferencing call discussed after Theorem 2. If the call is sufficiently long, with probability $(1 - \delta)$, $R^{(on)}$ is within $(0.01 + \epsilon + 0.00048 \cdot \epsilon_f)$ of optimal.

VI. CONCLUSION

Motivated by live-streaming applications experiencing partial bursts of only some packets per message, our work introduces the first streaming model to accommodate such losses. We then present a streaming code construction that is approximately rate-optimal under a natural (reset) condition in two steps. First, we use a learning-augmented algorithm to split message packets into (a) a component recovered strictly before its decoding deadline, and (b) a component recovered at its decoding deadline. Second, we introduce a building block construction to design a code given the choice of how to split message symbols that is approximately rate-optimal code under the reset condition. Future work can build upon our results in three main directions: (a) construct explicit predictive models to split message packets, (b) construct explicit predictive models to estimate the channel parameters (i.e., the feedback), and (c) combine our methodology with that of [24] to spread message symbols over $(\tau_L + 1) \geq 2$ time slots to alleviate the negative impact on the rate of the variability in the sizes of the message packets.

ACKNOWLEDGMENT

This work was funded in part by an NSF grant (CCF-1910813).

REFERENCES

[1] E. Martinian and C.-E. W. Sundberg, "Burst erasure correction codes with low decoding delay," *IEEE Transactions on Information Theory*, vol. 50, no. 10, pp. 2494–2502, Oct 2004.

[2] E. Martinian and M. Trott, "Delay-optimal burst erasure code construction," in *2007 IEEE International Symposium on Information Theory*, June 2007, pp. 1006–1010.

[3] A. Badr, P. Patil, A. Khisti, W. Tan, and J. Apostolopoulos, "Layered constructions for low-delay streaming codes," *IEEE Transactions on Information Theory*, vol. 63, no. 1, pp. 111–141, Jan 2017.

[4] S. L. Fong, A. Khisti, B. Li, W. Tan, X. Zhu, and J. Apostolopoulos, "Optimal streaming codes for channels with burst and arbitrary erasures," *IEEE Transactions on Information Theory*, vol. 65, no. 7, pp. 4274–4292, July 2019.

[5] M. N. Krishnan and P. V. Kumar, "Rate-optimal streaming codes for channels with burst and isolated erasures," in *2018 IEEE International Symposium on Information Theory (ISIT)*, June 2018, pp. 1809–1813.

[6] M. N. Krishnan, D. Shukla, and P. V. Kumar, "Rate-optimal streaming codes for channels with burst and random erasures," *IEEE Trans. Inf. Theory*, vol. 66, no. 8, pp. 4869–4891, 2020.

[7] E. Domanovitz, S. L. Fong, and A. Khisti, "An explicit rate-optimal streaming code for channels with burst and arbitrary erasures," vol. 68, no. 1, 2022, pp. 47–65.

[8] A. Badr, A. Khisti, and E. Martinian, "Diversity embedded streaming erasure codes (de-sco): Constructions and optimality," *IEEE Journal on Selected Areas in Communications*, vol. 29, no. 5, pp. 1042–1054, May 2011.

[9] N. Adler and Y. Cassuto, "Burst-erasure correcting codes with optimal average delay," *IEEE Transactions on Information Theory*, vol. 63, no. 5, pp. 2848–2865, May 2017.

[10] D. Leong and T. Ho, "Erasure coding for real-time streaming," in *2012 IEEE International Symposium on Information Theory Proceedings*, July 2012, pp. 289–293.

[11] D. Leong, A. Qureshi, and T. Ho, "On coding for real-time streaming under packet erasures," in *2013 IEEE International Symposium on Information Theory*, July 2013, pp. 1012–1016.

[12] S. L. Fong, A. Khisti, B. Li, W. T. Tan, X. Zhu, and J. Apostolopoulos, "Optimal streaming erasure codes over the three-node relay network," *IEEE Transactions on Information Theory*, vol. 66, no. 5, pp. 2696–2712, 2020.

[13] A. Badr, A. Khisti, W.-t. Tan, X. Zhu, and J. Apostolopoulos, "Fec for voip using dual-delay streaming codes," in *IEEE INFOCOM 2017 - IEEE Conference on Computer Communications*, 2017, pp. 1–9.

[14] Z. Li, A. Khisti, and B. Girod, "Correcting erasure bursts with minimum decoding delay," in *2011 Conference Record of the Forty Fifth Asilomar Conference on Signals, Systems and Computers (ASILOMAR)*, Nov 2011, pp. 33–39.

[15] Y. Wei and T. Ho, "On prioritized coding for real-time streaming under packet erasures," in *Communication, Control, and Computing (Allerton), 2013 51st Annual Allerton Conference on*. IEEE, 2013, pp. 327–334.

[16] P.-W. Su, Y.-C. Huang, S.-C. Lin, I.-H. Wang, and C.-C. Wang, "Random linear streaming codes in the finite memory length and decoding deadline regime—part i: Exact analysis," *IEEE Transactions on Information Theory*, vol. 68, no. 10, pp. 6356–6387, 2022.

[17] S. Emara, F. Wang, I. Kaplan, and B. Li, "Ivory: Learning network adaptive streaming codes," pp. 1–10, 2022.

[18] S. Emara, S. L. Fong, B. Li, A. Khisti, W.-T. Tan, X. Zhu, and J. Apostolopoulos, "Low-latency network-adaptive error control for interactive streaming," *IEEE Transactions on Multimedia*, vol. 24, pp. 1691–1706, 2021.

[19] M. N. Krishnan, G. K. Facenda, E. Domanovitz, A. Khisti, W.-T. Tan, and J. Apostolopoulos, "High rate streaming codes over the three-node relay network," in *2021 IEEE Information Theory Workshop (ITW)*. IEEE, 2021, pp. 1–6.

[20] E. Domanovitz, A. Khisti, W.-T. Tan, X. Zhu, and J. Apostolopoulos, "Streaming erasure codes over multi-hop relay network," in *2020 IEEE International Symposium on Information Theory (ISIT)*. IEEE, 2020, pp. 497–502.

[21] M. Haghifam, M. N. Krishnan, A. Khisti, X. Zhu, W.-T. Tan, and J. Apostolopoulos, "On streaming codes with unequal error protection," *IEEE J. Sel. Areas Inf. Theory*, 2021.

[22] M. Rudow and K. Rashmi, "Streaming codes for variable size messages," *IEEE Transactions on Information Theory*, pp. 1–1, 2022.

[23] ——, "Online versus offline rate in streaming codes for variable-size messages," 2023, pp. 1–1.

[24] ——, "Learning-augmented streaming codes are approximately optimal for variable-size messages," in *2022 IEEE International Symposium on Information Theory (ISIT)*, 2022, pp. 474–479.

[25] M. Rudow, F. Y. Yan, A. Kumar, G. Ananthanarayanan, M. Ellis, and K. Rashmi, "Tambur: Efficient loss recovery for videoconferencing via streaming codes," in *20th USENIX Symposium on Networked Systems Design and Implementation (NSDI 23)*. Boston, MA: USENIX Association, Apr. 2023, pp. 953–971. [Online]. Available: https://www.usenix.org/conference/nsdi23/presentation/rudow

[26] M. Rudow and K. Rashmi, "Learning-augmented streaming codes for variable-size messages under partial burst losses," http://www.cs.cmu.edu/~rvinayak/papers/learning_augment_streaming_codes_under_partial_bursts_ISIT_2023.pdf, 2023.

[27] E. Gabidulin, "Convolutional codes over large alphabets," in *Proc. Int. Workshop on Algebraic Combinatorial and Coding Theory*, 1988, pp. 80–84.

[28] H. Gluesing-Luerssen, J. Rosenthal, and R. Smarandache, "Strongly-mds convolutional codes," *IEEE Transactions on Information Theory*, vol. 52, no. 2, pp. 584–598, 2006.

APPENDIX C – EXTENDED VERSION WITH PROOFS

Learning-augmented streaming codes for variable-size messages under partial burst losses Michael Rudow and K.V. Rashmi

Abstract

Recovering bursts of lost packets in real-time is crucial to multimedia live-streaming applications' quality-of-experience (QoE). Streaming codes optimally handle the unique aspects of loss recovery for live streaming, including (a) variable-size messages, (b) a real-time playback deadline, and (c) burst losses across multiple frames. However, existing models for streaming codes in this setting only apply to bursts that drop *all* data sent for each message. Yet in many real-world applications only some packets are lost for each message in what we call a "partial burst." We introduce a new streaming model to accommodate partial bursts. We then design a building block to construct a streaming code given any choice of how much parity to allocate for each message. Next, we present a streaming code in an offline setting (i.e., where the sizes of future messages are known) by combining (a) the building block with (b) a linear program to set the number of parity symbols per message. We then design a streaming code in an online setting (i.e., without knowledge of the future) by combining (a) the building block with (b) a learning-augmented algorithm to set the number of parity symbols per message. The constructions are approximately rate-optimal under a natural condition on the nature of feedback.

I. INTRODUCTION

Live streaming is crucial to numerous popular applications ranging from videoconferencing to cloud gaming. The QoE of such applications depends on several factors, including bandwidth, latency, and packet loss recovery. Retransmission can recover lost packets using minimal redundancy in three steps: (a) transmission, (b) feedback, and (c) retransmission. But the latency of three one-way delays is prohibitively high for long-distance communication. Instead, erasure codes can be used for loss recovery.

The main drawback of traditional erasure codes like block codes or random linear convolutional codes is that they are inefficient at recovering burst losses in real-time. This is problematic for the many live-streaming applications that experience bursty losses. The weakness arises from the fact that conventional approaches recover all lost packets simultaneously. If a burst loss encompasses multiple messages, the first message of the burst is unavailable until after recovering the lost packets of the final message. This property can cause the latency to exceed the playback deadline of the first message. In contrast, "streaming codes" are designed to recover each message in the burst sequentially. Hence, earlier messages are available to be played sooner. This reduces the latency for recovering earlier messages in a burst. As such, streaming codes are better suited for real-time communication.

Streaming codes were first introduced by Martinian and Sundberg in [1]. Under their streaming model, during each time slot, $i$, a *message packet*, $S[i]$, of $k$ symbols arrives at a sender. A *channel packet*, $X[i]$, of $n$ symbols is sent over a burst-only packet loss model. Losses occur as bursts of $b$ consecutive channel packets followed by guard spaces of at least $\tau$ consecutive receptions. Each message packet must be recovered within $\tau$ time slots to satisfy the playback requirement. Martinian and Sundberg introduced rate-optimal streaming codes for several parameters, then Martinian and Trott presented rate-optimal codes for the remaining parameters in [2]. Many other works have studied streaming codes for various models of communication that fix the sizes of message packets and channel packets in advance [2]–[12], [12]–[21].

Motivated by the varying sizes of message packets in many live-streaming applications, such as videoconferencing, a new streaming model was introduced in [22]. Our paper focuses on this setting of variable-size message packets. Under this model, $S[i]$ and $X[i]$ are of sizes $k_i$ and $n_i$, respectively, for non-negative integers $k_i$ and $n_i$. Under this model, the optimal rate is adversely affected by the variability in the sizes of message packets. Spreading message symbols over multiple channel packets can mitigate the negative impact of the variability. However, spreading message symbols increases the latency to recover message packets when there are no losses—this is termed the "lossless-delay." As such, spreading across several channel packets may not be acceptable for many live-streaming applications. Rate-optimal and approximately rate-optimal streaming codes have been introduced when the lossless-delay is zero and one in [23] and [24], respectively.

The streaming model for variable message-sizes involves sending one channel packet per frame which is either received or lost. The prior works [3], [10], [11] on streaming codes that send multiple packets per message packet apply to settings where the sizes of message packets are fixed and bursts where *all* consecutive packets are lost. Unlike the existing literature on theoretical streaming codes, real-world applications frequently experience what we dub "partial bursts" losses of only some packets per frame. This was shown in a recent work [25] by assessing a large corpus of packet loss traces from Microsoft Teams 1:1 video calls and showing the prevalence of bursts where only some packets are lost per frame. The authors also proposed a heuristic-based design of new streaming codes suitable for such losses, and used these constructions to showcase the viability and potential benefits of streaming codes for improving the QoE for real-world live-streaming applications. The promising observations in [25] motivate a formal study of streaming codes for partial bursts.

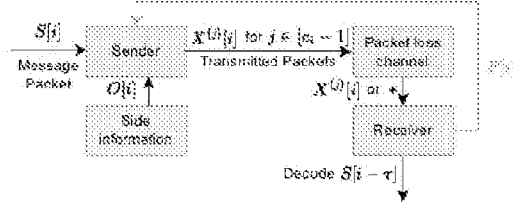

Fig. 1: Overview of the proposed streaming model. Multiple packets are transmitted over the channel for each message packet. The packet loss channel allows for partial bursts.

In this paper, we generalize the streaming model for variable message-sizes to accommodate sending one or more "transmitted packets" per time slot, where only a fraction of the transmitted packets may be lost in a burst (termed *partial bursts*). The receiver sends occasional feedback to the sender to inform the choice of parameters associated with partial bursts. The model is shown in Figure 1—the component "side information" will be introduced later in Section II. In the literature on streaming codes, arbitrary losses are often considered along with burst losses. While one could proceed to account for partial bursts by introducing arbitrary losses into the loss model, doing so would allow arbitrary losses over *across multiple time slots*. Allowing such arbitrary losses would reduce streaming codes' potential to exploit the bursty structure of losses clustered within a few consecutive frames observed in [25]. Instead, this burst structure can be leveraged under our new model with partial bursts.

We apply a two-step methodology to design streaming codes for the new model. First, a building block construction to design a streaming code given any split of each message packet into (a) one component guaranteed to be recovered strictly before its playback deadline (i.e., within $(\tau - 1)$ time slots), and (b) another component guaranteed to be recovered by its playback deadline (i.e., $\tau$ time slots later). Second, a policy for how to split each message packet into these two components. Our work uses a linear program to determine how to split message packets in the offline setting where the sizes of future message packets are available. Combining the linear program for splitting frames with the building block construction yields an approximately rate-optimal code under a natural condition on the nature of feedback (termed the "reset condition"). Finally, we employ a learning-augmented algorithm to determine the split to build a construction for the online setting where the sizes of future message packets are unavailable which is approximately rate-optimal under the reset condition.

II. SYSTEM MODEL

We now extend the streaming model with variable-size message packets from [22], as illustrated in Figure 1. There are a positive number, $t$, of time slots. During the $i$th time slot, the sender obtains a message packet, $S[i]$, of $k_i$ independent random symbols of a finite field, $\mathbb{F}$, where $k_i \in \{0, \ldots, m\}$ for some maximum value, $m$. We call $k_0, \ldots, k_t$ the "message packet size sequence." The sender sends $c_i$ *transmitted packets*, $X^{(0)}[i], \ldots, X^{(c_i-1)}[i]$, consisting of $n_i^{(0)}, \ldots, n_i^{(c_i-1)}$ symbols, respectively. This change to the model allowing multiple packets to be transmitted over the channel for each message packet is a stepping stone toward adding partial bursts to the loss model. We denote the transmitted packets, number of symbols sent, and number of parity symbols as $$X[i] = \left\langle X^{(0)}[i], \ldots, X^{(c_i-1)}[i] \right\rangle,$$

$$n_i = \sum_{j=0}^{c_i-1} n_i^{(j)},$$

$$p_i = n_i - k_i,$$

respectively. The rate is defined as in [22] as the ratio of message symbols to transmitted symbols:

$$R_t = \frac{\sum_{i=0}^{t} k_i}{\sum_{i=0}^{t} n_i}.$$

Loss model: The transmitted packets are sent over a channel with bursty losses (affecting one or more consecutive time slots) followed by guard spaces where there are no losses. We introduce a new type of burst loss, called a *partial burst*. In each time slot within a partial burst, only a fraction of the transmitted packets are lost. Formally, for a partial burst of length $b$ starting at time slot $i$, for each time slot $l$ within the partial burst, $l \in \{i, \ldots, i+b-1\}$, a $\ell \in (0, 1]$ fraction of the transmitted packets can be lost. That is, an arbitrary $\lceil \ell c_l \rceil$ transmitted packets of $X[l]$ are lost.

Further, the length and the fraction of packets lost in partial bursts are allowed to vary over time in order to enable using feedback (based on network changes) to tune the code. Formally, a partial burst starting in time slot $i$ encompasses $b_i$ consecutive time slots, where $b_i$ is a positive integer. During each time slot of the partial burst, $j \in \{i, \ldots, i + b_i - 1\}$, $\ell_j$ fraction of the transmitted packets are lost. Other than perhaps the few time slots after receiving feedback, $\ell_j = \ell_i$. The partial burst is followed by a guard space of at least $\tau$ time slots where all transmitted packets are received.

For any time slot $i$, we denote the $c_i$ received packets as $$Y[i] = \left(Y^{(0)}[i], \ldots, Y^{(c_i-1)}[i]\right),$$

where each received packet corresponds to either receiving the corresponding transmitted packet intact or it being lost. That is, for $j \in \{0, \ldots, c_i - 1\}$, $$Y^{(j)}[i] = \begin{cases} X^{(j)}[i] & \text{if } X^{(j)}[i] \text{ is received} \\ * & \text{if } X^{(j)}[i] \text{ is lost} \end{cases}$$

Feedback: The sender occasionally receives feedback from the receiver for updating the burst length and the fraction of transmitted packets lost. During any time slot $i$ where feedback is received, $b_i$ and all undefined $\ell_j$ for $j \in \{i, \ldots, i + b_i - 1\}$ are updated accordingly. If there is no feedback, the parameters do not change (i.e., $b_i$ and $\ell_{i+b_i-1}$ are set based on the last received feedback). The feedback can be viewed as the receiver conservatively estimating how lossy the network conditions will be based on prior losses. At times, there could be an underestimation of the losses, and that could lead to message packets not being recovered. In videoconferencing, due to compression, video frames are typically dependent on each other. Hence not recovering a message packet can lead to several subsequent packets not being useful even though they are received intact. Thus, the receiver can send additional feedback to signal that a *reset* is needed during any time slot. This is modeled via a binary value $\zeta_i$. It is 0 by default and set to 1 to indicate that the $\tau$ message packets before the reset need not be recovered if their transmitted packets are lost; this ensures that loss recovery does not rely on having already decoded these previous message packets. Whenever a reset is triggered, the values of $b_i$ and $\ell_i, \ldots, \ell_{i+b_i-1}$ are also updated.

*A. Encoding and Decoding*

Defining encoding and decoding requires understanding what information is available during the $i$th time slot. In the "offline" setting, the sizes of future message packets and future feedback from the receiver are assumed to be known in advance. In contrast, the setting where this information is unavailable is dubbed "online." We introduce side information, $O_i$, to capture the available information. Thus, in the offline setting, $O_i$ comprises the sizes of future message packets and future feedback. In the online setting, side information is the output of a predictive model (see Section V for details). During time slot $i$, the sender uses the prior message packets and side information, $O_i$, to encode as $$X[i] = Enc(S[0], \ldots, S[i], O_i).$$

We consider two types of decoding: (a) decoding when there are no losses, and (b) decoding when there are losses. First, when there are no losses (or all losses have already been recovered), the *lossless-delay constraint* requires decoding each message packet, $S[i]$, within the same time slot:

$$S[i] = Dec^{(L)}(S[0], \ldots, S[i-1], Y[i], k_i).$$

Second, when there are losses, the *worst-case-delay constraint* stipulates that each message packet is recovered within $\tau$ time slots. Specifically, for any burst starting in time slot $j$ of length $b_j$ that encompasses time slot $i$, $$S[i] = Dec(S[0], \ldots, S[j-1], Y[j], \ldots, Y[i+\tau], \\ k_0, \ldots, k_{i+\tau}). \qquad (1)$$

We note that under variable-size message packets, the sizes of the message packets are needed for decoding [22]–[24]. This is handled by adding a small header containing the sizes of the previous $\tau$ message packets. Also, our constructions do not require the full memory allowed under the model because they do not use any information about message packets and transmitted packets more than $2\tau$ time slots in the past.

*B. Notation and Conventions*

Let $[n]$ denote $\{0,\ldots,n\}$. Any vector, $V$, is a column vector of length $v$. For any $I = \{j_1,\ldots,j_i\} \subseteq [n]$ where $j_1 < \ldots < j_i$, the values of $V$ in the positions of $I$ are denoted as $V_I = V_{[j_1,j_i]}$. For any time slots $i \leq j \in [t]$ and vectors $Z[i],\ldots,Z[j]$, let $Z[i:j] = Z[i],\ldots,Z[j]$, and $z_i,\ldots,z_j$ denote their sizes. Let $0^{(j)}$ be a vector of $j$ zeros.

Next, we define extra notation for bursts. For any time slot, $i$, let $\mathbb{B}_i$ be the set of time slots, $j$, for which a burst starting in time slot $j$ includes time slot $i$ (i.e., $i \in \{j,\ldots,j+b_j-1\}$).

We now introduce some conventions followed in the rest of the paper. The final $(\tau+1)$ message packets are assumed to be of size 0, and $t$ is at least $(\tau+1)$; this can be satisfied by appending $(\tau+1)$ message packets of size 0 without affecting the optimal rate. Because an integral number of transmitted packets are always sent, for each time slot, $i$, $\ell_i$ can be restricted to be a rational number $q_i/h_i$ in simplest form. We expect $(h_i-1)$ to be negligible for practical settings; this can be guaranteed by considering higher values of $\ell_i$ with smaller values for $h_i$. To simplify our presentation of constructions and proofs, we require $h_i | k_i$ and $k_i \leq m - h_i$; this can be accomplished by zero-padding $S[i]$ and increasing $m$ by at most $(h_i-1)$. The cost of zero-padding is at most $\sum_{i=0}^{t} 2(h_i - 1)$ (because replication could be used). Additional notation for proofs in the appendix is available in Appendix A.

III. A BUILDING BLOCK CONSTRUCTION

This section develops an approximately rate-optimal construction for any parameters, $\tau$ and $t$, message packet size sequence, $K = (k_0,\ldots,k_t)$, and feedback, $\mathcal{L} = (\ell_0,\ldots,\ell_t)$, $B = (b_0,\ldots,b_t)$, and $Z = (\zeta_0,\ldots,\zeta_t)$. We present a building block to construct a code given any splits of the message packets into (a) a component recovered within $(\tau-1)$ time slots, and (b) a component recovered $\tau$ time slots later. Specifically, for any time slot $i \in [t-\tau]$, let $w_i$ be the number of symbols of $S[i]$ to be recovered during time slot $(i+\tau)$, and let $W = (w_0,\ldots,w_{t-\tau})$. At a high level, $(k_i - w_i)$ symbols of $S[i]$ are received or recovered using the parity symbols of $X[i:i+\tau-1]$. Then $w_i$ parity symbols are sent in $X[i+\tau]$ to recover the remaining lost symbols of $S[i]$. The construction is called "$(\tau, t, K, Z, \mathcal{L}, B, W)$-Split Code."

Encoding (high-level description). During time slot $i$, $S[i]$ is partitioned into $S[i] = (U[i], V[i])$. Parity symbols $P[i]$ are defined as $P[i] = (P^{(v)}[i] + P'[i])$ where $P'[i]$ comprises symbols that are full-rank linear combinations of the symbols of $V[i-\tau],\ldots,V[i]$ and $P^{(v)}[i]$ comprises full-rank linear combinations of the symbols of $U[i-\tau]$. The key property of the linear equations and choices of how to split is that for any $j \in [i]$ and burst of length $b_j$ starting in time slot $j$, the symbols of $V[j],\ldots,V[j+b_j-1]$ can be recovered by time slot $(j+\tau-1)$. Finally, the symbols of $U[i], V[i], P[i]$ are each evenly spread over $h_i$ transmitted packets. Figure 2 provides an overview of encoding.

Recovery (high-level description). Consider a burst starting in time slot $i$ of length $b_i$ where $Y[i:i+b_i-1]$ are received. First, for $j \in \mathbb{B}_i$, the received symbols of $P[j]$ are combined with $U[j-\tau]$ (which would have been already received) to determine $P'[j]$. Then the received symbols of $P'[i:i+\tau-1]$ are used to recover $V[i:i+b_i-1]$ by solving a system of linear equations. Second, for each $j \in \{i+\tau,\ldots,i+\tau+b_i-1\}$, $P'[j]$ is computed using $V[j-\tau:j]$, yielding $P^{(v)}[j] = (P[j] - P'[j])$. Combining $P^{(v)}[j]$ with the received symbols of $U[j-\tau]$ suffices to recover $U[j-\tau]$. Figure 3 provides an overview of loss recovery.

Code construction (detailed description) time slot $i$. The five-step encoding process comprises: (a) initialization, (b) splitting $S[i]$ into $V[i]$ and $U[i]$, (c) defining $P[i]$ given $V[j], U[j]$ for $j < i$, (d) allocating symbols to transmitted packets, and (e) handling resets from $\zeta_i = 1$.

*Initialization:* For any $i \in [\tau-1]$, $U[i] = S[i]$, $v_i = 0$, $p_{i-\tau} = k_i \ell_i$, and $p_i = 0$.

*Splitting $S[i]$:* For $i \in \{\tau,\ldots,t-\tau\}$, $S[i]$ splits into $S[i] = (U[i], V[i])$ where $u_i = 0$ if $\ell_i = 0$ and otherwise $u_i = w_i/\ell_i$. For each $j \in \mathbb{B}_i, l \in \{j,\ldots,j+b_j-1\}$, we define the number of received parity symbols for recovering $V[j:j+b_j-1]$ $= d^{(i,j,l)}$ next. Since for any $l > i+b_i$ is not available, we pretend that all future message packets are recovered using parity symbols sent after time slot $(i+\tau)$ by setting $$u_l = 0 \tag{2}$$
$$k_l = 0 \tag{3}$$

(for Equations 4 and 5 below), leading to $$d^{(i,j,l)} = \min\left((1-\ell_l)p_{l,l}, k_l - u_l\ell_l + \sum_{r=j}^{l-1}\left(k_r - u_r\ell_r - d^{(i,j,r)}\right)\right). \tag{4}$$

To ensure $V[j:j+b_j-1]$ are recovered by time slot $(j+\tau-1)$, we require $$\sum_{l=j+b_j}^{j+\tau-1} p_l + \sum_{l=j}^{j+b_j-1} d^{(l,j,l)} \geq \sum_{l=j}^{j+b_j-1} (k_l - u_l t_l). \tag{5}$$

Next, $u_i$ is increased until Equation 5 is satisfied and $t_i | u_i$. Then $U[j]$ comprises the first $u_i$ symbols of $S[j]$, and $V[j]$ comprises the remaining symbols. The number of parity symbols of $X[i+\tau]$ is defined as $$p_{i+\tau} = \ell_i u_i + pad_{i+\tau} \tag{6}$$

where $pad_{i+\tau}$ is the smallest integer to ensure $t_i | p_{i+\tau}$.[1] The symbols of $P[i+\tau]$ are not defined until time slot $(i+\tau)$.

*Defining $P[i]$:* To start, we define matrices that we use to define parity symbols. Let $H_0, \ldots, H_\tau$ be the parity check matrices of a systematic $[m(\tau+1), m\tau]$ m-MDS convolutional code [26], [27] (as from [3]). Let $A$ be a $m \times m$ parity check matrix of a $[2m, m]$ systematic MDS code (e.g., Reed-Solomon). For any $i \in [\tau-1], p_i = 0$ by initialization. For $i \geq \tau$, $P[i]$ is full-rank linear combinations of the symbols of $V[i-\tau:i]$ and $U[i-\tau]$:

$$U^\wedge[i-\tau] = (U[i-\tau], 0^{(m-u_{i-\tau})})$$
$$V^\wedge[j] = (V[j], 0^{(m-v_j)})$$
$$P^{(A)}[i] = (AU^\wedge[i-\tau])_{mp_i-1}$$
$$P'[i] = \sum_{j=0}^{\tau} H_j V^\wedge[i-\tau+j]$$
$$P[i] = (P^{(A)}[i] + P'[i]). \tag{7}$$

*Allocating symbols to transmitted packets.* Let $c_i = b_i$. The symbols of each of $V[i], U[i]$, and $P[i]$ are evenly allocated over $c_i$ transmitted packets. Formally, for each $j \in [c_i-1]$, the $j$th $v_i/c_i$, $u_i/c_i$, and $p_i/c_i$ symbols of $V[i], U[i]$, and $P[i]$, are called $V^{(j)}[i], U^{(j)}[i]$, and $P^{(j)}[i]$, respectively. Then let $$X^{(j)}[i] = (V^{(j)}[i], U^{(j)}[i], P^{(j)}[i]).$$

*Resets.* When $c_i = 1$ the sender treats $S[i]$ as the first message packet of a length $(t-i+1)$ call and completes initialization.

Next, Theorem 1 shows that the building block construction satisfies the lossless-delay and worst-case-delay constraints.

*Theorem 1:* For any $\tau, t, K, Z, \mathcal{L}, B, W$, the Split Code satisfies the lossless-delay and worst-case-delay constraints over the channel.

*Proof sketch:* At a high level, for any time slot $i$ and burst over $X[i:i+b_i-1]$, we show that $V[i:i+b_i-1]$ are recovered by time slot $(i+\tau-1)$ using the received message symbols and received symbols of $P'[i:i+\tau-1]$. We then show for $l \in \{i, \ldots, i+b_i-1\}$ that $U[l]$ is recovered during time slot $(l+\tau)$ using the received symbols of $U[l]$ and $P^{(A)}[l+\tau]$.

Appendix B has a detailed proof. ∎

IV. OFFLINE CODES

In this section, we design an offline approximately rate-optimal construction in three steps. First, we present Algorithm 1. The algorithm identifies suitable choices for $u_0, \ldots, u_t$ using a linear program (LP) whose objective function is to minimize the number of parity symbols sent, which maximizes the rate. Second, Algorithm 1 is combined with $(\tau, t, K, Z, \mathcal{L}, B, W)$-Split Code.

At a high level, the variables of the LP used in Algorithm 1 represent $w_0, \ldots, w_{t-\tau}$, which equal the number of parity symbols sent during time slots $\tau, \ldots, t$, respectively. Then $(k_i + w_{i-\tau})$ symbols are modeled as being sent during time slot $i$ (satisfying the lossless-delay constraint). The message packets that need not be recovered due to resets are modeled as having size zero. The LP's constraints impose the worst-case-delay constraint as follows. Constraint 1 ensures that no parity symbols are sent until time slot $\tau$. Constraint 2 ensures that a non-negative number of parity symbols are sent. For any burst starting in time slot $i$, Constraint 3 bounds how much useful information is received during the burst. Constraint 4 ensures recovery of enough symbols of $S[i:i+b_i-1]$ by time slot $(i+\tau-1)$ that the remaining symbols are recoverable at their respective deadlines. Finally, Constraint 5 reflects that $w_i$ never exceeds the number of lost symbols of $S[i]$.

*Remark 1:* Algorithm 1 runs in $O(poly(t\tau))$ time since the LP has $O(t\tau)$ constraints and variables.

Lemma 1 shows how to use Algorithm 1 to determine a nearly tight upper bound on the offline rate.

---

[1] We define $p_{i+\tau}$ once $\ell_{i+\tau}$ is known and until then pretend there is no padding for future parity symbols in Equations 4 and 5.

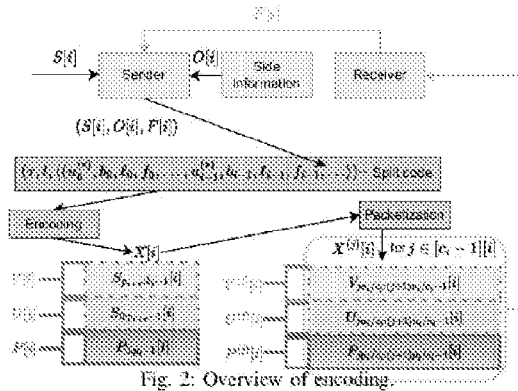

Fig. 2: Overview of encoding.

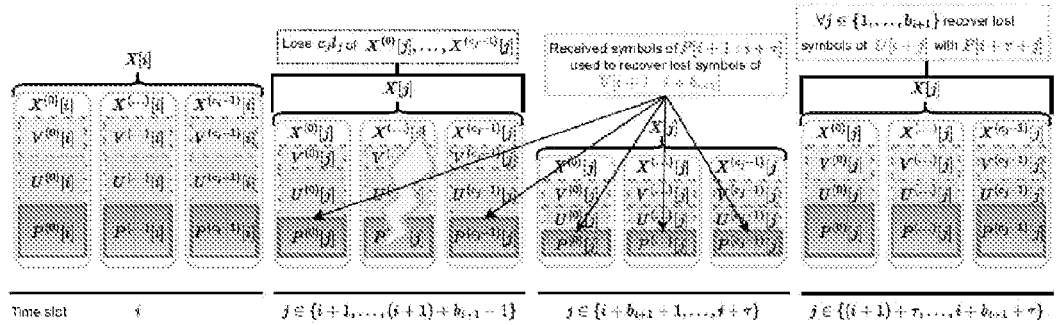

Fig. 3: Illustration of loss recovery under the $(\tau, t, K, Z, \mathcal{L}, B, W)$-Split Code for a burst over $X[i+1:i+b_{i+1}-1]$.

*Lemma 1:* For any $\tau, t, K, Z, \mathcal{L}, B$, if Algorithm 1 outputs $\langle w_i | i \in [t] \rangle$, the offline optimal rate under the reset condition on feedback is at most $$\left(\sum_{i=0}^{t} k_i\right) / \left(-2(t-\tau)(\tau-1) + \sum_{i=0}^{t-\tau} k_i + w_t\right). \tag{9}$$

*Proof:* The proof is shown in Appendix C. ∎

Theorem 2 below shows that combining Algorithm 1 with the building block construction (Section III) yields an approximately rate-optimal code subject to the following condition on the reset hit in feedback.

Reset condition on feedback : A reset must occur whenever an increasing fraction of transmitted packets could be lost. Formally, for any $i \in [t-\tau] \setminus \{0\}$ where feedback increases $\ell_i$, $\zeta_i$ must be set to 1.

*Theorem 2:* For any $\tau, t, K, Z, \mathcal{L}, B$, if Algorithm 1 outputs $\langle w_i | i \in [t] \rangle$ and each $w_i$ is set to $k_i \ell_i$, if $\sum_{j=i-\tau+1}^{i-\tau} \zeta_j > 0$, then the rate of the corresponding Split Code is less than the optimal rate under the reset condition on feedback by at most $$\left(\sum_{i=0}^{t-\tau} (2\tau + q_i + b_{i+\tau} - 4)\right) / \left(\sum_{i=0}^{t} k_i\right). \tag{10}$$

*Proof:* The proof is shown in Appendix D. ∎

As an example of applying Theorem 2, consider a videoconferencing call at 2000 kbps and 30 fps. Suppose the field size is $2^{32}$, for $i \in [t], \ell_i \in \{j/8 \mid j \in [8]\}$, and $\tau \leq 5$. Then the rate of the Split Code is within 0.01 of optimal.

Finally, we bound the cost of removing the reset condition on feedback. For each time slot $i$ that the condition is violated (i.e., $\ell_i$ is increased by $\delta$ without a reset), the denominator of Equation 9 decreases and numerator of Equation 10 increases by up to $\epsilon = (\delta \sum_{j=i-\tau+1}^{i} k_j \ell_j)$. This follows from the proof of Corollary 1, where an extra $\epsilon$ parity symbols may be lost as a result of sending at most $\epsilon/\delta$ parity symbols one time slot later.

Algorithm 1 Computes $\langle w_i | i \in [t] \rangle$ of an approximately rate optimal code.

Input: $(r, t, K, Z, B, \mathcal{L})$
For $i \in [t - \tau]$:
  If a reset occurs between time slot $(i + 1)$ and $(i + \tau)$:
    Treat $k_j$ as 0 in the below LP.
Minimize $\sum_{i=0}^{t-\tau} p_{i+\tau}^{(LP)}$ subject to:

1) $\forall j \in [\tau - 1], p_j^{(LP)} = 0$.
2) $\forall j \in [t - \tau], p_{j+\tau}^{(LP)} \geq 0$.
3) $\forall i \in [t - \tau], l \in \{i, \ldots, i + b_i - 1\}$, $$0 \leq d_{i,l} \leq \min((p_l^{(LP)} + k_l)(1 - \ell_l),$$
$$k_l - p_{l+\tau}^{(LP)} + \sum_{r=i}^{l-1}(k_r - p_{r+\tau}^{(LP)} - d_{i,r}))$$

4) $\forall i \in [t - \tau]$, $$\sum_{l=i+b_i}^{i+\tau-1} p_l^{(LP)} + \sum_{l=i}^{i+b_i-1} d_{i,l} \geq \sum_{l=i}^{i+b_i-1}(k_l - p_{l+\tau}^{(LP)}) \quad (8)$$

5) $\forall j \in [t - \tau], k_j \ell_j \geq p_{j+\tau}^{(LP)}$.

Output: $\langle p_i^{(LP)} | i \in [t] \rangle$

V. ONLINE APPROXIMATELY RATE-OPTIMAL CODES

We now present an online approximately rate-optimal construction, dubbed the "$(r, t, K, Z, \mathcal{L}, B, W^{(O)})$-Split ML Code." During the $i$th time slot, an ML model provides side information, $O_i = w_i$, to determine how to split the $i$th frame in the building block construction (Section III). If $\ell_i = 0$ then $X[i]$ is received, so $O_i$ must be 0. Otherwise, to ensure $O_i$ can be used by the building block construction, we require it to be (a) sufficiently large (i.e., setting $u_i = O_i / \ell_i$ satisfies Equation 5), and (b) padded to be divisible by $q_i$.

Our result requires a few terms. Let the outputs of the ML model over time slots $0, \ldots, (t - \tau)$ be $W^{(O)} = O_0, \ldots, O_{t-\tau}$. For $i = 0, \ldots, (t - \tau)$, let $W_i^{(Opt)}$ be the set of optimal values for $p_{i+\tau}^{(LP)}$ in Algorithm 1 with additional constraints that the variables corresponding to earlier time slots are set according to $W^{(O)}$ (i.e., for $j \in [i - 1]$ $p_{j+\tau}^{(LP)} = W_j^{(O)}$). For $i \in [t - \tau]$, the regret of the outputs of the ML model compared to the optimal values is $$\mathcal{R}_i = \min_{w^{(Opt)} \in W_i^{(Opt)}} |O_i - w^{(Opt)}|, \mathcal{R}_{[t]} = (\mathcal{R}_0, \ldots, \mathcal{R}_t) \quad (11)$$

For an arbitrary message packet size sequence and feedback chosen offline without access to $W^{(O)}$, let $R^{(opt)}$ be the offline optimal rate under the reset condition on feedback from Section IV and $R^{(on)}$ be a random variable (over the predictions of the ML model) reflecting the rate of the Split ML Code.

*Theorem 3:* Consider any $r, t, K, Z, \mathcal{L}, B, W^{(O)}$ and $\epsilon, \delta, \epsilon_i \in (0, 1)$. Suppose for $i \in [t]$ that $\mathbb{E}[\mathcal{R}_i] \leq \epsilon k_i$ and $t > \log(1/\delta)/(2\epsilon_i^2)$. Then with probability at least $(1 - \delta)$, $$R^{(opt)} - R^{(on)} \leq \epsilon + \Big(\sum_{i=0}^{t} \epsilon_i + 2\tau + h_i + q_i - 4\Big) / \Big(\sum_{s=0}^{t} k_s\Big) \quad (12)$$

*Proof:* The proof is shown in Appendix E. ■

Consider the example of a videoconferencing call discussed after Theorem 2. If the call is sufficiently long, with probability $(1 - \delta)$, $R^{(on)}$ is within $(0.01 + \epsilon + 0.00048 \cdot \epsilon_i)$ of optimal.

Finally, we note that removing the reset condition on feedback leads to increasing Equation 12 for each $i \in \{\tau, \ldots, t\}$ where $\ell_i$ increases by $\delta$ without a reset by at most $$\Big(\delta \sum_{j=i-\tau+1}^{i} k_j \ell_j\Big) / \Big(\sum_{j=0}^{t} k_j\Big).$$

VI. CONCLUSION

Motivated by live-streaming applications experiencing partial bursts of only some packets per message, our work introduces the first streaming model to accommodate such losses. We then present a streaming code construction that is approximately rate-optimal under a natural (reset) condition in two steps. First, we use a learning-augmented algorithm to split message packets into (a) a component recovered strictly before its decoding deadline, and (b) a component recovered at its decoding deadline. Second, we introduce a building block construction to design a code given the choice of how to split message symbols that is approximately rate-optimal code under the reset condition. Future work can build upon our results in three main directions: (a) construct explicit predictive models to split message packets, (b) construct explicit predictive models to estimate the channel parameters (i.e., the feedback), and (c) combine our methodology with that of [24] to spread message symbols over $(\tau_L + 1) \geq 2$ time slots to alleviate the negative impact on the rate of the variability in the sizes of the message packets.

ACKNOWLEDGMENT

This work was funded in part by an NSF grant (CCF-1910813). Preliminary results were published in [28].

REFERENCES

[1] E. Martinian and C.-W. Sundberg, "Burst erasure correction codes with low decoding delay," *IEEE Transactions on Information Theory*, vol. 50, no. 10, pp. 2494–2502, Oct 2004.

[2] E. Martinian and M. Trott, "Delay-optimal burst erasure code construction," in *2007 IEEE International Symposium on Information Theory*, June 2007, pp. 1006–1010.

[3] A. Badr, P. Patil, A. Khisti, W. Tan, and J. Apostolopoulos, "Layered constructions for low-delay streaming codes," *IEEE Transactions on Information Theory*, vol. 63, no. 1, pp. 111–141, Jan 2017.

[4] S. L. Fong, A. Khisti, B. Li, W. Tan, X. Zhu, and J. Apostolopoulos, "Optimal streaming codes for channels with burst and arbitrary erasures," *IEEE Transactions on Information Theory*, vol. 65, no. 7, pp. 4274–4292, July 2019.

[5] M. N. Krishnan and P. V. Kumar, "Rate-optimal streaming codes for channels with burst and isolated erasures," in *2018 IEEE International Symposium on Information Theory (ISIT)*, June 2018, pp. 1809–1813.

[6] M. N. Krishnan, D. Shukla, and P. V. Kumar, "Rate-optimal streaming codes for channels with burst and random erasures," *IEEE Trans. Inf. Theory*, vol. 66, no. 8, pp. 4869–4891, 2020.

[7] E. Domanovitz, S. L. Fong, and A. Khisti, "An explicit rate-optimal streaming code for channels with burst and arbitrary erasures," vol. 68, no. 1, 2022, pp. 47–65.

[8] A. Badr, A. Khisti, and E. Martinian, "Diversity embedded streaming erasure codes (de-sco): Constructions and optimality," *IEEE Journal on Selected Areas in Communications*, vol. 29, no. 5, pp. 1042–1054, May 2011.

[9] N. Adler and Y. Cassuto, "Burst-erasure correcting codes with optimal average delay," *IEEE Transactions on Information Theory*, vol. 63, no. 5, pp. 2848–2865, May 2017.

[10] D. Leong and T. Ho, "Erasure coding for real-time streaming," in *2012 IEEE International Symposium on Information Theory Proceedings*, July 2012, pp. 289–293.

[11] D. Leong, A. Qureshi, and T. Ho, "On coding for real-time streaming under packet erasures," in *2013 IEEE International Symposium on Information Theory*, July 2013, pp. 1012–1016.

[12] S. L. Fong, A. Khisti, B. Li, W. Tan, X. Zhu, and J. Apostolopoulos, "Optimal streaming erasure codes over the three-node relay network," *IEEE Transactions on Information Theory*, vol. 66, no. 5, pp. 2696–2712, 2020.

[13] A. Badr, A. Khisti, W.-t. Tan, X. Zhu, and J. Apostolopoulos, "Fec for voip using dual-delay streaming codes," in *IEEE INFOCOM 2017 - IEEE Conference on Computer Communications*, 2017, pp. 1–9.

[14] Z. Li, A. Khisti, and B. Girod, "Correcting erasure bursts with minimum decoding delay," in *2011 Conference Record of the Forty Fifth Asilomar Conference on Signals, Systems and Computers (ASILOMAR)*, Nov 2011, pp. 33–39.

[15] Y. Wei and T. Ho, "On prioritized coding for real-time streaming under packet erasures," in *Communication, Control, and Computing (Allerton), 2013 51st Annual Allerton Conference on*. IEEE, 2013, pp. 327–334.

[16] P.-W. Su, Y.-C. Huang, S.-C. Lin, I.-H. Wang, and C.-C. Wang, "Random linear streaming codes in the finite memory length and decoding deadline regime—part I: Exact analysis," *IEEE Transactions on Information Theory*, vol. 68, no. 10, pp. 6356–6387, 2022.

[17] S. Emara, F. Wang, I. Kaplan, and B. Li, "Ivory: Learning network adaptive streaming codes," pp. 1–10, 2022.

[18] S. Emara, S. L. Fong, B. Li, A. Khisti, W.-T. Tan, X. Zhu, and J. Apostolopoulos, "Low-latency network-adaptive error control for interactive streaming," *IEEE Transactions on Multimedia*, vol. 24, pp. 1691–1706, 2021.

[19] M. N. Krishnan, G. K. Facenda, E. Domanovitz, A. Khisti, W.-T. Tan, and J. Apostolopoulos, "High rate streaming codes over the three-node relay network," in *2021 IEEE Information Theory Workshop (ITW)*. IEEE, 2021, pp. 1–6.

[20] E. Domanovitz, A. Khisti, W.-T. Tan, X. Zhu, and J. Apostolopoulos, "Streaming erasure codes over multi-hop relay network," in *2020 IEEE International Symposium on Information Theory (ISIT)*. IEEE, 2020, pp. 497–502.

[21] M. Haghifam, M. N. Krishnan, A. Khisti, X. Zhu, W.-T. Tan, and J. Apostolopoulos, "On streaming codes with unequal error protection," *IEEE J. Sel. Areas Inf. Theory*, 2021.

[22] M. Rudow and K. Rashmi, "Streaming codes for variable-size messages," *IEEE Transactions on Information Theory*, pp. 1–1, 2022.

[23] ——, "Online versus offline rate in streaming codes for variable-size messages," 2023, pp. 1–1.

[24] ——, "Learning-augmented streaming codes are approximately optimal for variable-size messages," in *2022 IEEE International Symposium on Information Theory (ISIT)*, 2022, pp. 474–479.

[25] M. Rudow, F. Y. Yan, A. Kumar, G. Ananthanarayanan, M. Ellis, and K. Rashmi, "Tambur: Efficient loss recovery for videoconferencing via streaming codes," in *20th USENIX Symposium on Networked Systems Design and Implementation (NSDI 23)*. Boston, MA: USENIX Association, Apr. 2023, pp. 953–971. [Online]. Available: https://www.usenix.org/conference/nsdi23/presentation/rudow

[26] E. Gabidulin, "Convolutional codes over large alphabets," in *Proc. Int. Workshop on Algebraic Combinatorial and Coding Theory*, 1988, pp. 80–84.

[27] H. Gluesing-Luerssen, J. Rosenthal, and R. Smarandache, "Strongly-mds convolutional codes," *IEEE Transactions on Information Theory*, vol. 52, no. 2, pp. 584–598, 2006.

[28] M. Rudow, and K. Rashmi, "Learning-augmented streaming codes for variable-size messages under partial burst losses," in *2023 IEEE International Symposium on Information Theory (ISIT)*, 2023, p. to appear.

[29] W. Hoeffding, "Probability inequalities for sums of bounded random variables," in *The collected works of Wassily Hoeffding*. Springer, 1994, pp. 409–426.

APPENDIX

A. Additional notation

We define the set of possibilities for the received packets of $X[i]$ as $\mathcal{Y}_i$. Previously, we considered a burst as being of length $b$ and the fraction of packets lost as being of length $\ell$. These two values can be updated by feedback. To reflect the update, we instead refer to the length of a burst starting in time slot $i$ as $b_i$ and the fraction of packets that can be lost as $\ell_i = q_i/h_i$ for natural numbers $q_i$ and $h_i$ in simplest form. Also, $\ell_{i+1}$ is assumed to equal $\ell_i$ unless it is reset with feedback. For a burst starting in time slot $j$ of length $b_j$ and any $i \in \{j, \ldots, j + b_j - 1\}$, we define the set of possible received packets of $X[j:i]$ as $\mathcal{Y}_{j,i} = \mathcal{Y}_j \times \ldots \times \mathcal{Y}_i$.

To simplify the presentation of proofs, we also require that a burst starting in time slot $i$ does not end sooner than a burst starting before time slot $i$. Formally, we require $(i + b_i) \geq (j + b_j)$ for all $j \in \mathbb{B}_i$. This requirement holds without loss of generality by the satisfaction of the worst-case-delay for any $j \in \mathbb{B}_i$ and any burst loss leading to $Y[j : j + b_j - 1] \in \mathcal{Y}_{j,j+b_j-1}$. Specifically, $S[j : i - 1]$ are recovered by time slot $(i + \tau - 1)$ and suffice to obtain $X[j : i - 1]$. The worst-case-delay is still satisfied even though now the burst spans time slots $i$ through $(j + b_j - 1)$.

Next, we formalize decoding in terms of the normalized Shannon Entropy (i.e., the Shannon Entropy divided by the entropy of a random field element, $\log(|\mathbb{F}|)$):

$$\mathcal{H}(S[i] | S[0], \ldots, S[i-1], k_i, Y[i]) = 0 \tag{13}$$

$$\mathcal{H}(S[i] | S[0], \ldots, S[j-1], Y[j], \ldots, Y[i+\tau], k_j, \ldots, k_{i+\tau}) = 0. \tag{14}$$

Equations 13 and 14 follow directly from the lossless-delay and worst-case-delay constraints, respectively. The sizes of the message packets are assumed to be known for loss recovery (from the header), so they will be omitted from the entropy function henceforth. Let $\mathcal{I}(\cdot)$ be the normalized Mutual Information (MI): $\mathcal{I}(W; Z) = \mathcal{H}(W) - \mathcal{H}(W|Z)$.

Finally, formally define the term to capture how message packets are split into a component recovered before its deadline and a component recovered at its deadline. For any $i \in [t - \tau]$, let $w_i =$ $$\max_{Y[i] \in \mathcal{Y}_i} \{\mathcal{H}(S[i] | S[0 : i-1], X[i+1], \ldots, X[i+\tau-1], Y[i], k_0, \ldots, k_{i+\tau-1})\} \tag{15}$$

B. Proof of Theorem 1

We start with an auxiliary Lemma.

*Lemma 2:* For any $i \in [t - \tau]$, all $j \in \mathbb{B}_i$ where $\sum_{r=j}^{i+\tau-1} c_r = 0$, and any $l \in \{j, \ldots, i\}$, $d^{(i,j,l)} \geq (1 - \ell_l)u_l$.

*Proof:* First, $(1 - \ell_l)u_l \geq (1 - \ell_l)k_l \geq (1 - \ell_l)u_l$.
For $l = j$, combining Equation 4 with $k_l \geq u_l$ yields $$d^{(i,j,l)} \geq (k_l - u_l \ell_l) \geq (u_l - u_l \ell_l) = u_l(1 - \ell_l) \geq 0. \tag{16}$$

For $l \in \{j + 1, \ldots, i\}$, the case necessitates that $j < i$. First, by the inductive hypothesis on $(l - 1)$, $$d^{(i,j,l-1)} \leq k_{l-1} - u_{l-1}\ell_{l-1} + \sum_{r=j}^{l-2} k_r - u_r \ell_r - d^{(i,j,r)} \tag{17}$$

$$\sum_{r=j}^{l-1} d^{(i,j,r)} \leq \sum_{r=j}^{l-1} k_r - u_r \ell_r \tag{18}$$

where Equation 18 follows from rearranging terms. Thus, $d^{(i,j,l)} \geq (1 - \ell_l)u_l$ by Equation 4 and the logic for $l = j$. ∎

For any $i \in [t]$, the lossless-delay is met as $S[i]$ is in $X[i]$.

Next, to show satisfaction of the worst-case-delay, we consider any burst starting in $i \leq [t - \tau]$. We need not consider $i > (t - \tau)$, as the final $\tau$ message packets are known to be 0. If $\sum_{r=i}^{i+\tau-1} c_r > 0$ then $S[i : i + b_i - 1]$ need not be recovered, and the proof is concluded. Otherwise, $\sum_{r=i}^{i+\tau-1} c_r = 0$. We show in two steps that each $S[i : i + b_i - 1]$ is recovered within $\tau$ timeslots. First, the received symbols of $Y[i : i + b_i - 1]$ and $P[i + b_i : i + \tau - 1]$ are used to recover $V[i : i + b_i - 1]$. Second, for $j \in \{i, \ldots, i + b_i - 1\}$ where $\sum_{r=j+1}^{j+\tau-1} c_r = 0$, $U[j]$ is recovered in time slot $(j + \tau)$ with $P[j + \tau]$.

First, for $j \in \{i, \ldots, i+\tau-1\}$, $U[j-\tau]$ is used to compute $P^{(*)}[j]$ to determine $P'[j] = (P[j] - P^{(*)}[j])$ (by Equation 7). Recall from Equation 5 (and $v_l = (k_l - u_l)$)

$$\sum_{l=i+b_i}^{i+\tau-1} p'[l] + \sum_{l=i}^{i+b_i-1} d^{(j,i,l)} \geq \sum_{l=i}^{i+b_i-1} k_l - u_l \ell_l \tag{19}$$

$$\sum_{l=i+b_i}^{i+\tau-1} p'[l] + \sum_{l=i}^{i+b_i-1} d^{(j,i,l)} - (1-\ell_l)u_l \geq \sum_{l=i}^{i+b_i-1} v_l \tag{20}$$

where for $l \in \{i, \ldots, i+b_i-1\}$ the $(1-\ell_l)u_l$ symbols of $U[l]$ that are received are subtracted out (valid by Lemma 2).

Without loss of generality, we pretend that each $P[j]$ is padded with extra parity symbols to be $P^{(pad)}[j]$ of size $m$ but these extra $(m - p[j])$ symbols are all lost. Then each $(V^*[j], P^{(pad)}[j])$ comprises $2m$ symbols. The number of received parity symbols exceeds the number of missing message symbols. Thus, combining Equation 20 with Lemma 1 L1 of [3] shows $V[i]$ is recovered by time slot $(j + \tau - 1)$ (e.g., by solving a system of linear equations). For $r = (i+1), \ldots, (i+b_i-1)$, by Lemma 2 and Equation 4, $$\sum_{l=i}^{r-1} d^{(i,i+b_i-1,l)} \leq \sum_{l=i}^{r-1} k_l - u_l \ell_l \tag{21}$$

$$\sum_{l=i}^{r-1} d^{(i,i+b_i-1,l)} - u_l(1-\ell_l) \leq \sum_{l=i}^{r-1} v_l \tag{22}$$

Combining Equations 20 and 22 shows $$\sum_{l=i+b_i}^{i+\tau-1} p'[l] + \sum_{l=i}^{i+b_i-1} (d^{(j,i,l)} - u_l(1-\ell_l)) \geq \sum_{l=i}^{i+b_i-1} u_l \ell_l \tag{23}$$

Combining Equation 23 with Lemma 1 L1 of [3], $V[r]$ can be recovered by time slot $(i+\tau-1)$ (e.g., by solving a system of linear equations). After finishing iteration $r = (i + b_i - 1)$, $V[i : i+b_i-1]$ have been recovered.

For $l = i, \ldots, (i + b_i - 1)$ where $\sum_{j=i+1}^{i+\tau-1} \zeta_j = 0$, we now show that $U[l]$ is recovered by time slot $(i+\tau)$. During time slot $(l+\tau)$, $V[l : l+\tau]$ are available and are used to compute $P'[l+\tau]$, yielding $P^{(*)}[l+\tau] = (P[l+\tau] - P'[l+\tau])$. Then $P^{(*)}[l+\tau]$ comprises $p[l+\tau] \geq U[l][l]$ linearly independent linear equations of the symbols of $U[l]$. Combining $P^{(*)}[l+\tau]$, the $(1-\ell_l)u[l]$ received symbols of $U[l]$, and the $(m - u[l])$ zeroes of $U^*[l]$ (padding) provides at least $m$ symbols of the $[2m, m]$ maximum distance separable linear code. Thus, $U[l]$ is obtained by solving a system of linear equations. Both $V[l]$ and $U[l]$ are recovered by time slot $(l+\tau)$ for any $l \in \{i, \ldots, i+b_i-1\}$, so the worst-case-delay constraint is satisfied.

*C. Proof of Lemma 1*

Throughout Section C, we assume for all $i \in [t]$ that $b_i \leq \tau$. We begin by proving the result when there are no resets (i.e., $\sum_{i=0}^{t} \zeta_i = 0$). Let code construction, $C$, be any offline construction that satisfies the lossless-delay and worst-case-delay constraints. Under $C$, $X^{(C)}[i]$ is sent during time slot $i \in [t]$ of size $n_{C,i}$ comprising $(c_{C,i} + 1)$ transmitted packets. Then $Y^{(C)}[i]$ is the vector of received channel packets, and the total number of received symbols is $n_{C,i,Y^{(C)}}$. Appendix C1 shows some preliminary results for the proof. Appendix C2 incorporates relaxations to $C$ and verifies their correctness. Appendix C3 proves additional properties due to the relaxations. Finally, Appendix C4 ties the results together to finish the proof.

*1) Proof preliminaries:* We begin with defining a few terms for time slot $i \in [t - \tau]$. Will use the following terms:

$$w_i^{(C)} = \max_{Y^{(C)}[i] \in \mathcal{Y}_i} (\mathcal{H}(S[i] | S[0:i-1], Y^{(C)}[i], X^{(C)}[i+1:i+\tau-1])) \tag{24}$$

$$p_i^{(C)} = n_i - k_i. \tag{25}$$

*Lemma 3:* For any $i \in [t - \tau]$ such that $\mathbb{E}_i \neq \emptyset, \ell_i > 0$ the number of symbols sent during the $(i+\tau)$th time slot is at least $$n_{C,i+\tau} \geq \lceil w_i^{(C)} + k_{i+\tau} \rceil.$$

*Proof:* At a high level, by Equation 24, at least $w_i^{(C)}[i]$ symbols' worth of information are needed to recover $S[i]$ that are unavailable prior to time slot $(i+\tau)$. They must be recovered during time slot $(i+\tau)$ due to the worst-case-delay, leading to at least $\lceil w_i^{(C)}[i] \rceil$ symbols being sent in $X^{(C)}[i+\tau]$. The lossless-delay constraint for $S[i+\tau]$ necessitates an additional $k_{i+\tau}$ symbols be sent in $X^{(C)}[i+\tau]$.

By Equation 24, there is a $Y^{(C)}[i] \in \mathcal{Y}_i$ so that $$\left(\mathcal{H}(S[i] \| S[0:i-1], Y^{(C)}[i], X^{(C)}[i+1:i+\tau-1])\right) = w_i^{(C)}. \tag{26}$$

Recall that $S[0:i-1], Y^{(C)}[i:i+\tau-1]$ are available by time slot $(i+\tau-1)$. By Equation 14 and the chain rule, $$\mathcal{H}(S[i] \| S[0:i-1], Y^{(C)}[i], X^{(C)}[i+1:i+\tau]) = 0. \tag{27}$$

Thus for some $j \in \mathbb{B}_i$ and $Y^{(C)}[j:j+b_j-1] \in \mathcal{Y}_{j,j+b_j-1}$, $$n_{C,i+\tau} \geq \mathcal{H}(X^{(C)}[i+\tau]) \geq \tag{28}$$

$$\mathcal{H}(X^{(C)}[i+\tau] \| S[0:i-1], Y^{(C)}[j:j+b_j-1], X^{(C)}[j+b_j:i+\tau-1]) = \tag{29}$$

$$\mathcal{H}(X^{(C)}[i+\tau] \| S[0:i-1], Y^{(C)}[j:j+b_j-1], X^{(C)}[j+b_j:i+\tau-1]) + \tag{30}$$
$$\mathcal{H}(S[i] \| S[0:i-1], Y^{(C)}[j:j+b_j-1], X^{(C)}[j+b_j:i+\tau]) =$$

$$\mathcal{H}(S[i], X^{(C)}[i+\tau] \| S[0:i-1], Y^{(C)}[j:j+b_j-1], X^{(C)}[j+b_j:i+\tau-1]) \geq \tag{31}$$

$$\mathcal{H}(S[i] \| S[0:i-1], Y^{(C)}[j:j+b_j-1], X^{(C)}[j+b_j:i+\tau-1]) + \tag{32}$$
$$\mathcal{H}(X^{(C)}[i+\tau] \| S[0:i], Y^{(C)}[j:j+b_j-1], X^{(C)}[j+b_j:i+\tau-1]) \geq$$

$$\mathcal{H}(S[i] \| S[0:i-1], Y^{(C)}[i], X^{(C)}[i+1:i+\tau-1]) + \tag{33}$$
$$\mathcal{H}(X^{(C)}[i+\tau] \| S[0:i], X^{(C)}[i+1:i+\tau-1]) \geq$$

$$w_i^{(C)} + \mathcal{H}(X^{(C)}[i+\tau] \| S[0:i], X^{(C)}[i:i+\tau-1]) \geq \tag{34}$$

$$w_i^{(C)} + \mathcal{H}(X^{(C)}[i+\tau] \| S[0:i+\tau-1]) \geq \tag{35}$$

$$w_i^{(C)} + k_{i+\tau} \tag{36}$$

Equation 29 comes from conditioning reducing entropy; in Equation 30, the extra added term is 0 due to Equation 27; Equation 31 comes from applying the chain rule to Equation 30; Equation 32 comes from applying the chain rule to Equation 31; Equation 33 comes from conditioning reducing entropy; Equation 34 comes from conditioning reducing entropy Equation 26; Equation 35 comes from $X^{(C)}[i:i+\tau-1]$ being a function of $S[0:i+\tau-1]$ and conditioning reducing entropy; Equation 36 comes from Equation 13. Finally, combining Equations 28 and 36 establishes the result. ∎

Next, we bound the amount of information the parity symbols of each transmitted packet provide about earlier message packets.

*Lemma 4:* For any $i \in [t], j \in [i-1]$, the amount of information $X^{(C)}[i]$ can provide about dropped symbols of earlier message packets is bounded by $$\mathcal{I}(X^{(C)}[i]; S[j:\min(j+b_j, i) - 1] \| S[0:j-1])$$
$$\leq (n_{C,i} - k_i)$$

*Proof:*

$$\mathcal{I}(X^{(C)}[i]; S[j:\min(j+b_j, i) - 1] \| S[0:j-1]) = \tag{37}$$

$$\mathcal{H}(X^{(C)}[i] \| S[0:j-1]) - \tag{38}$$
$$\mathcal{H}(X^{(C)}[i] \| \min(j+b_j, i) - 1) \leq$$

$$\mathcal{H}(X^{(C)}[i] \| S[0:j-1]) - \mathcal{H}(X^{(C)}[i] \| S[0:i-1]) \leq \tag{39}$$

$$(n_{C,i} - k_i) \tag{40}$$

where Equation 38 comes from the definition of Mutual Information; Equation 39 comes from conditioning reducing information; Equation 40 comes from $X^{(C)}[i]$ having at most $n_{C,i}$ symbols and Equation 13. ∎

Lemma 4 will later be used to show for a burst starting in time slot $j$ how much redundancy transmitted packets received after the burst can provide to help in loss recovery.

We show for any $i \in [t-\tau]$ there is a burst starting in time slot $j \in \mathbb{B}_i$ such that all symbols of $S[j:i-1]$ and all but $w_i^{(C)}$ symbols of $S[i]$ must be recovered by time slot $(i+\tau-1)$.

*Lemma 5:* Consider any $i \in [j \sim \tau]$ and any $j \in \mathbb{B}_i$. Then $$\min_{Y^{(C)}[j:j+b_i-1] \in \mathcal{Y}_{j,j+b_i-1}} \left( \mathcal{I}(S[j:i]; Y^{(C)}[j:j+\tau-1] \mid S[0:j-1]) \right) \le \sum_{l=j}^{i} k_l - w_j^{(C)}.$$

*Proof:*

$$\mathcal{H}(S[j:i] \mid S[0:j-1], Y^{(C)}[j:j+\tau-1]) = \qquad (41)$$

$$\sum_{l=j}^{i} \mathcal{H}(S[l] \mid S[0:l-1], Y^{(C)}[j:j+\tau-1]) \ge \qquad (42)$$

$$\sum_{l=j}^{i} \mathcal{H}(S[l] \mid S[0:l-1], Y^{(C)}[l:l+\tau-1]) \ge \qquad (43)$$

$$\sum_{l=j}^{i} \mathcal{H}(S[l] \mid S[0:l-1], Y^{(C)}[l], X^{(C)}[l+1:l+\tau-1]) \ge \qquad (44)$$

$$\sum_{l=j}^{i} w_l^{(C)}. \qquad (45)$$

where Equation 42 follows from the chain rule; Equation 43 comes from conditioning reducing entropy; Equation 44 comes from conditioning reducing entropy; Equation 45 follows from Equation 24.

We note that $$\mathcal{I}(S[j:i]; Y^{(C)}[j:j+\tau-1] \mid S[0:j-1]) = \qquad (46)$$

$$\mathcal{H}(S[j:i] \mid S[0:j-1]) - \mathcal{H}(S[j:i] \mid S[0:j-1], Y^{(C)}[j:j+\tau-1]) \qquad (47)$$

$$\ge \sum_{l=j}^{i} k_l - w_l^{(C)} \qquad (48)$$

where Equation 47 follows from the definition of Mutual Information; Equation 48 follows from the sizes of $S[j:i]$, independence of message packets and Equation 45. ∎

We rewrite the worst-case-delay constraint in terms of mutual information as follows.

*Lemma 6:* Consider any $i \in [j \sim \tau]$ and any $j \in \mathbb{B}_i$. Then $$\min_{Y^{(C)}[j:j+b_i-1] \in \mathcal{Y}_{j,j+b_i-1}} \left( \mathcal{I}(S[j:i]; Y^{(C)}[j:i+\tau] \mid S[0:j-1]) \right) = \sum_{l=j}^{i} k_l.$$

*Proof:*

$$\mathcal{I}(S[j:i]; Y^{(C)}[j:i+\tau] \mid S[0:j-1]) = \qquad (49)$$

$$\mathcal{H}(S[j:i] \mid S[0:j-1]) - \mathcal{H}(S[j:i] \mid S[0:j-1], Y^{(C)}[j:i+\tau]) = \qquad (50)$$

$$\sum_{l=j}^{i} k_l - \sum_{l=j}^{i} \mathcal{H}(S[l] \mid S[0:j-1], Y^{(C)}[l:l+\tau]) = \qquad (51)$$

$$\sum_{l=j}^{i} k_l. \qquad (52)$$

Where Equation 50 follows from the definition of mutual information; Equation 51 follows from independence of message packets and the fact that the Equation 14 shows for any $l \in \{j,\ldots,i\}$, $\mathcal{H}(S[l] \mid S[0:j-1], Y^{(C)}[l:l+\tau]) = 0$, leading to Equation 52. ∎

*2) Relaxations:* We will use the following relaxations which may increase (but never decrease) the mutual information between received symbols under $C$ and missing information. Consider any $i \in [j \ldots r]$ and any $j \in \mathbb{B}_c$.

Relaxation 1.

$$\min_{Y^{(C)}[j+b_j-1]\in \mathcal{Y}_{j,j+b_j-1}} \left( \mathcal{I}(S[j:i]; Y^{(C)}[i] \mid S[0:j-1], Y^{(C)}[j:i-1]) \right) =$$

$$\min\left(n_{C,i}, Y^{(C)}, k_i - w_i^{(C)} + \sum_{r=j}^{i-1} k_r - w_r^{(C)} - \mathcal{I}(S[j:i]; Y^{(C)}[r] \mid S[0:j-1], Y^{(C)}[j:r-1])\right).$$

Relaxation 2. For any $l \in \{j+b_j, \ldots, j+r-1\}$.

$$\min_{Y^{(C)}[j+b_j-1]\in \mathcal{Y}_{j,j+b_j-1}} \left( \mathcal{I}(S[j:i]; X^{(C)}[l] \mid S[0:j-1], Y^{(C)}[j:l-1]) \right) =$$

$$\min\left(n_{C,l} - k_l, \sum_{r=j}^{i} k_r - w_i^{(C)} - \sum_{r=j}^{l-1} \mathcal{I}(S[j:\min(r,i)]; Y^{(C)}[r] \mid S[0:j-1], Y^{(C)}[j:r-1])\right).$$

*Lemma 7:* Relaxations 1 and 2 do not cause $C$ to send extra symbols or violate any constraints.

*Proof:*

Relaxation 1. By the sizes of transmitted packets and conditioning reducing entropy, we know $\mathcal{I}(S[j:i]; Y^{(C)}[i] \mid S[0:j-1], Y^{(C)}[j:i-1]) \leq \mathcal{H}(Y^{(C)}[i]) \leq n_{C,i,Y^{(C)}}$ (i.e., at most the size of $Y^{(C)}[i]$). We note $$\sum_{l=j}^{i} \mathcal{I}(S[j:i]; Y^{(C)}[l] \mid S[0:l-1], Y^{(C)}[j:l-1]) = \quad (53)$$

$$\sum_{l=j}^{i} \mathcal{I}(S[j:l]; Y^{(C)}[l] \mid S[0:l-1], Y^{(C)}[j:l-1]) = \quad (54)$$

$$\mathcal{I}(S[j:i]; Y^{(C)}[j:i] \mid S[0:j-1]) \leq \quad (55)$$

$$\mathcal{I}(S[j:i]; Y^{(C)}[j:j+r-1] \mid S[0:j-1]) \leq \quad (56)$$

$$\left(\sum_{l=j}^{i} k_l - w_i^{(C)}\right) \quad (57)$$

where Equation 54 comes from the independence of $S[l+1:i]$ from $S[0:l], Y^{(C)}[j:l]$; Equation 55 holds because applying the chain rule for mutual information to it yields Equation 53; Equation 56 comes from $(j+r-1) \geq i$, the chain rule for mutual information, and non-negativity of mutual information; Equation 57 comes from Lemma 5. Combining Equation 53 with Equation 57 establishes that the relaxation only maintains or increases the mutual information.

Relaxation 2. By Lemma 4, $\mathcal{I}(S[j:i]; X^{(C)}[l] \mid S[0:j-1], Y^{(C)}[j:l-1])$ is at most $(n_{C,l} - k_l) = p_l^{(C)}$. Also, $$\sum_{r=j}^{l} \left( \mathcal{I}(S[j:i]; Y^{(C)}[r] \mid S[0:j-1], Y^{(C)}[j:r-1]) \right) = \quad (58)$$

$$\sum_{r=j}^{i} \left( \mathcal{I}(S[j:r]; Y^{(C)}[r] \mid S[0:j-1], Y^{(C)}[j:r-1]) \right) +$$

$$\quad (59)$$

$$\sum_{r=i+1}^{l} \left( \mathcal{I}(S[j:i]; Y^{(C)}[r] \mid S[0:j-1], Y^{(C)}[j:r-1]) \right) =$$

$$\mathcal{I}(S[j:i]; Y^{(C)}[j:l] \mid S[0:j-1]) \leq \quad (60)$$

$$I(S[j:i]; Y^{(C)}[j:j+\tau-1] | S[0:j-1]) \leq \qquad (61)$$

$$\left(\sum_{r=j}^{i} k_r - w_j^{(C)}\right) \qquad (62)$$

where Equation 59 comes from the independence of $S[l+1:i]$ from $S[0:l], Y^{(C)}[j:l]$; Equation 60 comes from the chain rule for mutual information; Equation 61 comes from the chain rule of mutual information, the fact that $l \leq (j+\tau-1)$, and the non-negativity of mutual information. Equation 62 comes from Lemma 5. ∎

The relaxations lead to a mutual information that depends on the sizes of message packets and transmitted packets, not the symbols that are sent under $C$ themselves.

Relaxation 3. For any $i \in [t]$, $(e_{C,i}+1) = n_{C,i}$.

*Lemma 8:* Relaxation 3 does not cause $C$ to send extra symbols or violate any constraints.

*Proof:* If there are no losses, this change is irrelevant. Otherwise, all considered bounds (under the relaxation) when $X^{(C)}[i]$ experiences loss apply to any choice for packetization. The only way that packetization effects the bounds is if it changes the total number of received symbols, with the greedy choice being to receive as many symbols as possible for each transmitted packet.

Relaxation 3 has no change for $i > (t-\tau)$. We apply the change for $i = 0, \ldots, (t-\tau)$; this does not alter the total number of symbols sent (or even the total number sent during any time slot).

Next, we show that this change does not effect decoding. When $\ell_i n_{C,i}$ is an integer, then the minimum possible number of symbols lost over $X^{(C)}[i]$ is $\ell_i n_{C,i}$ and that is what is lost in the worst case.

Otherwise, exactly $\lceil \ell_i n_{C,i} \rceil$ symbols are lost in the worst case. For any $(e_{C,i}+1)$ transmitted packets sent in $X^{(C)}[i]$, the largest $l = \lceil \ell_i(e_{C,i}+1) \rceil$ could be lost, which contain in total at least $\lceil n_{C,i}/(e_{C,i}+1) \rceil \geq \lceil \ell_i n_{C,i} \rceil$ symbols by the pigeonhole principle and transmitted packets containing an integral number of symbols. Thus, one symbol per transmitted packet leads to as many symbols being received as possible, which maximizes their utility. ∎

Relaxation 4. $\forall l \in [t]$, $I(S[l]; X^{(C)}[l] | S[0:l-1]) = k_l$ whenever $n_{C,l} \geq k_l$.

Relaxation 5. $\forall l \in \{\tau, \ldots, t\}$, $$I(S[l-\tau]; X^{(C)}[l] | S[0:l-\tau-1], Y^{(C)}[l-\tau:l-1]) =$$
$$\min(n_l^{(C)}, \mathcal{H}(S[l-\tau] | S[0:l-\tau-1], Y^{(C)}[l-\tau:l-1]))$$

This only increases the mutual information by Lemma 4.

Relaxation 6. For any $l \in \{j+\tau, \ldots, i+\tau\}$, $$\min_{Y^{(C)}[l:j+k_j-1] \in \mathcal{Y}_{j,l+k_j-1}} (I(S[l-\tau+1:i]; X^{(C)}[l] |$$
$$S[0:l-\tau-1], Y^{(C)}[l-\tau:l-1])) =$$

$$\min(n_{C,l} - k_l - w_{l-\tau}^{(C)}, (\sum_{r=l-\tau+1}^{i} k_r - w_r^{(C)}) - I(S[l-\tau+1:i]; Y^{(C)}[l-\tau+1:l-1] | S[0:l-\tau])).$$

*Lemma 9:* Relaxations 6 does not cause $C$ to send extra symbols or violate any constraints.

*Proof:* By the size of $X^{(C)}[i]$ and the chain rule $$n_{C,l} \geq I(S[l-\tau], S[l-\tau+1:i], S[i]; X^{(C)}[i] | S[0:l-\tau-1], Y^{(C)}[l-\tau:l-1]) =$$
$$I(S[l-\tau]; X^{(C)}[i] | S[0:l-\tau-1], Y^{(C)}[l-\tau:l-1]) +$$
$$I(S[l-\tau+1:i]; X^{(C)}[i] | S[0:l-\tau], Y^{(C)}[l-\tau+1:l-1]) +$$
$$I(S[i]; X^{(C)}[i] | S[0:i], Y^{(C)}[j+1:l-1])$$

Where by the definition of mutual information $$I(S[i]; X^{(C)}[i] | S[0:i], Y^{(C)}[i+1:l-1]) =$$
$$\mathcal{H}(S[i] | S[0:i], Y^{(C)}[i+1:l-1]) - \mathcal{H}(S[i] | S[0:i], Y^{(C)}[i+1:l-1], X^{(C)}[i]) \geq$$
$$k_i - \mathcal{H}(S[i] | S[0:i], X^{(C)}[i+1:i]) = k_i$$

by conditioning reducing entropy and the chain rule.
Recall by Equation 14 that $$\mathcal{H}(S[l-\tau]|S[0:l-\tau-1], Y^{(C)}[l-\tau:l-1], X^{(C)}[l]) = 0$$

By the definition of Mutual Information and Equation 14, $$\mathcal{I}(S[l-\tau]; X^{(C)}[l]|S[0:l-\tau-1], Y^{(C)}[l-\tau:l-1]) =$$
$$\mathcal{H}(S[l-\tau]|S[0:l-\tau-1], Y^{(C)}[l-\tau:l-1]) - \mathcal{H}(S[l-\tau]|S[0:l-\tau-1], Y^{(C)}[l-\tau:l-1], X^{(C)}[l]) =$$
$$\mathcal{H}(S[l-\tau]|S[0:l-\tau-1], Y^{(C)}[l-\tau:l-1]) \geq$$
$$\mathcal{H}(S[l-\tau]|S[0:l-\tau-1], Y^{(C)}[l-\tau], X^{(C)}[l-1]) = w_{l-\tau}^{(C)}$$

Therefore, $$n_{C,l} \geq \mathcal{I}(S[l-\tau+1:l]; X^{(C)}[l]|S[0:l-\tau], Y^{(C)}[l-\tau+1:l-1]) + k_l + w_{l-\tau}^{(C)}$$

In addition, by the chain rule and Equation 24

$$\mathcal{I}(S[l-\tau+1:l]; X^{(C)}[l]|S[0:l-\tau], Y^{(C)}[l-\tau+1:l-1]) \leq$$
$$\mathcal{I}(S[l-\tau+1:l]; X^{(C)}[l], Y^{(C)}[l-\tau+1:l-1]|S[0:l-\tau]) \leq$$
$$\sum_{r=l-\tau+1}^{l} \mathcal{I}(S[r]; Y^{(C)}[r:l-1], X^{(C)}[l]|S[0:r-1]) \leq$$
$$\sum_{r=l-\tau+1}^{l} \mathcal{I}(S[r]; Y^{(C)}[r], X^{(C)}[l:r+\tau-1]|S[0:r-1]) \leq$$
$$\sum_{r=l-\tau+1}^{l} k_r - w_r^{(C)},$$

concluding the proof. ∎

*3) Useful identities of relaxed code:*
Corollary 1: Adjusting $C$ so that $p_j^{(C)} = 0$ for $j < \tau$ and for any $i \in [t-\tau]$, $$p_{i+\tau}^{(C)} = w_i^{(C)} \tag{63}$$

leads to at most $2(t-\tau)(\tau-1)$ extra symbols being sent.

*Proof:* By Equation 13, for all $i \in [t]$, $n_{C,i} \geq k_i$. For $i \in [t]$, we will adjust $n_{C,i}$ but maintain $n_{C,i} \geq k_i$. This ensures that the lossless-delay constraint is met under relaxation 4.

When a burst of length $b_0$ starts in $X^{(C)}[0]$, it is recovered by time slot $(\tau + b_0 - 1)$ then $S[0:\tau+b_0-1]$ are available by the same time slot $(\tau + b_0 - 1)$ by Lemma 6 and relaxation 4. In addition, $n_{C,i} \geq k_i$ for $i \in [b_0 - 1]$ by Equation 13, so a worst case burst drops at least $k_i \ell_i$ symbols of $X^{(C)}[i]$. We apply relaxations 1-5.

For $l \in [\tau-1]$ we move all but $k_l$ symbols of $X^{(C)}[l]$ to $X^{(C)}[\tau]$. If $X^{(C)}[\tau]$ is received, this move only improves loss recovery. If $X^{(C)}[\tau]$ is involved in a loss starting during time slot $\tau$, $S[0:\tau-1]$ are available, so the move does not harm loss recovery. If a burst starts in time slot $j \in \mathbb{B}_\tau$ then the move only improves loss recovery; if an extra symbol is lost in $X^{(C)}[\tau]$ due to rounding, this can only occur if (a) at least one extra symbol would have been lost in $X^{(C)}[j:\tau-1]$ anyway or (b) $\ell_\tau < \ell_j$, in which case moving more symbols of $X^{(C)}[\tau]$ reduces the number lost. Given relaxation 1, the change only improves loss recovery. If a burst starts in $X^{(C)}[0]$, the changes have only improved loss recovery because strictly more symbols are received; for $j \in [b_0]$, any $\ell_j k_j$ symbols that are lost could have been lost before and now additional symbols are received. This also updates $w_\tau^{(C)} = \ell_0 k_0$ but does not change $w_j^{(C)}$ for any $j > 0$.

For $z = 0, \ldots, b_0 - 1$, we move all but $(k_{\tau+z} + \ell_z k_z)$ symbols of $X^{(C)}[\tau + z]$ to $X^{(C)}[\tau + z + 1]$. If a burst starts during or before time slot $z$ then this does not change which symbols are received.[2] So loss recovery is unchanged for $S[0:z-1], S[z+1:z+b_z-1]$. By Relaxation 5, the worst-case-delay is satisfied for $S[z]$. If a burst starts during time slot $(z+1)$ then $S[z]$ is recovered before the burst. If $b_z = \tau$ then the change causes strictly more symbols to be received and otherwise the exact same symbols are received. Either way, loss recovery will proceed unchanged for $S[z+1:z+b_0]$. If a burst starts strictly after time slot $(z+1)$ during time slot $l$, then by relaxations 1 and 2 all received symbols of $X^{(C)}[l:l+\tau-1]$, including the received symbols of $X^{(C)}[z+\tau:z+\tau+1]$, are maximally useful for loss recovery. The only way fewer symbols

---

[2] Except for another burst that may perhaps start in time slot $(z+\tau+1)$, but for that symbols sent before the burst are useless for loss recovery are available compared to before the change is if the burst starts by time slot $(z+\tau)$ and is of length at least 2 time slots and extra losses occur due to rounding for how many transmitted packets are lost in partial bursts. So we send two extra symbols in $X^{(C)}[r]$ for $r \in \{z+\tau+2,\ldots,z+2\tau\}$ so that each provides one symbol's worth of information about $S[r-\tau]$ under relaxation 5.

The changes may have increased $w_{b_0}^{(C)}$ but not its loss recovery (relaxation 5). They also have not increased $w_j^{(C)}$ for $j > b_0$.

We prove by induction that we can alter $C$ to obey Equation 63 at the cost of $2(\tau-1)$ symbols per time slot; there is no cost for the final $(\tau+1)$ time slots where the message packets are each of size 0.

Suppose for the inductive hypothesis that
$$\forall j \in [i_*], p_{j+\tau}^{(C)} \geq w_j^{(C)} \tag{64}$$

and loss recovery for $S[0:i_*]$ within $\tau$ time slots is guaranteed. The inductive hypothesis has been shown to hold for $i_* = (b_0 - 1)$.

Now we apply induction for $i = (i_* + 1)$. Recall that by the IH $S[0:i-1]$ are still recovered by time slot $(i+\tau-1)$. We know by Lemma 3 that $p_{i+\tau}^{(C)} \geq w_i^{(C)}$ before we altered $C$. During earlier time slot $i' < i$, having moved symbols to $X^{(C)}[i'+\tau]$ could only increase the amount of information available about $S[i]$ by time slot $(i+\tau-1)$ under lossy conditions. Only moving symbols from $X^{(C)}[i+\tau-1]$ to $X^{(C)}[i+\tau]$ may have decreased the amount of information available about $S[i]$ by time slot $(i+\tau-1)$ under lossy conditions. Each symbol moved could only have decreased this (normalized) information by at most 1 while increasing $p_{i+\tau}^{(C)}$ by 1. Before we change anything, loss recovery is guaranteed by the IH.

Next, we continue to increment $w_i^{(C)}$ as long as doing so (a) does not cause $w_i^{(C)}$ to exceed $p_{i+\tau}^{(C)}$, and (b) does not reduce
$$\min_{Y^{(C)}[i:i+b_i-1] \in \mathbb{Y}_{i,i+b_i-1}} \left( \mathcal{I}(S[i:i+b_i-1]; Y^{(C)}[i:i+\tau-1] | S[0:i-1]) \right). \tag{65}$$

Only increasing $w_i^{(C)}$ ensures that $S[0:i-1]$ are still recovered by time slot $(i+\tau-1)$ (under the relaxations) For any burst starting after time slot $i$, the change has no effect on loss recovery, so it still holds.

For any burst starting in time slot $j \in \mathbb{B}_i$ where $j < i$ the change only increases loss recovery capabilities of $S[j:i-1]$ by time slot $(i+\tau-1)$ under our relaxations, so they are still recovered by then. To show loss recovery for $S[j:j+b_j-1]$, it suffices to show loss recovery for the worst-case burst starting in time slot $i$, as $(j+b_j) \leq (i+b_i)$. Under such a burst, recall that the worst case $\mathcal{I}(S[i:i+b_i-1]; Y^{(C)}[i:i+\tau-1] | S[0:i-1])$ is unchanged. Before the change, there was enough information between this and $p_{i+\tau}^{(C)}$ to recover $S[i]$ and some number of symbols of $S[i+1:i+b_i-1]$. Now, after the change, the same amount of information is available (by relaxation 6 symbols of $X^{(C)}[i]$ now used to recover $S[i]$ instead of $S[i+1:i+b_i-1]$ are simply replaced by symbols of $Y^{(C)}[i+1:i+\tau-1]$). In other words, the total amount of information about $S[i:i+b_i-1]$ available by time slot $(i+\tau)$ has not changed. So loss recovery still holds.

Let $\delta_i = (p_{i+\tau}^{(C)} - w_i^{(C)})$. We now move $\delta_i$ symbols from $X^{(C)}[i+\tau]$ to $X^{(C)}[i+\tau+1]$, which increases $p_{i+\tau+1}^{(C)}$ by $\delta_i$ and decreases $p_{i+\tau}^{(C)}$ by $\delta_i$.[3] If $\delta_i = 0$, the inductive step is concluded because there was no change.

Otherwise, loss recovery for $S[0:i-1]$ is the same because the changes occur after the deadline of $(i-1+\tau)$. Since $\delta_i > 0$, this means that we stopped incrementing $w_i^{(C)}$ because incrementing it more would have reduced Equation 65. This means that all but $w_i^{(C)}$ symbols of $S[i]$ are recovered prior to time slot $(i+\tau)$. Hence, by $p_{i+\tau}^{(C)} = w_i^{(C)}$ and relaxation 5, $S[i]$ is recoverable. By relaxations 5 and 6, the change of moving the $\delta_i$ symbols only helps with loss recovery for $S[i+1:i+\tau]$. It is possible that $w_{i+1}^{(C)}$ has increased as a result; however, the at most $\delta_i$ symbols of $X^{(C)}[i+\tau]$ that would have been used to recover $S[i+1]$ are now available in $X^{(C)}[i+1+\tau]$ to recover $S[i+1]$. So $S[i+1]$ is still recovered within $\tau$ time slots, and $p_{i+1+\tau}^{(C)} \geq w_{i+1}^{(C)}$.

For a burst starting in $j \in \mathbb{B}_i \cup \{i+1\}$, or any other burst that ends during or before $(i+\tau)$, the total number of symbols received over $X^{(C)}[i+\tau:i+\tau+1]$ is not reduced, so loss recovery of $S[i+1:j+b_j-1]$ is not negatively impacted. Either $X^{(C)}[i+\tau:i+\tau+1]$ are received (no change) or the information about lost packets is not lowered by the relaxations. For a burst starting during or after $(i+\tau+1)$, the symbols of $X[i+\tau]$ would not be used anyway because $S[0:i+\tau]$ are available. For bursts that include $X[i+\tau:i+\tau+1]$—therefore, starting no sooner than $X[i+2]$ and also ensuring relaxation 1 applies—up to 2 extra symbols may be lost due to a rounding issue of $\lceil \ell_l n_{C,l} \rceil$ symbols being lost in $X[l]$ for $l \in \{i+2, i+\tau+1\}$. This can be mitigated by sending two extra symbols in $X[r+\tau]$ for $r \in \{i+2,\ldots,i+\tau\}$ that is used to recover $S[r]$ (relaxation 5) and increasing $w_r^{(C)}$ by two (up to a max of $k_r$); in other words, all information about up to two symbols of $S[r]$ are removed from the transmission, $C$ pretends $k_r$ was two symbols smaller, and the extra two symbols are sent via replication.

Iterating over $i_* = b_0, \ldots, (t-\tau-1)$, we add at most $2(\tau-1)$ symbols for each value of $i_*$.

---

[3] We do not move the extra symbols we sent due to rounding issues (if we needed to move these to move $\delta_i$ symbols, then these symbols were never needed and are simply not sent).

Finally, we note how the proof changes without the condition on feedback. For each $i \in [t-\tau]$ where $\ell_{i+\tau} < \ell_{i+\tau+1}$, the number of extra symbols sent associated with step $i$ will increase by up to $(\ell_{i+\tau+1} - \ell_{i+\tau})$ times the number of parity symbols moved from $X^{(C)}[i+\tau]$ to $X^{(C)}[i+\tau+1]$. Consider a relaxed code, $C$, that was originally rate optimal. If more than $\sum_{j=i+1}^{i+\tau} k_j \ell_j$ parity symbols are moved, instead they can be deleted, and for $j \in \{i+1, \ldots, i+\tau\}$, $w_j^{(C)}$ could be set to $\ell_j k_j$ and an extra $w_j^{(C)}$ parity symbols be sent in $X^{(C)}[j+\tau]$. Thus, the number of symbols moved during time slot $i$ is at most $\sum_{j=i+1}^{i+\tau} k_j \ell_j$, so the increase during iteration $i$ is at most $$(\ell_{i+\tau+1} - \ell_{i+\tau}) \sum_{j=i+1}^{i+\tau} k_j \ell_j$$

∎

*Corollary 2:* For any $i \in [t-\tau]$, any $j \in \mathbb{B}_i$, and any construction $C$ adjusted under Corollary 1

$$\min_{Y^{(C)}[j:j+b_i-1] \in \mathcal{Y}_{i,j+b_i-1}} (\mathcal{I}(S[j:i]; Y^{(C)}[j:j+\tau-1] \| S[0:j-1])) = \sum_{l=j}^{i} k_l - w_l^{(C)}.$$

*Proof:* Follows from Lemma 5, Lemma 6, Corollary 1, and Equation 24. ∎

4) *Finishing the proof with no resets:* Let $C$ be an offline rate-optimal construction under the relaxations of Appendix C2. Recall that without loss of generality, for all $i \in [t-\tau]$ then $w_i^{(C)} = p_{i+\tau}^{(C)}$ by Corollary 1. This causes $C$ to send an extra at most $2(t-\tau)(\tau+1)$ symbols compared to a rate-optimal code.

We will show that $C$ satisfies the constraints where $p_{i+\tau}^{(LP)} = w_i^{(C)}$ for all $i \in [t-\tau]$. So the objective function is at most the number of symbols sent by $C$; this in turn is at most $$2(t-\tau)(\tau+1)$$

more than a rate-optimal code. Essentially, we show that Constraint 4 is analogous to the worst-case-delay constraint for a burst starting in time slot $i \in [t-\tau]$ where (a) for $j \in \{i, \ldots, i+b_i-1\}$, $w_j^{(C)}$ symbols of $S[j]$ are recovered during time slot $(j+\tau)$, (b) $d_{i,j}$ reflects the number of useful symbols of $Y^{(C)}[j]$ for recovering the remaining symbols of $S[i:j]$ not recovered in (a), and (c) for all $l \in \{i+b_i, \ldots, i+\tau-1\}$, at most $p_l^{(LP)}$ symbols of $X^{(C)}[l]$ are useful for recovering the remaining symbols of $S[i:i+b_i-1]$ not recovered in (a). Ultimately, because prove $C$ satisfies the constraints, the value of the objective function of the algorithm is smaller than the number of symbols sent by $C$ which is at most $$2(t-\tau)(\tau+1)$$

more than the that of a rate-optimal offline code.

We begin by noting that Constraint 1 holds by the proof of Corollary 1. By definition, $w_i^{(C)} \leq \ell_i k_i$, so Constraint 5 is satisfied. Also, Constraint 2 holds by Equation 25 and Equation 13.

By Corollary 2, for any burst starting in $i \in [t-\tau]$ and $j \in \{i, \ldots, i+b_i-1\}$ $$\min_{Y^{(C)}[j:j+b_i-1] \in \mathcal{Y}_{i,j+b_i-1}} (\mathcal{I}(S[i:j];$$

$$Y^{(C)}[i:i+\tau-1] \| S[0:i-1])) = \sum_{l=i}^{j} k_l - w_l^{(C)}. \quad (66)$$

Consequently, $$\mathcal{I}(S[i:i+b_i-1]; Y^{(C)}[i:i+\tau-1] \| S[0:i-1]) = \quad (67)$$

$$\mathcal{I}(S[i:i+b_i-1]; Y^{(C)}[i:i+b_i-1] \| S[0:i-1]) +$$

$$\mathcal{I}(S[i:i+b_i-1]; Y^{(C)}[i+b_i:i+\tau-1] \| \quad (68)$$

$$S[0:i-1], Y^{(C)}[i:i+b_i-1])) \leq$$

$$\sum_{l=i}^{i+h_i-1} \min\left((1-\ell_l)(p_l^{(LP)}+k_l), k_l - w_l^{(C)} + \sum_{r=i}^{l-1} k_r - w_r^{(C)} - \mathcal{I}(S[i:r]; Y^{(C)}[r]|S[0:i-1], Y^{(C)}[i:r-1])\right) +$$

$$\sum_{l=i+h_i}^{i+\tau} \min\left(p_l^{(C)}, \sum_{r=i}^{j} k_r - w_r^{(C)} - \sum_{r=i}^{l-1} \mathcal{I}(S[i:r]; Y^{(C)}[r]|S[0:i-1], Y^{(C)}[i:r-1])\right) \leq$$
(69)

$$\sum_{l=i}^{i+h_i-1} \min\left((1-\ell_l)(p_l^{(LP)}+k_l), k_l - w_l^{(C)} + \sum_{r=i}^{l-1} k_r - w_r^{(C)} - \mathcal{I}(S[i:r]; Y^{(C)}[r]|S[0:i-1], Y^{(C)}[i:r-1])\right) +$$

$$+ \sum_{l=i+h_i}^{i+\tau} p_l^{(C)}$$
(70)

where Equation 68 follows from the chain rule for MI; Equations 69 follows from relaxations 1 and 2 as well as Lemma 4 and Corollary 1; Equation 70 follows from the definition of the minimum function.

Therefore, by Equation 66, for any $i \in [t-\tau], j \in \{i,\ldots,i+h_i-1\}$ Constraints 3 and 4 are satisfied.

By the minimization of Algorithm 1, the values for $p_l^{(LP)}$ lead to $$\sum_{i=0}^{t-\tau} k_i + w_{t-\tau}^{(C)} \geq \sum_{i=0}^{t} k_i + p_{t+\tau}^{(LP)}$$

where the number of symbols sent by a rate-optimal code is by Corollary 1 is at most $$-2(t-\tau)(\tau-1) + \sum_{i=0}^{t-\tau} k_i + w_{t-\tau}^{(C)} \geq -2(t-\tau)(\tau-1) + \sum_{i=0}^{t} k_i + p_{t+\tau}^{(LP)}.$$

*5) Extending to resets:* At a high level, we prove the result by induction on the number of resets. The base case of no resets has already been shown. If the first reset occurs in time slot $r$, we show that the objective function is only $2(r)(\tau-1)$ more than the number of symbols sent under a rate optimal code by time slot $r$. We then apply the inductive hypothesis to prove closeness to optimality for the rest of the transmission.

We prove by induction on $\zeta = \sum_{l=0}^{t} \zeta_l$. The base case of $\zeta = 0$ has already been proven.

For the inductive step, we prove the result for $\zeta$ assuming that it is been proven for all $j \in \{0,\ldots,\zeta-1\}$. Let $r$ be the smallest value so that $\zeta_r = 1$. If $r < \tau$ then only the lossless-delay constraint is imposed for $S[0:r-1]$ so $\sum_{l=0}^{r-1} k_l$ symbols are sent and no parity need to be sent. Otherwise, $S[r-\tau:r-1]$ need not be recovered under lossy conditions. By considering $k_{r-\tau},\ldots,k_{r-1}$ to all be 0, the output of the algorithm through time slot $(r-1)$ can be viewed as how many parity symbols to send per time slot for a code that sends at most $2r(\tau-1)$ more symbols than a rate-optimal code for the transmission of $S[0:r-1]$ after appending $(\tau+1)$ time slots with size 0 message packets. Then an extra $\sum_{l=r-\tau}^{r-1} k_l$ symbols must also be sent under $C$ for the lossless-delay constraints (as with the offline code).

Either way, for time slot $r$ and above, we can view Algorithm 1 as being applied a second time on the remainder of the transmission given $p_l^{(LP)} = 0$ for $l \in \{r,\ldots,r+\tau-1\}$ and the worst-case-delay is not imposed for $S[r-\min(r,\tau):r-1]$. Then $\sum_{l=r}^{t} \zeta_l = (\zeta-1)$, so the correctness of Algorithm 1 holds by the inductive hypothesis. We note at most $(2r(\tau-1) + 2(t-r-\tau)(\tau-1)) = 2(t-\tau)(\tau-1)$ extra symbols are sent overall compared to a rate-optimal offline code.

*D. Proof of Theorem 2*

At a high level, the constraints of the algorithm ensure that Equation 5 is satisfied. For $i \in [t-\tau]$, the sizes of $u_i$ and $p_{i+\tau}$ are then slightly increased to ensure they are divisible by $q_i$ and $h_{i+\tau}$ respectively, leading to the slightly lower rate than the upper bound from Lemma 1.

Equation 5 need only be satisfied with the correct values of $u_i$ and $k_i$ in it and Equation 4 (due to the structure of the proof of Theorem 1). By the minimization and Constraints 3, 4 and Equations 4 (and $u_i = k_i$ if $\sum_{j=i+1}^{i+\tau} \zeta_j > 0$), Equation 5 is always satisfied. Thus, the construction's requirements are met.

For $j \in [t-\tau]$, if $\sum_{l=j+1}^{j+\tau} \zeta_l > 0$ then $p_{j+\tau} = 0$ (by the "resets" case of the construction); also, $u_j = k_j$, so failing to decode $S[j]$ will not hinder using parity symbols for recovering earlier message packets. Recall for any $u_j^{(LP)}$ that increasing $u_j^{(LP)} = p_{j+\tau}^{(LP)}$ to a quantity no more than $\ell_j k_j$ retains satisfaction of all constraints of the LP. So increasing $w_i$ from $p_{i+\tau}^{(LP)}$ for $i \in [t-\tau]$ (to ensure $q_i | w_i$) and likewise increasing $p_{j+\tau}$ (i.e., $p_{j+\tau}^{(LP)}$) is still a valid solution to the LP. Increasing $p_{j+\tau}$ (similarly $p_{i+\tau}^{(LP)}$) to be divisible by $h_{i+\tau}$ for $i \in [t-\tau]$ likewise retains the satisfaction of all constraints (with Constraint 5 removed). After these changes to the values of $p_j^{(LP)}$, $(\tau, t, K, Z, \mathcal{L}, B, W)$-Split Code is fully specified and sends $\sum_{i=0}^{t-\tau} k_i + p_{i+\tau}^{(LP)}$. The total increase in $\sum_{j=0}^{t-\tau} p_{j+\tau}^{(LP)}$ due to the change is at most $\sum_{j=0}^{t-\tau} \mathbb{1}[p_{i+\tau}^{(LP)} \neq 0](q_i + h_{i+\tau} - 2)$.

We know the rate is $$(\sum_{i=0}^{t} k_i)/(2(t-\tau)(\tau-1) + \sum_{i=0}^{t-\tau} k_i + w_i + q_i + h_{i+\tau} - 2).$$

It also sends at most $$\epsilon = 2(t-\tau)(\tau-1) + \sum_{i=0}^{t-\tau} q_i + h_{i+\tau} - 2$$

more symbols than a rate-optimal code.

Let us label the number of symbols sent as $N$, so the rate is $(\sum_{i=0}^{t} k_i)/N$. Then the optimal rate is at most $(\sum_{i=0}^{t} k_i)/(N-\epsilon)$ where $(N-\epsilon) \geq \sum_{i=0}^{t} k_i$.

The difference to the optimal rate is at most $$(\sum_{i=0}^{t} k_i)/(N-\epsilon) - (\sum_{i=0}^{t} k_i)/N \leq$$

$$(\epsilon \sum_{i=0}^{t} k_i)/(N(N-\epsilon)) \leq$$

$$\epsilon/(\sum_{i=0}^{t} k_i).$$

*E. Proof of Theorem 3*

At a high level, the proof is divided into three steps. First, we bound how many extra symbols are modeled as being sent under Algorithm 1 in terms of $\mathcal{R}_0, \ldots, \mathcal{R}_{t-\tau}$ by adding constraints for $p_0^{(LP)}, \ldots, p_t^{(LP)}$ to equal $O_0, \ldots, O_{t-\tau}$, respectively (Appendix E1). We then bound the probability that $\sum_{i=0}^{t-\tau} \mathcal{R}_i$ exceeds its mean by a significant amount (Appendix E2). Finally, we establish the rate in terms of these quantities (Appendix E3).

*1) Extra symbols sent under Algorithm 1:* First, we show that the increase in $\sum_{j=0}^{t} p_j^{(LP)}$ due to adding the constraint $p_{i+\tau}^{(LP)} = O_i$ for $i \in [t-\tau]$ is at most $\mathcal{R}_i$.

Let $w_i^{(Opt)} \in W_i^{(Opt)}$ be the value that minimizes $|w_i^{(Opt)} - O_i|$.

Suppose $O_i \geq w_i^{(Opt)}$. Then using the values of $p_j^{(LP)}$ for all $j > (i+\tau)$ still satisfy all constraints if $p_{i+\tau}^{(LP)}$ is set to equal $O_i$ and $p_{i+\tau,opt}^{(LP)}$.

Otherwise, suppose $O_i < w_i^{(Opt)}$. Let $\delta = \delta' = w_i^{(Opt)} - O_i$. Let us set $w_i^{(Opt)} = O_i$. While $\delta > 0$ let $$j = \min_{l \in \{i, \ldots, i+k_i-1, p_{l+\tau}^{(LP)} < l_l k_l, \sum_{l'=l+1}^{l+k_l} C_{l'} = 0\}} (l).$$

At least one such $j$ exists, since otherwise $p_{i+\tau}^{(LP)}$ could be reduced, violating the minimizing the objective function. Increase $p_{j+\tau}^{(LP)}$ by $\min(\ell_j k_j - w_j^{(Opt)}, \delta)$ and decrement $\delta$ by the changed amount. The changes ensure that all constraints are satisfied. The total number of extra symbols sent is at most $\delta'$.

*2) Bounding the regret:* First, suppose we start with $(\tau, t, K, Z, \mathcal{L}, B)$-Split ML Code and then incrementally for $j = 0, \ldots, (t-\tau)$ add the constraint that $p_{j+\tau}^{(LP)} = O_j$. With each switch, the total number of extra symbols sent is at most $\mathcal{R}_j \leq \ell_j k_j \leq \ell_j m$ (Appendix E1). In total, the number of extra symbols sent compared to $(\tau, t, K, Z, \mathcal{L}, B)$-Split ML Code is $\sum_{j=0}^{t-\tau} \mathcal{R}_j$. The proof follows from the Hoeffding Bound [29]. Formally, $$\mathbb{P}[1/(t+1)\sum_{i=0}^{t}(\mathcal{R}_i - \mathbb{E}[\mathcal{R}_i]) \geq \epsilon_1] \leq e^{-2(t+1)\epsilon_1^2/m}$$

To ensure this probability is at most $\delta$, we require $$\delta \geq e^{-2(t+1)\epsilon_1^2/m}$$

$$e^{2(t+1)\epsilon_1^2/m} \geq 1/\delta$$

$$2(t+1)\epsilon_1^2/m \geq \log(1/\delta)$$

$$t \geq \log(1/\delta)/(2\epsilon_1^2).$$

*3) Online approximately optimality:* Let $$\mathcal{R}_{[t]}^{(+)} = \sum_{i=0}^{t} \mathcal{R}_i$$

Let the total number of symbols modeled as being sent under Algorithm 1 be $N_{\tau,t,K,Z,C,B} = \sum_{i=0}^{t-\tau} k_i + p_{t+\tau}^{(LP)}$. Then let $$N' = N_{\tau,t,K,Z,C,B} - 2(t-\tau)(\tau-1) - \sum_{i=0}^{t}(h_i + q_i - 2)$$

$$\gamma = 2(t-\tau)(\tau-1) + \left(\sum_{i=0}^{t} h_i + q_i - 2\right) + \mathcal{R}_{[t]}^{(+)}.$$

Restricting to using the building block construction causes sending at most an extra up to $(h_i + q_i - 2)$ symbols per time slot $i$ compared to an optimal scheme for the choice of $O_0, \ldots, O_t$. By Lemma 1, defining $W_i^{(Opt)}$ for $i \in [t]$ as we do costs an additional at most $2(t-\tau)(\tau-1)$. So $N'$ is at most the number of symbols sent by an offline rate-optimal scheme. By Appendix E1, the number of extra symbols sent during time slot $i$ due to sub optimal choice of $O_i$ is $\mathcal{R}_i$. So the total number of extra symbols sent over an optimal coding scheme is at most $\gamma$.

Let $K^{(+)} = \sum_{i=0}^{t} k_i$. Then, $$R^{(opt)} - R^{(on)} \leq \tag{71}$$

$$K^{(+)}/N' - K^{(+)}/(N'+\gamma) \leq \qquad K^{(+)}\gamma/(N'(N'+\gamma)) \leq \gamma/N' \tag{72}$$

Recall from Appendix E2 that with probability at least $(1-\delta)$, $$\mathcal{R}_{[t]}^{(+)} \leq \sum_{i=0}^{t}(\epsilon h_i + \epsilon_1)$$

Therefore, by the definition of $K^{(+)}$ and the fact that $K^{(+)} \leq N'$, $$R^{(opt)} - R^{(on)} \leq \left(2(t-\tau)(\tau-1) + \sum_{i=0}^{t}(h_i + q_i - 2 + \epsilon h_i + \epsilon_1)\right)/N'$$

$$\leq \left(2(t-\tau)(\tau-1) + \sum_{i=0}^{t}(h_i + q_i - 2 + \epsilon h_i + \epsilon_1)\right)/K^{(+)}$$

$$= \epsilon + \epsilon_1(t+1)/K^{(+)} + \sum_{i=0}^{t}(2\tau + h_i + q_i - 4)/K^{(+)}$$

What is claimed is:

1. An erasure-coding based, live communication method for sending a real-time stream of video frames from a sender to a receiver, the method comprising:
   obtaining, by the sender and for each frame i of a plurality of video frames of said video stream, loss estimation parameters for the video frame i including a burst loss estimate, $b_i$, for the video frame i and a per-frame packet loss estimate, $l_i$, for the video frame i;
   partitioning, by the sender and for each video frame i of a plurality of video frames of said video stream, a set of video data symbols D[i] into a first set of video data symbols U[i] and a second set of video data symbols V[i] by using said estimated $b_{i-\tau}$ through $b_i$ and $l_{i-\tau}$ through $l_{(i+bi-1)}$ to determine a minimum size for U[i] and then identifying how many symbols are partitioned to U[i] between this minimum value and all symbols of D[i] and allocating the rest to V[i], wherein τ is a function of a predetermined maximum tolerable latency of the video stream expressed as a whole number of frames;
   generating, by the sender and for each video frame i, a set of one or more streaming FEC code parity symbols P[i] based on the symbols: V[i−τ] through V[i−l], U[i−τ], and the symbols of V[i] but not U[i], wherein the number of parity symbols for the ith video frame is determined as a function of the size of U[i−τ];
   encoding, by the sender and for each video frame i, the symbols of D[i] and P[i] into a plurality, $c_i$, of channel frames such that each of U[i], V[i], and P[i] is spread evenly across the plurality of channel frames, wherein each of U[i] and V[i] is selectively zero-padded by as little as possible and the size of P[i] is selectively increased by as little as possible to ensure that the size of each of U[i], V[i], and P[i] is evenly divisible by $c_i$, and wherein $c_i$ is selected to be as small as possible under the conditions that (a) evenly spreading the symbols over the channel frames leads to a channel frame size that is no more than a predetermined maximum transmittable unit size and (b) $c_i$ times $l_i$ is an integer or rounds up to be an integer where the increase due to rounding is small relative to the product; and
   transmitting the plurality of channel frames by the sender to the receiver over a lossy communication channel that can introduce burst losses including partial burst losses.

2. The method of claim 1, wherein the value of t is chosen based on the frame rate and one-way propagation delay from the sender to the receiver.

3. The method of claim 1, wherein the P[i] is the sum of two quantities P[i]:=$P_1$[i]+$P_2$[i], wherein the symbols of $P_1$[i] are linear combinations of the symbols of U[i−τ], and wherein the symbols of $P_2$[i] are linear combinations of the symbols of V[i−τ], . . . , V[i].

4. The method of claim 1, wherein setting the number of parity symbols sent for the ith video frame as a function of the size of U[i−τ] comprises:
   setting the number of parity symbols sent for the ith video frame to be the size of U[i−τ] times $l_{i-\tau}$ and optionally increasing the resulting number of parity symbols to be evenly divisible by the number of channel frames sent for the ith video frame.

5. The method of claim 1, wherein the sender receives the loss estimation parameters for the video frame i as feedback from the receiver.

6. The method of claim 1, wherein the sender is configured to receive loss estimation parameters as feedback from the receiver, and wherein, when the sender has not received loss estimation parameters for the video frame i from the receiver, the sender sets the loss estimation parameters for the video frame i to values used for a prior video frame.

7. The method of claim 1, wherein the sender is configured to receive loss estimation parameters as feedback from the receiver, and wherein the sender determines the loss estimation parameters for the video frame i based on feedback from the receiver for one or more prior video frames.

8. The method of claim 1, further comprising:
   decoding, by the receiver, a burst across i to j consecutive frames where j is an integer between one and b; to solve a system of linear equations corresponding to the symbols of D[i−τ] through D[i+τ−1], wherein the symbols of D[i−τ] through D[i−1] are combined with the received symbols V[i] through V[i+τ−1] and received symbols of P[i] through P[i+τ−1] to recover V[i] through V[i+$b_i$−1] and then for each r in i to j the symbols of V[r] through V[r+τ] are combined with the received symbols of U[r] and P[r+τ] to recover U[r].

9. The method of claim 8, wherein the receiver is configured to transmit loss estimation parameters as feedback to the sender, optionally wherein the receiver uses machine learning to determine the loss estimation parameters for the video frame i based at least on channel characteristics for at least one prior video frame.

10. The method of claim 8, wherein the sender performs video data compression to produce the plurality of video frames of said video stream, optionally wherein the receiver sends a reset request to the sender to reset video compression upon determining that a recovered compressed video frame cannot be rendered due to dependence on an earlier unrecovered compressed video frame.

11. A video streaming system comprising:
   a sender for sending a real-time stream of video frames from a sender to a receiver, wherein the sender is configured to:
     obtain, for each frame i of a plurality of video frames of said video stream, loss estimation parameters for the video frame i including a burst loss estimate, $b_i$, for the video frame i and a per-frame packet loss estimate, $l_i$, for the video frame i;
     partition, for each video frame i of a plurality of video frames of said video stream, a set of video data symbols D[i] into a first set of video data symbols U[i] and a second set of video data symbols V[i] by using said estimated $b_{i-\tau}$ through $b_i$ and $l_{i-\tau}$ through $l_{(i+bi-1)}$ to determine a minimum size for U[i] and then identifying how many symbols are partitioned to U[i] between this minimum value and all symbols of D[i] and allocating the rest to V[i], wherein τ is a function of a predetermined maximum tolerable latency of the video stream expressed as a whole number of frames;
     generate, for each video frame i, a set of one or more streaming FEC code parity symbols P[i] based on the symbols: V[i−τ] through V[i−1], U[i−τ], and the symbols of V[i] but not U[i], wherein the number of parity symbols for the ith video frame is determined as a function of the size of U[i−τ];
     encode, for each video frame i, the symbols of D[i] and P[i] into a plurality, $c_i$, of channel frames such that each of U[i], V[i], and P[i] is spread evenly across the plurality of channel frames, wherein each of U[i] and V[i] is selectively zero-padded by as little as possible and the size of P[i] is selectively increased by as little as possible to ensure that the size of each of U[i], V[i], and P[i] is evenly divisible by $c_i$, and wherein $c_i$ is selected to be as small as possible under the conditions that (a) evenly spreading the symbols over the channel frames leads to a channel frame size that is no more than a predetermined maximum transmittable unit size and (b) $c_i$ times $l_i$ is an integer or rounds up to be an integer where the increase due to rounding is small relative to the product; and transmit the plurality of channel frames to the receiver over a lossy communication channel that can introduce burst losses including partial burst losses.

12. The system of claim 11, wherein the value of τ is chosen based on the frame rate and one-way propagation delay from the sender to the receiver.

13. The system of claim 11, wherein the P[i] is the sum of two quantities $P[i]:=P_1[i]+P_2[i]$, wherein the symbols of $P_1[i]$ are linear combinations of the symbols of U[i–τ], and wherein the symbols of $P_2[i]$ are linear combinations of the symbols of V[i–τ], . . . , V[i].

14. The system of claim 11, wherein setting the number of parity symbols sent for the ith video frame as a function of the size of U[i–τ] comprises:

setting the number of parity symbols sent for the ith video frame to be the size of U[i–τ] times $l_{i-\tau}$ and optionally increasing the resulting number of parity symbols to be evenly divisible by the number of channel frames sent for the ith video frame.

15. The system of claim 11, wherein the sender receives the loss estimation parameters for the video frame i as feedback from the receiver.

16. The system of claim 11, wherein the sender is configured to receive loss estimation parameters as feedback from the receiver, and wherein, when the sender has not received loss estimation parameters for the video frame i from the receiver, the sender sets the loss estimation parameters for the video frame i to values used for a prior video frame.

17. The system of claim 11, wherein the sender is configured to receive loss estimation parameters as feedback from the receiver, and wherein the sender determines the loss estimation parameters for the video frame i based on feedback from the receiver for one or more prior video frames.

18. The system of claim 11, further comprising:

the receiver, wherein the receiver is configured to:

decode a burst across i to j consecutive frames where j is an integer between one and $b_i$ to solve a system of linear equations corresponding to the symbols of D[i–τ] through D[i+τ–1], wherein the symbols of D[i–τ] through D[i–1] are combined with the received symbols V[i] through V[i+τ–1] and received symbols of P[i] through P[i+τ–1] to recover V[i] through V[i+$b_i$–1] and then for each r in i to j the symbols of V[r] through V[r+τ] are combined with the received symbols of U[r] and P[r+t] to recover U[r].

19. The system of claim 18, wherein the receiver is configured to transmit loss estimation parameters as feedback to the sender, optionally wherein the receiver uses machine learning to determine the loss estimation parameters for the video frame i based at least on channel characteristics for at least one prior video frame.

20. The system of claim 18, wherein the sender performs video data compression to produce the plurality of video frames of said video stream, optionally wherein the receiver sends a reset request to the sender to reset video compression upon determining that a recovered compressed video frame cannot be rendered due to dependence on an earlier unrecovered compressed video frame.

* * * * *